United States Patent
Sakata et al.

(10) Patent No.: US 8,378,547 B2
(45) Date of Patent: Feb. 19, 2013

(54) ELECTRIC MOTOR

(75) Inventors: Kenji Sakata, Kiryu (JP); Yoshichika Kawashima, Kiryu (JP)

(73) Assignee: Mitsuba Corporation, Gunma (JP)

( * ) Notice: Subject to any disclaimer, the term of this patent is extended or adjusted under 35 U.S.C. 154(b) by 183 days.

(21) Appl. No.: 12/737,308

(22) PCT Filed: Jun. 30, 2009

(86) PCT No.: PCT/JP2009/061972
§ 371 (c)(1),
(2), (4) Date: Dec. 28, 2010

(87) PCT Pub. No.: WO2010/001899
PCT Pub. Date: Jan. 7, 2010

(65) Prior Publication Data
US 2011/0095638 A1    Apr. 28, 2011

(30) Foreign Application Priority Data

| Jun. 30, 2008 | (JP) | 2008-170738 |
| Jun. 30, 2008 | (JP) | 2008-170739 |
| Jun. 30, 2008 | (JP) | 2008-170740 |
| Feb. 23, 2009 | (JP) | 2009-039598 |
| Mar. 19, 2009 | (JP) | 2009-068640 |

(51) Int. Cl.
*H02K 3/28* (2006.01)
(52) U.S. Cl. ............ 310/198; 310/184; 310/185
(58) Field of Classification Search .......... 310/184–185, 310/198, 219–226, 233, 234, 239
See application file for complete search history.

(56) References Cited

U.S. PATENT DOCUMENTS

| 6,079,659 A * | 6/2000 | Yamamura et al. | 242/433.2 |
| 6,819,025 B2 * | 11/2004 | Egawa et al. | 310/216.001 |
| 7,352,100 B2 * | 4/2008 | Ito et al. | 310/216.011 |

(Continued)

FOREIGN PATENT DOCUMENTS

| CN | 1470095 | 1/2004 |
| JP | 2-184246 | 7/1990 |
| JP | 2006-352993 | 12/2006 |
| JP | 2008-92731 | 4/2007 |
| JP | 2007-202391 | 8/2007 |

(Continued)

OTHER PUBLICATIONS

Chinese Office Action mailing date of Dec. 5, 2012 on the underlying Application No. 200980133232.1 with English translation thereof.

*Primary Examiner* — Tran Nguyen
(74) *Attorney, Agent, or Firm* — Kenyon & Kenyon LLP

(57) ABSTRACT

In an electric motor, magnets (4) have two pairs of poles, the number of teeth (9) is 18, and the number of segments (14) of a commutator is 18. Winding wires (12, 25) for forming an armature coil (7) are formed by a first conductive wire (110) or a second conductive wire (120). The winding wire (25) has a first coil winding wire (7A) and a second coil winding wire (7B). The coil winding wires are each wound around four teeth (9) adjacent to each other. An end (31) of the second coil winding wire is connected to a segment (14) adjacent to a segment arranged at a position which is point symmetric with respect to a segment to which an end (30) of the first coil winding wire is connected. According to the invention, in the electric motor capable of changing the rotational speed of the armature by switching application of an electric current among three brushes, vibration and operating noise can be reduced, and mounting of the connecting wires and the winding wires can be facilitated.

23 Claims, 48 Drawing Sheets

U.S. PATENT DOCUMENTS

| | | | |
|---|---|---|---|
| 7,928,629 B2 * | 4/2011 | Aoyama et al. | 310/248 |
| 8,080,916 B2 * | 12/2011 | Shioda et al. | 310/195 |
| 2005/0206268 A1 | 9/2005 | Walter et al. | |
| 2006/0244334 A1 * | 11/2006 | Furui | 310/198 |
| 2010/0013361 A1 * | 1/2010 | Zhao et al. | 310/40 MM |

FOREIGN PATENT DOCUMENTS

| | | |
|---|---|---|
| WO | WO 02/21665 | 3/2002 |
| WO | WO 2005/076442 | 8/2005 |

* cited by examiner

ELECTRIC MOTOR

TECHNICAL FIELD

The present invention relates to an electric motor which is mounted to automobiles or the like, and particularly, to an electric motor capable of changing the rotational speed of an armature provided in the electric motor. Priority is claimed on Japanese Patent Application Nos. 2008-170738, 2008-170739, and 2008-170740 filed on Jun. 30, 2008, Japanese Patent Application No. 2009-039598 filed on Feb. 23, 2009, and Japanese Patent Application No. 2009-068640 filed on Mar. 19, 2009, the contents of which are incorporated herein by reference.

BACKGROUND ART

Generally, commutator motors with brushes are frequently used as an electric motor mounted on an automobile. This electric motor has a cylindrical yoke, a plurality of permanent magnets arranged on the inner circumferential surface of this yoke, and an armature arranged inside these permanent magnets and rotatable with respect to the yoke. This armature has a rotary shaft, and an armature core which is fixed onto this shaft and has a plurality of radially formed teeth, and a coil wound around the teeth. The coil has a plurality of winding wires wound around the teeth through slots formed between the teeth. The respective winding wires are connected to a plurality of segments of the commutator fixed to the rotary shaft.

The commutator has a plurality of segments which is formed from metal pieces, is insulated from each other and disposed in a columnar shape. A winding starting end and a winding finishing end of the winding wire are connected to each of the segments. Additionally, a plurality of brushes is connected to the segments of the commutator so as to be capable of making sliding contact therewith, and an electric current is supplied to the coil via these brushes. Also, a magnetic field is formed in the teeth of the armature core due to an electric current which flows through the coil, and the armature is rotated with the rotary shaft by a magnetic attractive force or repulsive force which is generated between the teeth and the permanent magnets fixed onto the yoke.

In this electric motor, there is a motor including a total of three brushes, a brush for low speed and a brush for high speed which are selectively connected to a positive terminal of a power source and a common brush connected to a negative terminal of the power source. By selectively connecting either the brush for low speed or the brush for high speed to the positive terminal, the rotational speed of the armature provided in the electric motor can be changed (for example, PTL 1).

FIG. 17 is a developed view of an electric motor 80 with four poles, sixteen slots, and sixteen segments, having four permanent magnets (two pole pairs), sixteen teeth (slots), and sixteen segments, which is disclosed in PTL 1. As for the permanent magnets 81, N poles and S poles are arranged alternately. The slots 83 are gaps between the teeth 82 adjacent to each other. As shown in this drawing, No. 1 to No. 16 are given to the respective teeth 82 and the respective segments 84.

A winding wire 87 and a winding wire 88, which is arranged at a position which is point symmetric with respect to the winding wire 87, are substantially simultaneously wound around the teeth 82 by a double flyer. The winding wire 87 is split into two coil winding wires 93A and 93B, and is wound around the teeth 82 with different numbers. That is, the winding wire 87 connected to a No. 2 segment 84e passes through a slot 83e between a No. 16 tooth 82 and a No. 1 tooth 82, passes through a slot 83f between a No. 3 tooth 82 and a No. 4 tooth 82, and is wound in a forward direction around No. 1, No. 2, and No. 3 teeth 82 n times (n is a natural number), whereby a coil winding wire 93A is formed.

Next, the winding wire 87 passes through a slot 83g between a No. 7 tooth 82 and a No. 8 tooth 82, passes through a slot 83b between a No. 4 tooth 82 and a No. 5 tooth 82, is wound in an opposite direction around No. 5, No. 6, and No. 7 teeth 82 n times, and is connected to a No. 3 segment 84a, whereby a coil winding wire 93B is formed. The slot 83g exists at a position deviated in a circumferential direction from the slot 83f by a mechanical angle of 90°, and the slot 83b exists at a position deviated in a circumferential direction from the slot 83e by a mechanical angle of 90°.

On the other hand, the winding wire 88 is split into two coil winding wires 93C and 93D, and is wound around the teeth 82 with different numbers. That is, the winding wire 88 connected to a No. 10 segment 84b passes through a slot 83h between a No. 8 tooth 82 and a No. 9 tooth 82, passes through a slot 83i between a No. 11 tooth 82 and a No. 12 tooth 82, and is wound in a forward direction around No. 9, No. 10, and No. 11 teeth 82 n times (n is a natural number), whereby a coil winding wire 93C is formed.

Next, the winding wire 88 passes through a slot 83j between a No. 15 tooth 82 and a No. 16 tooth 82, passes through a slot 83d between No. 12 and No. 13 teeth 82, is wound in an opposite direction around No. 13, No. 14, and No. 15 teeth 82 n times, and is connected to a No. 11 segment 84c, whereby a coil winding wire 93D is formed. The slot 83j exists at a position deviated in a circumferential direction from the slot 83i by a mechanical angle of 90°, and the slot 83d exists at a position deviated in a circumferential direction from the slot 83h by a mechanical angle of 90°.

In the electric motor 80, the winding wire 87 and the winding wire 88 which are wound in this way are wound 8 times while the segment 84 of winding starting is shifted sequentially one by one in the forward direction, and an armature coil is formed by the winding wire 87 and the winding wire 88.

The No. 2 segment 84e and the No. 10 segment 84b, as well as the No. 3 segment 84a and the No. 11 segment 84c are short-circuited by connecting wires 90. Additionally, the brushes 91 which come into sliding contact with the segments 84 includes three brushes of a brush 92a for low speed and a brush 92b for high speed which are selectively connected to a positive electrode terminal of a power source, and a common brush 92c connected to a negative electrode terminal of the power source. The brush 92a for low speed and the common brush 92c are arranged at an interval of 180° in electric angle.

The brush 92b for high speed is arranged in the state of being separated by a predetermined angle in the circumferential direction from the brush 92a for low speed. Also, when an electric current is supplied to between the brush 92a for low speed and the common brush 92c from the power source, the electric motor 80 is rotationally driven at a low speed, and when an electric current is supplied to between the brush 92b for high speed and the common brush 92c from the power source, the electric motor 80 is rotationally driven at high speed. Since the No. 2 segment 84e and the No. 10 segment 84b, as well as the No. 3 segment 84a and the No. 11 segment 84c are short-circuited by the connecting wires 90 so as to have the same potential, even in the electric motor 80 with four magnetic poles, low-speed rotational driving and high-speed rotation of the electric motor 80 are possible due to the three brushes 92a, 92b, and 92c.

Here, the winding wire 87 and the winding wire 88 of the electric motor 80 adopt a configuration using coil winding wires split in two. The reason is as follows. In a case where the winding wire 87 and the winding wire 88 are split, the number of times of winding a coil winding wire can be distributed into two (n and n). However, in a case where the winding wires are not split, the number of times of winding the coil winding wire 93A becomes 2n in the winding wire 87, and similarly the number of times of winding the coil winding wire 93C becomes 2n in the winding wire 88.

In this case, for example, there is an increase in the number of crossovers 94A of the coil winding wire 93A which crosses over from the slot 83e to the slot 83f, and the number of crossovers 94C of the coil winding wire 93C which crosses over from the slot 83h to the slot 83i. Therefore, in the armature coil formed by overlapped winding, in a case where the coil winding wires 93A and the 93C are wound so as to overlap the outside of the coil winding wires 93A and 93C which are already wound, winding thickening occurs, so that axial dimensions of the armature becomes large and the space factor of the winding wires decreases.

Thus, the configuration of coil winding wires split into two is adopted to reduce the axial dimensions of the armature and improve the space factor of the winding wires. Moreover, as described above, in the multi-pole electric motor with four or more poles, it is useful to adopt the structure in which the connecting wires are arranged at the armature and the configuration of split coil winding wires, in order to allow the rotational speed of the armature to be changed by three brushes and to achieve reduction in the axial dimensions of the armature and improvement in the space factor of the winding wires.

RELATED ART DOCUMENT

Patent Literature

[PTL 1] JP-A-2007-202391

SUMMARY OF INVENTION

Technical Problem

However, in a case where the number of teeth (N=16) is an even number of times (N=8×P) of the number of pole pairs (P=4/2=2) as in the above-described electric motor of four poles, sixteen slots, and sixteen segments, torque ripple tends to increase. Hereinafter, this will be described with reference to FIG. 18. FIG. 18 is a view illustrating a torque ripple generated in the armature when the armature is arranged at a certain position. When the armature is arranged at the position shown in this drawing, lines of magnetic flux ($\eta 1$ to $\eta 4$) which are each inclined in the thrust direction (circumferential direction) are generated between the No. 3 tooth 82 and a magnet 81b, between the No. 7 tooth 82 and a magnet 81c, between the No. 11 tooth 82 and a magnet 81d, and between the No. 15 tooth 82 and a magnet 81a.

Thus, if the lines of magnetic flux are generated between the teeth 82 and the magnets 81, attractive forces which act in order to minimize the length of the lines of magnetic flux are generated between the teeth 82 and the magnets 81 according to the natural laws which attempt to minimize magnetic energy. Here, since the lines of magnetic flux ($\eta 1$ to $\eta 4$) are inclined in the thrust direction (circumferential direction), the attractive forces in the thrust direction (circumferential direction) are included in the attractive force generated between the teeth 82 and the magnets 81. Due to this attractive force in the thrust direction, torques (T1 to T4) in the thrust direction are respectively generated in the No. 3 tooth 82, the No. 7 tooth 82, the No. 11 tooth 82, and the No. 15 tooth 82. The total of the torques (T1 to T4) in the thrust direction becomes the cause of torque ripple.

Here, in a case where the number of teeth (N=16) is an even number of times (N=8×P) of the number of pole pairs (P=4/2=2) as in the conventional example, the torques (T1 to T4) in the thrust direction are simultaneously generated in the same direction (counterclockwise rotation in this drawing). Therefore, the torque ripple which is the total of the torques (T1 to T4) in the thrust direction increases. This torque ripple becomes the cause of vibration and operating noise generated in the electric motor when the armature of the electric motor rotates.

Additionally, in the armature having the connecting wires as in the conventional example, the connecting wires may be disposed in advance at the commutator, and then the winding wires may be connected to the commutator. In this case, since the work of mounting the conductive wires becomes 2 times or more, workability is bad and cost increases.

Thus, the object of the invention is to provide an electric motor capable of reducing vibration and operating noise, facilitating mounting of connecting wires and winding wires, and changing the rotational speed of an armature by the switching application of an electric current among three brushes.

Solution to Problem

An electric motor related to the invention includes a housing which is a magnetic yoke; a plurality of pairs of magnets fixed onto the inner wall of the housing, a rotary shaft, an armature core which is fixed onto the rotary shaft and has a plurality of radially formed teeth, a commutator which is fixed onto the rotary shaft and has a plurality of segments, an armature coil wound so as to surround the teeth of the armature core and having a plurality of winding wires connected to the segments of the commutator, and a plurality of connecting wires connecting one pair of segments of the commutator. Additionally, this electric motor includes an armature arranged so as to be surrounded by the plurality of pairs of magnets, and rotatably supported in the housing, and a plurality of brushes capable of making sliding contact with the segments of the commutator of the armature. The number of pole pairs of the magnets is 2, the number of the teeth is 18, the number of the segments of the commutator is 18, and the armature has a first conductive wire and a second conductive wire. The plurality of winding wires has first to ninth winding wires formed from the first conductive wire, and the other first to ninth winding wires formed from the second conductive wire and arranged so as to each face respective winding wires of the first to ninth winding wires. The first to the ninth winding wires are joined together in series via respective connecting wires of the nine connecting wires formed from the first conductive wire, and the other first to ninth winding wires are joined together in series via respective connecting wires of the other nine connecting wires formed from the second conductive wire. Respective winding wires of the first to ninth winding wires and the other first to ninth winding wires have a first coil winding wire and a second coil winding wire which are connected in series to each other, an end of the first coil winding wire is connected to one segment of the commutator, and an end of the second coil winding wire is connected to a segment adjacent to a segment arranged at a position which is point symmetric with respect to the segment to which the end of the first coil winding wire is connected.

The first coil winding wire is wound so as to surround four teeth adjacent to each other, the second coil winding wire is arranged at a position adjacent to the four teeth around which the first coil winding wire is wound, and is wound so as to surround four other teeth adjacent to each other, and the winding direction of the second coil winding wire is opposite to the winding direction of the first coil winding wire. Additionally, respective connecting wires of the nine connecting wires and respective connecting wires of the other nine connecting wires are connected to one pair of segments which is arranged to face each other. The brushes have first and second brushes selectively connected to a first power supply terminal, and a third brush connected to a second power supply terminal, the first brush is arranged at a position separated from the third brush by an electrical angle of about 180°, and the second brush is arranged at a position separated by a predetermined angle from a position apart from the third brush by an electric angle of about 180°.

Advantageous Effects of Invention

In this way, in the electric motor capable of changing the rotational speed of the armature by switching application of an electric current among three brushes, the number of pole pairs of the magnets is set to 2 and the number of teeth of the armature core is set to 18 which is an odd number of times of the number of pole pairs, so that the torque ripple can be reduced, and the operating noise generated from the electric motor can be reduced. Additionally, the workability of mounting of the connecting wires and the winding wires is improved by forming the respective winding wires and the respective connecting wires in a series by the first and second conductive wires.

DESCRIPTION OF EMBODIMENTS

Figure 1:
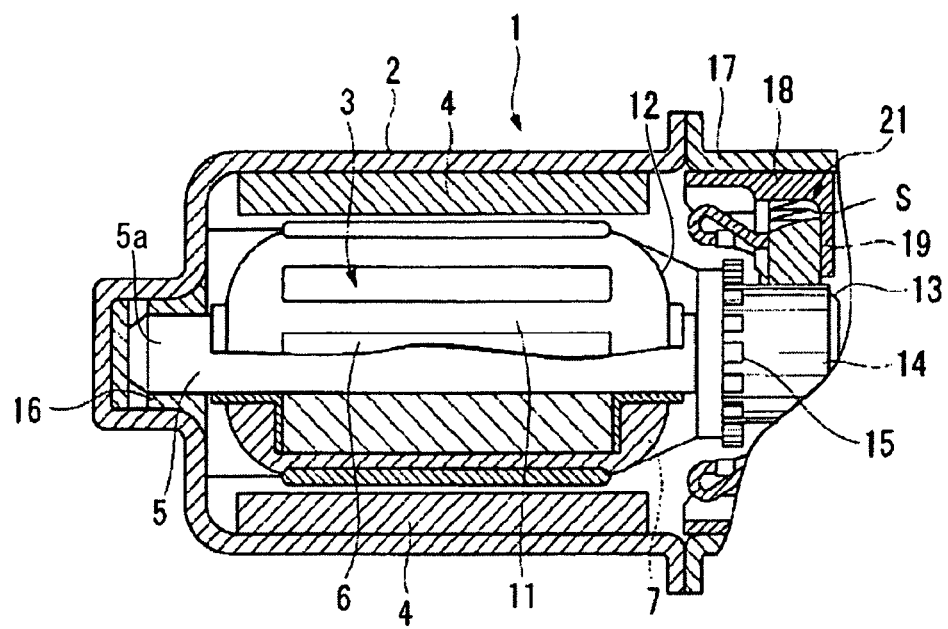
FIG. 1 is a longitudinal sectional view showing the configuration of an electric motor in a first embodiment of the invention.
Figure 2:
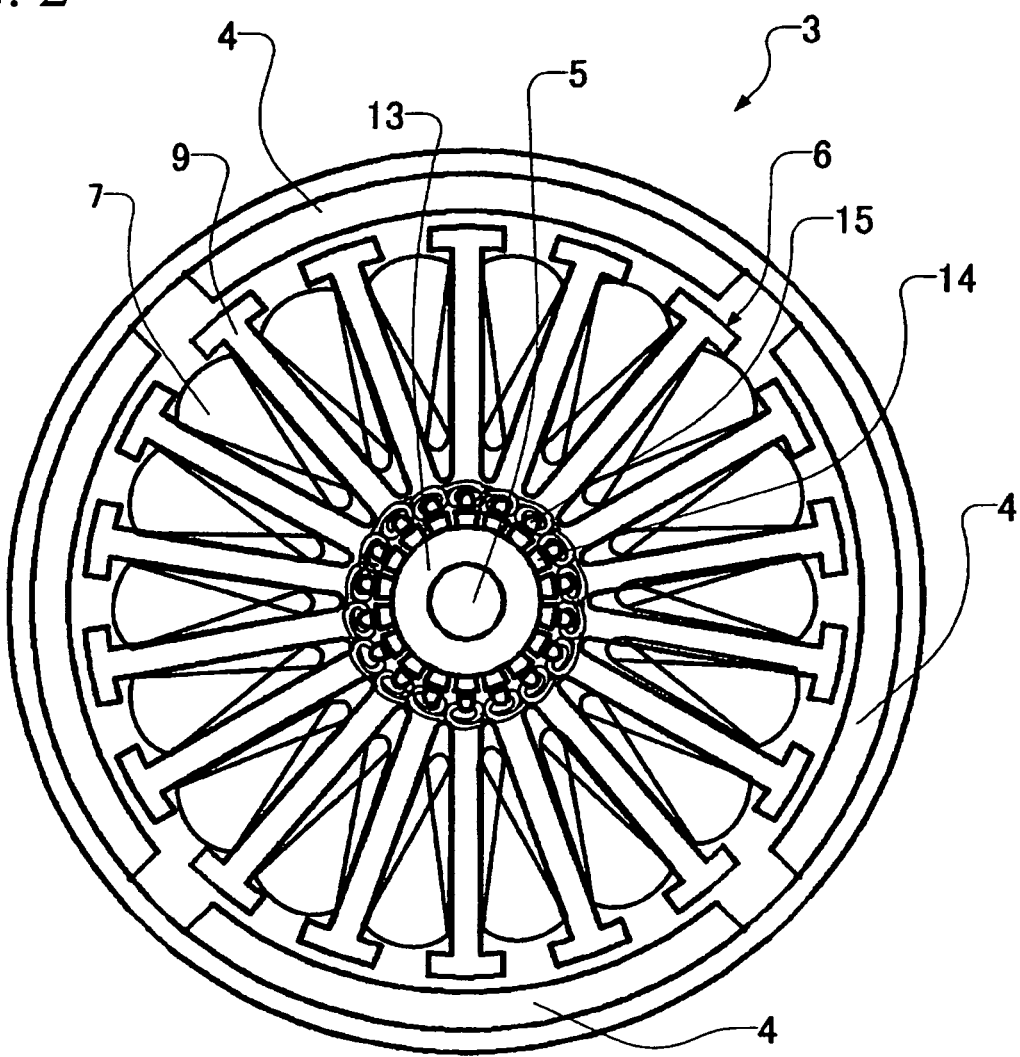
FIG. 2 is a top view of an armature in the first embodiment of the invention.

Embodiments of the invention will be described below. In addition, in the drawings corresponding to the following description, a portion of reference signs which designate components common to a plurality of embodiments may be omitted.

Next, an electric motor 1, in which a first embodiment of the invention will be described with reference to FIGS. 1 to 5, is used as a drive unit, such as a wiper motor, a power window motor, and a fan motor of an automobile, and has a bottomed cylindrical yoke 2, magnets 4 fixed onto the inner wall of the yoke 2, and an armature 3 surrounded by the magnets 4, arranged within the yoke 2, and rotatably supported with respect to the yoke 2. The magnets 4 are magnetized in four poles, the electric motor 1 is a tetrapolar electric motor, and the number of pole pairs is 2.

The armature 3 is configured of an armature core 6 fixed onto a rotary shaft 5, an armature coil 7 wound around the armature core 6, and a commutator 13 fixed onto the rotary shaft 5. The armature core 6 is formed by stacking a plurality of metal plates in an axial direction. Eighteen teeth 9 (refer to FIG. 2), which are formed in a T shape, are radially formed at regular intervals along a circumferential direction at an outer circumferential portion of a metal plate. As a plurality of metal plates is externally fitted to the rotary shaft 5, a grooved slot 11 is formed between adjacent teeth 9 at an outer circumference of the armature core 6.

Eighteen slots 11 extend along the axial direction of the rotary shaft 5, and are formed at regular intervals along the circumferential direction. Here, the number of teeth 9 or slots 11 is 18, the number of pole pairs is 2, and the number of slots 11 is 9 times the number of pole pairs (18=9×2), and becomes an odd number of times. Additionally, a plurality of enamel-coated winding wires 12 is wound between the slots 11, and thereby, an armature coil 7 is formed at the outer circumference of the armature core 6.

The commutator 13 is fixed onto one end of the rotary shaft 5. Eighteen segments 14 formed from a conductive material are attached onto the outer circumferential surface of the commutator 13. The segments 14 are made of a plate-like metal piece which is long in the axial direction, and are fixed onto insulated resin in parallel at regular intervals along the circumferential direction in a state where the segments are insulated from each other. A riser 15 which is bent in a folded-back fashion is integrally formed at the end of each segment 14 on the side of the armature core 6. A winding wire 12, which becomes a winding starting end 30 and a winding finishing end 31 of the winding wire 12 of an armature coil 7, is connected to the riser 15. Thereby, a segment 14 and a winding wire 12 of an armature coil 7 corresponding to this segment are electrically connected to each other.

Additionally, the risers 15 respectively corresponding to the segments 14 (every eighth segments 14 in the present embodiment), which face each other at positions which are point symmetric with respect to each other about the rotary shaft 5, are each connected by the connecting wires 25. The connecting wires 25 are members for short-circuiting a plurality of segments 14 which has the same potential, and are arranged between the commutator 13 and the armature core 6.

An end 5a of the rotary shaft 5 is supported so as to be freely rotatable by a bearing 16 which is arranged within a boss 2a formed in the yoke 2 so as to protrude therefrom. An opening end of the yoke 2 is provided with a cover 17, and a holder stay 18 is attached to the inside of the cover 17. Brush holders 19 are formed at three circumferential positions of the holder stay 18. Brushes 21 are built into each of the brush holders 19, so as to protrude and retract from the brush holders 19 in a state where the brushes are pressed via respective coil-shaped springs S. Since the brushes 21 are pressed by the coil-shaped springs S, the tips of the brushes 21 come into sliding contact with the commutator 13, and an electric current is supplied to the commutator 13 via the brushes 21 from an external power source (not shown). In addition, the springs S are not limited to the coil-shaped springs, and may be a plate-like, i.e., a plate spring.

Figure 3:
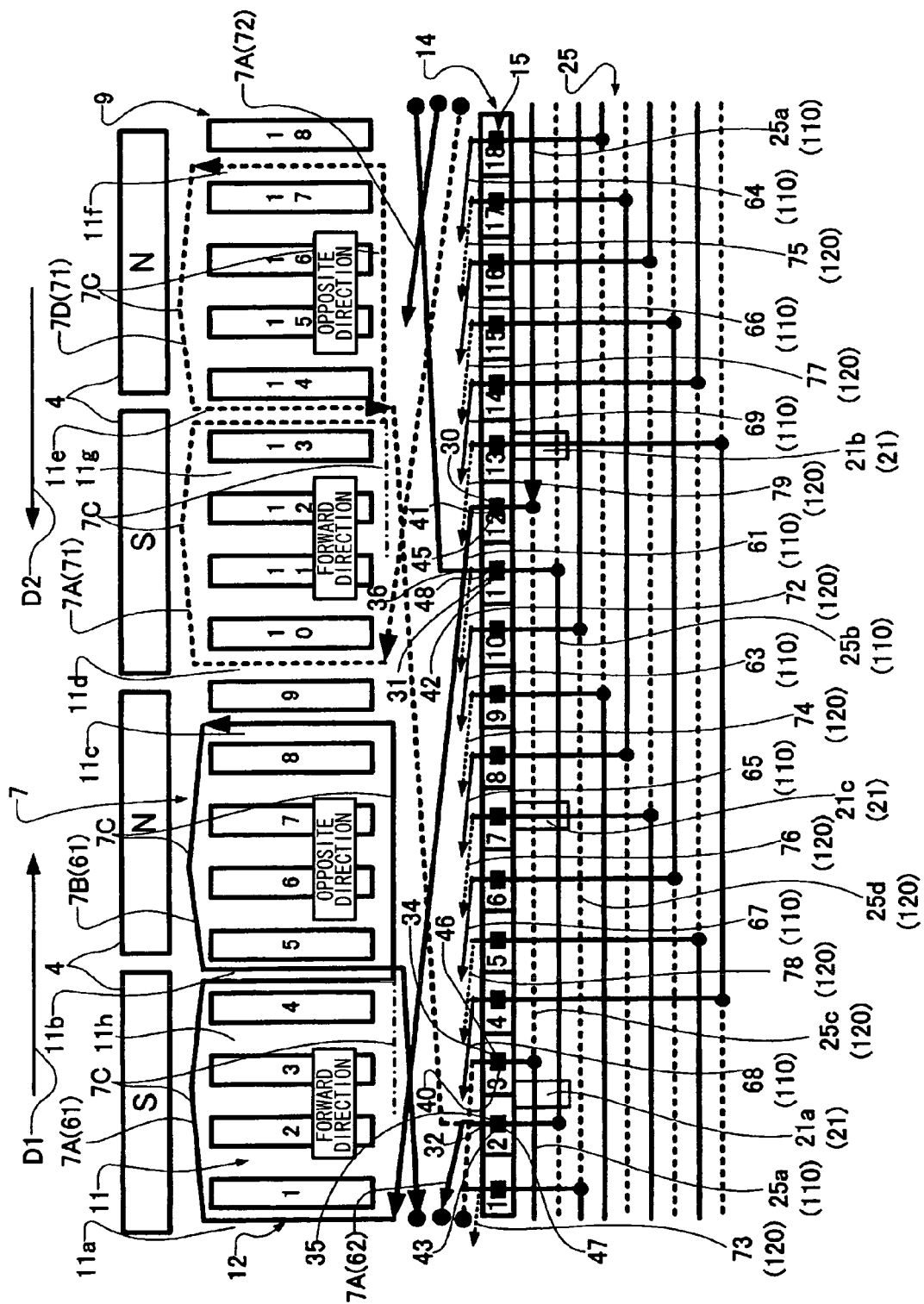
FIG. 3 is a developed view of the armature showing the winding state of an armature coil in the first embodiment of the invention.
Figure 4:
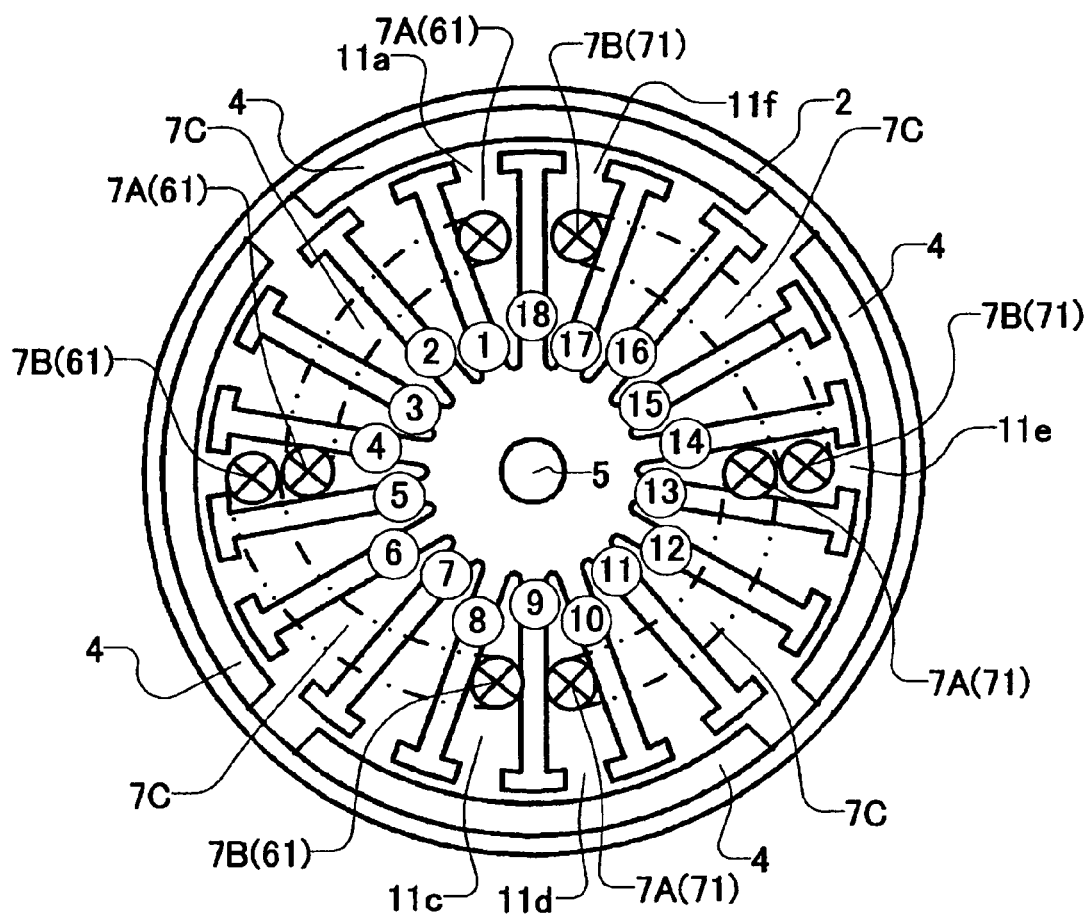
FIG. 4 is a top view of the armature showing the winding state of the armature coil in the first embodiment of the invention.

Next, the winding structure of the armature coil 7 provided in the electric motor 1 will be described with reference to FIGS. 3 and 4. FIG. 3 is a developed view of the armature, FIG. 4 is a transverse sectional view of the armature, and a gap between adjacent teeth 9 and 9 corresponds to the slot 11. In addition, in FIGS. 3 and 4, the segments 14 of the commutator 13 and the teeth 9 are each numbered.

An armature coil 7 of the first embodiment of the invention includes a first conductive wire 110 and a second conductive wire 120. In addition, in FIG. 3, the first conductive wire 110 is shown by solid lines, and the second conductive wire 120 is shown by broken lines.

The armature coil 7 has first to ninth winding wires (61 to 69) formed by the first conductive wire 110 and other first to ninth winding wires (71 to 79) formed by the second conductive wire 120. Also, the first to ninth winding wires (61 to 69) and the other first to ninth winding wires (71 to 79) corresponding thereto are respectively arranged at facing positions which are point symmetric about the rotary shaft 5.

That is, a first winding wire pair (61, 71), a second winding wire pair (62, 72), a third winding wire pair (63, 73), a fourth winding wire pair (64, 74), a fifth winding wire pair (65, 75), a sixth winding wire pair (66, 76), a seventh winding wire pair (67, 77), an eighth winding wire pair (68, 78), and a ninth winding wire pair (69, 79), which are formed by the first conductive wire 110 and second conductive wire 120, are respectively arranged at facing positions which are point symmetric about the rotary shaft 5.

The first to ninth winding wires (61 to 69) are joined together in a series via nine connecting wires 25 which are similarly formed from the first conductive wire 110. That is, the first winding wire 61, the connecting wire 25, the second winding wire 62, the connecting wire 25, the third winding wire 63, the connecting wire 25, the fourth winding wire 64, the connecting wire 25, the fifth winding wire 65, the connecting wire 25, the sixth winding wire 66, the connecting wire 25, the seventh winding wire 67, the connecting wire 25, the eighth winding wire 68, the connecting wire 25, the ninth winding wire 69, and the connecting wire 25 are formed in this order in a series by the first conductive wire 110. Additionally, each connecting wire of the connecting wires 25 which connect the first to ninth winding wires (61 to 69) together is electrically and mechanically connected to the risers 15 and 15 formed by a pair of segments 14 and 14 which is arranged at facing positions which are point symmetric with respect to each other about the rotary shaft 5.

On the other hand, the other first to ninth winding wires (71 to 79) are joined together in a series via nine connecting wires 25 which are similarly formed from the second conductive wire 120. That is, the first winding wire 71, the connecting wire 25, the second winding wire 72, the connecting wire 25, the third winding wire 73, the connecting wire 25, the fourth winding wire 74, the connecting wire 25, the fifth winding wire 75, the connecting wire 25, the sixth winding wire 76, the connecting wire 25, the seventh winding wire 77, the connecting wire 25, the eighth winding wire 78, the connecting wire 25, the ninth winding wire 79, and the connecting wire 25 are formed in this order in a series by the second conductive wire 120. Additionally, each connecting wire of the connecting wires 25 which connect the other first to ninth winding wires (71 to 79) together is electrically and mechanically connected to the risers 15 and 15 formed by a pair of segments 14 and 14 which is arranged at facing positions which are point symmetric with respect to each other about the rotary shaft 5.

The first to ninth winding wires (61 to 69) and the other first to ninth winding wires (71 to 79) have a first coil winding wire 7A and a second coil winding wire 7B which are each connected in series to each other. Additionally, the first coil winding wire 7A is wound 12 times so as to surround four teeth 9 which are adjacent to each other, and the second coil winding wire 7B is arranged at a position adjacent in a right direction D1 to the four teeth 9 around which the first coil winding wire 7A is wound and is wound 12 times so as to surround the four other teeth 9 which are adjacent to each other. Here, the winding direction of the second coil winding wire 7B is opposite to the winding direction of the first coil winding wire 7A.

An end 30 of the first coil winding wire 7A is connected to one segment 14 of the commutator 13, and an end 31 of the second coil winding wire 7B is connected to the segment 14 adjacent to the segment 14 to which the end 30 of the first coil winding wire 7A is connected. Here, as described above, the second coil winding wire 7B is arranged in the right direction D1 with respect to the first coil winding wire 7A, while the end 31 is connected to the segment 14 arranged in a left direction D2 with respect to the segment 14 to which the end 30 is connected.

In the present embodiment, the first conductive wire 110 and second conductive wire 120 are substantially simultaneously wound around the teeth 9, which are formed in the armature core 6 by a double flyer type winding machine and which face each other point-symmetrically about the rotary shaft 5. The first to ninth winding wires (61 to 69) and the connecting wires 25 which join the first to ninth winding wires together in a series are formed by the first conductive wire 110, and the other first to ninth winding wires (71 to 79) and the connecting wires 25 which join the other first to ninth winding wires together in a series are formed by the second conductive wire 120.

Hereinafter, the first to ninth winding wires (61 to 69) and the connecting wires 25 which join the first to ninth winding wires together in a series, which are formed by the first conductive wire 110, will be described from the first winding wire 61. The first winding wire 61 formed by the first conductive wire 110 has a first coil winding wire 7A and a second coil winding wire 7B, and the first coil winding wire 7A is joined in a series to a connecting wire 21a similarly formed from the first conductive wire 110, while the second coil winding wire 7B is joined in a series to a connecting wire 25b similarly formed from the first conductive wire 110.

An end 40 which is a starting point of the connecting wire 25a formed from the first conductive wire 110 is electrically and mechanically connected to the riser 15 formed at the No. 3 segment 14, and as for the connecting wire 25a, an end 41 which is disposed in the left direction D2 and is an end point of the connecting wire 25a is electrically and mechanically connected to the riser 15 formed at the No. 12 segment 14. Here, the No. 3 segment 14 and the No. 12 segment 14 are arranged at positions which face each other point-symmetrically about the rotary shaft 5. The end 41 of the connecting wire 25a and the end 30 which is the starting point of the first coil winding wire 7A are joined together in series, and the first coil winding wire 7A formed by the first conductive wire 110 is wound around the teeth 9 after being connected to the No. 12 segment 14 at the end 30.

The first coil winding wire 7A passes through a slit 11a formed between a No. 18 tooth 9 and a No. 1 tooth 9 and a slit 11b formed between a No. 4 tooth 9 and a No. 5 tooth 9, and is wound 12 times clockwise so as to surround the No. 1 tooth 9 to the No. 4 tooth 9 which are close to each other.

The arrangement of the second coil winding wire 7B, which is formed from the first conductive wire 110 similarly to the first coil winding wire 7A and is connected in series to the first coil winding wire 7A, will be described below. The second coil winding wire 7B passes through a slit 11c formed between a No. 8 tooth 9 and a No. 9 tooth 9 and the slit 11b formed between the No. 4 tooth 9 and the No. 5 tooth 9, is adjacent to the No. 1 tooth 9 to the No. 4 tooth 9, and is wound 12 times in a counterclockwise direction opposite to the winding direction of the first coil winding wire 7A so as to surround the No. 5 tooth 9 to the No. 8 tooth 9 which are close to each other. The second coil winding wire 7B is wound in a direction opposite to the first coil winding wire 7A in order to face a magnetic pole having polarity (N pole in FIG. 3)

different from the polarity (S pole in FIG. 3) of a magnetic pole which the first coil winding wire 7A faces.

The end 31 of the second coil winding wire 7B is connected to the riser 15 formed at the No. 11 segment 14 adjacent to the No. 12 segment 14, to which the end 30 of the first coil winding wire 7A is connected, in the left direction D2 opposite to the right direction D1. By performing the connection in this way, the first coil winding wire 7A near the end 30 can be suppressed from the outside by the second coil winding wire 7B near the end 31, and winding thickening of the first winding wire 61 in this vicinity can be prevented.

The first winding wire 61 and the second winding wire 62 wound around the armature core 6 following the first winding wire 61 are joined together in a series by the connecting wire 25b formed by the first conductive wire 110. An end 42 which is a starting point of the connecting wire 25b and the end 31 of the second coil winding wire 7B provided at the first winding wire 61 are joined together in a series, and the end 42 is electrically and mechanically connected to the riser 15 of the No. 11 segment 14. Also, as for the connecting wire 25b, an end 43 which is disposed in the left direction D2 and is an end point of the connecting wire 25b is electrically and mechanically connected to the riser 15 of the No. 2 segment 14. Here, the No. 11 segment 14 and the No. 2 segment 14 are arranged at positions which face each other point-symmetrically about the rotary shaft 5.

The end 43 of the connecting wire 25b and the end 32, which is the starting point of the first coil winding wire 7A of the second winding wire 62 wound following the first winding wire 61, are joined together in a series. Also, the first coil winding wire 7A of the second winding wire 62 passes through the slit 11c formed between the No. 8 tooth 9 and the No. 9 tooth 9 and a slit 11g formed between a No. 12 tooth 9 and a No. 13 tooth 9, and is wound 12 times clockwise so as to surround the No. 9 tooth 9 to the No. 12 tooth 9. The same process as the aforementioned process is repeated below, and the armature core 6 includes the first to ninth winding wires (61 to 69), and nine connecting wires 25.

In this way, the respective winding wires 12 of the first to ninth winding wires (61 to 69) are split into the first coil winding wire 7A and the second coil winding wire 7B, and are wound around the armature core 6. Accordingly, compared to a case where the winding wires are wound without splitting, the number of crossovers 7C which cross over from one slot 11 to another slot 11 is small, and the thickness of the crossovers is small. Additionally, the first to ninth winding wires (61 to 69) and the connecting wires 25 which join the first to ninth winding wires together in a series are formed by disposing a single first conductive wire 110 at the armature core 6 and the commutator 13. Therefore, compared to a case where connecting wires are disposed in advance at the commutator 13, and then, winding wires are disposed, the time of winding work is shortened, and mounting of the connecting wires and winding wires to the armature core and commutator 13 is simple.

As described above, each of the first to ninth winding wires (61 to 69) formed by the first conductive wire 110 and each of the other first to ninth winding wires (71 to 79) formed by the second conductive wire 120 corresponding to the first to ninth winding wires are substantially simultaneously wound around the teeth 9 of the armature core 6 which face each other point-symmetrically about the rotary shaft 5 by a double flyer type winding machine.

Accordingly, the respective winding wires 12 of the other first to ninth winding wires (71 to 79) corresponding to the respective winding wires 12 of the first to ninth winding wires (61 to 69) are arranged at positions which face each other point-symmetrically about the rotary shaft 5. That is, the first winding wire 71 is arranged at a position which faces the first winding wire 61, and the second winding wire 72 is arranged at a position which faces the second winding wire 62, the third winding wire 73 is arranged at a position which faces the third winding wire 63, and the fourth winding wire 74 is arranged at a position which faces the fourth winding wire 64. Moreover, the fifth winding wire 75 is arranged at a position which faces the fifth winding wire 65, the sixth winding wire 76 is arranged at a position which faces the sixth winding wire 66, the seventh winding wire 77 is arranged at a position which faces the seventh winding wire 67, the eighth winding wire 78 is arranged at a position which faces the eighth winding wire 68, and the ninth winding wire 79 is arranged at a position which faces the ninth winding wire 69.

Hereinafter, the other first to ninth winding wires (71 to 79) and the connecting wires 25 which join the other first to ninth winding wires together in a series, which are formed by the second conductive wire 120, will be described from the other first winding wire 71.

The first winding wire 71 formed by the second conductive wire 120 has a first coil winding wire 7A and a second coil winding wire 7B connected in series to the first coil winding wire 7A, and the first coil winding wire 7A is joined in a series to a connecting wire 21c similarly formed from the second conductive wire 120, while the second coil winding wire 7B is joined in a series to a connecting wire 25d similarly formed from the second conductive wire 120.

An end 45 which is a starting point of the connecting wire 25c formed from the second conductive wire 120 is electrically and mechanically connected to the riser 15 of the No. 12 segment 14, and as for the connecting wire 25c, an end 46 which is disposed in the left direction D2 and is an end point of the connecting wire 25c is electrically and mechanically connected to the riser 15 of the No. 3 segment 12. Here, the No. 12 segment 14 and the No. 3 segment 14 are arranged at positions which face each other point-symmetrically about the rotary shaft 5. The end 46 of the connecting wire 25c and the end 34 which is the starting point of the first coil winding wire 7A are joined together in a series, and the first coil winding wire 7A formed by the second conductive wire 120 is wound around the teeth 9 from the end 34.

The first coil winding wire 7A passes through a slit 11d formed between the No. 9 tooth 9 and a No. 10 tooth 9 and a slit 11e formed between the No. 13 tooth 9 and a No. 14 tooth 9, and is wound 12 times clockwise so as to surround the No. 10 tooth 9 to the No. 13 tooth 9 which are close to each other.

The arrangement of the second coil winding wire 7B, which is formed from the second conductive wire 120 similarly to the first coil winding wire 7A and is connected in series to the first coil winding wire 7A, will be described below. The second coil winding wire 7B passes through a slit 11f formed between a No. 17 tooth 9 and the No. 18 tooth 9 and the slit 11e formed between the No. 13 tooth 9 and the No. 14 tooth 9, and is wound 12 times in a counterclockwise direction opposite to the winding direction of the first coil winding wire 7A so as to surround the No. 14 tooth 9 to the No. 17 tooth 9 which are adjacent to the No. 10 tooth 9 to the No. 13 tooth 9 in the right direction D1 and are close to each other. The second coil winding wire 7B is wound in a direction opposite to the first coil winding wire 7A because the second coil winding wire 7B faces a magnetic pole having polarity (N pole in FIG. 3) different from the polarity (S pole in FIG. 3) of a magnetic pole which the first coil winding wire 7A faces.

The end 35 of the second coil winding wire 7B is connected to the riser 15 formed at the No. 2 segment 14 adjacent to the No. 3 segment 14 to which the end 34 of the first coil winding wire 7A is connected, in the left direction D2 opposite to the right direction D1. By performing a connection in this way, the first coil winding wire 7A near the end 34 can be suppressed from the outside by the second coil winding wire 7B near the end 35, and winding thickening of the first winding wire 71 in this vicinity can be prevented.

The first winding wire 71 and the second winding wire 72 are joined together in a series by the connecting wire 25d similarly formed by the second conductive wire 120. An end 47 which is a starting point of the connecting wire 25d and the end 35 of the second coil winding wire 7B provided at the first winding wire 71 are joined together in a series, and the end 47 is electrically and mechanically connected to the riser 15 of the No. 2 segment 14. Also, as for the connecting wire 25d, an end 48 which is disposed in the left direction D2 and is an end point of the connecting wire 25d is electrically and mechanically connected to the riser 15 of the No. 11 segment 14. Here, the No. 2 segment 14 and the No. 11 segment 14 are arranged at positions which face each other point-symmetrically about the rotary shaft 5.

The end 48 of the connecting wire 25d and an end 36, which is a starting point of the first coil winding wire 7A of the second winding wire 72 wound following the first winding wire 71, are joined together in a series. Also, the first coil winding wire 7A of the second winding wire 72 passes through a slit 11h formed between the No. 17 tooth 9 and the No. 18 tooth 9 and a slit 11i formed between a No. 3 tooth 9 and the No. 4 tooth 9, and is wound 12 times clockwise so as to surround the No. 18 tooth 9 to the No. 3 tooth. The same process as the aforementioned process is repeated below, and the armature core 6 includes the other first to ninth winding wires (71 to 79), and nine connecting wires 25.

In this way, the respective winding wires 12 of the other first to ninth winding wires (71 to 79) are split into the first coil winding wire 7A and the second coil winding wire 7B, and are wound around the armature core 6. Accordingly, compared to a case where the winding wires are wound without splitting, the thickness of crossovers 7C which cross over from one slot 11 to another slot 11 is made small. Additionally, the other first to ninth winding wires (71 to 79) and the connecting wires 25 which join the other first to ninth winding wires together in a series are formed by disposing a single first winding wire 71 at the armature core 6 and the commutator 13. Therefore, compared to a case where connecting wires are disposed in advance at the commutator 13, and then, winding wires are disposed, the time of winding work is shortened, and mounting of the connecting wires and winding wires to the armature core and commutator 13 is simple.

In this way, the respective winding wires 12 of the first to ninth winding wires (61 to 69) and the other first to ninth winding wires (71 to 79) are split into the first coil winding wire 7A and the second coil winding wire 7B, and are wound around the armature core 6, and the thickness of the respective crossovers 7C is made thin. Therefore, in the armature coil 7 formed by the first to ninth winding wires (61 to 69) and the other first to ninth winding wires (71 to 72) which are each wound so as to overlap each other sequentially from the outside of the winding wires 12 which are already wound, winding thickening caused by overlapping of the crossovers 7C is reduced.

Thereby, axial miniaturization of a portion in which the crossovers 7C exist can be achieved. Additionally, due to the reduction of winding thickening, insertion of the first and second conductive wires 110 and 120 into the slot 11 is facilitated, and the ratio of the winding wires 12 which occupy in a space within the slot 11, i.e., space factor, is improved. For this reason, it is possible to reduce the space within the slot 11, and reduction of the radial dimensions of the armature core 6 can be achieved. Thereby, miniaturization of the whole electric motor 1 can be achieved.

As shown in FIG. 3, the first winding wire 61 and the first winding wire 71 which are arranged at positions which face each other point-symmetrically about the rotary shaft 5 are connected to each other by the connecting wire 25a and the connecting wire 25c. Therefore, the first winding wire 61 and the first winding wire 71 are connected in parallel to each other by the connecting wire 25a and the connecting wire 25c. In this way, the winding wires 12 and 12, which are arranged at positions which face each other point-symmetrically about the rotary shaft 5 among the first to ninth winding wires (61 to 69) and the other first to ninth winding wires (71 to 79), are each connected in parallel to each other by two connecting wires 25 and 25. For this reason, even in the four-pole electric motor 1 as in the present embodiment, basically, the armature 3 can be rotated by supplying power from two positions arranged with an electrical angle of 180°.

Figure 5:
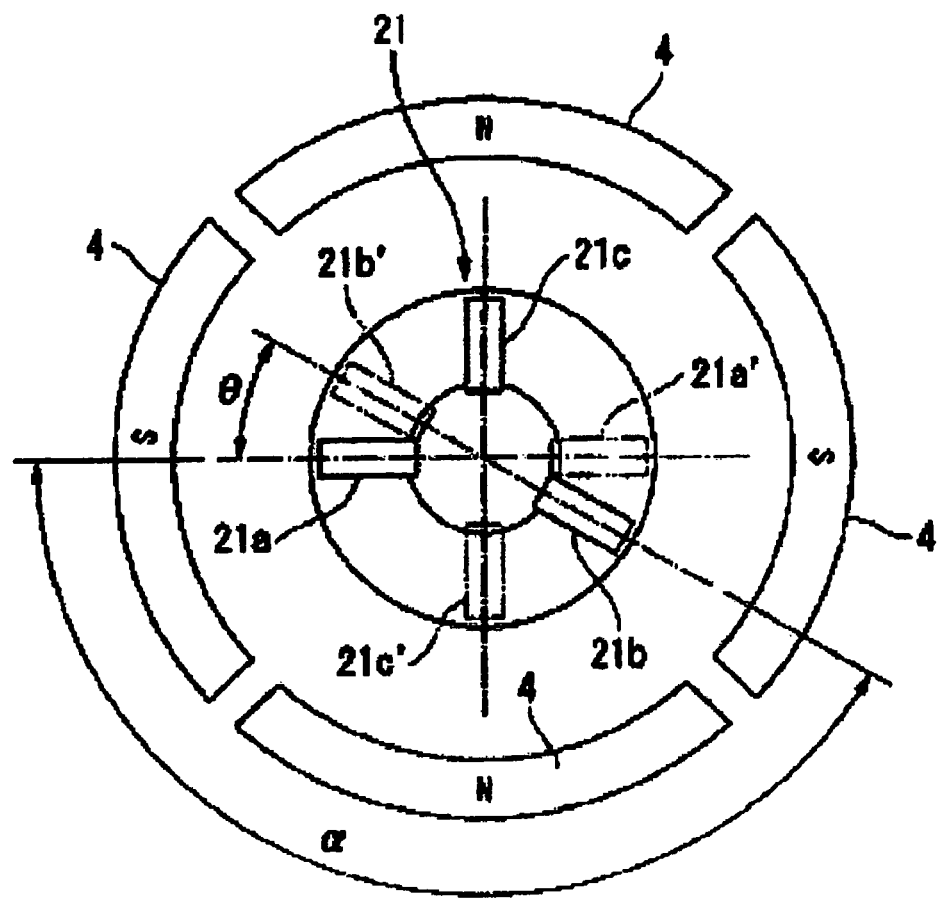
FIG. 5 is an arrangement view of brushes in the first embodiment of the invention.

As shown in FIG. 5, the brush 21 is constituted by a brush 21a for low speed and a brush 21b for high speed which are selectively connected to a cathode (first power supply terminal) of a power source, and a common brush 21c which is used by both the brush 21a for low speed or the brush 21b for high speed, and is connected to an anode (second power supply terminal) of the power source. The brush 21a for low speed and the common brush 21c are mutually disposed at an interval of 180° in electrical angle and at an interval of 90° in the circumferential direction in mechanical angle. On the other hand, the brush 21b for high speed is arranged to be apart from the brush 21a for low speed by an angle α in the circumferential direction. In addition, in the present embodiment, the common brush 21c is connected to the anode (second power supply terminal) of the power source and the brush 21a for low speed and the brush 21b for high speed are connected to the cathode (first power supply terminal). However, these brushes may be connected in the opposite manner to this.

Here, since the segments 14 which have the same potential in the commutator 13, i.e., the segments which are arranged to face each other point-symmetrically about the rotary shaft 5 are short-circuited by the connecting wire 25, electric power is supplied even to the segments with which the brushes 21 do not come into sliding contact via the connecting wires 25. Accordingly, as shown by one-dot chain lines in FIG. 5, an electric current is supplied to the segments 14 which have the same potential so that there are brushes 21a', 21b', and 21c' even at positions which face the brushes 21a, 21b, and 21c, respectively, about the rotary shaft 5.

According to this, the brush 21b' for high speed exists at a position which is advanced by an angle θ with respect to the brush 21a for low speed. Also, in the electric motor 1, an electric current is supplied by the common brush 21c and the brush 21a for low speed during low-speed rotation, and an electric current is supplied by the common brush 21c and the brush 21b for high speed during high-speed rotation. For this reason, during high-speed rotation, the electric motor 1 is advanced by the brush 21b for high-speed, and operates at higher rotational speed than that during low-speed rotation. Here, the advance angle θ is to 20° to 35° in the present embodiment.

Since the commutator 13 is provided with the connecting wires 25 which short circuits the segments 14 to have the same potential together, it is possible to provide an electric motor 1 which can switch rotational speed by installing three brushes of the brush 21a for low speed, the brush 21b for high speed which is arranged to be separated from the brush 21a for low speed by the angle α in the circumferential direction, and the common brush 21c by which is used by both the brush 21a for low speed and the brush 21b for high speed. Moreover, since the number of brushes does not increase even if the number of pole pairs is 2, the manufacturing cost of the electric motor 1 does not increase.

Figure 6:
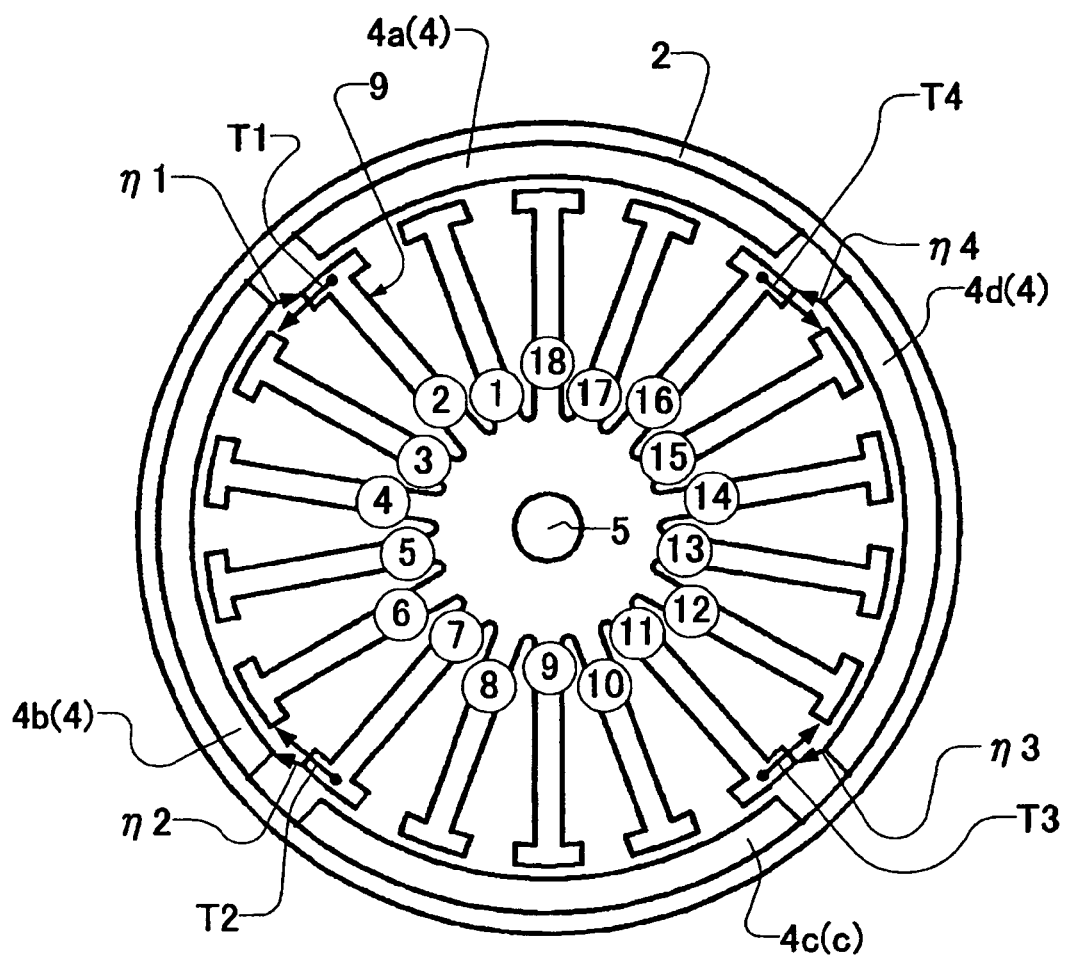
FIG. 6 is a transverse sectional view of the electric motor illustrating the torque ripple of the electric motor in the first embodiment of the invention.

Next, torque ripple generated in the electric motor 1 of the present embodiment will be described with reference to FIG. 6. FIG. 6 is a view illustrating torque ripple generated in the armature when the armature 3 is arranged at a certain position. When the armature 3 is arranged at the position shown in this drawing, lines of magnetic flux (η1 to η2) which are each inclined in the thrust direction (circumferential direction) are generated between a No. 2 tooth 9 and a magnet 4b, between a No. 7 tooth 9 and the magnet 4c, between a No. 11 tooth 9 and a magnet 4d, and between a No. 16 tooth 9 and the magnet 4a.

Thus, if the lines of magnetic flux are generated between the teeth 9 and the magnets 4, attractive forces which act in order to minimize the length of the lines of magnetic flux are generated between the teeth 9 and the magnets 4 according to the natural laws which attempt to minimize magnetic energy. Here, since the lines of magnetic flux (η1 to η4) are inclined in the thrust direction (circumferential direction), the attractive forces in the thrust direction (circumferential direction) are included in the attractive force generated between the teeth 9 and the magnets 4. Due to this attractive force in the thrust direction, torques (T1 to T4) in the thrust direction are respectively generated in the No. 2 tooth 9, the No. 7 tooth 9, the No. 11 tooth 9, and the No. 16 tooth 9. The total of the torques (T1 to T4) becomes torque ripple.

Here, in the present embodiment, the number of teeth 9 is "18", the number of pole pairs is "2", and the number of teeth 9 is "9" times the number of pole pairs. In this way, when the number of teeth 9 is an odd multiple of the number of pole pairs, torques (T1 to T4) adjacent to each other among the torques (T1 to T4) act in different rotational directions. That is, in this drawing, the torque T1 and the torque T3 act counterclockwise, and the torque T2 and the torque T4 act clockwise. Therefore, the torque T1 and the torque T3, and the torque T2 and the torque T4 will be mutually cancelled out. Due to this, the torque ripple which is the total of the torques (T1 to T4) is reduced, and the torque ripple becomes small.

The torque ripple becomes one of the causes of noise and vibration in the electric motor. Additionally, the size of the torque ripple, and the magnitude of noise and vibration have a proportional relationship. Accordingly, since the torque ripple is reduced as in the present embodiment, the noise and vibration in the electric motor 1 can be reduced.

Figure 7:
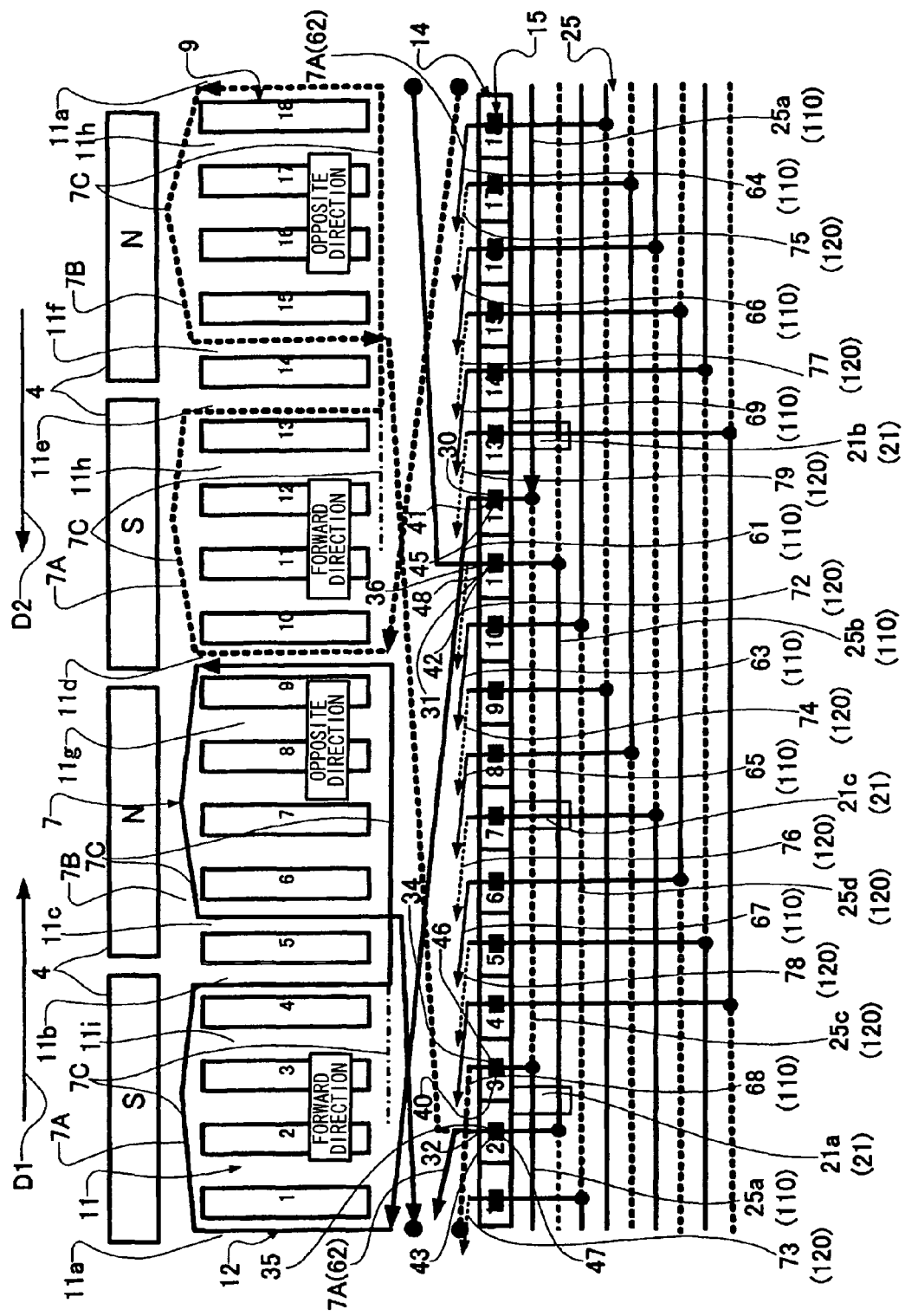
FIG. 7 is a developed view of an armature showing the winding state of an armature coil in a second embodiment of the invention.
Figure 8:
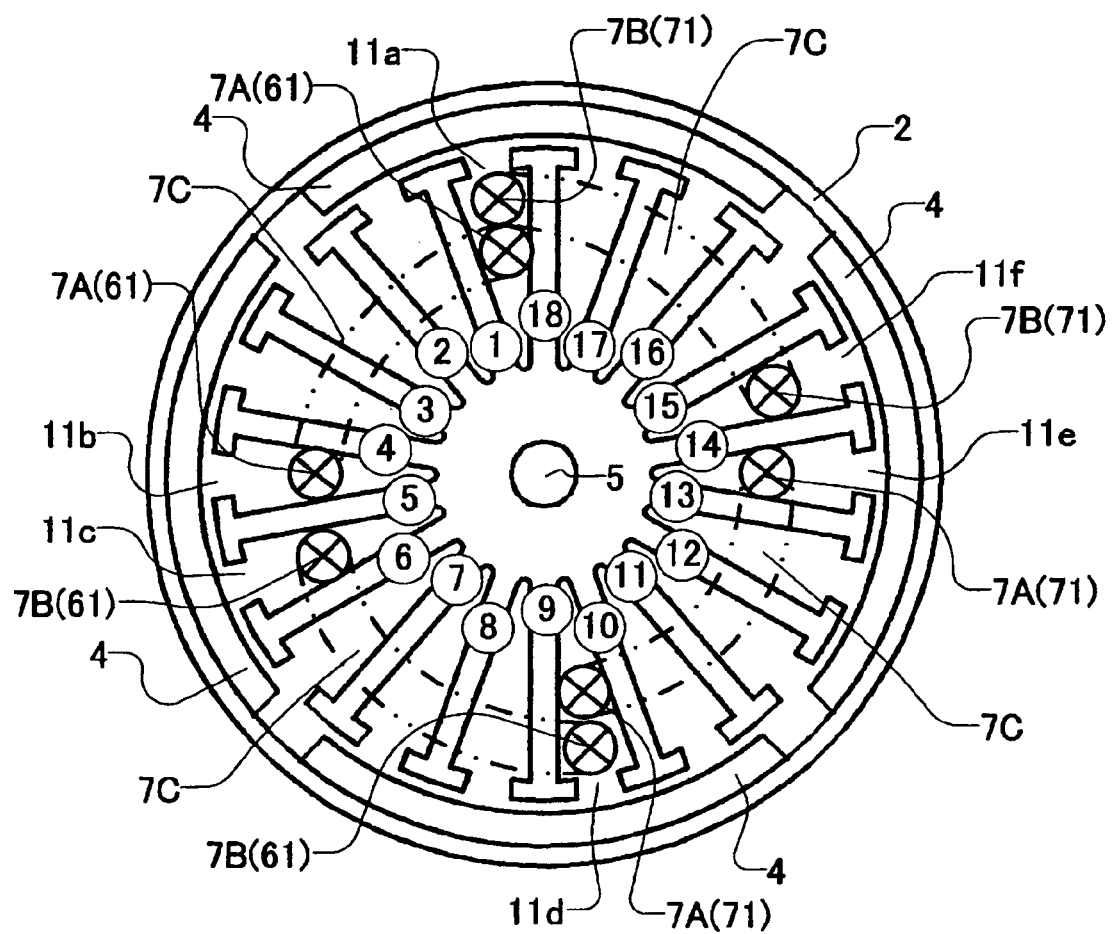
FIG. 8 is a top view of the armature showing the winding state of the armature coil in the second embodiment of the invention.

Next, the winding structure of the armature coil 7 provided in the electric motor 1 of a second embodiment of the invention will be described with reference to FIGS. 7 and 8. FIG. 7 is a developed view of the armature, FIG. 8 is a transverse sectional view of the armature, and a gap between adjacent teeth 9 and 9 corresponds to the slot 11. Additionally, in FIGS. 7 and 8, the segments 14 of the commutator 13 and the teeth 9 are each numbered.

The electric motor 1 of the second embodiment of the present invention and the electric motor 1 of the first embodiment described above are different from each other only in the winding structure of the armature coil 7, and are the same in the other portions. Accordingly, only the winding structure of the armature coil 7 will be described below, and description of the other portions is omitted.

The armature coil 7 of the second embodiment of the present invention includes a first conductive wire 110 and a second conductive wire 120. In addition, in FIG. 7, the first conductive wire 110 is shown by solid lines, and the second conductive wire 120 is indicated by broken lines.

The armature coil 7 has first to ninth winding wires (61 to 69) formed by the first conductive wire 110 and other first to ninth winding wires (71 to 79) formed by the second conductive wire 120. Also, the first to ninth winding wires (61 to 69) and the other first to ninth winding wires (71 to 79) corresponding thereto are respectively arranged at facing positions which are point symmetric about the rotary shaft 5.

That is, a first winding wire pair (61, 71), a second winding wire pair (62, 72), a third winding wire pair (63, 73), a fourth winding wire pair (64, 74), a fifth winding wire pair (65, 75), a sixth winding wire pair (66, 76), a seventh winding wire pair (67, 77), an eighth winding wire pair (68, 78), and a ninth winding wire pair (69, 79), which are formed by the first conductive wire 110 and second conductive wire 120, are respectively arranged at facing positions which are point symmetric about the rotary shaft 5.

The first to ninth winding wires (61 to 69) are joined together in a series via nine connecting wires 25 which are similarly formed from the first conductive wire 110. That is, the first winding wire 61, the connecting wire 25, the second winding wire 62, the connecting wire 25, the third winding wire 63, the connecting wire 25, the fourth winding wire 64, the connecting wire 25, the fifth winding wire 65, the connecting wire 25, the sixth winding wire 66, the connecting wire 25, the seventh winding wire 67, the connecting wire 25, the eighth winding wire 68, the connecting wire 25, the ninth winding wire 69, and the connecting wire 25 are formed in this order in a series by the first conductive wire 110. Additionally, each connecting wire of the connecting wires 25 which connect the first to ninth winding wires (61 to 69) together is electrically and mechanically connected to the risers 15 and 15 formed at a pair of segments 14 and 14 which is arranged at facing positions which are point symmetric with respect to each other about the rotary shaft 5.

On the other hand, the other first to ninth winding wires (71 to 79) are joined together in a series via nine connecting wires 25 which are similarly formed from the second conductive wire 120. That is, the first winding wire 71, the connecting wire 25, the second winding wire 72, the connecting wire 25, the third winding wire 73, the connecting wire 25, the fourth winding wire 74, the connecting wire 25, the fifth winding wire 75, the connecting wire 25, the sixth winding wire 76, the connecting wire 25, the seventh winding wire 77, the connecting wire 25, the eighth winding wire 78, the connecting wire 25, the ninth winding wire 79, and the connecting wire 25 are formed in this order in a series by the second conductive wire 120. Additionally, each connecting wire of the connecting wires 25 which connect the other first to ninth winding wires (71 to 79) together is electrically and mechanically connected to the risers 15 and 15 formed at a pair of segments 14 and 14 which is arranged at facing positions which are point symmetric with respect to each other about the rotary shaft 5.

Each of first to ninth winding wires (61 to 69) and the other first to ninth winding wires (71 to 79) have a first coil winding wire 7A and a second coil winding wire 7B which are each connected in series to each other. Additionally, the first coil winding wire 7A is wound 12 times so as to surround four teeth 9 which are adjacent to each other, and the second coil winding wire 7B is arranged at a position adjacent in the right direction D1 to the four teeth 9 around which the first coil winding wire 7A is wound with one tooth 9 therebetween and is wound 12 times so as to surround the four other teeth 9 which are adjacent to each other. Here, the winding direction of the second coil winding wire 7B is opposite to the winding direction of the first coil winding wire 7A.

An end 30 of the first coil winding wire 7A is connected to one segment 14 of the commutator 13, and an end 31 of the second coil winding wire 7B is connected to the segment 14 adjacent to the segment 14 to which the end 30 of the first coil winding wire 7A is connected. Here, as described above, the second coil winding wire 7B is arranged in the right direction D1 with respect to the first coil winding wire 7A, while the end 31 is connected to the segment 14 arranged in the left direction D2 with respect to the segment 14 to which the end 30 is connected.

In the present embodiment, the first conductive wire 110 and the second conductive wire 120 are substantially simultaneously wound around the teeth 9, which are formed in the armature core 6 by a double flyer type winding machine and which face each other point-symmetrically about the rotary shaft 5. The first to ninth winding wires (61 to 69) and the connecting wires 25 which join the first to ninth winding wires together in a series are formed by the first conductive wire 110, and the other first to ninth winding wires (71 to 79) and the connecting wires 25 which join the other first to ninth winding wires together in a series are formed by the second conductive wire 120.

Hereinafter, the first to ninth winding wires (61 to 69) and the connecting wires 25 which join the first to ninth winding wires together in a series, which are formed by the first conductive wire 110, will be described from the first winding wire 61. The first winding wire 61 formed by the first conductive wire 110 has a first coil winding wire 7A and a second coil winding wire 7B, and the first coil winding wire 7A is joined in a series to a connecting wire 21a similarly formed from the first conductive wire 110, while the second coil winding wire 7B is joined in a series to a connecting wire 25b similarly formed from the first conductive wire 110.

An end 40 which is a starting point of the connecting wire 25a formed from the first conductive wire 110 is electrically and mechanically connected to the riser 15 formed at the No. 3 segment 14, and as for the connecting wire 25a, an end 41 which is disposed in the left direction D2 and is an end point of the connecting wire 25a is electrically and mechanically connected to the riser 15 formed at the No. 12 segment 14. Here, the No. 3 segment 14 and the No. 12 segment 14 are arranged at positions which face each other point-symmetrically about the rotary shaft 5. The end 41 of the connecting wire 25a and the end 30 which is the starting point of the first coil winding wire 7A are joined together in a series, and the first coil winding wire 7A formed by the first conductive wire 110 is wound around the teeth 9 after being connected to the end 30.

The first coil winding wire 7A passes through a slit 11a formed between the No. 18 tooth 9 and the No. 1 tooth 9 and a slit 11b formed between the No. 4 tooth 9 and the No. 5 tooth 9, and is wound 12 times clockwise so as to surround the No. 1 tooth 9 to the No. 4 tooth 9 which are close to each other.

The arrangement of the second coil winding wire 7B, which is formed from the first conductive wire 110 similarly to the first coil winding wire 7A and is connected in series to the first coil winding wire 7A, will be described below. The second coil winding wire 7B passes through a slit 11d formed between the No. 9 tooth 9 and the No. 10 tooth 9 and the slit 11c formed between the No. 5 tooth 9 and the No. 6 tooth 9, and is wound 12 times in a counterclockwise direction opposite to the winding direction of the first coil winding wire 7A so as to surround the No. 6 tooth 9 to the No. 9 tooth 9 which are adjacent to the No. 1 tooth 9 to the No. 4 tooth 9 with the No. 5 tooth 9 therebetween and are close to each other. The second coil winding wire 7B is wound in a direction opposite to the first coil 7 winding wire 7A because the second coil winding wire 7B faces a magnetic pole having polarity (N pole in FIG. 7) different from the polarity (S pole in FIG. 7) of a magnetic pole which the first coil winding wire 7A faces.

The end 31 of the second coil winding wire 7B is connected to the riser 15 formed at the No. 11 segment 14 adjacent to the No. 12 segment 14 to which the end 30 of the first coil winding wire 7A is connected, in the left direction D2 opposite to the right direction D1. By performing the connection in this way, the first coil winding wire 7A near the end 30 can be suppressed from the outside by the second coil winding wire 7B near the end 31, and winding thickening of the first winding wire 61 in this vicinity can be prevented.

The first winding wire 61 and the second winding wire 62 wound around the armature core 6 following the first winding wire 61 are joined together in a series by the connecting wire 25b formed by the first conductive wire 110. An end 42 which is a starting point of the connecting wire 25b and the end 31 of the second coil winding wire 7B provided at the first winding wire 61 are joined together in a series, and the end 42 is electrically and mechanically connected to the riser 15 of the No. 11 segment 14. Also, as for the connecting wire 25b, an end 43 which is disposed in the left direction D2 and is an end point of the connecting wire 25b is electrically and mechanically connected to the riser 15 of the No. 2 segment 14. Here, the No. 11 segment 14 and the No. 2 segment 14 are arranged at positions which face each other point-symmetrically about the rotary shaft 5.

The end 43 of the connecting wire 25b and the end 32, which is the starting point of the first coil winding wire 7A of the second winding wire 62 wound following the first winding wire 61, are joined together in a series. Also, the first coil winding wire 7A of the second winding wire 62 passes through a slit 11g formed between the No. 8 tooth 9 and the No. 9 tooth 9 and the slit 11h formed between the No. 12 tooth 9 and the No. 13 tooth 9, and is wound 12 times clockwise so as to surround the No. 9 tooth 9 to the No. 12 tooth 9. The same process as the aforementioned process is repeated below, and the armature core 6 includes the first to ninth winding wires (61 to 69), and nine connecting wires 25.

In this way, the respective winding wires 12 of the first to ninth winding wires (61 to 69) are split into the first coil winding wire 7A and the second coil winding wire 7B, and are wound around the armature core 6. Accordingly, compared to a case where the winding wires are wound without splitting, the number of crossovers 7C which cross over from one slot 11 to another slot 11 is small, and the thickness of the crossovers is small. Additionally, the first to ninth winding wires (61 to 69) and the connecting wires 25 which join the first to ninth winding wires together in a series are formed by disposing a single first conductive wire 110 at the armature core 6 and the commutator 13. Therefore, compared to a case where connecting wires are disposed in advance at the commutator 13, and then, winding wires are disposed, the time of winding work is shortened, and mounting of the connecting wires and winding wires to the armature core and commutator 13 is simple.

As described above, each of the first to ninth winding wires (61 to 69) formed by the first conductive wire 110 and each of the other first to ninth winding wires (71 to 79) formed by the second conductive wire 120 corresponding to the first to ninth winding wires are substantially simultaneously wound around the teeth 9 of the armature core 6 which face each other point-symmetrically about the rotary shaft 5 by a double flyer type winding machine.

Accordingly, the respective winding wires 12 of the other first to ninth winding wires (71 to 79) corresponding to the respective winding wires 12 of the first to ninth winding wires (61 to 69) are arranged at positions which face each other point-symmetrically about the rotary shaft 5. That is, the first winding wire 71 is arranged at a position which faces the first winding wire 61, and the second winding wire 72 is arranged at a position which faces the second winding wire 62, the third winding wire 73 is arranged at a position which faces the third winding wire 63, and the fourth winding wire 74 is arranged at a position which faces the fourth winding wire 64. Moreover, the fifth winding wire 75 is arranged at a position which faces the fifth winding wire 65, the sixth winding wire 76 is arranged at a position which faces the sixth winding wire 66, the seventh winding wire 77 is arranged at a position which faces the seventh winding wire 67, the eighth winding wire 78 is arranged at a position which faces the eighth winding wire 68, and the ninth winding wire 79 is arranged at a position which faces the ninth winding wire 69.

Hereinafter, the other first to ninth winding wires (71 to 79) and the connecting wires 25 which join the other first to ninth winding wires together in a series, which are formed by the second conductive wire 120, will be described from the first winding wire 71.

The first winding wire 71 formed by the second conductive wire 120 has a first coil winding wire 7A and a second coil winding wire 7B connected in series to the first coil winding wire 7A, and the first coil winding wire 7A is joined in a series to a connecting wire 21c similarly formed from the second conductive wire 120, while the second coil winding wire 7B is joined in a series to a connecting wire 25d similarly formed from the second conductive wire 120.

An end 45 which is a starting point of the connecting wire 25c formed from the second conductive wire 120 is electrically and mechanically connected to the riser 15 of the No. 12 segment 14, and as for the connecting wire 25c, an end 46 which is disposed in the left direction D2 and is an end point of the connecting wire 25c is electrically and mechanically connected to the riser 15 of the No. 3 segment 12. Here, the No. 12 segment 14 and the No. 3 segment 14 are arranged at positions which face each other point-symmetrically about the rotary shaft 5. The end 46 of the connecting wire 25c and the end 34 which is the starting point of the first coil winding wire 7A are joined together in a series, and the first coil winding wire 7A formed by the second conductive wire 120 is wound around the teeth 9 from the end 34.

The first coil winding wire 7A passes through a slit 11d formed between the No. 9 tooth 9 and the No. 10 tooth 9 and a slit 11e formed between the No. 13 tooth 9 and the No. 14 tooth 9, and is wound 12 times clockwise so as to surround the No. 10 tooth 9 to the No. 13 tooth 9 which are close to each other.

The arrangement of the second coil winding wire 7B, which is formed from the second conductive wire 120 similarly to the first coil winding wire 7A and is connected in series to the first coil winding wire 7A, will be described below. The second coil winding wire 7B passes through the slit 11a formed between the No. 18 tooth 9 and the No. 1 tooth 9 and the slit 11f formed between the No. 14 tooth 9 and the No. 15 tooth 9, and is wound 12 times in a counterclockwise direction opposite to the winding direction of the first coil winding wire 7A so as to surround the No. 15 tooth 9 to the No. 18 tooth 9 which are adjacent to the No. 10 tooth 9 to the No. 13 tooth 9 in the right direction D1 with the No. 14 tooth 9 therebetween and are close to each other. The second coil winding wire 7B is wound in a direction opposite to the first coil 7 winding wire A in order to face a magnetic pole having polarity (N pole in FIG. 7) different from the polarity (S pole in FIG. 7) of a magnetic pole which the first coil winding wire 7A faces.

The end 35 of the second coil winding wire 7B is connected to the riser 15 formed at the No. 2 segment 14 adjacent to the No. 3 segment 14 to which the end 34 of the first coil winding wire 7A is connected, in the left direction D2 opposite to the right direction D1. By performing connection in this way, the first coil winding wire 7A near the end 34 can be suppressed from the outside by the second coil winding wire 7B near the end 35, and winding thickening of the first winding wire 71 in this vicinity can be prevented.

The first winding wire 71 and the second winding wire 72 are joined together in a series by the connecting wire 25d similarly formed by the second conductive wire 120. An end 47 which is a starting point of the connecting wire 25d and the end 35 of the second coil winding wire 7B provided at the first winding wire 71 are joined together in a series, and the end 47 is electrically and mechanically connected to the riser 15 of the No. 2 segment 14. Also, as for the connecting wire 25d, an end 48, which is disposed in the left direction D2 and is an end point of the connecting wire 25d, is electrically and mechanically connected to the riser 15 of the No. 11 segment 14. Here, the No. 2 segment 14 and the No. 11 segment 14 are arranged at positions which face each other point-symmetrically about the rotary shaft 5.

The end 48 of the connecting wire 25d and an end 36, which is a starting point of the first coil winding wire 7A of the second winding wire 72 wound following the first winding wire 71, are joined together in a series. Also, the first coil winding wire 7A of the second winding wire 72 passes through a slit 11f formed between the No. 17 tooth 9 and the No. 18 tooth 9 and the slit 11h formed between a No. 3 tooth 9 and the No. 4 tooth 9, and is wound 12 times clockwise so as to surround the No. 18 tooth 9 to the No. 3 tooth 9. The same process as the aforementioned process is repeated below, and the armature core 6 includes the other first to ninth winding wires (71 to 79), and nine connecting wires 25.

In this way, the respective winding wires 12 of the other first to ninth winding wires (71 to 79) are split into the first coil winding wire 7A and the second coil winding wire 7B, and are wound around the armature core 6. Accordingly, compared to a case where the winding wires are wound without splitting, the thickness of crossovers 7C which cross over from one slot 11 to another slot 11 is made small. Additionally, the other first to ninth winding wires (71 to 79) and the connecting wires 25 which join the other first to ninth winding wires together in a series are formed by disposing a single first winding wire 71 at the armature core 6 and the commutator 13. Therefore, compared to a case where connecting wires are disposed in advance at the commutator 13, and then, winding wires are disposed, the time of winding work is shortened, and mounting of the connecting wires and winding wires to the armature core and commutator 13 is simple.

In this way, the respective winding wires 12 of the first to ninth winding wires (61 to 69) and the other first to ninth winding wires (71 to 79) are split into the first coil winding wire 7A and the second coil winding wire 7B, and are wound around the armature core 6, and the thickness of the respective crossovers 7C is made thin. Therefore, in the armature coil 7 formed by the first to ninth winding wires (61 to 69) and the other first to ninth winding wires (71 to 72) which are each wound so as to overlap each other sequentially from the outside of the winding wires 12 which are already wound, winding thickening caused by overlapping of the crossovers 7C is reduced.

Thereby, axial miniaturization of a portion in which the crossovers 7C exist can be achieved. Additionally, due to the reduction of winding thickening, insertion of the first and second conductive wires 110 and 120 into the slot 11 is facilitated, and the ratio of the winding wires 12 which occupy a space within the slot 11, i.e., space factor, is improved. For this reason, it is possible to reduce the space within the slot 11, and reduction of the radial dimensions of the armature core 6 can be achieved. Thereby, miniaturization of the whole electric motor 1 is achieved.

As shown in FIG. 3, the first winding wire 61 and the other first winding wire 71 which are arranged at positions which face each other point-symmetrically about the rotary shaft 5 are connected to each other by the connecting wire 25a and the connecting wire 25c. Therefore, the first winding wire 61 and the other first winding wire 71 are connected in parallel to each other by the connecting wire 25a and the connecting wire 25c. In this way, the winding wires 12 and 12, which are arranged at positions which face each other point-symmetrically about the rotary shaft 5 among the first to ninth winding wires (61 to 69) and the other first to ninth winding wires (71 to 79), are each connected in parallel to each other by two connecting wires 25 and 25. For this reason, even in the four-pole electric motor 1 as in the present embodiment, basically, the armature 3 can be rotated by supplying power from two positions arranged with an electrical angle of 180°.

Figure 9:
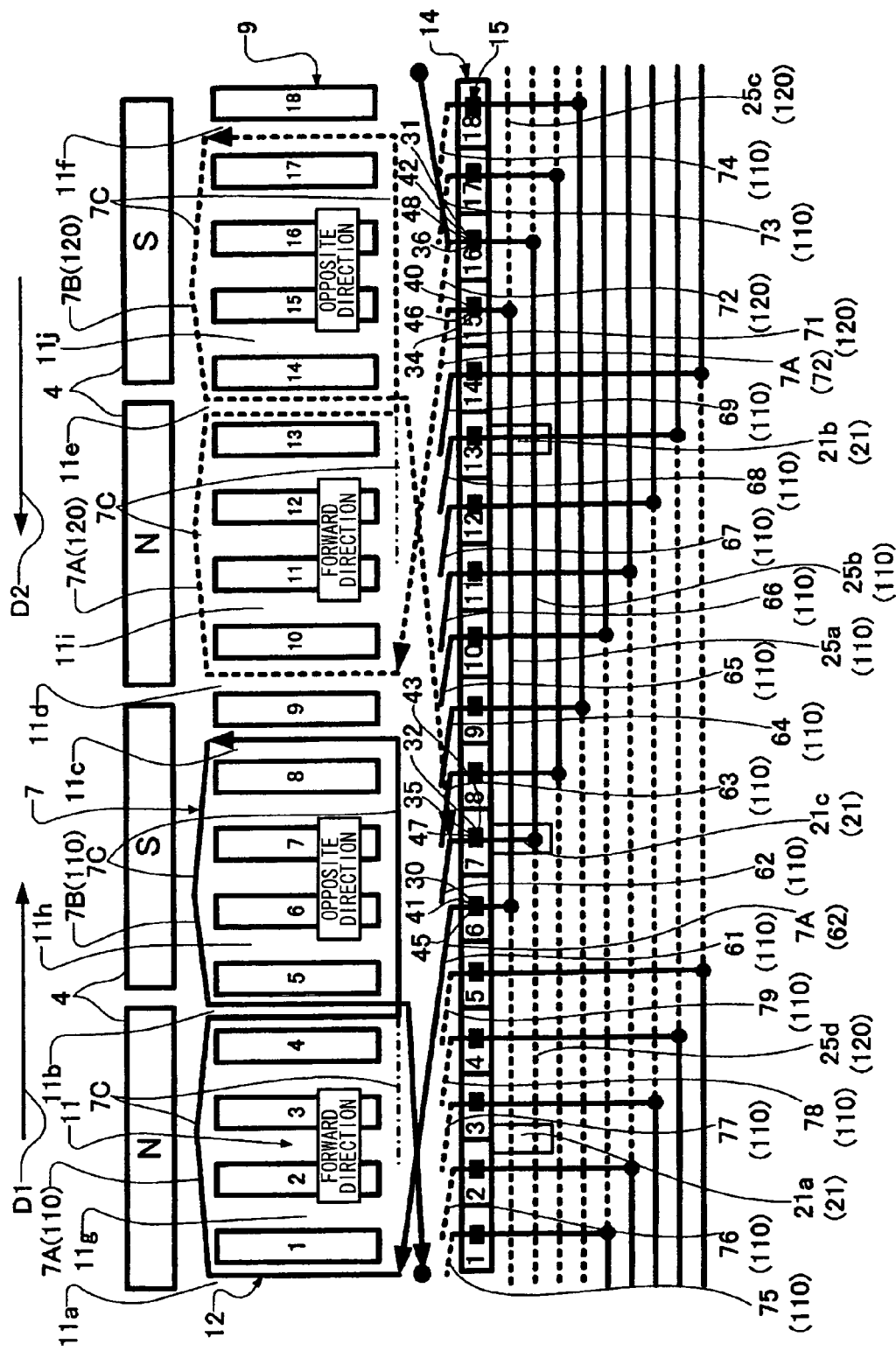
FIG. 9 is a developed view of an armature showing the winding state of an armature coil in a third embodiment of the invention.
Figure 10:
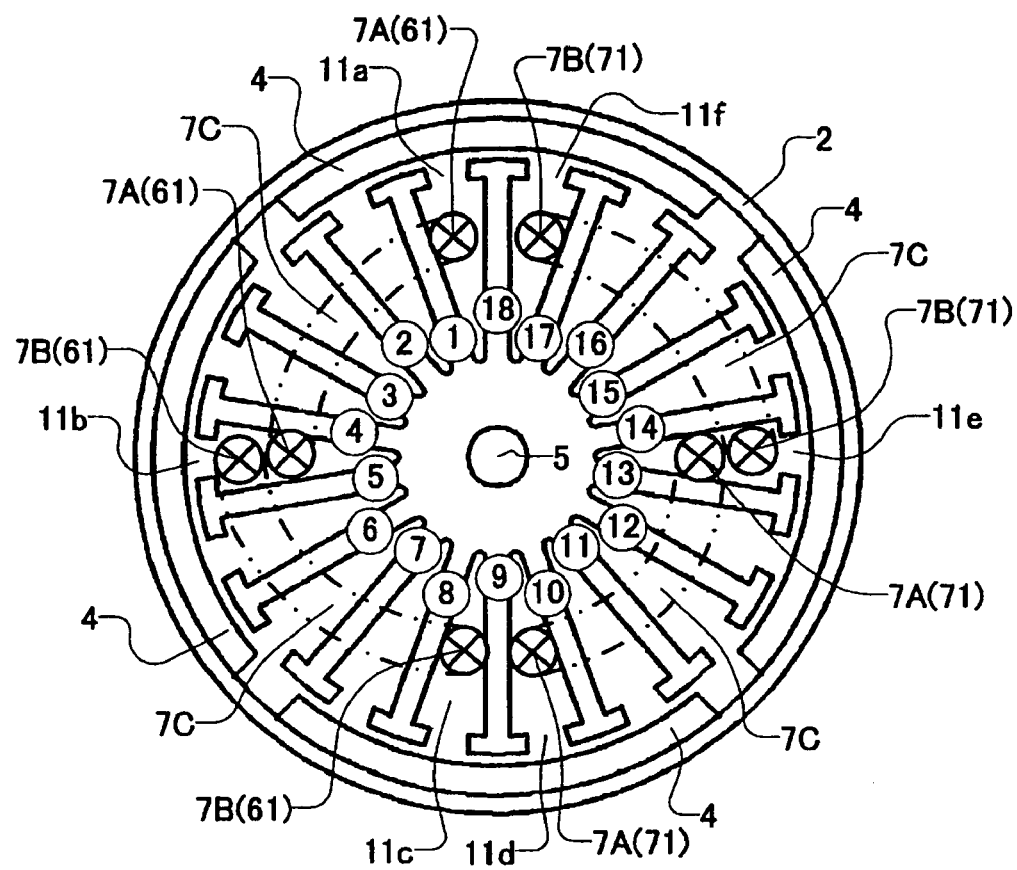
FIG. 10 is a top view of the armature showing the winding state of the armature coil in the third embodiment of the invention.

Next, the winding structure of the armature coil 7 of a third embodiment of the present invention will be described with reference to FIGS. 9 and 10. FIG. 9 is a developed view of the armature, FIG. 10 is a transverse sectional view of the armature, and a gap between adjacent teeth 9 corresponds to the slot 11. Additionally, in FIGS. 9 and 10, the segments 14 provided at the commutator 13 and the teeth 9 provided at the armature core 6 are each numbered.

The electric motor 1 of the third embodiment of the present invention and the electric motor 1 of the first embodiment described above are different from each other only in the winding structure of the armature coil 7, and are the same in the other portions. Accordingly, only the winding structure of the armature coil 7 will be described below, and description of the other portions is omitted.

The armature coil 7 of the third embodiment of the present invention includes a first conductive wire 110 and a second conductive wire 120. In addition, in FIG. 9, the first conductive wire 110 is shown by solid lines, and the second conductive wire 120 is indicated by broken lines.

The armature coil 7 has first to ninth winding wires (61 to 69) formed by the first conductive wire 110 and other first to ninth winding wires (71 to 79) formed by the second conductive wire 120. Also, the first to ninth winding wires (61 to 69) and the other first to ninth winding wires (71 to 79) corresponding thereto are respectively arranged at facing positions which are point symmetric about the rotary shaft 5.

That is, a first winding wire pair (61, 71), a second winding wire pair (62, 72), a third winding wire pair (63, 73), a fourth winding wire pair (64, 74), a fifth winding wire pair (65, 75), a sixth winding wire pair (66, 76), a seventh winding wire pair (67, 77), an eighth winding wire pair (68, 78), and a ninth winding wire pair (69, 79) are respectively arranged at facing positions which are point symmetric about the rotary shaft 5.

The first to ninth winding wires (61 to 69) are joined together in a series via nine connecting wires 25 which are similarly formed from the first conductive wire 110. That is, the first winding wire 61, the connecting wire 25, the second winding wire 62, the connecting wire 25, the third winding wire 63, the connecting wire 25, the fourth winding wire 64, the connecting wire 25, the fifth winding wire 65, the connecting wire 25, the sixth winding wire 66, the connecting wire 25, the seventh winding wire 67, the connecting wire 25, the eighth winding wire 68, the connecting wire 25, the ninth winding wire 69, and the connecting wire 25 are respectively formed in this order in a series by the first conductive wire 110. Additionally, each connecting wire of the connecting wires 25 which connect the first to ninth winding wires (61 to 69) together is electrically and mechanically connected to the risers 15 formed by a pair of segments 14 and 14 which is arranged at facing positions which are point symmetric with respect to each other about the rotary shaft 5.

On the other hand, the other first to ninth winding wires (71 to 79) are joined together in a series via nine connecting wires 25 which are similarly formed from the second conductive wire 120. That is, the first winding wire 71, the connecting wire 25, the second winding wire 72, the connecting wire 25, the third winding wire 73, the connecting wire 25, the fourth winding wire 74, the connecting wire 25, the fifth winding wire 75, the connecting wire 25, the sixth winding wire 76, the connecting wire 25, the seventh winding wire 77, the connecting wire 25, the eighth winding wire 78, the connecting wire 25, the ninth winding wire 79, and the connecting wire 25 are formed in this order in a series by the second conductive wire 120. Additionally, each connecting wire of the connecting wires 25 which connect the other first to ninth winding wires (71 to 79) together is electrically and mechanically connected to the risers 15 formed by a pair of segments 14 and 14 which is arranged at facing positions which are point symmetric with respect to each other about the rotary shaft 5.

The first to ninth winding wires (61 to 69) and the other first to ninth winding wires (71 to 79) have a first coil winding wire 7A and a second coil winding wire 7B which are each connected in series to each other. Additionally, the first coil winding wire 7A is wound 12 times so as to surround four teeth 9 which are adjacent to each other, and the second coil winding wire 7B is arranged at a position adjacent in the right direction D1 to the four teeth 9 around which the first coil winding wire 7A is wound, and is wound 12 times so as to surround the four other teeth 9 which are adjacent to each other. Here, the winding direction of the second coil winding wire 7B is opposite to the winding direction of the first coil winding wire 7A.

An end 30 of the first coil winding wire 7A is connected to one segment 14 of the commutator 13, and an end 31 of the second coil winding wire 7B is connected to the segment 14 adjacent in the right direction D1 to the segment 14 arranged at a position which is point symmetric about the rotary shaft 5 with respect to the segment 14 to which the end 30 of the first coil winding wire 7A is connected.

In the present embodiment, the first conductive wire 110 and second conductive wire 120 are substantially simultaneously wound around the teeth 9, which are formed in the armature core 6 by a double flyer type winding machine and which face each other point-symmetrically about the rotary shaft 5. The first to ninth winding wires (61 to 69) and the connecting wires 25 which join the first to ninth winding wires together in a series are formed by the first conductive wire 110, and the other first to ninth winding wires (71 to 79) and the connecting wires 25 which join the other first to ninth winding wires together in a series are formed by the second conductive wire 120.

Hereinafter, the first to ninth winding wires (61 to 69) and the connecting wires 25 which join the first to ninth winding wires together in a series, which are formed by the first conductive wire 110, will be described from the first winding wire 61. The first winding wire 61 formed by the first conductive wire 110 has a first coil winding wire 7A and a second coil winding wire 7B, and the first coil winding wire 7A is joined in a series to a connecting wire 21*a* similarly formed from the first conductive wire 110, while the second coil winding wire 7B is joined in a series to a connecting wire 25*b* similarly formed from the first conductive wire 110.

An end 40 which is a starting point of the connecting wire 25*a* formed from the first conductive wire 110 is electrically and mechanically connected to the riser 15 formed at the No. 15 segment 14, and as for the connecting wire 25*a*, an end 41 which is disposed in the left direction D2 and is an end point of the connecting wire 25*a* is electrically and mechanically connected to the riser 15 formed at the No. 6 segment 14. Here, the No. 15 segment 14 and the No. 6 segment 14 are arranged at positions which face each other point-symmetrically about the rotary shaft 5. The end 41 of the connecting wire 25*a* and the end 30 which is the starting point of the first coil winding wire 7A are joined together in a series, and the first coil winding wire 7A formed by the first conductive wire 110 is wound around the teeth 9 after being connected to the end 30.

The first coil winding wire 7A passes through a slit 11*a* formed between the No. 18 tooth 9 and the No. 1 tooth 9 and a slit 11*b* formed between the No. 4 tooth 9 and the No. 5 tooth 9, and is wound 12 times clockwise so as to surround the four No. 1 to No. 4 teeth 9 which are close to each other.

The arrangement of the second coil winding wire 7B, which is formed from the first conductive wire 110 similarly to the first coil winding wire 7A and is connected in series to the first coil winding wire 7A, will be described below. The second coil winding wire 7B passes through a slit 11*c* formed between a No. 8 tooth 9 and a No. 9 tooth 9 and the slit 11*b* formed between the No. 4 tooth 9 and the No. 5 tooth 9, and is wound 12 times in a counterclockwise direction opposite to the winding direction of the first coil winding wire 7A so as to surround the four No. 5 to No. 8 teeth 9 which are adjacent to the No. 1 to No. 4 teeth 9 and are close to each other. The second coil winding wire 7B is wound in a direction opposite to the first coil 7 winding wire A because the second coil winding wire 7B faces a magnetic pole having polarity (S pole in FIG. 9) different from the polarity (N pole in FIG. 9) of a magnetic pole which the first coil winding wire 7A faces.

The end 31 of the second coil winding wire 7B is connected to the riser 15 formed at the No. 16 segment 14 adjacent in the right direction D1 to the No. 15 segment 14 arranged at a position which is point symmetric about the rotary shaft 5 with respect to the No. 6 segment 14 to which the end 30 of the first coil winding wire 7A is connected.

The first winding wire 61 and the second winding wire 62 wound around the armature core 6 following the first winding wire 61 are joined together in a series by the connecting wire 25*b* formed by the first conductive wire 110. An end 42 which is a starting point of the connecting wire 25*b* and the end 31 of the second coil winding wire 7B provided at the first winding wire 61 are joined together in a series, and the end 42 is electrically and mechanically-connected to the riser 15 of the No. 16 segment 14. Also, as for the connecting wire 25*b*, an end 43 which is disposed in the left direction D2 and is an end point of the connecting wire 25*b* is electrically and mechanically connected to a riser 15 formed at a No. 7 segment 14. Here, the No. 16 segment 14 and the No. 7 segment 14 are arranged at positions which face each other point-symmetrically about the rotary shaft 5.

The end 43 of the connecting wire 25*b* and the end 32, which is the starting point of the first coil winding wire 7A of the second winding wire 62 wound following the first winding wire 61, are joined together in a series. Also, the first coil winding wire 7A of the second winding wire 62 passes through a slit 11*g* formed between the No. 1 tooth 9 and the No. 2 tooth 9 and the slit 11*h* formed between the No. 5 tooth 9 and the No. 6 tooth 9, and is wound 12 times clockwise so as to surround the four No. 2 to No. 5 teeth 9. The same process as the aforementioned process is repeated below, and the armature core 6 includes the first to ninth winding wires (61 to 69), and nine connecting wires 25.

In this way, the respective winding wires 12 of the first to ninth winding wires (61 to 69) are split into the first coil winding wire 7A and the second coil winding wire 7B, and are wound around the armature core 6. Accordingly, compared to a case where the winding wires are wound without splitting, the number of crossovers 7C which cross over from one slot 11 to another slot 11 is small, and the thickness of the crossovers is small. Additionally, the first to ninth winding wires (61 to 69) and the connecting wires 25 which join the first to ninth winding wires together in a series are formed by disposing a single first conductive wire 110 at the armature core 6 and the commutator 13. Therefore, compared to a case where connecting wires are disposed in advance at the commutator 13, and then, winding wires are disposed, the time of winding work is shortened, and mounting of the connecting wires and winding wires to the armature core and commutator 13 is simple.

As described above, each of the first to ninth winding wires (61 to 69) formed by the first conductive wire 110 and each of the other first to ninth winding wires (71 to 79) formed by the second conductive wire 120 corresponding to the first to ninth winding wires are substantially simultaneously wound around the teeth 9 of the armature core 6 which face each other point-symmetrically about the rotary shaft 5 by a double flyer type winding machine.

Accordingly, the respective winding wires 12 of the other first to ninth winding wires (71 to 79) corresponding to the respective winding wires 12 of the first to ninth winding wires (61 to 69) are arranged at positions which face each other point-symmetrically about the rotary shaft 5. That is, the first winding wire 71 is arranged at a position which faces the first winding wire 61, and the second winding wire 72 is arranged at a position which faces the second winding wire 62, the third winding wire 73 is arranged at a position which faces the third winding wire 63, and the fourth winding wire 74 is arranged at a position which faces the fourth winding wire 64. Moreover, the fifth winding wire 75 is arranged at a position which faces the fifth winding wire 65, the sixth winding wire 76 is arranged at a position which faces the sixth winding wire 66, the seventh winding wire 77 is arranged at a position which faces the seventh winding wire 67, the eighth winding wire 78 is arranged at a position which faces the eighth winding wire 68, and the ninth winding wire 79 is arranged at a position which faces the ninth winding wire 69.

Hereinafter, the other first to ninth winding wires (71 to 79) and the connecting wires 25 which join the other first to ninth winding wires together in a series, which are formed by the second conductive wire 120, will be described from the first winding wire 71.

The first winding wire 71 formed by the second conductive wire 120 has a first coil winding wire 7A and a second coil winding wire 7B connected in series to the first coil winding wire 7A, and the first coil winding wire 7A is joined in a series to a connecting wire 21*c* similarly formed from the second conductive wire 120, while the second coil winding wire 7B is joined in a series to a connecting wire 25*d* similarly formed from the second conductive wire 120.

An end 45 which is a starting point of the connecting wire 25*c* formed from the second conductive wire 120 is electrically and mechanically connected to the riser 15 formed at the No. 6 segment 14, and as for the connecting wire 25c, an end 46 which is disposed in the left direction D2 and is an end point of the connecting wire 25c is electrically and mechanically connected to the riser 15 of the No. 15 segment 14. Here, the No. 6 segment 14 and the No. 15 segment 14 are arranged at positions which face each other point-symmetrically about the rotary shaft 5. The end 46 of the connecting wire 25c and the end 34 which is the starting point of the first coil winding wire 7A are joined together in a series, and the first coil winding wire 7A formed by the second conductive wire 120 is wound around the teeth 9 from the end 34.

The first coil winding wire 7A passes through a slit 11d formed between the No. 9 tooth 9 and the No. 10 tooth 9 and a slit 11e formed between the No. 13 tooth 9 and the No. 14 tooth 9, and is wound 12 times clockwise so as to surround the four No. 10 to No. 13 teeth 9 which are close to each other.

The arrangement of the second coil winding wire 7B, which is formed from the second conductive wire 120 similarly to the first coil winding wire 7A and is connected in series to the first coil winding wire 7A, will be described below. The second coil winding wire 7B passes through a slit 11f formed between the No. 17 tooth 9 and the No. 18 tooth 9 and the slit 11e formed between the No. 13 tooth 9 and the No. 14 tooth 9, and is wound 12 times in a counterclockwise direction opposite to the winding direction of the first coil winding wire 7A so as to surround the four No. 14 to No. 17 teeth 9 which are adjacent to the four No. 10 to No. 13 teeth 9 in the right direction D1 and are close to each other. The second coil winding wire 7B is wound in a direction opposite to the first coil winding wire 7A because the second coil winding wire 7B faces a magnetic pole having polarity (S pole in FIG. 9) different from the polarity (N pole in FIG. 9) of a magnetic pole which the first coil winding wire 7A faces.

The end 35 of the second coil winding wire 7B is connected to the riser 15 formed at the No. 7 segment 14 adjacent in the right direction D1 to the No. 6 segment 14 arranged at a position which is point symmetric about the rotary shaft 5 with respect to the No. 15 segment 14 to which the end 34 of the first coil winding wire 7A is connected.

The first winding wire 71 and the second winding wire 72 are joined together in a series by the connecting wire 25d similarly formed by the second conductive wire 120. An end 47 which is a starting point of the connecting wire 25d and the end 35 of the second coil winding wire 7B provided at the first winding wire 71 are joined together in a series, and the end 47 is electrically and mechanically connected to the riser 15 of the No. 7 segment 14. Also, as for the connecting wire 25d, an end 48 disposed in the left direction D2, which is an end point of the connecting wire 25d is electrically and mechanically connected to the riser 15 of the No. 16 segment 14. Here, the No. 7 segment 14 and the No. 16 segment 14 are arranged at positions which face each other point-symmetrically about the rotary shaft 5.

The end 48 of the connecting wire 25d and an end 36, which is a starting point of the first coil winding wire 7A of the second winding wire 72 wound following the first winding wire 71, are joined together in a series. Also, the first coil winding wire 7A of the second winding wire 72 passes through a slit 11i formed between the No. 10 tooth 9 and the No. 11 tooth 9 and the slit 11j formed between the No. 14 tooth 9 and the No. 15 tooth 9, and is wound 12 times clockwise so as to surround the four No. 11 to No. 14 teeth 9. The same process as the aforementioned process is repeated below, and the armature core 6 includes the other first to ninth winding wires (71 to 79), and nine connecting wires 25.

In this way, the respective winding wires 12 of the other first to ninth winding wires (71 to 79) are split into the first coil winding wire 7A and the second coil winding wire 7B, and are wound around the armature core 6. Accordingly, compared to a case where the winding wires are wound without splitting, the thickness of crossovers 7C which cross over from one slot 11 to another slot 11 is made small. Additionally, the other first to ninth winding wires (71 to 79) and the connecting wires 25 which join the other first to ninth winding wires together in a series are formed by disposing a single first winding wire 71 at the armature core 6 and the commutator 13. Therefore, compared to a case where connecting wires are disposed in advance at the commutator 13, and then, winding wires are disposed, the time of winding work is shortened, and mounting of the connecting wires and winding wires to the armature core and commutator 13 is simple.

In this way, the respective winding wires 12 of the first to ninth winding wires (61 to 69) and the other first to ninth winding wires (71 to 79) are split into the first coil winding wire 7A and the second coil winding wire 7B, and are wound around the armature core 6, and the thickness of the respective crossovers 7C is made thin. Therefore; in the armature coil 7 formed by the first to ninth winding wires (61 to 69) and the other first to ninth winding wires (71 to 72) which are each wound so as to overlap each other sequentially from the outside of the winding wires 12 which are already wound, winding thickening caused by overlapping of the crossovers 7C is reduced.

Thereby, axial miniaturization of a portion in which the crossovers 7C exist can be achieved. Additionally, due to the reduction of winding thickening, insertion of the first and second conductive wires 110 and 120 into the slot 11 is facilitated, and the ratio of the winding wires 12 which occupy in a space within the slot 11, i.e., space factor, is improved. For this reason, it is possible to reduce the space within the slot 11, and reduction of the radial dimensions of the armature core 6 can be achieved. Thereby, miniaturization of the whole electric motor 1 is achieved.

As shown in FIG. 9, the first winding wire 61 and the first winding wire 71 which are arranged at positions which face each other point-symmetrically about the rotary shaft 5 are connected to each other by the connecting wire 25a and the connecting wire 25c. Therefore, the first winding wire 61 and the first winding wire 71 are connected in parallel to each other by the connecting wire 25a and the connecting wire 25c. In this way, the winding wires 12 and 12, which are arranged at positions which face each other point-symmetrically about the rotary shaft 5 among the first to ninth winding wires (61 to 69) and the other first to ninth winding wires (71 to 79), are each connected in parallel to each other by two connecting wires 25 and 25. For this reason, even in the four-pole electric motor 1 as in the present embodiment, basically, the armature 3 can be rotated by supplying power from two positions arranged with an electrical angle of 180°.

Figure 11:
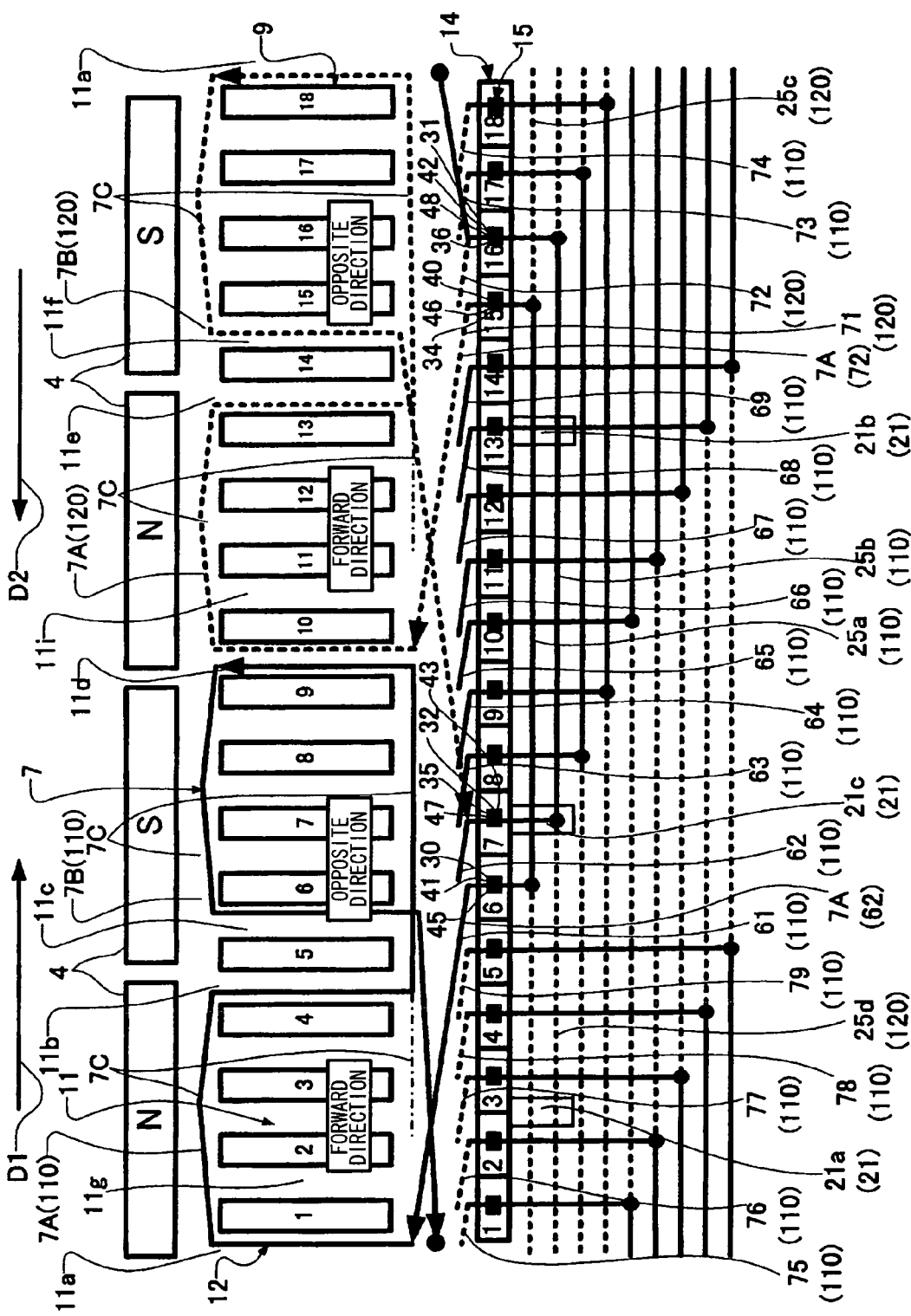
FIG. 11 is a developed view of an armature showing the winding state of an armature coil in a fourth embodiment of the invention.
Figure 12:
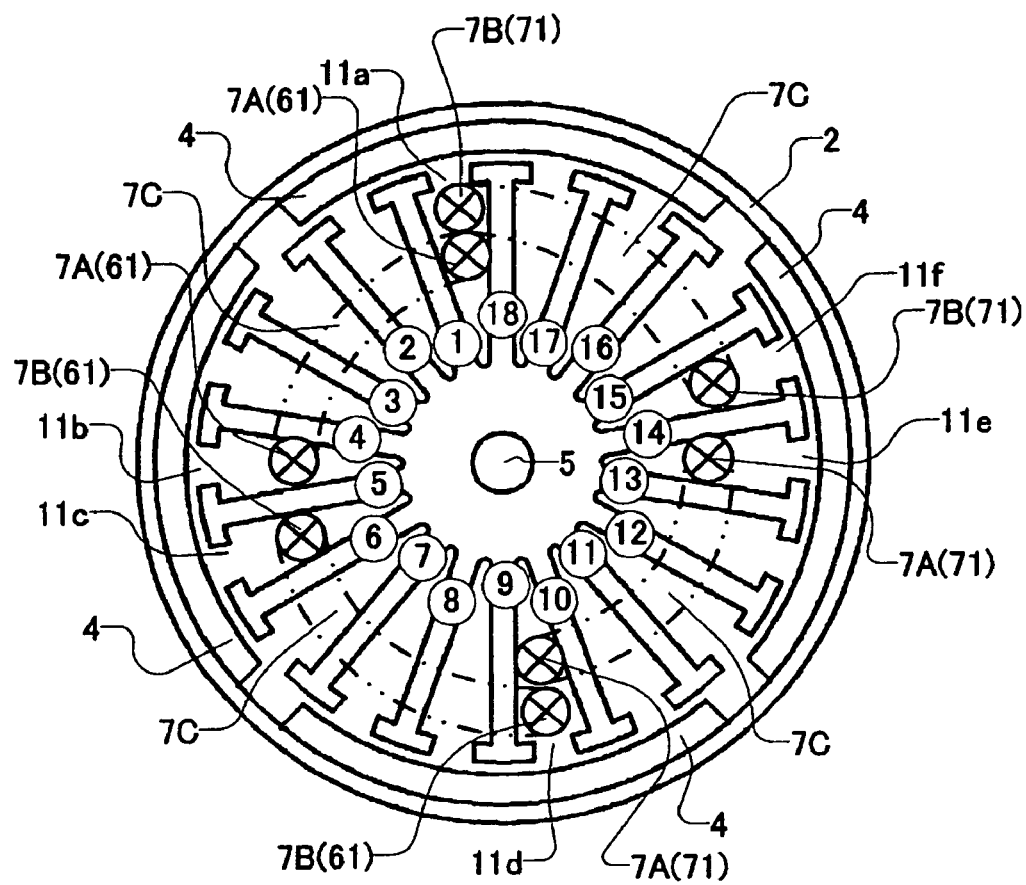
FIG. 12 is a top view of the armature showing the winding state of the armature coil in the fourth embodiment of the invention.

Next, the winding structure of the armature coil 7 of a fourth embodiment of the invention will be described with reference to FIGS. 11 and 12. FIG. 11 is a developed view of the armature, FIG. 12 is a transverse sectional view of the armature, and a gap between adjacent teeth 9 corresponds to the slot 11. Additionally, in FIGS. 11 and 12, the segments 14 provided at the commutator 13 and the teeth 9 provided at the armature core 6 are each numbered.

The electric motor 1 of the fourth embodiment of the invention and the electric motor 1 of the first embodiment described above are different from each other only in the winding structure of the armature coil 7, and are the same in the other portions. Accordingly, only the winding structure of the armature coil 7 will be described below, and description of the other portions is omitted.

The armature coil 7 of the fourth embodiment of the invention includes a first conductive wire 110 and a second conductive wire 120. In addition, in FIG. 11, the first conductive wire 110 is shown by solid lines, and the second conductive wire 120 is indicated by broken lines.

The armature coil 7 has first to ninth winding wires (61 to 69) formed by the first conductive wire 110 and other first to ninth winding wires (71 to 79) formed by the second conductive wire 120. Also, the first to ninth winding wires (61 to 69) and the other first to ninth winding wires (71 to 79) corresponding thereto are respectively arranged at facing positions which are point symmetric about the rotary shaft 5.

That is, a first winding wire pair (61, 71), a second winding wire pair (62, 72), a third winding wire pair (63, 73), a fourth winding wire pair (64, 74), a fifth winding wire pair (65, 75), a sixth winding wire pair (66, 76), a seventh winding wire pair (67, 77), an eighth winding wire pair (68, 78), and a ninth winding wire pair (69, 79) are respectively arranged at facing positions which are point symmetric about the rotary shaft 5.

The first to ninth winding wires (61 to 69) are joined together in a series via nine connecting wires 25 which are similarly formed from the first conductive wire 110. That is, the first winding wire 61, the connecting wire 25, the second winding wire 62, the connecting wire 25, the third winding wire 63, the connecting wire 25, the fourth winding wire 64, the connecting wire 25, the fifth winding wire 65, the connecting wire 25, the sixth winding wire 66, the connecting wire 25, the seventh winding wire 67, the connecting wire 25, the eighth winding wire 68, the connecting wire 25, the ninth winding wire 69, and the connecting wire 25 are respectively formed in this order in a series by the first conductive wire 110. Additionally, each connecting wire of the connecting wires 25 which connect the first to ninth winding wires (61 to 69) together is electrically and mechanically connected to the risers 15 formed by a pair of segments 14 and 14 which is arranged at facing positions which are point symmetric with respect to each other about the rotary shaft 5.

On the other hand, the other first to ninth winding wires (71 to 79) are joined together in a series via nine connecting wires 25 which are similarly formed from the second conductive wire 120. That is, the first winding wire 71, the connecting wire 25, the second winding wire 72, the connecting wire 25, the third winding wire 73, the connecting wire 25, the fourth winding wire 74, the connecting wire 25, the fifth winding wire 75, the connecting wire 25, the sixth winding wire 76, the connecting wire 25, the seventh winding wire 77, the connecting wire 25, the eighth winding wire 78, the connecting wire 25, the ninth winding wire 79, and the connecting wire 25 are formed in this order in a series by the second conductive wire 120. Additionally, each connecting wire of the connecting wires 25 which connect the other first to ninth winding wires (71 to 79) together is electrically and mechanically connected to the risers 15 formed by a pair of segments 14 and 14 which is arranged at facing positions which are point symmetric with respect to each other about the rotary shaft 5.

The first to ninth winding wires (61 to 69) and the other first to ninth winding wires (71 to 79) have a first coil winding wire 7A and a second coil winding wire 7B which are each connected in series to each other. Additionally, the first coil winding wire 7A is wound 12 times so as to surround four teeth 9 which are adjacent to each other, and the second coil winding wire 7B is arranged at a position adjacent in the right direction D1 to the four teeth 9 around which the first coil winding wire 7A is wound with one tooth 9 therebetween and is wound 12 times so as to surround the four other teeth 9 which are adjacent to each other. Here, the winding direction of the second coil winding wire 7B is opposite to the winding direction of the first coil winding wire 7A.

An end 30 of the first coil winding wire 7A is connected to one segment 14 of the commutator 13, and an end 31 of the second coil winding wire 7B is connected to the segment 14 adjacent in the right direction D1 to the segment 14 arranged at a position which is point symmetric with respect to the segment 14 to which the end 30 of the first coil winding wire 7A is connected about the rotary shaft 5.

In the present embodiment, the first conductive wire 110 and second conductive wire 120 are substantially simultaneously wound around the teeth 9, which are formed in the armature core 6 by a double flyer type winding machine and which face each other point-symmetrically about the rotary shaft 5. The first to ninth winding wires (61 to 69) and the connecting wires 25 which join the first to ninth winding wires together in a series are formed by the first conductive wire 110, and the other first to ninth winding wires (71 to 79) and the connecting wires 25 which join the other first to ninth winding wires together in a series are formed by the second conductive wire 120.

Hereinafter, the first to ninth winding wires (61 to 69) and the connecting wires 25 which join the first to ninth winding wires together in a series, which are formed by the first conductive wire 110, will be described from the first winding wire 61. The first winding wire 61 formed by the first conductive wire 110 has a first coil winding wire 7A and a second coil winding wire 7B, and the first coil winding wire 7A is joined in a series to a connecting wire 21a similarly formed from the first conductive wire 110, while the second coil winding wire 7B is joined in a series to a connecting wire 25b similarly formed from the first conductive wire 110.

An end 40 which is a starting point of the connecting wire 25a formed from the first conductive wire 110 is electrically and mechanically connected to the riser 15 formed at the No. 15 segment 14, and as for the connecting wire 25a, an end 41 which is disposed in the left direction D2 and is an end point of the connecting wire 25a is electrically and mechanically connected to the riser 15 formed at the No. 6 segment 14. Here, the No. 15 segment 14 and the No. 6 segment 14 are arranged at positions which face each other point-symmetrically about the rotary shaft 5. The end 41 of the connecting wire 25a and the end 30 which is the starting point of the first coil winding wire 7A are joined together in a series, and the first coil winding wire 7A formed by the first conductive wire 110 is wound around the teeth 9 after being connected to the No. 6 segment 14 at the end 30.

The first coil winding wire 7A passes through a slit 11a formed between the No. 18 tooth 9 and the No. 1 tooth 9 and a slit 11b formed between the No. 4 tooth 9 and the No. 5 tooth 9, and is wound 12 times clockwise so as to surround the four No. 1 to No. 4 teeth 9 which are close to each other.

The arrangement of the second coil winding wire 7B, which is formed from the first conductive wire 110 similarly to the first coil winding wire 7A and is connected in series to the first coil winding wire 7A, will be described below. The second coil winding wire 7B passes through a slit 11d formed between the No. 9 tooth 9 and the No. 10 tooth 9 and the slit 11c formed between the No. 5 tooth 9 and the No. 6 tooth 9, and is wound 12 times in a counterclockwise direction which is a direction opposite to the winding direction of the first coil winding wire 7A so as to surround the four No. 6 to No. 9 teeth 9 which are adjacent to the No. 1 to No. 4 teeth 9 with the No. 5 tooth 9 therebetween and are close to each other. The second coil winding wire 7B is wound in a direction opposite to the first coil winding wire 7A because the second coil winding wire 7B faces a magnetic pole having polarity (S pole in FIG. 11) different from the polarity (N pole in FIG. 11) of a magnetic pole which the first coil winding wire 7A faces.

The end 31 of the second coil winding wire 7B is connected to the riser 15 formed at the No. 16 segment 14 adjacent in the right direction D1 to the No. 15 segment 14 arranged of a position which is point symmetric about the rotary shaft 5 with respect to the No. 6 segment 14 to which the end 30 of the first coil winding wire 7A is connected.

The first winding wire 61 and the second winding wire 62 wound around the armature core 6 following the first winding wire 61 are joined together in a series by the connecting wire 25b formed by the first conductive wire 110. An end 42 which is a starting point of the connecting wire 25b and the end 31 of the second coil winding wire 7B provided at the first winding wire 61 are joined together in a series, and the end 42 is electrically and mechanically connected to the riser 15 of the No. 16 segment 14. Also, as for the connecting wire 25b, an end 43 which is disposed in the left direction D2 and is an end point of the connecting wire 25b is electrically and mechanically connected to a riser 15 formed at a No. 7 segment 14. Here, the No. 16 segment 14 and the No. 7 segment 14 are arranged at positions which face each other point-symmetrically about the rotary shaft 5.

The end 43 of the connecting wire 25b and the end 32, which is the starting point of the first coil winding wire 7A of the second winding wire 62 wound following the first winding wire 61, are joined together in a series. The first coil winding wire 7A of the second winding wire 62 passes through a slit 11g formed between the No. 1 tooth 9 and the No. 2 tooth 9 and the slit 11c formed between the No. 5 tooth 9 and the No. 6 tooth 9, and is wound 12 times clockwise so as to surround the four No. 2 to No. 5 teeth 9. The same process as the aforementioned process is repeated below, and the armature core 6 includes the first to ninth winding wires (61 to 69), and nine connecting wires 25.

In this way, the respective winding wires 12 of the first to ninth winding wires (61 to 69) are split into the first coil winding wire 7A and the second coil winding wire 7B, and are wound around the armature core 6. Accordingly, compared to a case where the winding wires are wound without splitting, the number of crossovers 7C which cross over from one slot 11 to another slot 11 is small, and the thickness of the crossovers is small. Additionally, the first to ninth winding wires (61 to 69) and the connecting wires 25 which join the first to ninth winding wires together in a series are formed by disposing a single first conductive wire 110 at the armature core 6 and the commutator 13. Therefore, compared to a case where connecting wires are disposed in advance at the commutator 13, and then, winding wires are disposed, the time of winding work is shortened, and mounting of the connecting wires and winding wires to the armature core and commutator 13 is simple.

As described above, each of the first to ninth winding wires (61 to 69) formed by the first conductive wire 110 and each of the other first to ninth winding wires (71 to 79) formed by the second conductive wire 120 corresponding to the first to ninth winding wires are substantially simultaneously wound around the teeth 9 of the armature core 6 which face each other point-symmetrically about the rotary shaft 5 by a double flyer type winding machine.

Accordingly, the respective winding wires 12 of the other first to ninth winding wires (71 to 79) corresponding to the respective winding wires 12 of the first to ninth winding wires (61 to 69) are arranged at positions which face each other point-symmetrically about the rotary shaft 5. That is, the first winding wire 71 is arranged at a position which faces the first winding wire 61, and the second winding wire 72 is arranged at a position which faces the second winding wire 62, the third winding wire 73 is arranged at a position which faces the third winding wire 63, and the fourth winding wire 74 is arranged at a position which faces the fourth winding wire 64. Moreover, the fifth winding wire 75 is arranged at a position which faces the fifth winding wire 65, the sixth winding wire 76 is arranged at a position which faces the sixth winding wire 66, the seventh winding wire 77 is arranged at a position which faces the seventh winding wire 67, the eighth winding wire 78 is arranged at a position which faces the eighth winding wire 68, and the ninth winding wire 79 is arranged at a position which faces the ninth winding wire 69.

Hereinafter, the other first to ninth winding wires (71 to 79) and the connecting wires 25 which join the other first to ninth winding wires together in a series, which are formed by the second conductive wire 120, will be described from the first winding wire 71.

The first winding wire 71 formed by the second conductive wire 120 has a first coil winding wire 7A and a second coil winding wire 7B connected in series to the first coil winding wire 7A, and the first coil winding wire 7A is joined in a series to a connecting wire 21c similarly formed from the second conductive wire 120, while the second coil winding wire 7B is joined in a series to a connecting wire 25d similarly formed from the second conductive wire 120.

An end 45 which is a starting point of the connecting wire 25c formed from the second conductive wire 120 is electrically and mechanically connected to the riser 15 formed at the No. 6 segment 14, and as for the connecting wire 25c, an end 46 which is disposed in the left direction D2 and is an end point of the connecting wire 25c is electrically and mechanically connected to the riser 15 of the No. 15 segment 14. Here, the No. 6 segment 14 and the No. 15 segment 14 are arranged at positions which face each other point-symmetrically about the rotary shaft 5. The end 46 of the connecting wire 25c and the end 34 which is the starting point of the first coil winding wire 7A are joined together in a series, and the first coil winding wire 7A formed by the second conductive wire 120 is connected to the No. 15 segment 14 at the end 34 and wound around the teeth 9.

The first coil winding wire 7A passes through a slit 11d formed between the No. 9 tooth 9 and the No. 10 tooth 9 and a slit 11e formed between the No. 13 tooth 9 and the No. 14 tooth 9, and is wound 12 times clockwise so as to surround the four No. 10 to No. 13 teeth 9 which are close to each other.

The arrangement of the second coil winding wire 7B, which is formed from the second conductive wire 120 similarly to the first coil winding wire 7A and is connected in series to the first coil winding wire 7A, will be described below. The second coil winding wire 7B passes through the slit 11a formed between the No. 18 tooth 9 and the No. 1 tooth 9 and the slit 11f formed between the No. 14 tooth 9 and the No. 15 tooth 9, and is wound 12 times in a counterclockwise direction opposite to the winding direction of the first coil winding wire 7A so as to surround the four No. 15 to No. 18 teeth 9 which are adjacent to the four No. 10 to No. 13 teeth 9 in the right direction D1 with the No. 14 tooth 9 therebetween and are close to each other. The second coil winding wire 7B is wound in a direction opposite to the first coil 7 winding wire A because the second coil winding wire 7B faces a magnetic pole having polarity (S pole in FIG. 11) different from the polarity (N pole in FIG. 11) of a magnetic pole which the first coil winding wire 7A faces.

The end 35 of the second coil winding wire 7B is connected to the riser 15 formed at the No. 7 segment 14 adjacent in the right direction D1 to the No. 6 segment 14 arranged at a position which is point symmetric about the rotary shaft 5 with respect to the No. 15 segment 14 to which the end 34 of the first coil winding wire 7A is connected.

The first winding wire 71 and the second winding wire 72 are joined together in a series by the connecting wire 25d similarly formed by the second conductive wire 120. An end 47 which is a starting point of the connecting wire 25d and the end 35 of the second coil winding wire 7B provided at the first winding wire 71 are joined together in a series, and the end 47 is electrically and mechanically connected to the riser 15 of the No. 7 segment 14. As for the connecting wire 25d, an end 48 which is disposed in the left direction D2 and is an end point of the connecting wire 25d is electrically and mechanically connected to the riser 15 of the No. 16 segment 14. Here, the No. 7 segment 14 and the No. 16 segment 14 are arranged at positions which face each other point-symmetrically about the rotary shaft 5.

The end 48 of the connecting wire 25d and an end 36, which is a starting point of the first coil winding wire 7A of the second winding wire 72 wound following the first winding wire 71, are joined together in a series. The first coil winding wire 7A of the second winding wire 72 passes through a slit 11i formed between the No. 10 tooth 9 and the No. 11 tooth 9 and the slit 11f formed between the No. 14 tooth 9 and the No. 15 tooth 9, and is wound 12 times clockwise so as to surround the four No. 11 to No. 14 teeth 9. The same process as the aforementioned process is repeated below, and the armature core 6 includes the other first to ninth winding wires (71 to 79), and nine connecting wires 25.

In this way, the respective winding wires 12 of the other first to ninth winding wires (71 to 79) are split into the first coil winding wire 7A and the second coil winding wire 7B, and are wound around the armature core 6. Accordingly, compared to a case where the winding wires are wound without splitting, the thickness of crossovers 7C which cross over from one slot 11 to another slot 11 is made small. Additionally, the other first to ninth winding wires (71 to 79) and the connecting wires 25 which join the other first to ninth winding wires together in a series are formed by disposing a single first winding wire 71 at the armature core 6 and the commutator 13. Therefore, compared to a case where connecting wires are disposed in advance at the commutator 13, and then, winding wires are disposed, the time of winding work is shortened, and mounting of the connecting wires and winding wires to the armature core and commutator 13 is simple.

In this way, the respective winding wires 12 of the first to ninth winding wires (61 to 69) and the other first to ninth winding wires (71 to 79) have the first coil winding wire 7A and the second coil winding wire 7B, and are wound around the armature core 6, and the thickness of the respective crossovers 7C is made thin. Therefore, in the armature coil 7 formed by the first to ninth winding wires (61 to 69) and the other first to ninth winding wires (71 to 72) which are each wound so as to overlap each other sequentially from the outside of the winding wires 12 which are already wound, winding thickening caused by overlapping of the crossovers 7C is reduced.

Thereby, axial miniaturization of a portion in which the crossovers 7C exist can be achieved. Additionally, due to the reduction of winding thickening, insertion of the first and second conductive wires 110 and 120 into the slot 11 is facilitated, and the ratio of the winding wires 12 which occupy a space within the slot 11, i.e., space factor, is improved. For this reason, it is possible to reduce the space within the slot 11, and reduction of the radial dimensions of the armature core 6 can be achieved. Thereby, miniaturization of the whole electric motor 1 is achieved.

As shown in FIG. 9, the first winding wire 61 and the first winding wire 71 which are arranged at positions which face each other point-symmetrically about the rotary shaft 5 are connected to each other by the connecting wire 25a and the connecting wire 25c. Therefore, the first winding wire 61 and the first winding wire 71 are connected in parallel to each other by the connecting wire 25a and the connecting wire 25c. In this way, the winding wires 12 and 12, which are arranged at positions which face each other point-symmetrically about the rotary shaft 5 among the first to ninth winding wires (61 to 69) and the other first to ninth winding wires (71 to 79), are each connected in parallel to each other by two connecting wires 25 and 25. For this reason, even in the four-pole electric motor 1 as in the present embodiment, basically, the armature 3 can be rotated by supplying power from two positions arranged with an electrical angle of 180°.

Figure 13:
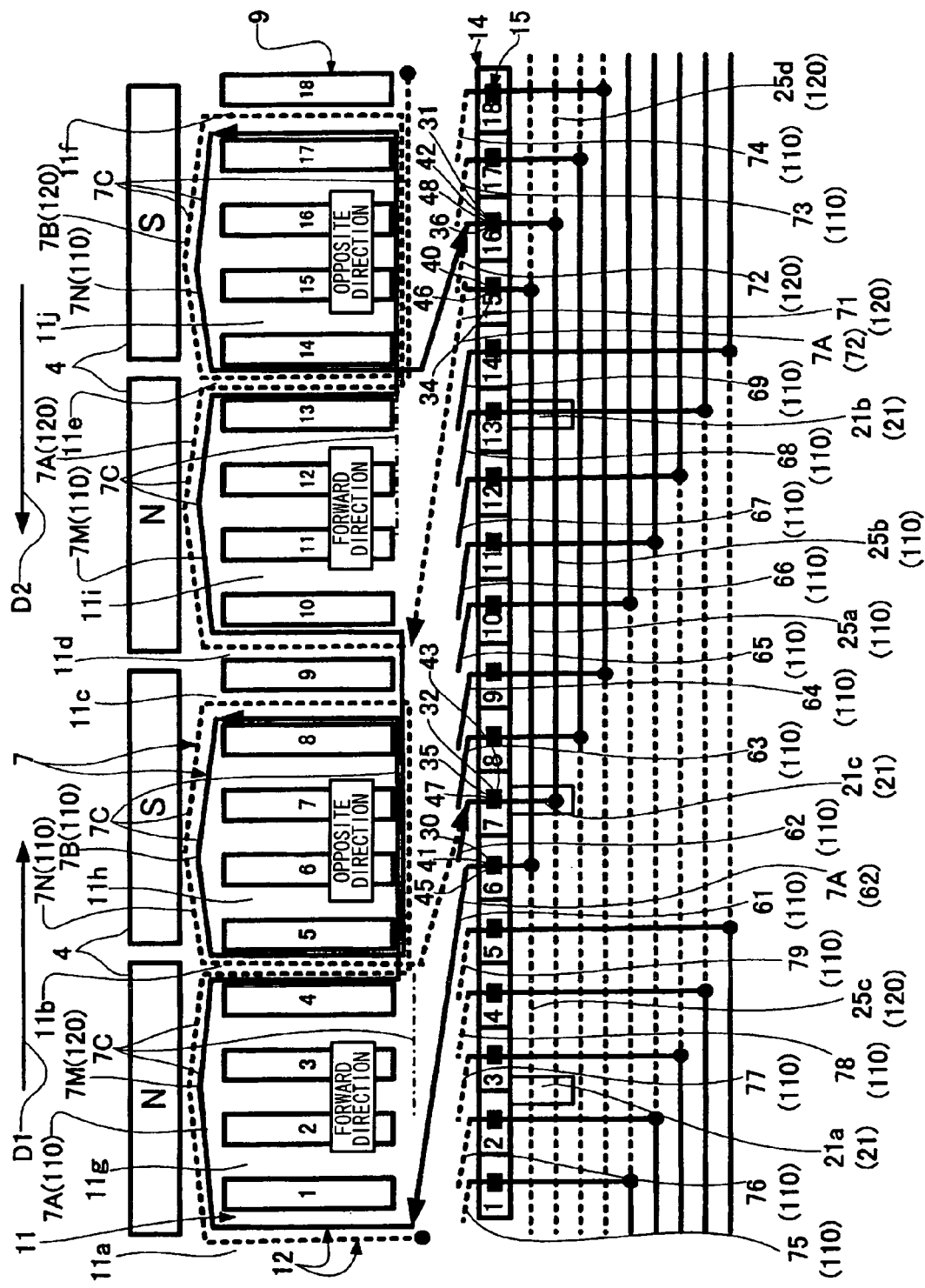
FIG. 13 is a developed view of an armature showing the winding state of an armature coil in a fifth embodiment of the invention.
Figure 14:
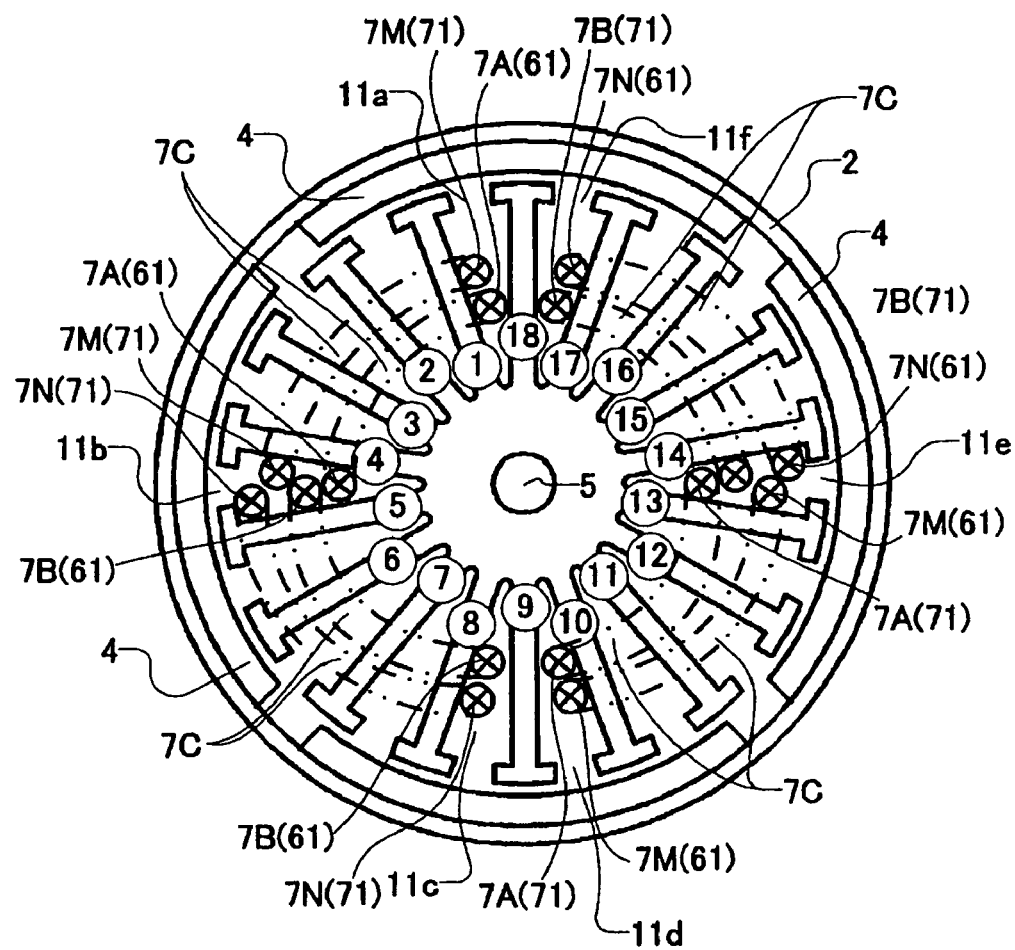
FIG. 14 is a top view of the armature showing the winding state of the armature coil in the fifth embodiment of the invention.

Next, the winding structure of the armature coil 7 of a fifth embodiment of the present invention will be described with reference to FIGS. 13 and 14. FIG. 13 is a developed view of the armature, FIG. 14 is a transverse sectional view of the armature, and a gap between adjacent teeth 9 corresponds to the slot 11. Additionally, in FIGS. 13 and 14, the segments 14 provided at the commutator 13 and the teeth 9 provided at the armature core 6 are each numbered.

The electric motor 1 of the fifth embodiment of the invention and the electric motor 1 of the first embodiment described above are different from each other only in the winding structure of the armature coil 7, and are the same in the other portions. Accordingly, only the winding structure of the armature coil 7 will be described below, and description of the other portions is omitted.

The armature coil 7 of the fifth embodiment of the present invention includes a first conductive wire 110 and a second conductive wire 120. In addition, in FIG. 13, the first conductive wire 110 is shown by solid lines, and the second conductive wire 120 is indicated by broken lines. The armature coil 7 has first to ninth winding wires (61 to 69) formed by the first conductive wire 110 and other first to ninth winding wires (71 to 79) formed by the second conductive wire 120.

The first to ninth winding wires (61 to 69) are joined together in a series via nine connecting wires 25 which are similarly formed from the first conductive wire 110. That is, the first winding wire 61, the connecting wire 25, the second winding wire 62, the connecting wire 25, the third winding wire 63, the connecting wire 25, the fourth winding wire 64, the connecting wire 25, the fifth winding wire 65, the connecting wire 25, the sixth winding wire 66, the connecting wire 25, the seventh winding wire 67, the connecting wire 25, the eighth winding wire 68, the connecting wire 25, the ninth winding wire 69, and the connecting wire 25 are respectively formed in this order in a series by the first conductive wire 110. Additionally, each connecting wire of the connecting wires 25 which connect the first to ninth winding wires (61 to 69) together is electrically and mechanically connected to the risers 15 formed by a pair of segments 14 and 14 which is arranged at facing positions which are point symmetric with respect to each other about the rotary shaft 5.

On the other hand, the other first to ninth winding wires (71 to 79) are joined together in a series via nine connecting wires 25 which are similarly formed from the second conductive wire 120. That is, the first winding wire 71, the connecting wire 25, the second winding wire 72, the connecting wire 25, the third winding wire 73, the connecting wire 25, the fourth winding wire 74, the connecting wire 25, the fifth winding wire 75, the connecting wire 25, the sixth winding wire 76, the connecting wire 25, the seventh winding wire 77, the connecting wire 25, the eighth winding wire 78, the connecting wire 25, the ninth winding wire 79, and the connecting wire 25 are formed in this order in a series by the second conductive wire 120. Additionally, each of the connecting wires 25 which connect the other first to ninth winding wires (71 to 79) together is electrically and mechanically connected to the risers 15 formed by a pair of segments 14 and 14 which is arranged at facing positions which are point symmetric with respect to each other about the rotary shaft 5.

The first to ninth winding wires (61 to 69) and the other first to ninth winding wires (71 to 79) have first to four coil winding wires (7A, 7B, 7M, and 7N) which are each connected in series to each other. Additionally, the first to fourth coil winding wires (7A, 7B, 7M, and 7N) are respectively arranged at intervals of about 90° in mechanical angle, and the winding wires 12 are wound substantially over the whole circumference of the armature core 6. That is, the first to fourth coil winding wires (7A, 7B, 7M, and 7N) are respectively arranged at positions which can substantially simultaneously face four magnets 4 provided at the electric motor 1.

The first coil winding wire 7A is wound 6 times clockwise (forward direction) so as to surround four teeth 9 which are adjacent to each other, and the second coil winding wire 7B is arranged at a position adjacent in the right direction D1 to the four teeth 9 around which the first coil winding wire 7A is wound, and is wound 6 times counterclockwise (opposite direction) so as to surround four other teeth 9 which are adjacent to each other.

Additionally, the third coil winding wire 7M is adjacent in the right direction D1 to four teeth 9 around which the second coil winding wire 7B is wound with one tooth 9 therebetween, and is wound 6 times clockwise (forward direction) so as to surround four other teeth 9 which are adjacent to each other, and the fourth coil winding wire 7N is adjacent in the right direction D1 to four teeth 9 around which the third coil winding wire 7M is wound, and is wound 6 times counterclockwise (opposite direction) so as to surround four other teeth 9 which are adjacent to each other. That is, the first and third coil winding wires (7A, 7M) are wound in the same direction, and the second and fourth coil winding wires (7B, 7N) are wound in a direction opposite to the first and third coil winding wires (7A, 7M).

An end 30 of the first coil winding wire 7A is connected to one segment 14 of the commutator 13, and an end 31 of the fourth coil winding wire 7N is connected to the segment 14 adjacent in the right direction D1 to the segment 14 arranged at a position which is point symmetric about the rotary shaft 5 with respect to the segment 14 to which the end 30 of the first coil winding wire 7A is connected.

In the present embodiment, the first conductive wire 110 and the second conductive wire 120 are substantially simultaneously wound around the teeth 9, which are formed in the armature core 6 by a double flyer type winding machine and which face each other point-symmetrically about the rotary shaft 5. The first to ninth winding wires (61 to 69) and the connecting wires 25 which join the first to ninth winding wires together in a series are formed by the first conductive wire 110, and the other first to ninth winding wires (71 to 79) and the connecting wires 25 which join the other first to ninth winding wires together in a series are formed by the second conductive wire 120.

Thus, since the first conductive wire 110 and second conductive wire 120 are wound around the armature core 6 by the double flyer type winding machine, each of the winding wires 12 of the first to ninth winding wires (61 to 69) and each of the winding wires 12 of the other first to ninth winding wires (71 to 79) corresponding to the first to ninth winding wires are wound in the state of having deviated from each other by a mechanical angle of 180°. For example, in the first winding wire 61 and the first winding wire 71 which are substantially simultaneously formed at the armature core 6, the respective first coil winding wires (7A, 7A), the respective second coil winding wires (7B, 7B), the respective third coil winding wires (7M, 7M), and the respective fourth coil winding wires (7N, 7N) are arranged at positions which have deviated from each other by a mechanical angle of 180°.

Hereinafter, the first to ninth winding wires (61 to 69) and the connecting wires 25 which join the first to ninth winding wires together in a series, which are formed by the first conductive wire 110, will be described in detail from the first winding wire 61. The first winding wire 61 formed by the first conductive wire 110 has first to fourth coil winding wires (7A, 7B, 7M, and 7N) which are each connected in series to each other, and the first coil winding wire 7A is joined in a series to a connecting wire 21a similarly formed from the first conductive wire 110, while the fourth coil winding wire 7N is joined in a series to a connecting wire 25b similarly formed from the first conductive wire 110.

An end 40 which is a starting point of the connecting wire 25a formed from the first conductive wire 110 is electrically and mechanically connected to the riser 15 formed at the No. 15 segment 14, and as for the connecting wire 25a, an end 41 which is disposed in the left direction D2 and is an end point of the connecting wire 25a is electrically and mechanically connected to the riser 15 formed at the No. 6 segment 14. Here, the No. 15 segment 14 and the No. 6 segment 14 are arranged at positions which face each other point-symmetrically about the rotary shaft 5. The end 41 of the connecting wire 25a and the end 30 which is the starting point of the first coil winding wire 7A are joined together in a series, and the first coil winding wire 7A formed by the first conductive wire 110 is wound around the teeth 9 after being connected to the No. 6 segment 14 at the end 30.

The first coil winding wire 7A passes through a slit 11a formed between the No. 18 tooth 9 and the No. 1 tooth 9 and a slit 11b formed between the No. 4 tooth 9 and the No. 5 tooth 9, and is wound 6 times clockwise (forward direction) so as to surround the four No. 1 to No. 4 teeth 9 which are close to each other.

The arrangement of the second coil winding wire 7B which is connected in series to the first coil winding wire 7A will be described below. The second coil winding wire 7B passes through a slit 11c formed between a No. 8 tooth 9 and a No. 9 tooth 9 and the slit 11b formed between the No. 4 tooth 9 and the No. 5 tooth 9, and is wound 6 times in a counterclockwise direction (opposite direction) opposite to the winding direction of the first coil winding wire 7A so as to surround the four No. 5 to No. 8 teeth 9 which are adjacent to the No. 1 to No. 4 teeth 9 and are close to each other. The second coil winding wire 7B is wound in a direction opposite to the first coil winding wire 7A because the second coil winding wire 7B faces a magnetic pole having polarity (S pole in FIG. 13) different from the polarity (N pole in FIG. 13) of a magnetic pole which the first coil winding wire 7A faces.

The arrangement of the third coil winding wire 7M which is connected in series to the second coil winding wire 7B will be described below. The third coil winding wire 7M passes through the slit 11d formed between the No. 9 tooth 9 and the No. 10 tooth 9 and the slit 11e formed between the No. 13 tooth 9 and the No. 14 tooth 9, and is wound 6 times in a clockwise direction (forward direction) opposite to the winding direction of the second coil winding wire 7B so as to surround the four No. 10 to No. 13 teeth 9 which are adjacent to the four No. 5 to No. 8 teeth 9 with the No. 9 tooth 9 therebetween and are close to each other. The third coil winding wire 7M is wound in a direction opposite to the second coil winding wire 7B because the third coil winding wire 7M faces a magnetic pole having polarity (N pole in FIG. 13) different from the polarity (S pole in FIG. 13) of a magnetic pole which the second coil winding wire 7B faces.

The arrangement of the fourth coil winding wire 7N which is connected in series to the third coil winding wire 7M will be described below. The fourth coil winding wire 7N passes through a slit 11f formed between the No. 17 tooth 9 and the No. 18 tooth 9 and the slit 11e formed between the No. 13 tooth 9 and the No. 14 tooth 9, and is wound 6 times in a counterclockwise direction (opposite direction) opposite to the winding direction of the third coil winding wire 7M so as to surround the four No. 14 to No. 17 teeth 9 which are adjacent to the four No. 10 to No. 13 teeth 9 and are close to each other. The fourth coil winding wire 7N is wound in a direction opposite to the third coil winding wire 7M because the fourth coil winding wire 7N faces a magnetic pole having polarity (S pole in FIG. 13) different from the polarity (N pole in FIG. 13) of a magnetic pole which the third coil winding wire 7M faces.

The end 31 of the fourth coil winding wire 7N is connected to the riser 15 formed at the No. 16 segment 14 adjacent in the right direction D1 to the No. 15 segment 14 arranged at a position which is point symmetric about the rotary shaft 5 with respect to the No. 6 segment 14 to which the end 30 of the first coil winding wire 7A is connected.

The first winding wire 61 and the second winding wire 62 wound around the armature core 6 following the first winding wire 61 are joined together in a series by the connecting wire 25b formed by the first conductive wire 110. An end 42 which is a starting point of the connecting wire 25b and the end 31 of the fourth coil winding wire 7N provided at the first winding wire 61 are joined together in a series, and the end 42 is electrically and mechanically connected to the riser 15 of the No. 16 segment 14. Also, as for the connecting wire 25b, an end 43 which is disposed in the left direction D2 and is an end point of the connecting wire 25b is electrically and mechanically connected to a riser 15 formed at a No. 7 segment 14. Here, the No. 16 segment 14 and the No. 7 segment 14 are arranged at positions which face each other point-symmetrically about the rotary shaft 5.

The end 43 of the connecting wire 25b and the end 32, which is the starting point of the first coil winding wire 7A of the second winding wire 62 wound following the first winding wire 61, are joined together in a series. The first coil winding wire 7A of the second winding wire 62 passes through a slit 11g formed between the No. 1 tooth 9 and the No. 2 tooth 9 and the slit 11h formed between the No. 5 tooth 9 and the No. 6 tooth 9, and is wound 6 times clockwise so as to surround the four No. 2 to No. 5 teeth 9. The same process as the aforementioned process is repeated below, and the armature core 6 includes the first to ninth winding wires (61 to 69), and nine connecting wires 25.

In this way, the respective winding wires 12 of the first to ninth winding wires (61 to 69) are split into the first coil winding wire 7A, the second coil winding wire 7B, the third coil winding wire 7C, and the fourth coil winding wires 7D, and are wound around the armature core 6. Accordingly, compared to a case where the winding wires are wound without splitting, the number of crossovers 7C which cross over from one slot 11 to another slot 11 is small, and the thickness of the crossovers is small.

The first to ninth winding wires (61 to 69) and the connecting wires 25 which join the first to ninth winding wires together in a series are formed by disposing a single first conductive wire 110 at the armature core 6 and the commutator 13. Therefore, compared to a case where connecting wires are disposed in advance at the commutator 13, and then, winding wires are disposed, the time of winding work is shortened, and mounting of the connecting wires and winding wires to the armature core and commutator 13 is simple.

As described above, each of the first to ninth winding wires (61 to 69) formed by the first conductive wire 110 and each of the other first to ninth winding wires (71 to 79) formed by the second conductive wire 120 corresponding to the first to ninth winding wires are substantially simultaneously wound around the teeth 9 of the armature core 6 which face each other point-symmetrically about the rotary shaft 5 by a double flyer type winding machine.

Accordingly, the respective winding wires 12 of the other first to ninth winding wires (71 to 79) corresponding to the respective winding wires 12 of the first to ninth winding wires (61 to 69) are wound around the armature core 6 in the state of having deviated from each other by a mechanical angle of 180°. That is, the first winding wire 71 is wound around the armature core 6 in the state of having deviated from the first winding wire 61 by a mechanical angle of 180°, the second winding wire 72 is wound around the armature core 6 in the state of having deviated from the second winding wire 62 by a mechanical angle of 180°, the third winding wire 73 is wound around the armature core 6 in the state of having deviated from the third winding wire 63 by a mechanical angle of 180°, and the fourth winding wire 74 is wound around the armature core 6 in the state of having deviated from the fourth winding wire 64 by a mechanical angle of 180°.

Similarly, the fifth winding wire 75 is wound around the armature core 6 in the state of having deviated from the fifth winding wire 65 by a mechanical angle of 180°, the sixth winding wire 76 is wound around the armature core 6 in the state of having deviated from the sixth winding wire 66 by a mechanical angle of 180°, the seventh winding wire 77 is wound around the armature core 6 in the state of having deviated from the seventh winding wire 67 by a mechanical angle of 180°, the eighth winding wire 78 is wound around the armature core 6 in the state of having deviated from the eighth winding wire 68 by a mechanical angle of 180°, and the ninth winding wire 79 is wound around the armature core 6 in the state of having deviated from the ninth winding wire 69 by a mechanical angle of 180°.

Hereinafter, the other first to ninth winding wires (71 to 79) and the connecting wires 25 which join the other first to ninth winding wires together in a series, which are formed by the second conductive wire 120, will be described from the first winding wire 71.

The first winding wire 71 formed by the second conductive wire 120 has a first coil winding wire 7A, a second coil winding wire 7B connected in series to the first coil winding wire 7A, a third coil winding wire 7M connected in series to the second coil winding wire 7B, and a fourth coil winding wire 7N connected in series to the third coil winding wire 7M, and the first coil winding wire 7A is joined in a series to a connecting wire 21c similarly formed from the second conductive wire 120, while the fourth coil winding wire 7N is joined in a series to a connecting wire 25d similarly formed from the second conductive wire 120.

An end 45 which is a starting point of the connecting wire 25c formed from the second conductive wire 120 is electrically and mechanically connected to the riser 15 formed at the No. 6 segment 14, and as for the connecting wire 25c, an end 46 which is disposed in the left direction D2 and is an end point of the connecting wire 25c is electrically and mechanically connected to the riser 15 of the No. 15 segment 14. Here, the No. 6 segment 14 and the No. 15 segment 14 are arranged at positions which face each other point-symmetrically about the rotary shaft 5. The end 46 of the connecting wire 25c and the end 34 which is the starting point of the first coil winding wire 7A are joined together in a series, and the first coil winding wire 7A formed by the second conductive wire 120 is wound around the teeth 9 from the end 34.

The first coil winding wire 7A passes through a slit 11d formed between the No. 9 tooth 9 and the No. 10 tooth 9 and a slit 11e formed between the No. 13 tooth 9 and the No. 14 tooth 9, and is wound 12 times clockwise so as to surround the four No. 10 to No. 13 teeth 9 which are close to each other.

The arrangement of the second coil winding wire 7B which is connected in series to the first coil winding wire 7A will be described below. The second coil winding wire 7B passes through a slit 11f formed between the No. 17 tooth 9 and the No. 18 tooth 9 and the slit 11e formed between the No. 13 tooth 9 and the No. 14 tooth 9, and is wound 6 times in a counterclockwise direction (opposite direction) opposite to the winding direction of the first coil winding wire 7A so as to surround the four No. 14 to No. 17 teeth 9 which are adjacent to the four No. 10 to No. 13 teeth 9 in the right direction D1 and are close to each other. The second coil winding wire 7B is wound in a direction opposite to the first coil winding wire 7A because the second coil winding wire 7B faces a magnetic pole having polarity (S pole in FIG. 13) different from the polarity (N pole in FIG. 13) of a magnetic pole which the first coil winding wire 7A faces.

The arrangement of the third coil winding wire 7M which is connected in series to the second coil winding wire 7B will be described below. The third coil winding wire 7M passes through the slit 11a formed between the No. 18 tooth 9 and the No. 1 tooth 9 and the slit 11b formed between the No. 4 tooth 9 and the No. 5 tooth 9, and is wound 6 times in a clockwise direction (forward direction) opposite to the winding direction of the second coil winding wire 7B so as to surround the four No. 1 to No. 4 teeth 9 which are adjacent to the four No. 14 to No. 17 teeth 9 with the No. 18 tooth 9 therebetween and are close to each other. The third coil winding wire 7M is wound in a direction opposite to the second coil winding wire 7B because the third coil winding wire 7M faces a magnetic pole having polarity (N pole in FIG. 13) different from the polarity (S pole in FIG. 13) of a magnetic pole which the second coil winding wire 7B faces.

The arrangement of the fourth coil winding wire 7N which is connected in series to the third coil winding wire 7M will be described below. The fourth coil winding wire 7N passes through a slit 11c formed between the No. 8 tooth 9 and the No. 9 tooth 9 and the slit 11b formed between the No. 4 tooth 9 and the No. 5 tooth 9, and is wound 6 times in a counterclockwise direction (opposite direction) opposite to the winding direction of the third coil winding wire 7M so as to surround the four No. 5 to No. 8 teeth 9 which are adjacent to the four No. 1 to No. 4 teeth 9 and are close to each other. The fourth coil winding wire 7N is wound in a direction opposite to the third coil winding wire 7M because the fourth coil winding wire 7N faces a magnetic pole having polarity (S pole in FIG. 13) different from the polarity (N pole in FIG. 13) of a magnetic pole which the third coil winding wire 7M faces.

The end 35 of the fourth coil winding wire 7N is connected to the riser 15 formed at the No. 7 segment 14 adjacent in the right direction D1 to the No. 6 segment 14 arranged at a position which is point symmetric about the rotary shaft 5 with respect to the No. 15 segment 14 to which the end 34 of the first coil winding wire 7A is connected.

The first winding wire 71 and the second winding wire 72 are joined together in a series by the connecting wire 25d similarly formed by the second conductive wire 120. An end 47 which is a starting point of the connecting wire 25d and the end 35 of the fourth coil winding wire 7N provided at the first winding wire 71 are joined together in a series, and the end 47 is electrically and mechanically connected to the riser 15 of the No. 7 segment 14. As for the connecting wire 25d, an end 48 which is disposed in the left direction D2 and is an end point of the connecting wire 25d is electrically and mechanically connected to the riser 15 of the No. 16 segment 14. Here, the No. 7 segment 14 and the No. 16 segment 14 are arranged at positions which face each other point-symmetrically about the rotary shaft 5.

The end 48 of the connecting wire 25d and an end 36, which is a starting point of the first coil winding wire 7A of the second winding wire 72 wound following the first winding wire 71, are joined together in a series. The first coil winding wire 7A of the second winding wire 72 passes through a slit 11i formed between the No. 10 tooth 9 and the No. 11 tooth 9 and the slit 11j formed between the No. 14 tooth 9 and the No. 15 tooth 9, and is wound 12 times clockwise so as to surround the four No. 11 to No. 14 teeth 9. The same process as the aforementioned process is repeated below, and the armature core 6 includes the other first to ninth winding wires (71 to 79) and nine connecting wires 25.

In this way, the respective winding wires 12 of the other first to ninth winding wires (71 to 79) are split into the first coil winding wire 7A and the second coil winding wire 7B, and are wound around the armature core 6. Accordingly, compared to a case where the winding wires are wound without splitting, the thickness of crossovers 7C which cross over from one slot 11 to another slot 11 is made small. Additionally, the other first to ninth winding wires (71 to 79) and the connecting wires 25 which join the other first to ninth winding wires together in a series are formed by disposing a single first winding wire 71 at the armature core 6 and the commutator 13. Therefore, compared to a case where connecting wires are disposed in advance at the commutator 13, and then, winding wires are disposed, the time of winding work is shortened, and mounting of the connecting wires and winding wires to the armature core and commutator 13 is simple.

In this way, the respective winding wires 12 of the first to ninth winding wires (61 to 69) and the other first to ninth winding wires (71 to 79) have the first coil winding wire 7A and the second coil winding wire 7B, and are wound around the armature core 6, and the thickness of the respective crossovers 7C is made thin. Therefore, in the armature coil 7 formed by the first to ninth winding wires (61 to 69) and the other first to ninth winding wires (71 to 72) which are each wound so as to overlap each other sequentially from the outside of the winding wires 12 which are already wound, winding thickening caused by overlapping of the crossovers 7C is reduced.

Thereby, axial miniaturization of a portion in which the crossovers 7C exist is achieved. Additionally, due to the reduction of winding thickening, insertion of the first and second conductive wires 110 and 120 into the slot 11 is facilitated, and the ratio of the winding wires 12 which occupy a space within the slot 11, i.e., space factor, is improved. For this reason, it is possible to reduce the space within the slot 11, and reduction of the radial dimensions of the armature core 6 can be achieved. Thereby, miniaturization of the whole electric motor 1 is achieved.

Moreover, the first to four coil winding wires (7A, 7B, 7M, and 7N) provided at the first to ninth winding wires (61 to 69) and the other first to ninth winding wires (71 to 79) are respectively arranged at positions which can substantially simultaneously face four magnets 4 provided at the electric motor 1. Additionally, the first to fourth coil winding wires (7A, 7B, 7M, and 7N) are short-circuited from each other. Therefore, the magnetic imbalance caused in the armature coil 7 is cancelled out in the radial direction.

As shown in FIG. 13, the first winding wire 61 and the first winding wire 71 which are arranged at positions which face each other point-symmetrically about the rotary shaft 5 are connected to each other by the connecting wire 25a and the connecting wire 25c. Therefore, the first winding wire 61 and the first winding wire 71 are connected in parallel to each other by the connecting wire 25a and the connecting wire 25c. In this way, the winding wires 12 and 12, which are arranged at positions which face each other point-symmetrically about the rotary shaft 5 among the first to ninth winding wires (61 to 69) and the other first to ninth winding wires (71 to 79), are each connected in parallel to each other by two connecting wires 25 and 25. For this reason, even in the four-pole electric motor 1 as in the present embodiment, basically, the armature 3 can be rotated by supplying power from two positions arranged with an electrical angle of 180°.

Figure 15:
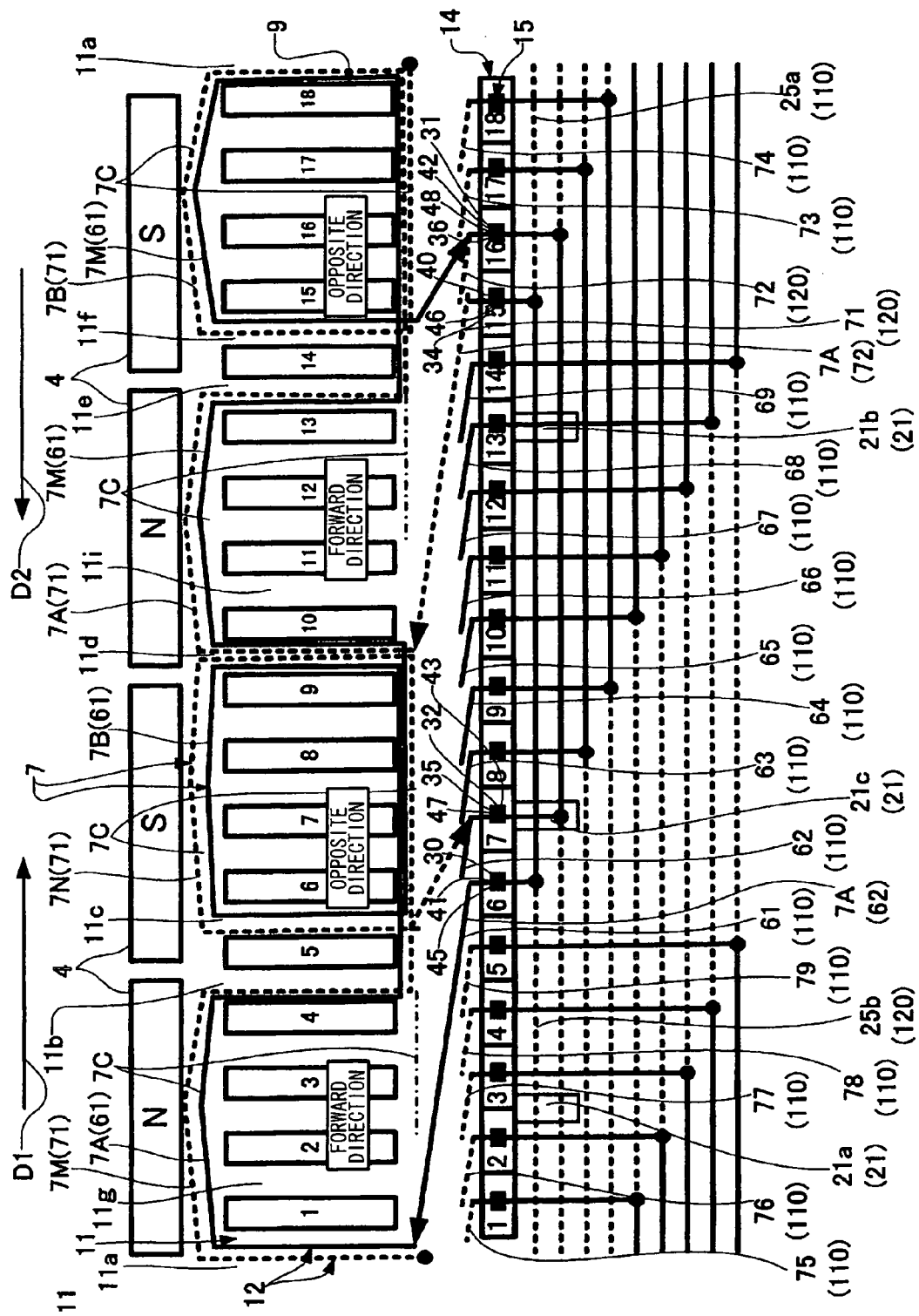
FIG. 15 is a developed view of an armature showing the winding state of an armature coil in a sixth embodiment of the invention.
Figure 16:
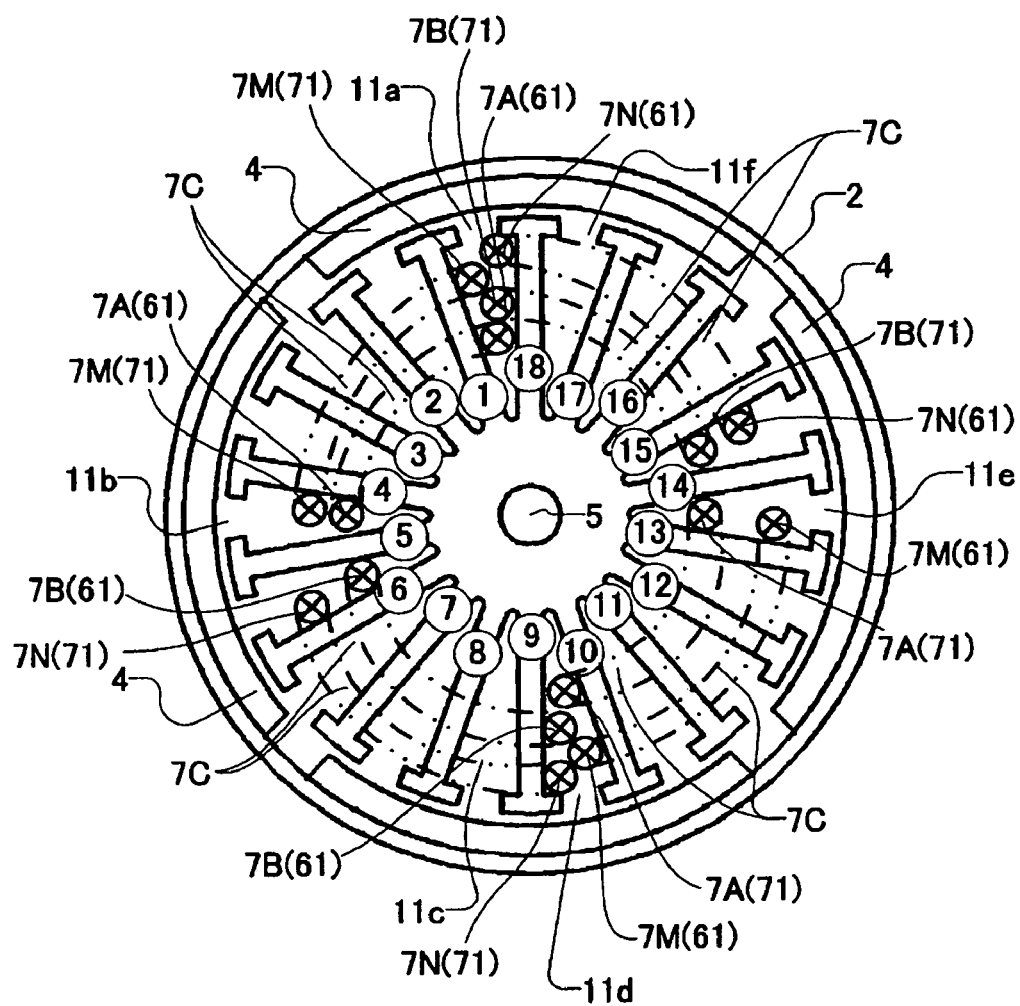
FIG. 16 is a top view of the armature showing the winding state of the armature coil in the sixth embodiment of the invention.
Figure 17:
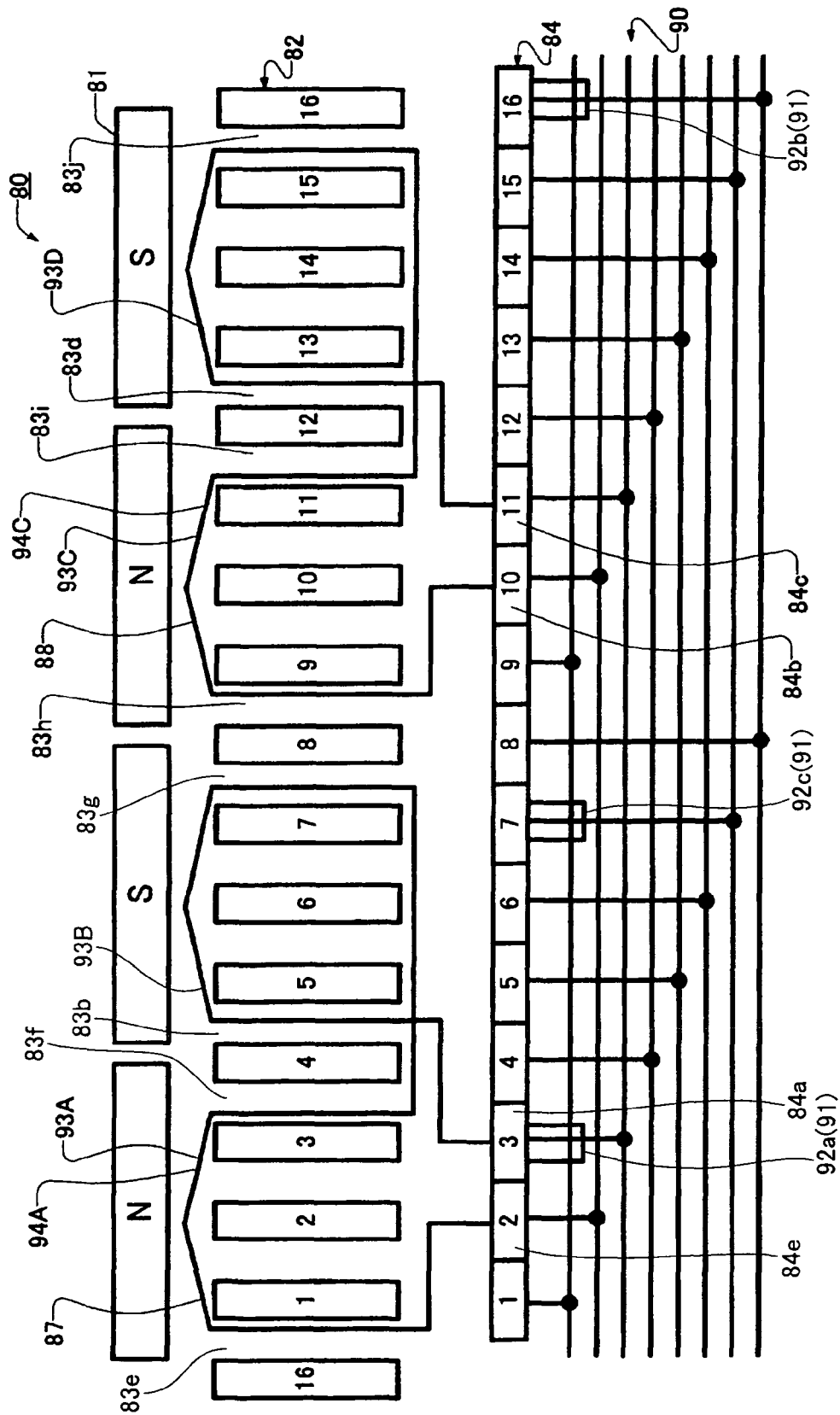
FIG. 17 is a top view of an armature showing the winding state of an armature coil in a conventional example.
Figure 18:
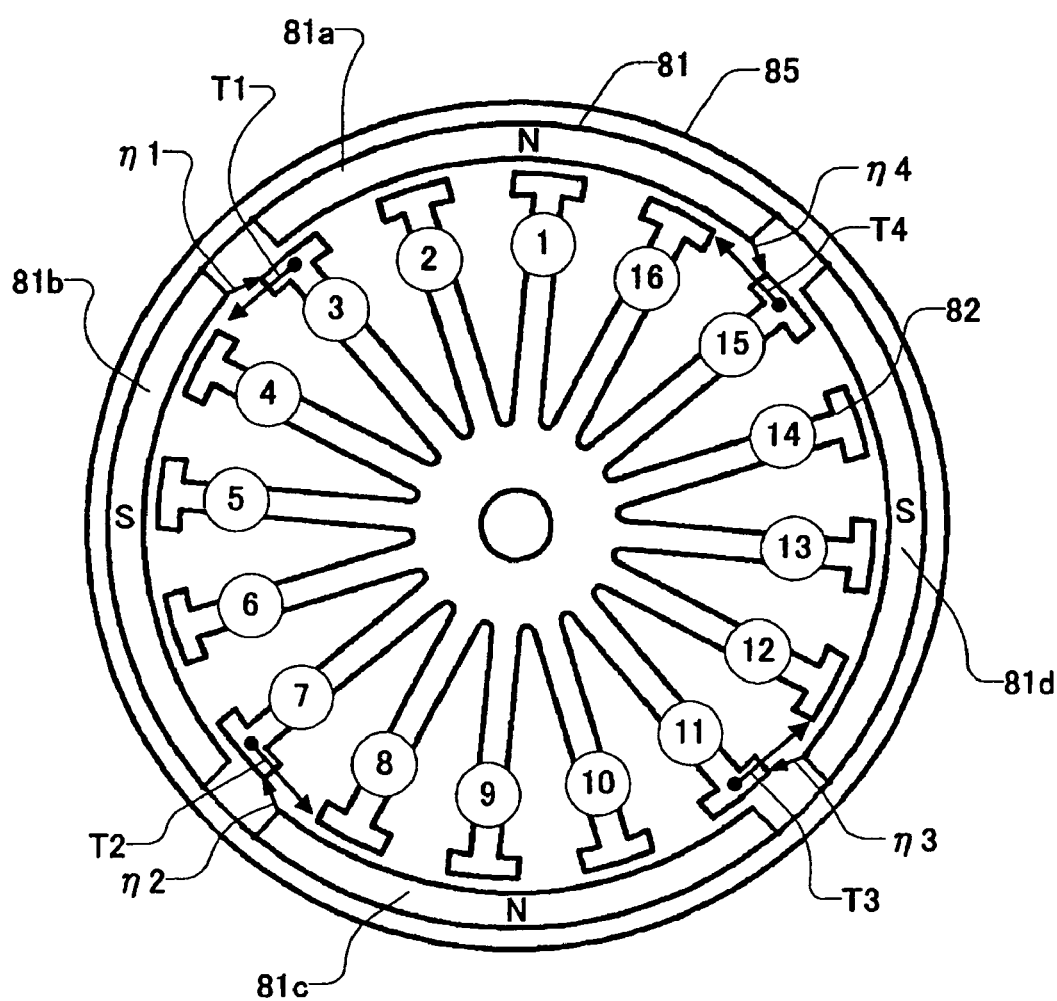
FIG. 18 is a transverse sectional view of the electric motor illustrating the torque ripple of the electric motor in the conventional example.

Next, the winding structure of the armature coil 7 of a sixth embodiment of the present invention will be described with reference to FIGS. 15 and 16. FIG. 15 is a developed view of the armature, FIG. 16 is a transverse sectional view of the armature, and a gap between adjacent teeth 9 corresponds to the slot 11. Additionally, in FIGS. 15 and 16, the segments 14 provided at the commutator 13 and the teeth 9 provided at the armature core 6 are each numbered.

The electric motor 1 of the sixth embodiment of the present invention and the electric motor 1 of the first embodiment described above are different from each other only in the winding structure of the armature coil 7, and are the same in the other portions. Accordingly, only the winding structure of the armature coil 7 will be described below, and description of the other portions is omitted.

The armature coil 7 of the sixth embodiment of the present invention includes a first conductive wire 110 and a second conductive wire 120. In addition, in FIG. 15, the first conductive wire 110 is shown by solid lines, and the second conductive wire 120 is indicated by broken lines. The armature coil 7 has first to ninth winding wires (61 to 69) formed by the first conductive wire 110 and other first to ninth winding wires (71 to 79) formed by the second conductive wire 120.

The first to ninth winding wires (61 to 69) are joined together in a series via nine connecting wires 25 which are similarly formed from the first conductive wire 110. That is, the first winding wire 61, the connecting wire 25, the second winding wire 62, the connecting wire 25, the third winding wire 63, the connecting wire 25, the fourth winding wire 64, the connecting wire 25, the fifth winding wire 65, the connecting wire 25, the sixth winding wire 66, the connecting wire 25, the seventh winding wire 67, the connecting wire 25, the eighth winding wire 68, the connecting wire 25, the ninth winding wire 69, and the connecting wire 25 are respectively formed in this order in a series by the first conductive wire 110. Additionally, each connecting wire of the connecting wires 25 which connect the first to ninth winding wires (61 to 69) together is electrically and mechanically connected to the risers 15 formed by a pair of segments 14 and 14 which is arranged at facing positions which are point symmetric with respect to each other about the rotary shaft 5.

On the other hand, the other first to ninth winding wires (71 to 79) are joined together in a series via nine connecting wires 25 which are similarly formed from the second conductive wire 120. That is, the first winding wire 71, the connecting wire 25, the second winding wire 72, the connecting wire 25, the third winding wire 73, the connecting wire 25, the fourth winding wire 74, the connecting wire 25, the fifth winding wire 75, the connecting wire 25, the sixth winding wire 76, the connecting wire 25, the seventh winding wire 77, the connecting wire 25, the eighth winding wire 78, the connecting wire 25, the ninth winding wire 79, and the connecting wire 25 are formed in this order in a series by the second conductive wire 120. Additionally, each of the connecting wires 25 which connect the other first to ninth winding wires (71 to 79) together is electrically and mechanically connected to the risers 15 formed by a pair of segments 14 and 14 which is arranged at facing positions which are point symmetric with respect to each other about the rotary shaft 5.

The first to ninth winding wires (61 to 69) and the other first to ninth winding wires (71 to 79) have first to four coil winding wires (7A, 7B, 7M, and 7N) which are each connected in series to each other. Additionally, the first to fourth coil winding wires (7A, 7B, 7M, and 7N) are respectively arranged at intervals of about 90° in mechanical angle, and the winding wires 12 are wound substantially over the whole circumference of the armature core 6. That is, the first to fourth coil winding wires (7A, 7B, 7M, and 7N) are respectively arranged at positions which can substantially simultaneously face four magnets 4 provided at the electric motor 1.

Additionally, the first coil winding wire 7A is wound 6 times clockwise (forward direction) so as to surround four teeth 9 which are adjacent to each other, and the second coil winding wire 7B is arranged at a position adjacent in the right direction D1 to the four teeth 9 around which the first coil winding wire 7A is wound with one tooth 9 therebetween and is wound 12 times counterclockwise (opposite direction) so as to surround four teeth 9 which are adjacent to each other.

The third coil winding wire 7M is arranged to a position adjacent in the right direction D1 to the four teeth 9 around which the second coil winding wire 7B is wound and is wound 6 times clockwise (forward direction) so as to surround four teeth 9 which are adjacent to each other, and the fourth coil winding wire 7N is arranged at a position adjacent in the right direction D1 to the four teeth 9 around which the third coil winding wire 7M is wound with one tooth 9 therebetween, and is wound 6 times counterclockwise (opposite direction) so as to surround four teeth 9 which are adjacent to each other. That is, the first and third coil winding wires (7A, 7M) are wound in the same direction, and the second and fourth coil winding wires (7B, 7N) are wound in a direction opposite to the first and third coil winding wires (7A, 7M).

An end 30 of the first coil winding wire 7A is connected to one segment 14 of the commutator 13, and an end 31 of the fourth coil winding wire 7N is connected to the segment 14 adjacent in the right direction D1 to the segment 14 arranged at a position which is point symmetric about the rotary shaft 5 with respect to the segment 14 to which the end 30 of the first coil winding wire 7A is connected.

In the present embodiment, the first conductive wire 110 and second conductive wire 120 are substantially simultaneously wound around the teeth 9, which are formed in the armature core 6 by a double flyer type winding machine and which face each other point-symmetrically about the rotary shaft 5. The first to ninth winding wires (61 to 69) and the connecting wires 25 which join the first to ninth winding wires together in a series are formed by the first conductive wire 110, and the other first to ninth winding wires (71 to 79)

and the connecting wires 25 which join the other first to ninth winding wires together in a series are formed by the second conductive wire 120.

Thus, since the first conductive wire 110 and second conductive wire 120 are wound around the armature core 6 by the double flyer type winding machine, each of the winding wires 12 of the first to ninth winding wires (61 to 69) and each of the winding wires 12 of the other first to ninth winding wires (71 to 79) corresponding to the first to ninth winding wires are wound in the state of having deviated from each other by a mechanical angle of 180°. For example, in the first winding wire 61 and the first winding wire 71 which are substantially simultaneously formed at the armature core 6, the first coil winding wires (7A, 7A), the second coil winding wires (7B, 7B), the third coil winding wires (7M, 7M), and the fourth coil winding wires (7N, 7N) are arranged at positions which have deviated from each other by a mechanical angle of 180°.

Hereinafter, the first to ninth winding wires (61 to 69) and the connecting wires 25 which join the first to ninth winding wires together in a series, which are formed by the first conductive wire 110, will be described in detail from the first winding wire 61. The first winding wire 61 formed by the first conductive wire 110 has first to fourth coil winding wires (7A, 7B, 7M, and 7N) which are each connected in series to each other, and the first coil winding wire 7A is joined in a series to a connecting wire 21a similarly formed from the first conductive wire 110, while the fourth coil winding wire 7N is joined in a series to a connecting wire 25b similarly formed from the first conductive wire 110.

An end 40 which is a starting point of the connecting wire 25a formed from the first conductive wire 110 is electrically and mechanically connected to the riser 15 formed at the No. 15 segment 14, and as for the connecting wire 25a, an end 41 which is disposed in the left direction D2 and is an end point of the connecting wire 25a is electrically and mechanically connected to the riser 15 formed at the No. 6 segment 14. Here, the No. 15 segment 14 and the No. 6 segment 14 are arranged at positions which face each other point-symmetrically about the rotary shaft 5. The end 41 of the connecting wire 25a and the end 30 which is the starting point of the first coil winding wire 7A are joined together in a series, and the first coil winding wire 7A formed by the first conductive wire 110 is wound around the teeth 9 after being connected to the No. 6 segment 14 at the end 30.

The first coil winding wire 7A passes through a slit 11a formed between the No. 18 tooth 9 and the No. 1 tooth 9 and a slit 11b formed between the No. 4 tooth 9 and the No. 5 tooth 9, and is wound 6 times clockwise (forward direction) so as to surround the four No. 1 to No. 4 teeth 9 which are close to each other.

The arrangement of the second coil winding wire 7B which is connected in series to the first coil winding wire 7A will be described below. The second coil winding wire 7B passes through a slit 11d formed between the No. 9 tooth 9 and the No. 10 tooth 9 and the slit 11c formed between the No. 5 tooth 9 and the No. 6 tooth 9, and is wound 6 times in a counterclockwise direction (opposite direction) which is a direction opposite to the winding direction of the first coil winding wire 7A so as to surround the four No. 6 to No. 9 teeth 9 which are adjacent to the No. 1 to No. 4 teeth 9 with the No. 5 tooth 9 therebetween and are close to each other. The second coil winding wire 7B is wound in a direction opposite to the first coil 7 winding wire A because the second coil winding wire 7B faces a magnetic pole having polarity (S pole in FIG. 15) different from the polarity (N pole in FIG. 15) of a magnetic pole which the first coil winding wire 7A faces.

The arrangement of the third coil winding wire 7M which is connected in series to the second coil winding wire 7B will be described below. The third coil winding wire 7M passes through the slit 11d formed between the No. 9 tooth 9 and the No. 10 tooth 9 and the slit 11e formed between the No. 13 tooth 9 and the No. 14 tooth 9, and is wound 6 times in a clockwise direction (forward direction) opposite to the winding direction of the second coil winding wire 7B so as to surround the four No. 10 to No. 13 teeth 9 which are adjacent to the four No. 6 to No. 9 teeth 9 and are close to each other. The third coil winding wire 7M is wound in a direction opposite to the second coil winding wire 7B because the third coil winding wire 7M faces a magnetic pole having polarity (N pole in FIG. 15) different from the polarity (S pole in FIG. 15) of a magnetic pole which the second coil winding wire 7B faces.

The arrangement of the fourth coil winding wire 7N which is connected in series to the third coil winding wire 7M will be described below. The fourth coil winding wire 7N passes through the slit 11a formed between the No. 18 tooth 9 and the No. 1 tooth 9 and the slit 11f formed between the No. 14 tooth 9 and the No. 15 tooth 9, and is wound 6 times in a counterclockwise direction (opposite direction) opposite to the winding direction of the third coil winding wire 7M so as to surround the four No. 15 to No. 18 teeth 9 which are adjacent to the four No. 10 to No. 13 teeth 9 with the No. 14 tooth 9 therebetween and are close to each other. The fourth coil winding wire 7N is wound in a direction opposite to the third coil winding wire 7M because the fourth coil winding wire 7N faces a magnetic pole having polarity (S pole in FIG. 15) different from the polarity (N pole in FIG. 15) of a magnetic pole which the third coil winding wire 7M faces.

The end 31 of the fourth coil winding wire 7N is connected to the riser 15 formed at the No. 16 segment 14 adjacent in the right direction D1 to the No. 15 segment 14 arranged at a position which is point symmetric about the rotary shaft 5 with respect to the No. 6 segment 14 to which the end 30 of the first coil winding wire 7A is connected.

The first winding wire 61 and the second winding wire 62 wound around the armature core 6 following the first winding wire 61 are joined together in a series by the connecting wire 25b formed by the first conductive wire 110. An end 42 which is a starting point of the connecting wire 25b and the end 31 of the fourth coil winding wire 7N provided at the first winding wire 61 are joined together in a series, and the end 42 is electrically and mechanically connected to the riser 15 of the No. 16 segment 14. Also, as for the connecting wire 25b, an end 43 which is disposed in the left direction D2 and is an end point of the connecting wire 25b is electrically and mechanically connected to a riser 15 formed at a No. 7 segment 14. Here, the No. 16 segment 14 and the No. 7 segment 14 are arranged at positions which face each other point-symmetrically about the rotary shaft 5.

The end 43 of the connecting wire 25b and the end 32, which is the starting point of the first coil winding wire 7A of the second winding wire 62 wound following the first winding wire 61, are joined together in a series. Also, the first coil winding wire 7A of the second winding wire 62 passes through a slit 11g formed between the No. 1 tooth 9 and the No. 2 tooth 9 and the slit 11c formed between the No. 5 tooth 9 and the No. 6 tooth 9, and is wound 6 times clockwise so as to surround the four No. 2 to No. 5 teeth 9. The same process as the aforementioned process is repeated below, and the armature core 6 includes the first to ninth winding wires (61 to 69), and nine connecting wires 25.

In this way, the respective winding wires 12 of the first to ninth winding wires (61 to 69) are split into the first to fourth coil winding wires (7A, 7B, 7M, and 7N), and are respectively wound around the armature core 6. Accordingly, compared to a case where the winding wires are wound without splitting, the number of crossovers 7C which cross over from one slot 11 to another slot 11 is small, and the thickness of a bundle of the crossovers 7C is small.

The first to ninth winding wires (61 to 69) and the connecting wires 25 which join the first to ninth winding wires together in a series are formed by disposing a single first conductive wire 110 in a series at the armature core 6 and the commutator 13. Therefore, compared to a case where connecting wires are disposed in advance at the commutator 13, and then, winding wires are disposed, the time of winding work is shortened, and mounting of the connecting wires and winding wires to the armature core and the commutator 13 is simple.

As described above, each of the winding wires 12 of the first to ninth winding wires (61 to 69) and each of the winding wires 12 of the other first to ninth winding wires (71 to 79) corresponding to the first to ninth winding wires are substantially simultaneously wound around the teeth 9 of the armature core 6 which face each other point-symmetrically about the rotary shaft 5 by a double flyer type winding machine.

Accordingly, the respective winding wires 12 of the other first to ninth winding wires (71 to 79) corresponding to the respective winding wires 12 of the first to ninth winding wires (61 to 69) are wound around the armature core 6 in the state of having deviated from each other by a mechanical angle of 180°. That is, the first winding wire 71 is wound around the armature core 6 in the state of having deviated from the first winding wire 61 by a mechanical angle of 180°, the second winding wire 72 is wound around the armature core 6 in the state of having deviated from the second winding wire 62 by a mechanical angle of 180°, the third winding wire 73 is wound around the armature core 6 in the state of having deviated from the third winding wire 63 by a mechanical angle of 180°, and the fourth winding wire 71 is wound around the armature core 6 in the state of having deviated from the fourth winding wire 64 by a mechanical angle of 180°.

Similarly, the fifth winding wire 75 is wound around the armature core 6 in the state of having deviated from the fifth winding wire 65 by a mechanical angle 180°, the sixth winding wire 76 is wound around the armature core 6 in the state of having deviated from the sixth winding wire 66 by a mechanical angle of 180°, the seventh winding wire 77 is wound around the armature core 6 in the state of having deviated from the seventh winding wire 67 by a mechanical angle of 180°, the eighth winding wire 78 is wound around the armature core 6 in the state of having deviated from the eighth winding wire 68 by a mechanical angle of 180°, and the ninth winding wire 79 is wound around the armature core 6 in the state of having deviated from the ninth winding wire 69 by a mechanical angle of 180°.

Hereinafter, the other first to ninth winding wires (71 to 79) and the connecting wires 25 which join the other first to ninth winding wires together in a series, which are formed by the second conductive wire 120, will be described in detail from the first winding wire 71.

The first winding wire 71 formed by the second conductive wire 120 has a first coil winding wire 7A, a second coil winding wire 7B connected in series to the first coil winding wire 7A, a third coil winding wire 7M connected in series to the second coil winding wire 7B, and a fourth coil winding wire 7N connected in series to the third coil winding wire 7M, and the first coil winding wire 7A is joined in a series to a connecting wire 21c similarly formed from the second conductive wire 120, while the fourth coil winding wire 7N is joined in a series to a connecting wire 25d similarly formed from the second conductive wire 120.

An end 45 which is a starting point of the connecting wire 25c is electrically and mechanically connected to the riser 15 formed at the No. 6 segment 14, and as for the connecting wire 25c, an end 46 which is disposed in the left direction D2 and is an end point of the connecting wire 25c is electrically and mechanically connected to the riser 15 of the No. 15 segment 14. Here, the No. 6 segment 14 and the No. 15 segment 14 are arranged at positions which face each other point-symmetrically about the rotary shaft 5. The end 46 of the connecting wire 25c and the end 34 which is the starting point of the first coil winding wire 7A are joined together in a series, and the first coil winding wire 7A formed by the second conductive wire 120 is wound around the teeth 9 after being connected to the No. 15 segment 14 at the end 34.

The first coil winding wire 7A passes through a slit 11d formed between the No. 9 tooth 9 and the No. 10 tooth 9 and a slit 11e formed between the No. 13 tooth 9 and the No. 14 tooth 9, and is wound 6 times clockwise (forward direction) so as to surround the four No. 10 to No. 13 teeth 9 which are close to each other.

The arrangement of the second coil winding wire 7B which is connected in series to the first coil winding wire 7A will be described below. The second coil winding wire 7B passes through the slit 11a formed between the No. 18 tooth 9 and the No. 1 tooth 9 and the slit 11f formed between the No. 14 tooth 9 and the No. 15 tooth 9, and is wound 6 times in a counterclockwise direction (opposite direction) opposite to the winding direction of the first coil winding wire 7A so as to surround the four No. 15 to No. 18 teeth 9 which are adjacent to the four No. 10 to No. 13 teeth 9 in the right direction D1 with the No. 14 tooth 9 therebetween and are close to each other. The second coil winding wire 7B is wound in a direction opposite to the first coil winding wire 7A because the second coil winding wire 7B faces a magnetic pole having polarity (S pole in FIG. 15) different from the polarity (N pole in FIG. 15) of a magnetic pole which the first coil winding wire 7A faces.

The arrangement of the third coil winding wire 7M which is connected in series to the second coil winding wire 7B will be described below. The third coil winding wire 7M passes through the slit 11a formed between the No. 18 tooth 9 and the No. 1 tooth 9 and the slit 11b formed between the No. 4 tooth 9 and the No. 5 tooth 9, and is wound 6 times in a clockwise direction (forward direction) opposite to the winding direction of the second coil winding wire 7B so as to surround the four No. 1 to No. 4 teeth 9 which are adjacent to the four No. 15 to No. 18 teeth 9 and are close to each other. The third coil winding wire 7M is wound in a direction opposite to the second coil winding wire 7B because the third coil winding wire 7M faces a magnetic pole having polarity (N pole in FIG. 15) different from the polarity (S pole in FIG. 15) of a magnetic pole which the second coil winding wire 7B faces.

The arrangement of the fourth coil winding wire 7N which is connected in series to the third coil winding wire 7M will be described below. The fourth coil winding wire 7N passes through the slit 11d formed between the No. 9 tooth 9 and the No. 10 tooth 9 and the slit 11c formed between the No. 5 tooth 9 and the No. 6 tooth 9, and is wound 6 times in a counterclockwise direction (opposite direction) opposite to the winding direction of the third coil winding wire 7M so as to surround the four No. 6 to No. 9 teeth 9 which are adjacent to the four No. 1 to No. 4 teeth 9 with the No. 5 tooth 9 therebetween and are close to each other. The fourth coil winding wire 7N is wound in a direction opposite to the third coil winding wire 7M because the fourth coil winding wire 7N faces a magnetic pole having polarity (S pole in FIG. 15) different from the polarity (N pole in FIG. 15) of a magnetic pole which the third coil winding wire 7M faces.

The end 35 of the fourth coil winding wire 7N is connected to the riser 15 formed at the No. 7 segment 14 adjacent in the right direction D1 to the No. 6 segment 14 arranged at a position which is point symmetric about the rotary shaft 5 with respect to the No. 15 segment 14 to which the end 34 of the first coil winding wire 7A is connected.

The first winding wire 71 and the second winding wire 72 are joined together in a series by the connecting wire 25d similarly formed by the second winding wire 120. An end 47 which is a starting point of the connecting wire 25d and the end 35 of the fourth coil winding wire 7N provided at the first winding wire 71 are joined together in a series, and the end 47 is electrically and mechanically connected to the riser 15 of the No. 7 segment 14. As for the connecting wire 25d, an end 48 which is disposed in the left direction D2 and is an end point of the connecting wire 25d is electrically and mechanically connected to the riser 15 of the No. 16 segment 14. Here, the No. 7 segment 14 and the No. 16 segment 14 are arranged at positions which face each other point-symmetrically about the rotary shaft 5.

The end 48 of the connecting wire 25d and an end 36, which is a starting point of the first coil winding wire 7A of the second winding wire 72 wound following the first winding wire 71, are joined together in a series. Also, the first coil winding wire 7A of the second winding wire 72 passes through a slit 11i formed between the No. 10 tooth 9 and the No. 11 tooth 9 and the slit 11f formed between the No. 14 tooth 9 and the No. 15 tooth 9, and is wound 12 times clockwise so as to surround the four No. 11 to No. 14 teeth 9. The same process as the aforementioned process is repeated below, and the armature core 6 includes the other first to ninth winding wires (71 to 79), and nine connecting wires 25.

In this way, the respective winding wires 12 of the other first to ninth winding wires (71 to 79) are split into the first to fourth coil winding wires (7A, 7B, 7M, and 7N), and are wound around the armature core 6. Accordingly, compared to a case where the winding wires are wound without splitting, the thickness of a bundle of crossovers 7C which cross over from one slot 11 to another slot 11 is made small. Additionally, the other first to ninth winding wires (71 to 79) and the connecting wires 25 which join the other first to ninth winding wires together in a series are formed by disposing a single first winding wire 71 at the armature core 6 and the commutator 13. Therefore, compared to a case where connecting wires are disposed in advance at the commutator 13, and then, winding wires are disposed, the time of winding work is shortened, and mounting of the connecting wires and winding wires to the armature core and commutator 13 is simple.

In this way, the respective winding wires 12 of the first to ninth winding wires (61 to 69) and the other first to ninth winding wires (71 to 79) are split into the first to fourth coil winding wires (7A, 7B, 7M, and 7N), and are wound around the armature core 6, and the thickness of a bundle of the respective crossovers 7C is made thin. Therefore, in the armature coil 7 formed by the first to ninth winding wires (61 to 69) and the other first to ninth winding wires (71 to 72) which are each wound so as to overlap each other sequentially from the outside of the winding wires 12 which are already wound, winding thickening caused by overlapping of the crossovers 7C is reduced.

Thereby, axial miniaturization of a portion in which the crossovers 7C exist can be achieved. Additionally, due to the reduction of winding thickening, insertion of the first and second conductive wires 110 and 120 into the slot 11 is facilitated, and the ratio of the winding wires 12 which occupy a space within the slot 11, i.e., space factor, is improved. For this reason, it is possible to reduce the space within the slot 11, and reduction of the radial dimensions of the armature core 6 can be achieved. Thereby, miniaturization of the whole electric motor 1 is achieved.

Moreover, the first to fourth coil winding wires (7A, 7B, 7M, and 7N) provided at the first to ninth winding wires (61 to 69) and the other first to ninth winding wires (71 to 79) are respectively arranged at positions which can face four magnets 4 provided at the electric motor 1. Additionally, the first to fourth coil winding wires (7A, 7B, 7M, and 7N) are short-circuited from each other. Therefore, the magnetic imbalance caused in the armature coil 7 is cancelled out in the radial direction.

As shown in FIG. 15, the first winding wire 61 and the first winding wire 71 which are arranged at positions which face each other point-symmetrically about the rotary shaft 5 are connected to each other by the connecting wire 25a and the connecting wire 25c. Therefore, the first winding wire 61 and the first winding wire 71 are connected in parallel to each other by the connecting wire 25a and the connecting wire 25c. In this way, the winding wires 12 and 12, which are arranged at positions which have deviated from each other by a mechanical angle of 180° among the first to ninth winding wires (61 to 69) and the other first to ninth winding wires (71 to 79), are each connected in parallel to each other by two connecting wires 25. For this reason, even in the four-pole electric motor 1 as in the present embodiment, basically, the armature 3 can be rotated by supplying power from two positions arranged with an electrical angle of 180°.

Figure 19:
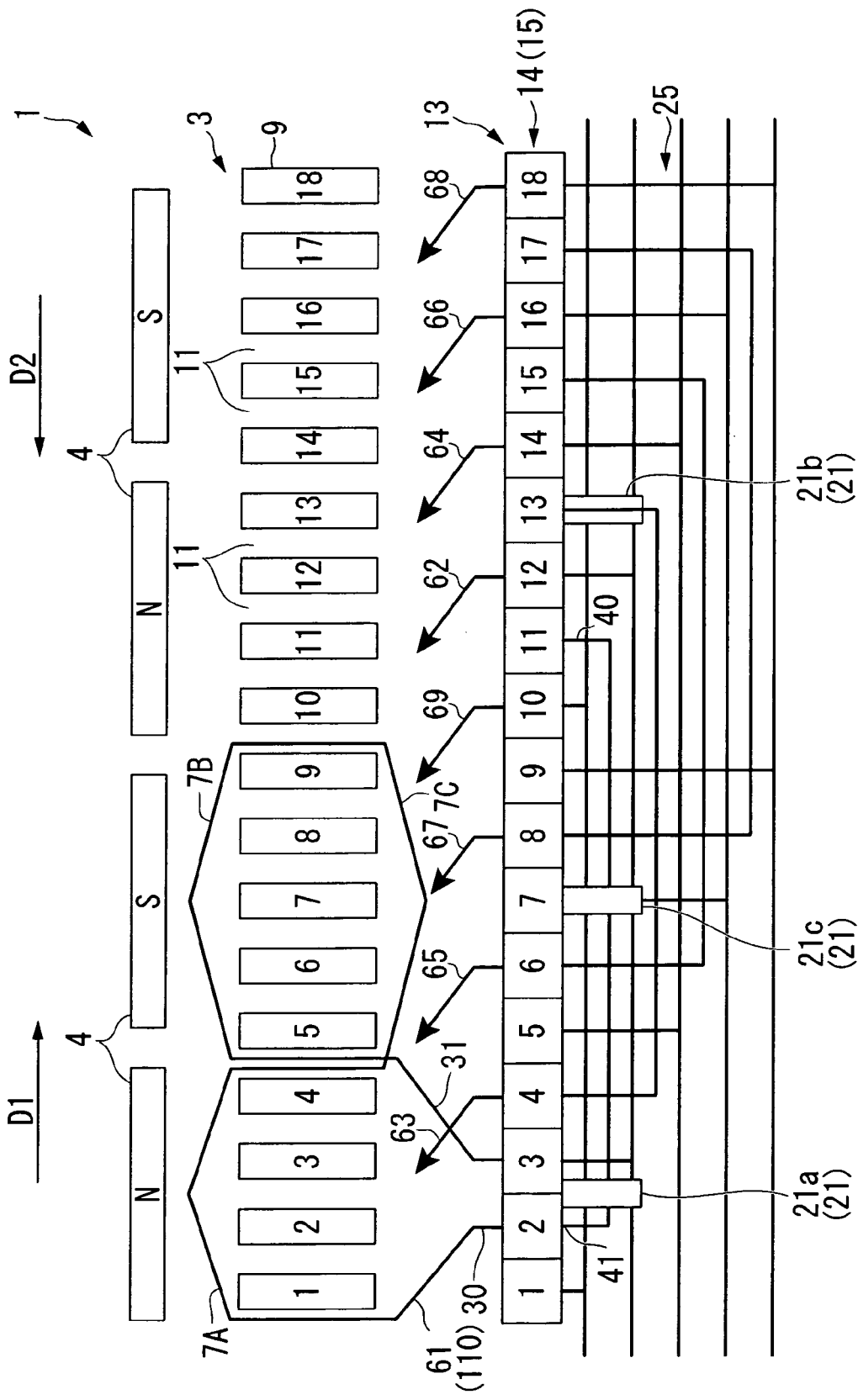
FIG. 19 is a developed view of an armature showing the winding state of an armature coil in a seventh embodiment of the invention.
Figure 20:
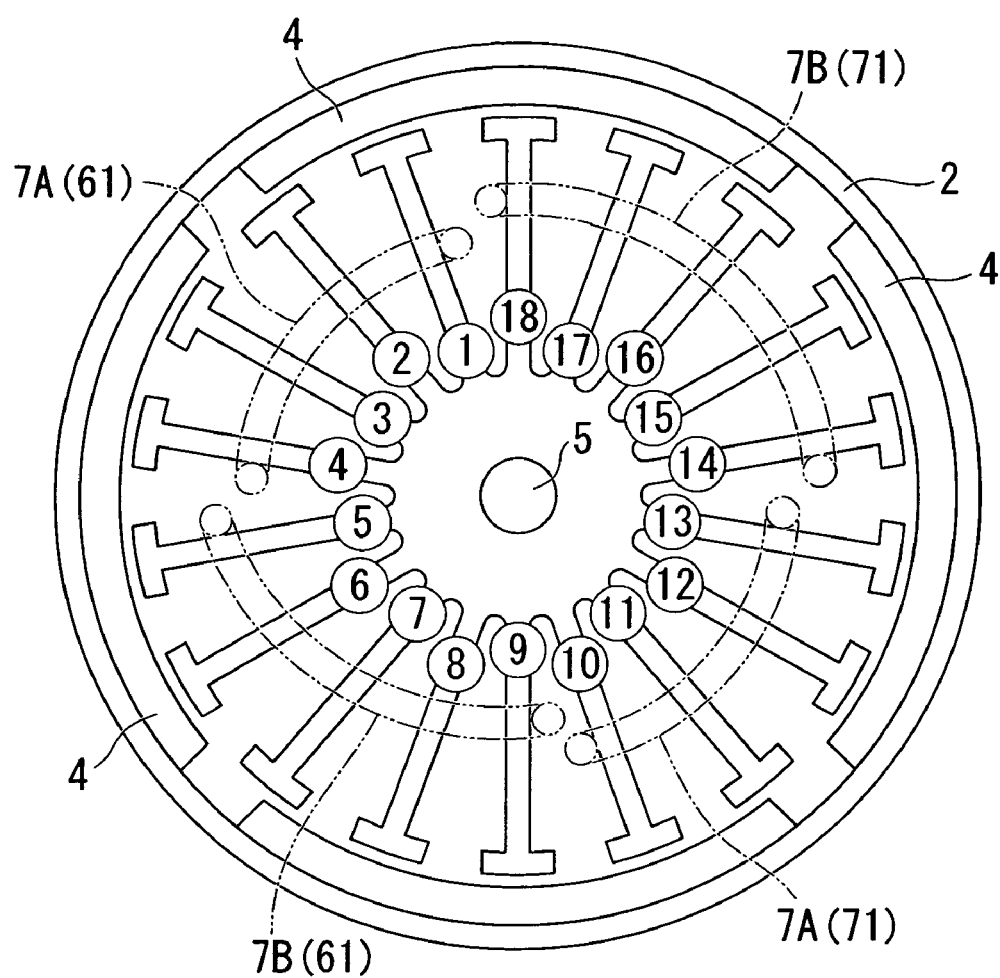
FIG. 20 is a top view of the armature showing the winding state of the armature coil in the seventh embodiment of the invention.

Next, the winding structure of the armature coil 7 provided in the electric motor 1 of a seventh embodiment of the present invention will be described with reference to FIGS. 19 and 20. FIG. 19 is a developed view of the armature, FIG. 20 is a transverse sectional view of the armature, and a gap between adjacent teeth 9 corresponds to the slot 11. Additionally, in FIGS. 19 and 20, the segments 14 of the commutator 13 and the teeth 9 are each numbered.

In addition, the electric motor 1 of the seventh embodiment of the present invention and the electric motor 1 of the first embodiment described above are different from each other only in the winding structure of the armature coil 7, and are the same in the other portions. Accordingly, only the winding structure of the armature coil 7 will be described below, and description of the other portions is omitted (this is also the same in the following embodiments).

Additionally, the following embodiment is the same as that of the above-mentioned sixth embodiment in that the armature coil 7 includes the first conductive wire 110 and second conductive wire 120, in that the first conductive wire 110 and the second conductive wire 120 are formed at the armature core 6 by the double flyer type winding machine and are substantially simultaneously and similarly wound around the teeth 9 which exist at positions which are point symmetric about the rotary shaft 5, in that the first to ninth winding wires (61 to 69) are formed by the first conductive wire 110, and the other first to ninth winding wires (71 to 79) are formed by the second conductive wire 120. Thus, in the developed view (for example, FIG. 19) of the armature, illustration of the second conductive wire 120 is omitted and only the first conductive wire 110 is shown. The winding structure of the first conductive wire 110 will now be described.

In the electric motor 1 of the seventh embodiment of the present invention, each of the connecting wires 25 is electrically and mechanically connected to the risers 15 formed by a pair of segments 14 and 14 which is arranged at facing positions which are point symmetric about the rotary shaft 5. Each of the connecting wires 25 may be disposed over the whole circumference, or may be disposed over only half of the circumference. Additionally, the first to ninth winding wires (61 to 69) have a first coil winding wire 7A and a second coil winding wire 7B which are each connected in series to each other. The first coil winding wire 7A is wound 12 times so as to surround four teeth 9 adjacent to each other. The second coil winding wire 7B is arranged at a position adjacent in the right direction D1 to the four teeth 9 around which the first coil winding wire 7A is wound, and is wound 12 times so as to surround five other teeth 9 which are adjacent to each other. Here, the winding direction of the second coil winding wire 7B is opposite to the winding direction of the first coil winding wire 7A.

An end 30 of the first coil winding wire 7A is connected to one segment 14 of the commutator 13, and an end 31 of the second coil winding wire 7B is connected to the segment 14 adjacent to the segment 14 to which the end 30 of the first coil winding wire 7A is connected. Here, as described above, the second coil winding wire 7B is arranged in the right direction D1 with respect to the first coil winding wire 7A, while the end 31 is also connected to the segment 14 arranged in the right direction D1 with respect to the segment 14 to which the end 30 is connected.

More specifically, the first winding wire 61 formed by the first conductive wire 110 has a first coil winding wire 7A and a second coil winding wire 7B. The end 30 of the first coil winding wire 7A is connected to the No. 2 segment 14, and then passes through a slit 11 formed between the No. 18 tooth 9 and the No. 1 tooth 9 and a slit 11 formed between the No. 4 tooth 9 and the No. 5 tooth 9, and is wound 12 times clockwise so as to surround the No. 1 tooth 9 to the No. 4 tooth 9 which are close to each other.

The second coil winding wire 7B passes through a slit 11 formed between a No. 9 tooth 9 and a No. 10 tooth 9 and the slit 11 formed between the No. 4 tooth 9 and the No. 5 tooth 9, and is wound 12 times in a counterclockwise direction opposite to the winding direction of the first coil winding wire 7A so as to surround the No. 5 tooth 9 to the No. 9 tooth 9 which are adjacent to the No. 1 tooth 9 to the No. 4 tooth 9 and are close to each other.

That is, the first coil winding wire 7A is wound in the state of short pitch winding, while the second coil winding wire 7B is wound in the state of long pitch winding. Additionally, the second coil winding wire 7B is wound in a direction opposite to the first coil 7 winding wire 7A because the second coil winding wire 7B faces a magnetic pole having polarity (S pole in FIG. 19) different from the polarity (N pole in FIG. 19) of a magnetic pole which the first coil winding wire 7A faces.

The end 31 of the second coil winding wire 7B is connected to the riser 15 formed at the No. 3 segment 14 adjacent in the right direction D1 to the No. 2 segment 14 to which the end 30 of the first coil winding wire 7A is connected. Also, the first to ninth winding wires (61 to 69) are formed at the armature core 6 by repeating this while deviating in the circumferential direction between the segments 14 and 14 which are adjacent to each other.

Therefore, according to the above-described seventh embodiment, the respective winding wires are split into the first coil winding wire 7A and the second coil winding wire 7B, and are wound around the armature core 6. Thus, compared to a case where the winding wires are wound without splitting, the number of crossovers 7C which cross over from one slot 11 to another slot 11 is small, and the wire diameter of the crossovers can be reduced.

Additionally, the winding wires 12 and 12, which are arranged at positions which face each other point-symmetrically about the rotary shaft 5 among the first to ninth winding wires (61 to 69) and the other first to ninth winding wires (not shown in FIG. 19) are each connected in parallel to each other by two connecting wires 12 and 12. For this reason, even in the four-pole electric motor 1 as in the present embodiment, basically, the armature 3 is rotated by supplying power from two positions arranged with an electrical angle of 180°. Moreover, since the first coil winding wire 7A is wound in the state of short pitch winding, while the second coil winding wire 7B is wound in the state of long pitch winding, the magnetic balance can be further improved.

Figure 21:
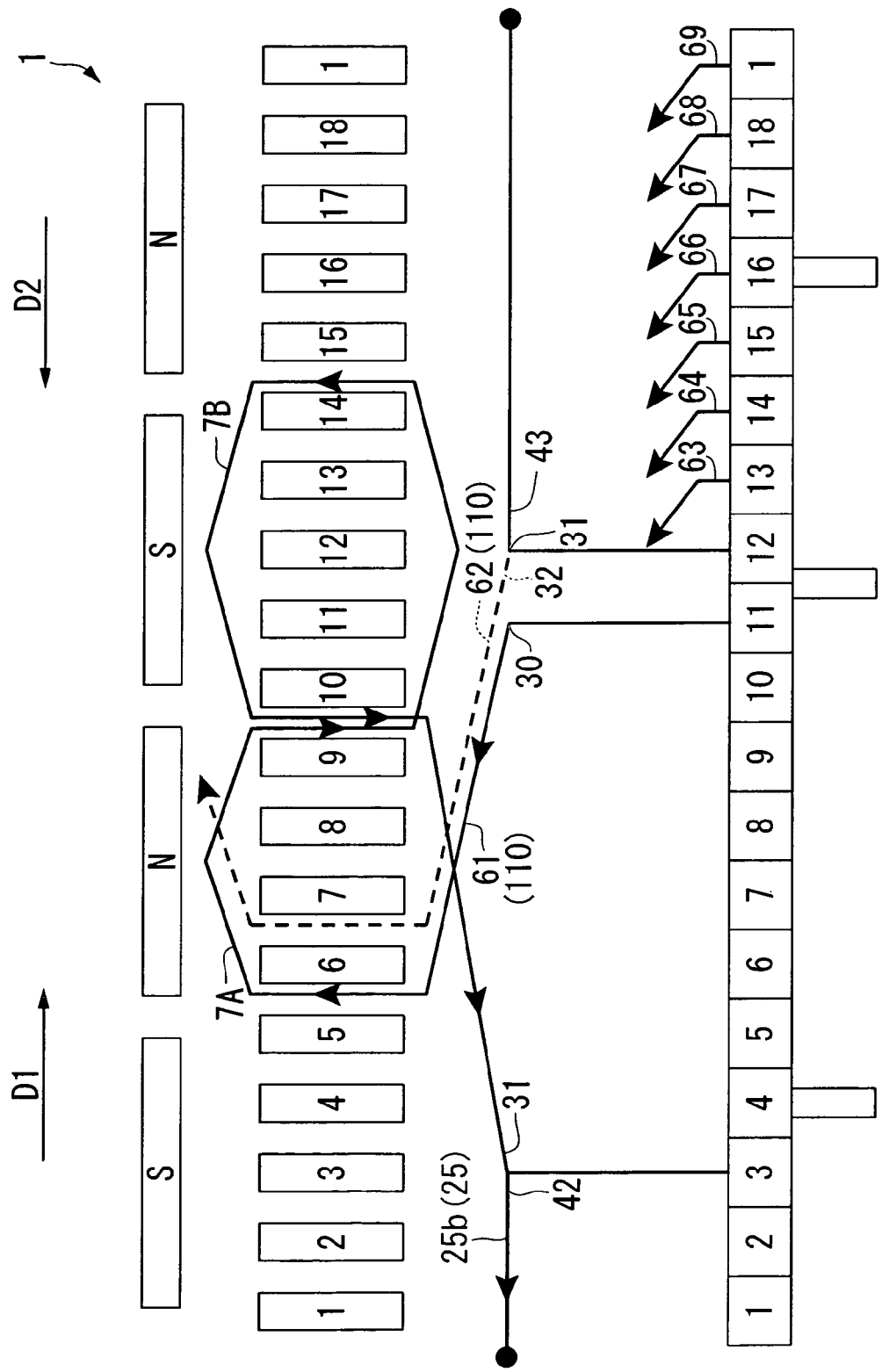
FIG. 21 is a developed view of an armature showing the winding state of an armature coil in an eighth embodiment of the invention.
Figure 22:
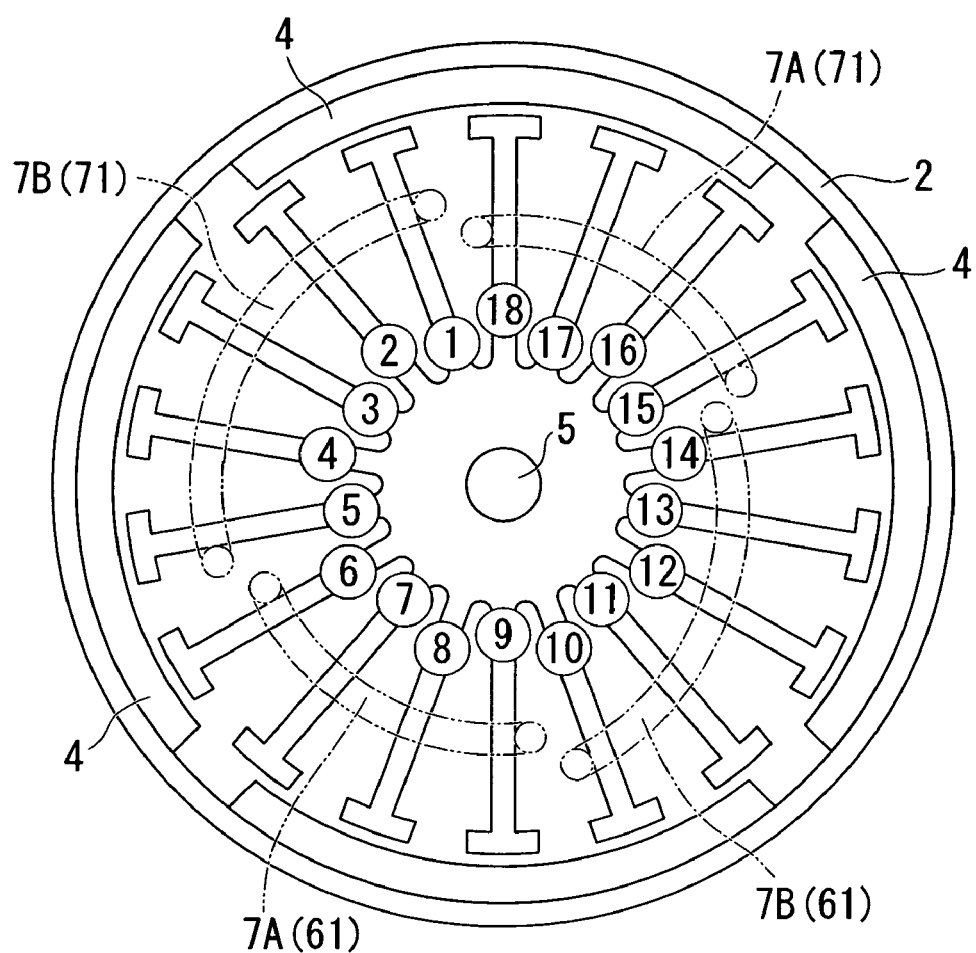
FIG. 22 is a top view of the armature showing the winding state of the armature coil in the eighth embodiment of the invention.

Next, the winding structure of the armature coil 7 provided in the electric motor 1 of an eighth embodiment of the present invention will be described with reference to FIGS. 21 and 22. FIG. 21 is a developed view of the armature, FIG. 22 is a transverse sectional view of the armature, and a gap between adjacent teeth 9 corresponds to the slot 11. Additionally, in FIGS. 21 and 22, the segments 14 of the commutator 13 and the teeth 9 are each numbered.

Here, in the electric motor 1 of the eighth embodiment of the present invention, the first to ninth winding wires (61 to 69) and the connecting wires 25 which join the first to ninth winding wires together in a series are formed by the first conductive wire 110, and the other first to ninth winding wires (71 to 79) and the connecting wires 25 which join the other first to ninth winding wires together in a series are formed by the second conductive wire 120.

The first to ninth winding wires (61 to 69) are joined together in a series via nine connecting wires 25 which are similarly formed from the first conductive wire 110. That is, the first winding wire 61, the connecting wire 25, the second winding wire 62, the connecting wire 25, the third winding wire 63, the connecting wire 25, the fourth winding wire 64, the connecting wire 25, the fifth winding wire 65, the connecting wire 25, the sixth winding wire 66, the connecting wire 25, the seventh winding wire 67, the connecting wire 25, the eighth winding wire 68, the connecting wire 25, the ninth winding wire 69, and the connecting wire 25 are formed in this order in a series by the first conductive wire 110. Additionally, each connecting wire of the connecting wires 25 which connect the first to ninth winding wires (61 to 69) together is electrically and mechanically connected to the risers 15 formed by a pair of segments 14 and 14 which is arranged at facing positions which are point symmetric with respect to each other about the rotary shaft 5.

The first to ninth winding wires (61 to 69) have a first coil winding wire 7A and a second coil winding wire 7B which are each connected in series to each other. The first coil winding wire 7A is wound 12 times so as to surround four teeth 9 adjacent to each other. The second coil winding wire 7B is arranged at a position adjacent in the right direction D1 to the four teeth 9 around which the first coil winding wire 7A is wound, and is wound 12 times so as to surround five other teeth 9 which are adjacent to each other. Here, the winding direction of the second coil winding wire 7B is opposite to the winding direction of the first coil winding wire 7A.

An end 30 of the first coil winding wire 7A is connected to one segment 14 of the commutator 13, and an end 31 of the second coil winding wire 7B is connected to the segment 14 adjacent in the right direction D1 to the segment 14 arranged at a position which is point symmetric about the rotary shaft 5 with respect to the segment 14 to which the end 30 of the first coil winding wire 7A is connected. Here, as described above, the second coil winding wire 7B is arranged in the right direction D1 with respect to the first coil winding wire 7A, while the end 31 is connected to the segment 14 arranged in the left direction D2 with respect to the segment 14 to which the end 30 is connected.

More specifically, the first winding wire 61 formed by the first conductive wire 110 has a first coil winding wire 7A and a second coil winding wire 7B, and the second coil winding wire 7B is joined in a series to the connecting wire 25b similarly formed from the first conductive wire 110. The first coil winding wire 7A is connected to the No. 11 segment 14, and then passes through a slit 11 formed between the No. 5 tooth 9 and the No. 6 tooth 9 and a slit 11 formed between the No. 9 tooth 9 and the No. 10 tooth 9, and is wound 12 times clockwise so as to surround the No. 6 tooth 9 to the No. 9 tooth 9 which are close to each other.

Next, the arrangement of the second coil winding wire 7B, which is formed from the first conductive wire 110 similarly to the first coil winding wire 7A and is connected in series to the first coil winding wire 7A, will be described below. The second coil winding wire 7B passes through a slit 11 formed between a No. 14 tooth 9 and a No. 15 tooth 9 and the slit 11 formed between the No. 9 tooth 9 and the No. 10 tooth 9, and is wound 12 times in a counterclockwise direction opposite to the winding direction of the first coil winding wire 7A so as to surround the No. 10 tooth 9 to the No. 14 tooth 9 which are adjacent to the No. 6 tooth 9 to the No. 9 tooth 9 and are close to each other. The second coil winding wire 7B is wound in a direction opposite to the first coil 7 winding wire 7A because the second coil winding wire 7B faces a magnetic pole having polarity (S pole in FIG. 21) different from the polarity (N pole in FIG. 21) of a magnetic pole which the first coil winding wire 7A faces.

The end 31 of the second coil winding wire 7B is connected to the No. 3 segment 14 adjacent in the right direction D1 to the No. 2 segment 14 arranged at a position which is point symmetric about the rotary shaft 5 with respect to the No. 11 segment 14 to which the end 30 of the first coil winding wire 7A is connected. By performing connection in this way, the first coil winding wire 7A near the end 30 can be suppressed from the outside by the second coil winding wire 7B near the end 31, and winding thickening of the first winding wire 61 in this vicinity can be prevented.

The second coil winding wire 7B and the second winding wire 62 are joined together in a series by the connecting wire 25b formed by the first conductive wire 110. An end 42 which is a starting point of the connecting wire 25b and the end 31 of the second coil winding wire 7B provided at the first winding wire 61 are joined together in a series, and the end 42 is electrically and mechanically connected to the riser 15 of the No. 3 segment 14. Also, as for the connecting wire 25b, an end 43 which is disposed in the left direction D2 and is an end point of the connecting wire 25b is electrically and mechanically connected to the riser 15 of the No. 12 segment 14. Here, the No. 3 segment 14 and the No. 12 segment 14 are arranged at positions which face each other point-symmetrically about the rotary shaft 5.

The end 43 of the connecting wire 25b and the end 32, which is the starting point of the first coil winding wire 7A of the second winding wire 62 wound following the first winding wire 61, are joined together in a series. Also, the first coil winding wire 7A of the second winding wire 62 passes through the slit 11 formed between the No. 6 tooth 9 and the No. 7 tooth 9 and a slit 11 formed between a No. 10 tooth 9 and a No. 11 tooth 9, and is wound 12 times clockwise so as to surround the No. 7 tooth 9 to the No. 10 tooth 9. The same process as the aforementioned process is repeated below, and the armature core 6 includes the first to ninth winding wires (61 to 69), and nine connecting wires 25.

Therefore, according to the above-described eighth embodiment, the same effects as those of the aforementioned seventh embodiment can be exhibited. In addition to this, the first to ninth winding wires (61 to 69) and the connecting wires 25 which join the first to ninth winding wires together in a series are formed by disposing the single first conductive wire 110 at the armature core 6 and the commutator 13. Thus, compared to a case where connecting wires are disposed in advance at the commutator 13, and then winding wires are disposed, the time of winding work is shortened and mounting of the connecting wires and the winding wires to the armature core and commutator 13 can be performed simply and easily.

Additionally, at the neck of the commutator 13, the first coil winding wire 7A can be suppressed from the outside by the second coil winding wire 7B, and winding thickening of the first winding wire 61 in this vicinity can be prevented.

Figure 23:
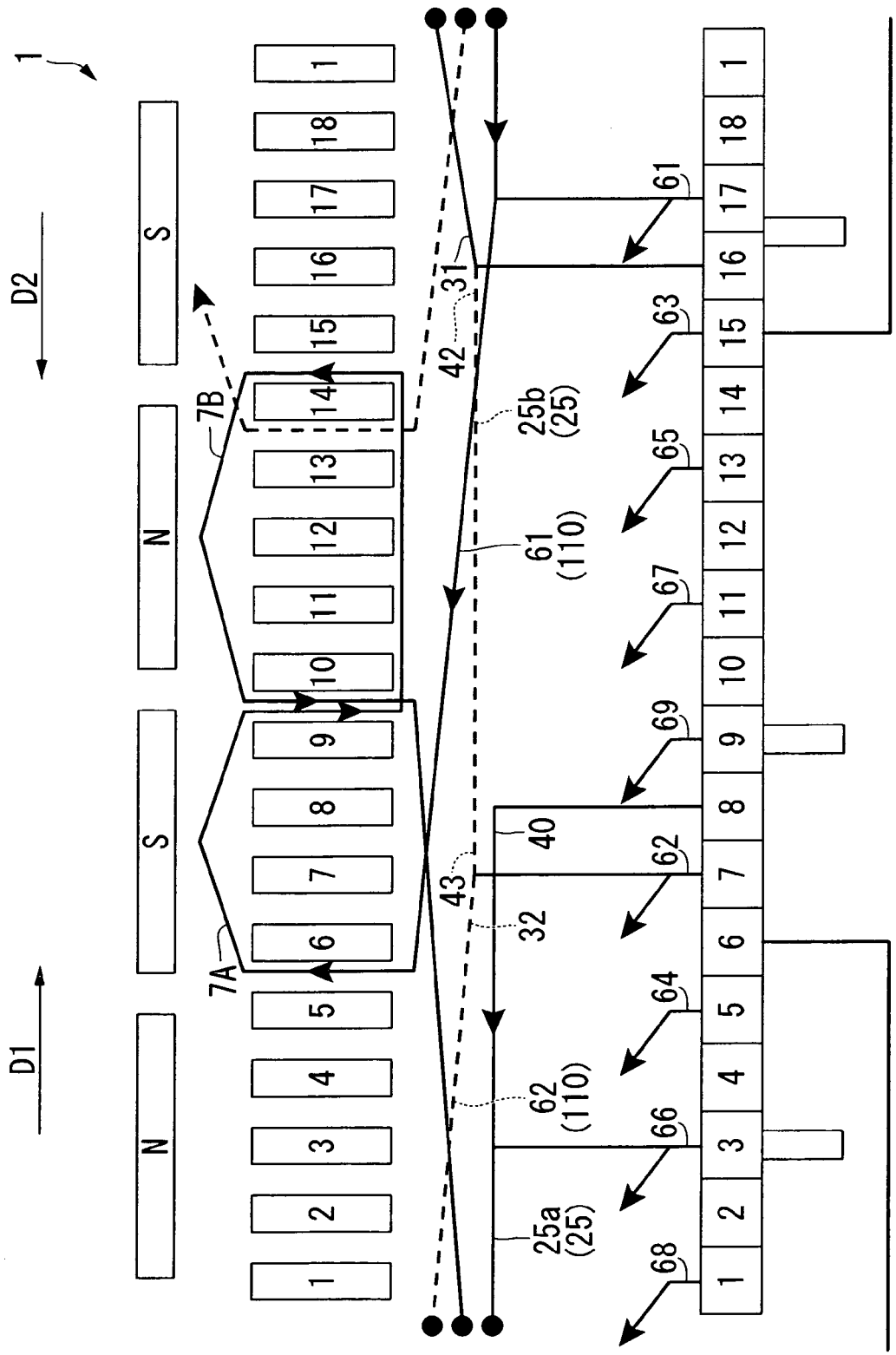
FIG. 23 is a developed view of an armature showing the winding state of an armature coil in a ninth embodiment of the invention.
Figure 24:
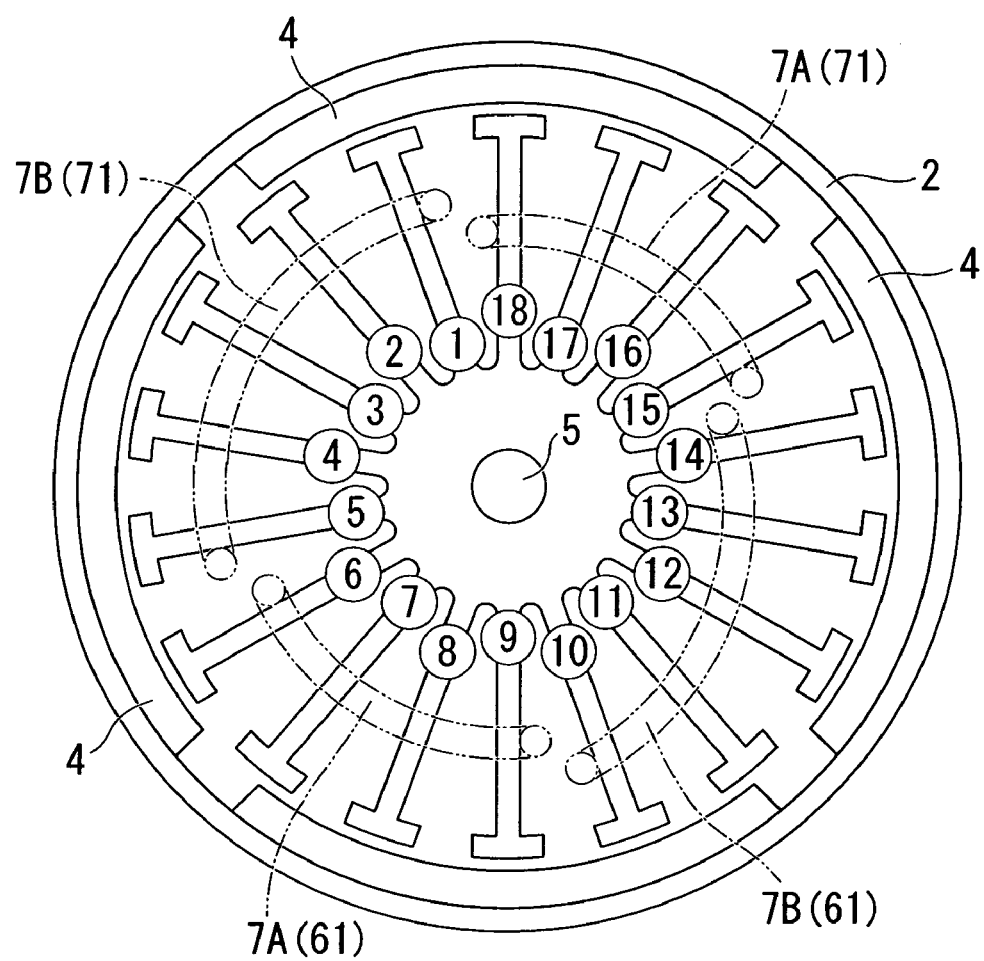
FIG. 24 is a top view of the armature showing the winding state of the armature coil in the ninth embodiment of the invention.

Next, the winding structure of the armature coil 7 provided in the electric motor 1 of a ninth embodiment of the present invention will be described with reference to FIGS. 23 and 24. FIG. 23 is a developed view of the armature, FIG. 24 is a transverse sectional view of the armature, and a gap between adjacent teeth 9 corresponds to the slot 11. Additionally, in FIGS. 23 and 24, the segments 14 of the commutator 13 and the teeth 9 are each numbered.

Here, in the electric motor 1 of the ninth embodiment of the present invention, the first to ninth winding wires (61 to 69) and the connecting wires 25 which join the first to ninth winding wires together in a series are formed by the first conductive wire 110, and the other first to ninth winding wires (71 to 79) and the connecting wires 25 which join the other first to ninth winding wires together in a series are formed by the second conductive wire 120.

The first to ninth winding wires (61 to 69) are joined together in a series via nine connecting wires 25 which are similarly formed from the first conductive wire 110. That is, the first winding wire 61, the connecting wire 25, the second winding wire 62, the connecting wire 25, the third winding wire 63, the connecting wire 25, the fourth winding wire 64, the connecting wire 25, the fifth winding wire 65, the connecting wire 25, the sixth winding wire 66, the connecting wire 25, the seventh winding wire 67, the connecting wire 25, the eighth winding wire 68, the connecting wire 25, the ninth winding wire 69, and the connecting wire 25 are formed in this order in a series by the first conductive wire 110. Additionally, each connecting wire of the connecting wires 25 which connect the first to ninth winding wires (61 to 69) together is electrically and mechanically connected to the risers 15 formed by a pair of segments 14 and 14 which is arranged at facing positions which are point symmetric with respect to each other about the rotary shaft 5.

The first to ninth winding wires (61 to 69) have a first coil winding wire 7A and a second coil winding wire 7B which are each connected in series to each other. Additionally, the first coil winding wire 7A is wound 12 times so as to surround four teeth 9 adjacent to each other. The second coil winding wire 7B is arranged at a position adjacent in the right direction D1 to the four teeth 9 around which the first coil winding wire 7A is wound, and is wound 12 times so as to surround five other teeth 9 which are adjacent to each other. Here, the winding direction of the second coil winding wire 7B is opposite to the winding direction of the first coil winding wire 7A.

An end 30 of the first coil winding wire 7A is connected to one segment 14 of the commutator 13, and an end 31 of the second coil winding wire 7B is connected to the segment 14 adjacent to the segment 14 to which the end 30 of the first coil winding wire 7A is connected. Here, as described above, the second coil winding wire 7B is arranged in the right direction D1 with respect to the first coil winding wire 7A, while the end 31 is connected to the segment 14 arranged in the left direction D2 with respect to the segment 14 to which the end 30 is connected.

More specifically, the first winding wire 61 formed by the first conductive wire 110 has a first coil winding wire 7A and a second coil winding wire 7B, and the first coil winding wire 7A is joined in a series to a connecting wire 25a similarly formed from the first conductive wire 110, while the second coil winding wire 7B is joined in a series to a connecting wire 25b similarly formed from the first conductive wire 110.

An end 40 which is a starting point of the connecting wire 25a formed from the first conductive wire 110 is electrically and mechanically connected to the riser 15 formed at the No. 8 segment 14, and as for the connecting wire 25a, an end 41 which is disposed in the left direction D2 and is an end point of the connecting wire 25a is electrically and mechanically connected to the riser 15 formed at the No. 17 segment 14. Here, the No. 8 segment 14 and the No. 17 segment 14 are arranged at positions which are point symmetric about the rotary shaft 5. The end 41 of the connecting wire 25a and the end 30 which is the starting point of the first coil winding wire 61 are joined together in a series, and the first coil winding wire 7A formed by the first conductive wire 110 is wound around the teeth 9 after being connected to the end 30.

The first coil winding wire 7A passes through a slit 11 formed between the No. 5 tooth 9 and the No. 9 tooth 9 and a slit 11 formed between the No. 9 tooth 9 and the No. 10 tooth 9, and is wound 12 times clockwise so as to surround the No. 6 tooth 9 to the No. 9 tooth 9 which are close to each other.

Next, the arrangement of the second coil winding wire 7B, which is formed from the first conductive wire 110 similarly to the first coil winding wire 7A and is connected in series to the first coil winding wire 7A, will be described below.

The second coil winding wire 7B passes through a slit 11 formed between a No. 14 tooth 9 and a No. 15 tooth 9 and the slit 11 formed between the No. 9 tooth 9 and the No. 10 tooth 9, and is wound 12 times in a counterclockwise direction opposite to the winding direction of the first coil winding wire 7A so as to surround the No. 10 tooth 9 to the No. 14 tooth 9 which are adjacent to the No. 6 tooth 9 to the No. 9 tooth 9 and are close to each other. The second coil winding wire 7B is wound in a direction opposite to the first coil 7 winding wire 7A because the second coil winding wire 7B faces a magnetic pole having polarity (N pole in FIG. 23) different from the polarity (S pole in FIG. 23) of a magnetic pole which the first coil winding wire 7A faces.

The end 31 of the second coil winding wire 7B is connected to the riser 15 formed at the No. 16 segment 14 adjacent to the No. 17 segment 14 to which the end 30 of the first coil winding wire 7A is connected in the opposite left direction D2. By performing connection in this way, the first coil winding wire 7A near the end 30 can be suppressed from the outside by the second coil winding wire 7B near the end 31, and winding thickening of the first winding wire 61 in this vicinity can be prevented.

The first winding wire 61 and the second winding wire 62 wound around the stator core 6 following the first winding wire 61 are joined together in a series by the connecting wire 25b formed by the first conductive wire 110. An end 42 which is a starting point of the connecting wire 25b and the end 31 of the second coil winding wire 7B provided at the first winding wire 61 are joined together in a series, and the end 42 is electrically and mechanically connected to the riser 15 of the No. 16 segment 14. Also, as for the connecting wire 25b, an end 43 which is disposed in the left direction D2 and is an end point of the connecting wire 25b is electrically and mechanically connected to the riser 15 of the No. 7 segment 14. Here, the No. 16 segment 14 and the No. 7 segment 14 are arranged at positions which are point symmetric about the rotary shaft 5.

The end 43 of the connecting wire 25b and the end 32, which is the starting point of the first coil winding wire 7A of the second winding wire 62 wound following the first winding wire 61, are joined together in a series. Also, the first coil winding wire 7A of the second winding wire 62 passes through the slit 11 formed between the No. 13 tooth 9 and the No. 14 tooth 9 and a slit 11 formed between a No. 17 tooth 9 and a No. 18 tooth 9, and is wound 12 times clockwise so as to surround the No. 14 tooth 9 to the No. 17 tooth 9. The same process as the aforementioned process is repeated below, and the armature core 6 includes the first to ninth winding wires (61 to 69), and nine connecting wires 25.

Accordingly, according to the above-described ninth embodiment, the same effects as those of the aforementioned eighth embodiment can be exhibited.

Figure 25:
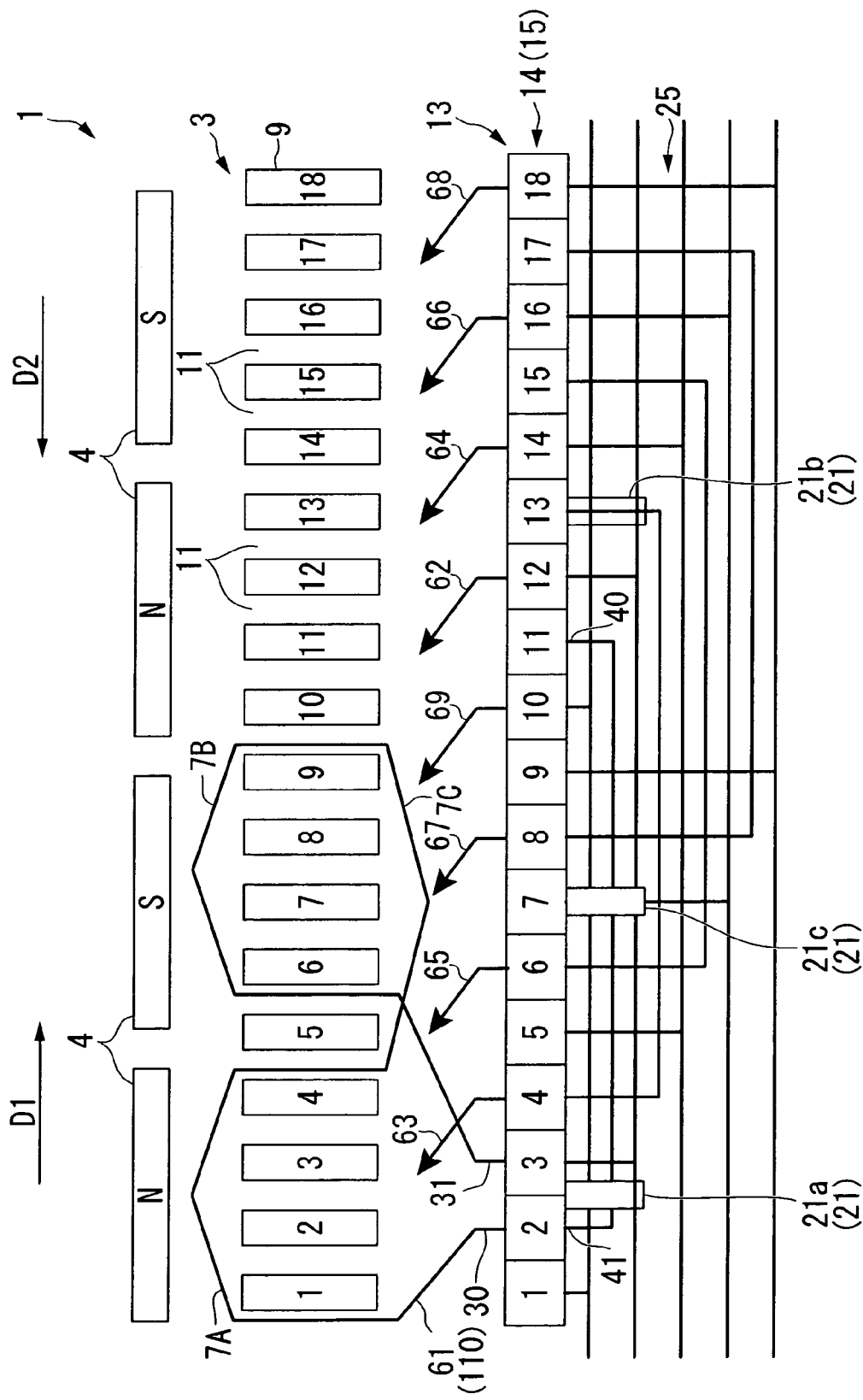
FIG. 25 is a developed view of an armature showing the winding state of an armature coil in a tenth embodiment of the invention.
Figure 26:
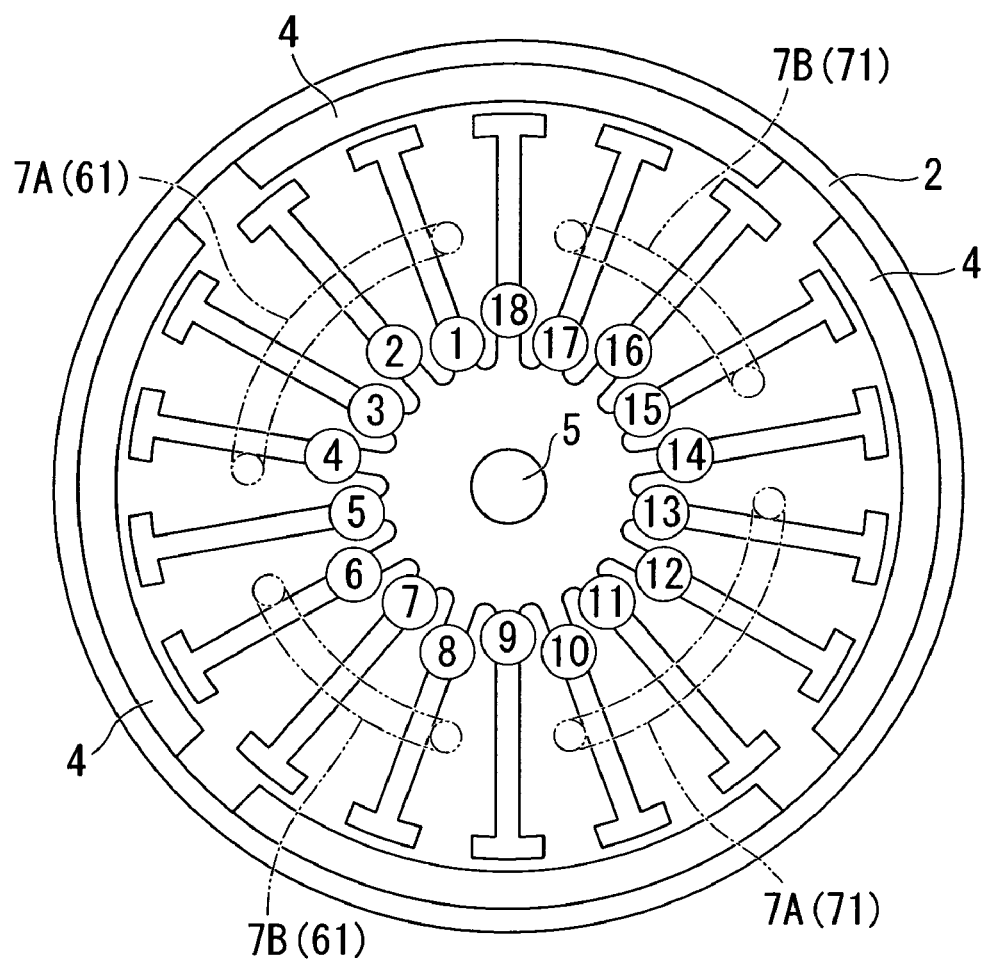
FIG. 26 is a top view of the armature showing the winding state of the armature coil in the tenth embodiment of the invention.

Next, the winding structure of the armature coil 7 provided in the electric motor 1 of a tenth embodiment of the present invention will be described with reference to FIGS. 25 and 26. FIG. 25 is a developed view of the armature, FIG. 26 is a transverse sectional view of the armature, and a gap between adjacent teeth 9 corresponds to the slot 11. Additionally, in FIGS. 25 and 26, the segments 14 of the commutator 13 and the teeth 9 are each numbered.

Here, in the electric motor 1 of the tenth embodiment of the present invention, each of the connecting wires 25 is electrically and mechanically connected to the risers 15 formed by a pair of segments 14 and 14 which is arranged at facing positions which are point symmetric about the rotary shaft 5. Each of the connecting wires 25 may be disposed over the whole circumference, or may be disposed at only half of the circumference.

Additionally, the first to ninth winding wires (61 to 69) have a first coil winding wire 7A and a second coil winding wire 7B which are each connected in series to each other. The first coil winding wire 7A is wound 12 times so as to surround four teeth 9 adjacent to each other. The second coil winding wire 7B is arranged at a position adjacent in the right direction D1 to the four teeth 9 around which the first coil winding wire 7A is wound with one tooth therebetween, and is wound 12 times so as to surround three other teeth 9 which are adjacent to each other. Here, the winding direction of the second coil winding wire 7B is opposite to the winding direction of the first coil winding wire 7A.

An end 30 of the first coil winding wire 7A is connected to one segment 14 of the commutator 13, and an end 31 of the second coil winding wire 7B is connected to the segment 14 adjacent to the segment 14 to which the end 30 of the first coil winding wire 7A is connected. Here, as described above, the second coil winding wire 7B is arranged in the right direction D1 with respect to the first coil winding wire 7A, while the end 31 is also connected to the segment 14 arranged in the right direction D1 with respect to the segment 14 to which the end 30 is connected.

More specifically, the first winding wire 61 formed by the first conductive wire 110 has a first coil winding wire 7A and a second coil winding wire 7B.

The end 30 of the first coil winding wire 7A is connected to the No. 2 segment 14, and then passes through a slit 11 formed between the No. 18 tooth 9 and the No. 1 tooth 9 and a slit 11 formed between the No. 4 tooth 9 and the No. 5 tooth 9, and is wound 12 times clockwise so as to surround the No. 1 tooth 9 to the No. 4 tooth 9 which are close to each other.

The second coil winding wire 7B passes through a slit 11 formed between the No. 8 tooth 9 and the No. 9 tooth 9 and the slit 11 formed between the No. 5 tooth 9 and the No. 6 tooth 9, and is wound 12 times in a counterclockwise direction opposite to the winding direction of the first coil winding wire 7A so as to surround the No. 6 tooth 9 to the No. 8 tooth 9 which are adjacent to the No. 1 tooth 9 to the No. 4 tooth 9 with the No. 5 tooth 9 therebetween and are close to each other.

That is, although the first coil winding wire 7A and the second coil winding wire 7B are different from each other in the number of teeth 9 which exist therebetween, both coil winding wires 7A and 7B are in the state of short pitch winding. Additionally, the second coil winding wire 7B is wound in a direction opposite to the first coil 7 winding wire 7A because the second coil winding wire 7B faces a magnetic pole having polarity (S pole in FIG. 25) different from the polarity (N pole in FIG. 25) of a magnetic pole which the first coil winding wire 7A faces.

The end 31 of the second coil winding wire 7B is connected to the riser 15 formed at the No. 3 segment 14 adjacent in the right direction D1 to the No. 2 segment 14 to which the end 30 of the first coil winding wire 7A is connected. Also, the first to ninth winding wires (61 to 69) are formed at the armature core 6 by repeating this while deviating in the circumferential direction between the segments 14 and 14 which are adjacent to each other.

According to the tenth embodiment, both the first coil winding wire 7A and the second coil winding wire 7B are in the state of short pitch winding. However, in the aforementioned seventh embodiment, the magnets 4 are in the state of being accommodated within a range of long pitch winding. Thus, the same effects as those of the aforementioned seventh embodiment can be exhibited.

Figure 27:
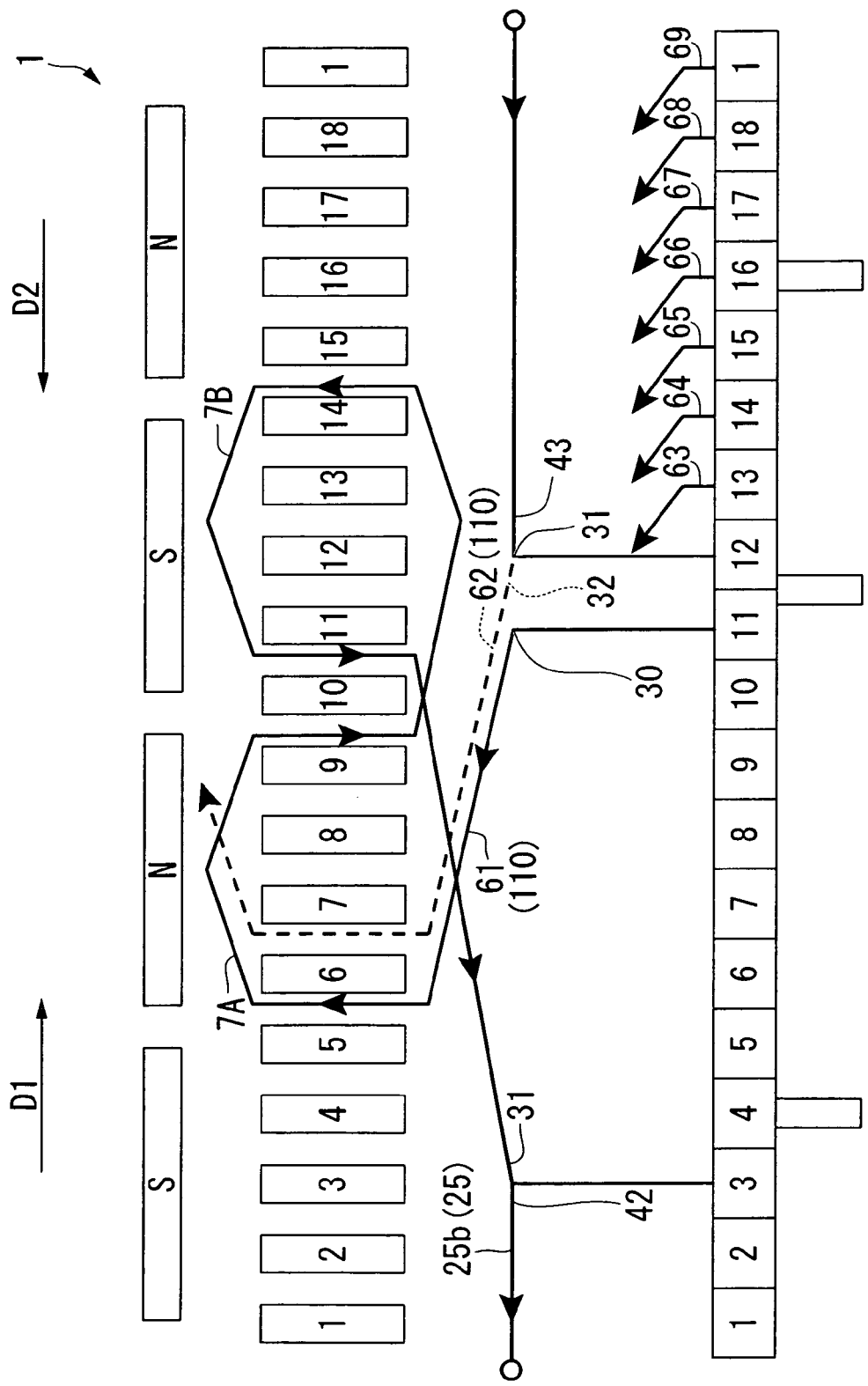
FIG. 27 is a developed view of an armature showing the winding state of an armature coil in an eleventh embodiment of the invention.
Figure 28:
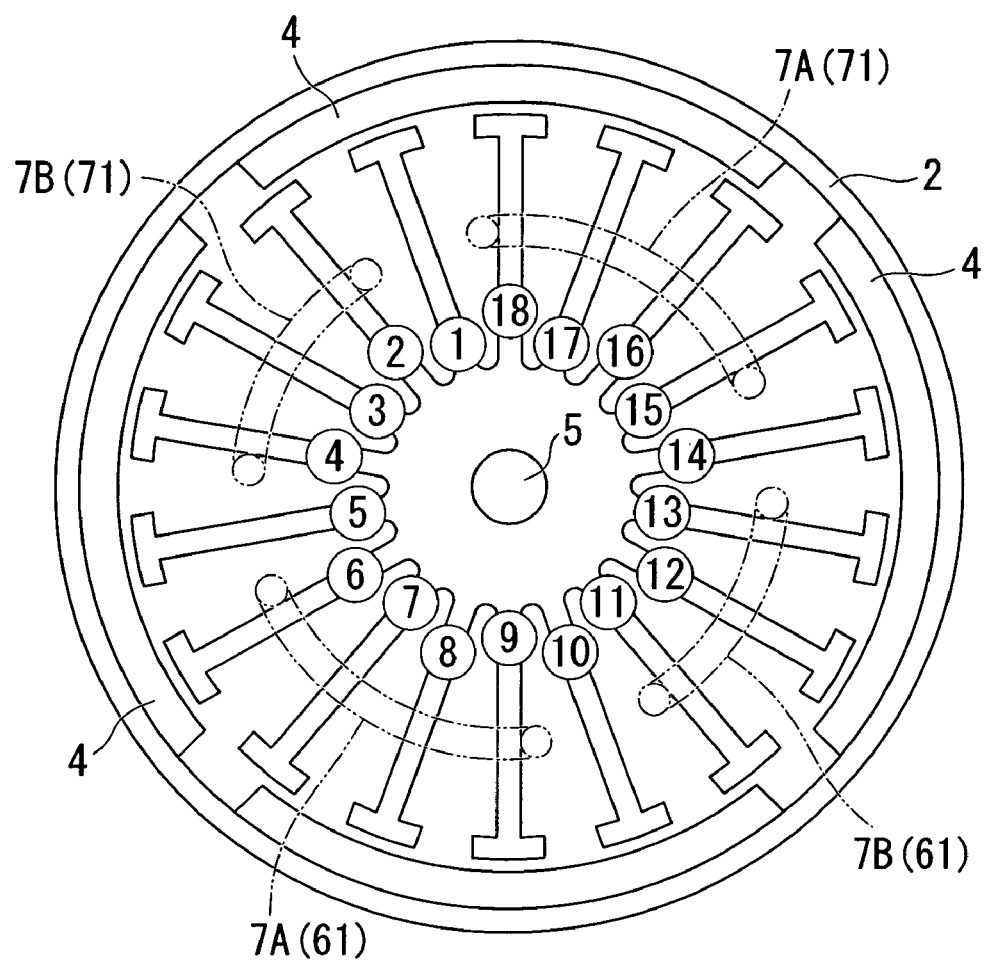
FIG. 28 is a top view of the armature showing the winding state of the armature coil in the eleventh embodiment of the invention.

Next, the winding structure of the armature coil 7 provided in the electric motor 1 of an eleventh embodiment of the present invention will be described with reference to FIGS. 27 and 28. FIG. 27 is a developed view of the armature, FIG. 28 is a transverse sectional view of the armature, and a gap between adjacent teeth 9 corresponds to the slot 11. Additionally, in FIGS. 27 and 28, the segments 14 of the commutator 13 and the teeth 9 are each numbered.

Here, in the electric motor 1 of the eleventh embodiment of the present invention, the first to ninth winding wires (61 to 69) and the connecting wires 25 which join the first to ninth winding wires together in a series are formed by the first conductive wire 110, and the other first to ninth winding wires (71 to 79) and the connecting wires 25 which join the other first to ninth winding wires together in a series are formed by the second conductive wire 120.

The first to ninth winding wires (61 to 69) are joined together in a series via nine connecting wires 25 which are similarly formed from the first conductive wire 110. That is, the first winding wire 61, the connecting wire 25, the second winding wire 62, the connecting wire 25, the third winding wire 63, the connecting wire 25, the fourth winding wire 64, the connecting wire 25, the fifth winding wire 65, the connecting wire 25, the sixth winding wire 66, the connecting wire 25, the seventh winding wire 67, the connecting wire 25, the eighth winding wire 68, the connecting wire 25, the ninth winding wire 69, and the connecting wire 25 are formed in this order in a series by the first conductive wire 110. Additionally, each connecting wire of the connecting wires 25 which connect the first to ninth winding wires (61 to 69) together is electrically and mechanically connected to the risers 15 formed by a pair of segments 14 and 14 which is arranged at facing positions which are point symmetric with respect to each other about the rotary shaft 5.

The first to ninth winding wires (61 to 69) have a first coil winding wire 7A and a second coil winding wire 7B which are each connected in series to each other. Additionally, the first coil winding wire 7A is wound 12 times so as to surround four teeth 9 adjacent to each other. The second coil winding wire 7B is arranged at a position adjacent in the right direction D1 to the four teeth 9 around which the first coil winding wire 7A is wound with one tooth 9 therebetween, and is wound 12 times so as to surround three other teeth 9 which are adjacent to each other. Here, the winding direction of the second coil winding wire 7B is opposite to the winding direction of the first coil winding wire 7A.

An end 30 of the first coil winding wire 7A is connected to one segment 14 of the commutator 13, and an end 31 of the second coil winding wire 7B is connected to the segment 14 adjacent in the right direction D1 to the segment 14 arranged at a position which is point symmetric about the rotary shaft 5 with respect to the segment 14 to which the end 30 of the first coil winding wire 7A is connected. Here, as described above, the second coil winding wire 7B is arranged in the right direction D1 with respect to the first coil winding wire 7A, while the end 31 is connected to the segment 14 arranged in the left direction D2 with respect to the segment 14 to which the end 30 is connected.

More specifically, the first winding wire 61 formed by the first conductive wire 110 has a first coil winding wire 7A and a second coil winding wire 7B, and the second coil winding wire 7B is joined in a series to the connecting wire 25b similarly formed from the first conductive wire 110.

The first coil winding wire 7A is connected to the No. 11 segment 14, and then passes through a slit 11 formed between the No. 5 tooth 9 and the No. 6 tooth 9 and a slit 11 formed between the No. 9 tooth 9 and the No. 10 tooth 9, and is wound 12 times clockwise so as to surround the No. 6 tooth 9 to the No. 9 tooth 9 which are close to each other.

Next, the arrangement of the second coil winding wire 7B, which is formed from the first conductive wire 110 similarly to the first coil winding wire 7A and is connected in series to the first coil winding wire 7A, will be described below.

The second coil winding wire 7B passes through a slit 11 formed between the No. 13 tooth 9 and the No. 14 tooth 9 and the slit 11 formed between the No. 10 tooth 9 and the No. 11 tooth 9, and is wound 12 times in a counterclockwise direction opposite to the winding direction of the first coil winding wire 7A so as to surround the No. 11 tooth 9 to the No. 13 tooth 9 which are adjacent to the No. 6 tooth 9 to the No. 9 tooth 9 with the No. 10 tooth 9 therebetween and are close to each other. The second coil winding wire 7B is wound in a direction opposite to the first coil winding wire 7A because the second coil winding wire 7B faces a magnetic pole having polarity (S pole in FIG. 27) different from the polarity (N pole in FIG. 27) of a magnetic pole which the first coil winding wire 7A faces.

The end 31 of the second coil winding wire 7B is connected to the No. 3 segment 14 adjacent in the right direction D1 to the No. 2 segment 14 arranged at a position which is point symmetric about the rotary shaft 5 with respect to the No. 11 segment 14 to which the end 30 of the first coil winding wire 7A is connected. By performing connection in this way, the first coil winding wire 7A near the end 30 can be suppressed from the outside by the second coil winding wire 7B near the end 31, and winding thickening of the first winding wire 61 in this vicinity can be prevented.

The second coil winding wire 7B and the second winding wire 62 are joined together in a series by the connecting wire 25*b* formed by the first conductive wire 110. An end 42 which is a starting point of the connecting wire 25*b* and the end 31 of the second coil winding wire 7B provided at the first winding wire 61 are joined together in a series, and the end 42 is electrically and mechanically connected to the riser 15 of the No. 3 segment 14. Also, as for the connecting wire 25*b*, an end 43 which is disposed in the left direction D2 and is an end point of the connecting wire 25*b* is electrically and mechanically connected to the riser 15 of the No. 12 segment 14. Here, the No. 3 segment 14 and the No. 12 segment 14 are arranged at positions which face each other point-symmetrically about the rotary shaft 5.

The end 43 of the connecting wire 25*b* and the end 32, which is the starting point of the first coil winding wire 7A of the second winding wire 62 wound following the first winding wire 61, are joined together in a series. Also, the first coil winding wire 7A of the second winding wire 62 passes through the slit 11 formed between the No. 6 tooth 9 and the No. 7 tooth 9 and a slit 11 formed between a No. 10 tooth 9 and a No. 11 tooth 9, and is wound 12 times clockwise so as to surround the No. 7 tooth 9 to the No. 10 tooth 9. The same process as the aforementioned process is repeated below, and the armature core 6 includes the first to ninth winding wires (61 to 69), and nine connecting wires 25.

Therefore, according to the above-described eleventh embodiment, the same effects as those of the aforementioned eighth embodiment can be exhibited.

Figure 29:
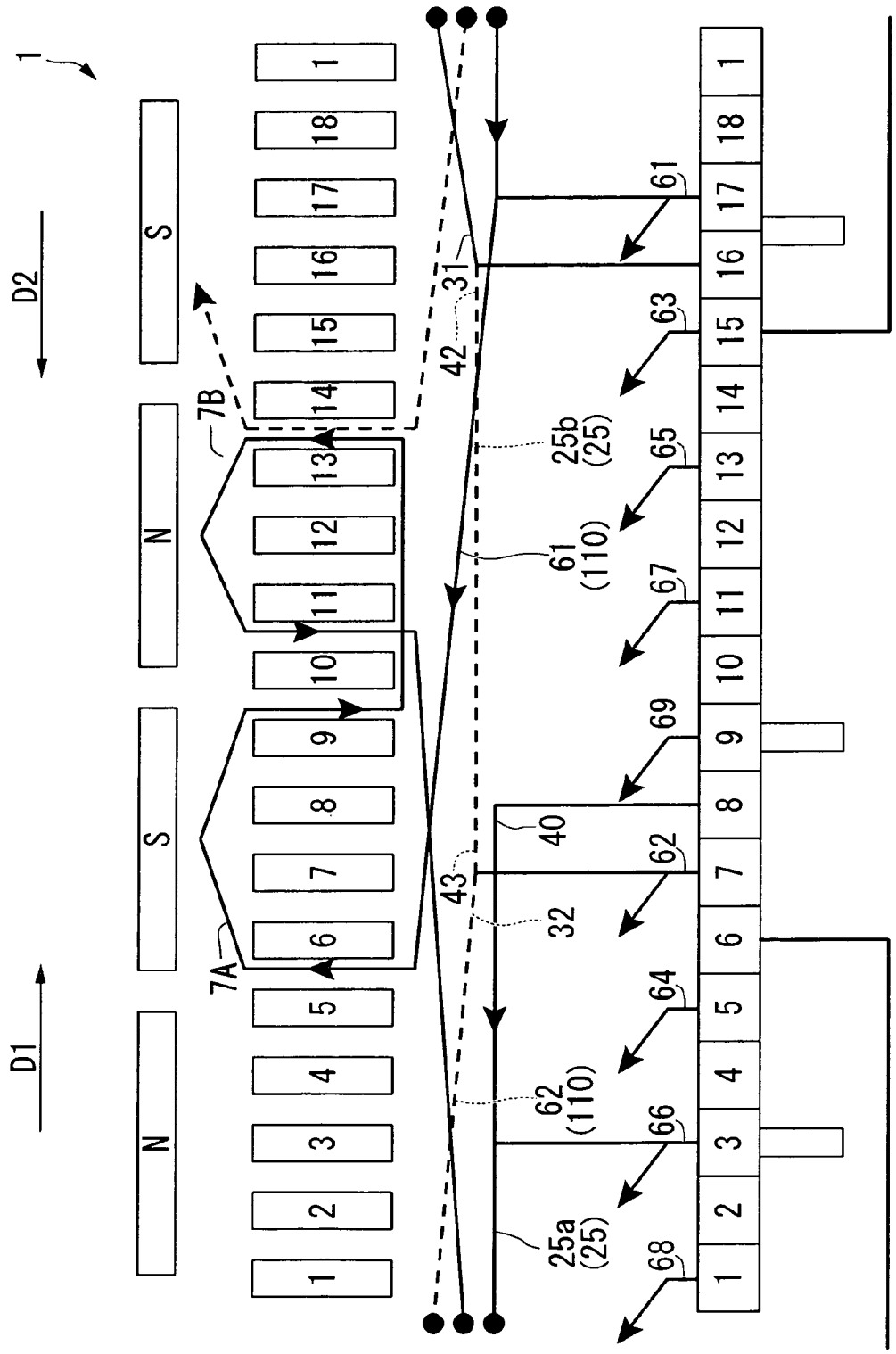
FIG. 29 is a developed view of an armature showing the winding state of an armature coil in a twelfth embodiment of the invention.
Figure 30:
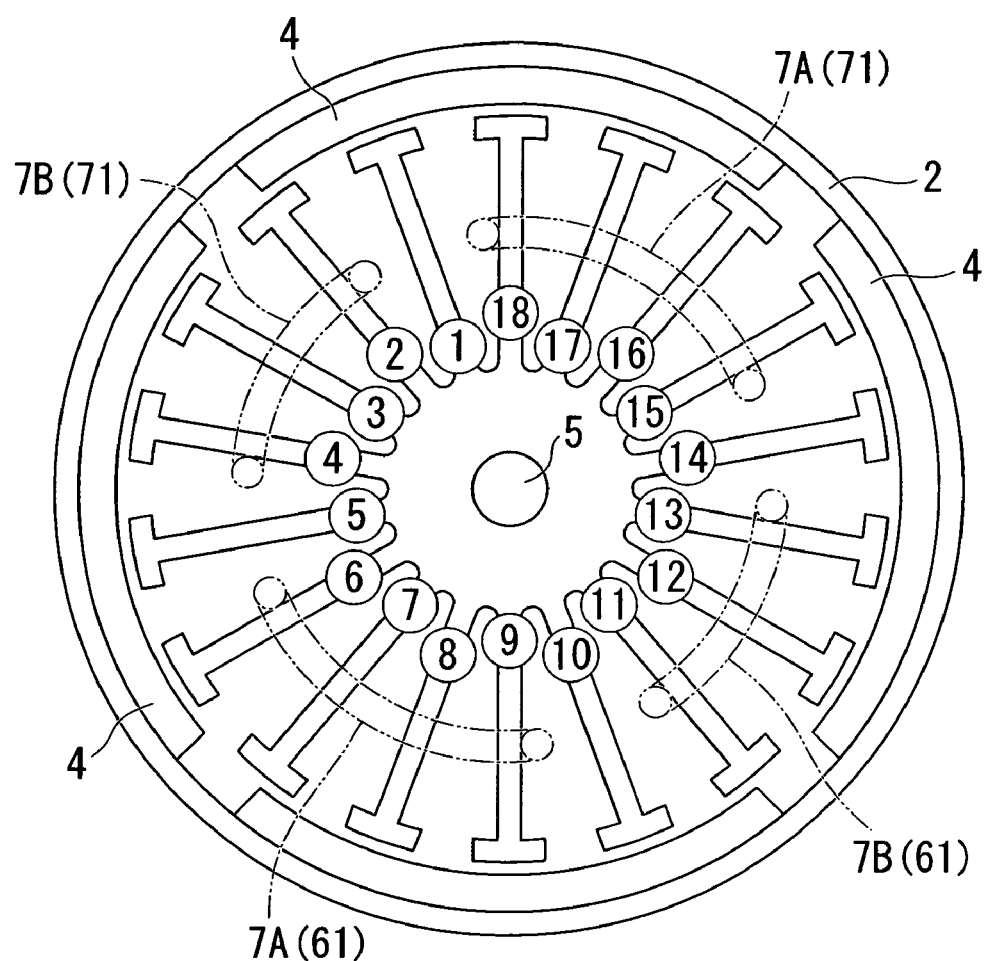
FIG. 30 is a top view of the armature showing the winding state of the armature coil in the twelfth embodiment of the invention.

Next, the winding structure of the armature coil 7 provided in the electric motor 1 of a twelfth embodiment of the present invention will be described with reference to FIGS. 29 and 30. FIG. 29 is a developed view of the armature, FIG. 30 is a transverse sectional view of the armature, and a gap between adjacent teeth 9 corresponds to the slot 11. Additionally, in FIGS. 29 and 30, the segments 14 of the commutator 13 and the teeth 9 are each numbered.

Here, in the electric motor 1 of the twelfth embodiment of the present invention, the first to ninth winding wires (61 to 69) and the connecting wires 25 which join the first to ninth winding wires together in a series are formed by the first conductive wire 110, and the other first to ninth winding wires (71 to 79) and the connecting wires 25 which join the other first to ninth winding wires together in a series are formed by the second conductive wire 120.

The first to ninth winding wires (61 to 69) are joined together in a series via nine connecting wires 25 which are similarly formed from the first conductive wire 110. That is, the first winding wire 61, the connecting wire 25, the second winding wire 62, the connecting wire 25, the third winding wire 63, the connecting wire 25, the fourth winding wire 64, the connecting wire 25, the fifth winding wire 65, the connecting wire 25, the sixth winding wire 66, the connecting wire 25, the seventh winding wire 67, the connecting wire 25, the eighth winding wire 68, the connecting wire 25, the ninth winding wire 69, and the connecting wire 25 are formed in this order in a series by the first conductive wire 110. Additionally, each connecting wire of the connecting wires 25 which connect the first to ninth winding wires (61 to 69) together is electrically and mechanically connected to the risers 15 formed by a pair of segments 14 and 14 which is arranged at facing positions which are point symmetric with respect to each other about the rotary shaft 5.

The first to ninth winding wires (61 to 69) have a first coil winding wire 7A and a second coil winding wire 7B which are each connected in series to each other. Additionally, the first coil winding wire 7A is wound 12 times so as to surround four teeth 9 adjacent to each other. The second coil winding wire 7B is arranged at a position adjacent in the right direction D1 to the four teeth 9 around which the first coil winding wire 7A is wound with one tooth 9 therebetween, and is wound 12 times so as to surround three other teeth 9 which are adjacent to each other. Here, the winding direction of the second coil winding wire 7B is opposite to the winding direction of the first coil winding wire 7A.

An end 30 of the first coil winding wire 7A is connected to one segment 14 of the commutator 13, and an end 31 of the second coil winding wire 7B is connected to the segment 14 adjacent to the segment 14 to which the end 30 of the first coil winding wire 7A is connected. Here, as described above, the second coil winding wire 7B is arranged in the right direction D1 with respect to the first coil winding wire 7A, while the end 31 is connected to the segment 14 arranged in the left direction D2 with respect to the segment 14 to which the end 30 is connected.

More specifically, the first winding wire 61 formed by the first conductive wire 110 has a first coil winding wire 7A and a second coil winding wire 7B, and the first coil winding wire 7A is joined in a series to a connecting wire 25*a* similarly formed from the first conductive wire 110, while the second coil winding wire 7B is joined in a series to a connecting wire 25*b* similarly formed from the first conductive wire 110.

An end 40 which is a starting point of the connecting wire 25*a* formed from the first conductive wire 110 is electrically and mechanically connected to the riser 15 formed at the No. 8 segment 14, and as for the connecting wire 25*a*, an end 41 which is disposed in the left direction D2 and is an end point of the connecting wire 25*a* is electrically and mechanically connected to the riser 15 formed at the No. 17 segment 14. Here, the No. 8 segment 14 and the No. 17 segment 14 are arranged at positions which are point symmetric about the rotary shaft 5. The end 41 of the connecting wire 25*a* and the end 30 which is the starting point of the first coil winding wire 7A are joined together in a series, and the first coil winding wire 7A formed by the first conductive wire 110 is wound around the teeth 9 after being connected to the end 30.

The first coil winding wire 7A passes through a slit 11 formed between the No. 5 tooth 9 and the No. 9 tooth 9 and a slit 11 formed between the No. 9 tooth 9 and the No. 10 tooth 9, and is wound 12 times clockwise so as to surround the No. 6 tooth 9 to the No. 9 tooth 9 which are close to each other.

Next, the arrangement of the second coil winding wire 7B, which is formed from the first conductive wire 110 similarly to the first coil winding wire 7A and is connected in series to the first coil winding wire 7A, will be described below.

The second coil winding wire 7B passes through a slit 11 formed between the No. 13 tooth 9 and the No. 14 tooth 9 and the slit 11 formed between the No. 10 tooth 9 and the No. 11 tooth 9, and is wound 12 times in a counterclockwise direction opposite to the winding direction of the first coil winding wire 7A so as to surround the No. 11 tooth 9 to the No. 13 tooth 9 which are adjacent to the No. 6 tooth 9 to the No. 9 tooth 9 with the No. 10 tooth 9 therebetween and are close to each other. The second coil winding wire 7B is wound in a direction opposite to the first coil 7 winding wire 7A because the second coil winding wire 7B faces a magnetic pole having polarity (N pole in FIG. 29) different from the polarity (S pole in FIG. 29) of a magnetic pole which the first coil winding wire 7A faces.

The end 31 of the second coil winding wire 7B is connected to the riser 15 formed at the No. 16 segment 14 adjacent to the No. 17 segment 14 to which the end 30 of the first coil winding wire 7A is connected, in the opposite left direction D2. By performing connection in this way, the first coil winding wire 7A near the end 30 can be suppressed from the outside by the second coil winding wire 7B near the end 31, and winding thickening of the first winding wire 61 in this vicinity can be prevented.

The second winding wire 61 and the second winding wire 62 wound around the stator core 6 following the first winding wire 61 are joined together in a series by the connecting wire 25b formed by the first conductive wire 110. An end 42 which is a starting point of the connecting wire 25b and the end 31 of the second coil winding wire 7B provided at the first winding wire 61 are joined together in a series, and the end 42 is electrically and mechanically connected to the riser 15 of the No. 16 segment 14. Also, as for the connecting wire 25b, an end 43 which is disposed in the left direction D2 and is an end point of the connecting wire 25b is electrically and mechanically connected to the riser 15 of the No. 7 segment 14. Here, the No. 16 segment 14 and the No. 7 segment 14 are arranged at positions which are point symmetric about the rotary shaft 5.

The end 43 of the connecting wire 25b and the end 32, which is the starting point of the first coil winding wire 7A of the second winding wire 62 wound following the first winding wire 61, are joined together in a series. Also, the first coil winding wire 7A of the second winding wire 62 passes through the slit 11 formed between the No. 13 tooth 9 and the No. 14 tooth 9 and a slit 11 formed between a No. 17 tooth 9 and a No. 18 tooth 9, and is wound 12 times clockwise so as to surround the No. 14 tooth 9 to the No. 17 tooth 9. The same process as the aforementioned process is repeated below, and the armature core 6 includes the first to ninth winding wires (61 to 69), and nine connecting wires 25.

Accordingly, according to the above-described twelfth embodiment, the same effects as those of the aforementioned ninth embodiment can be exhibited.

Figure 31:
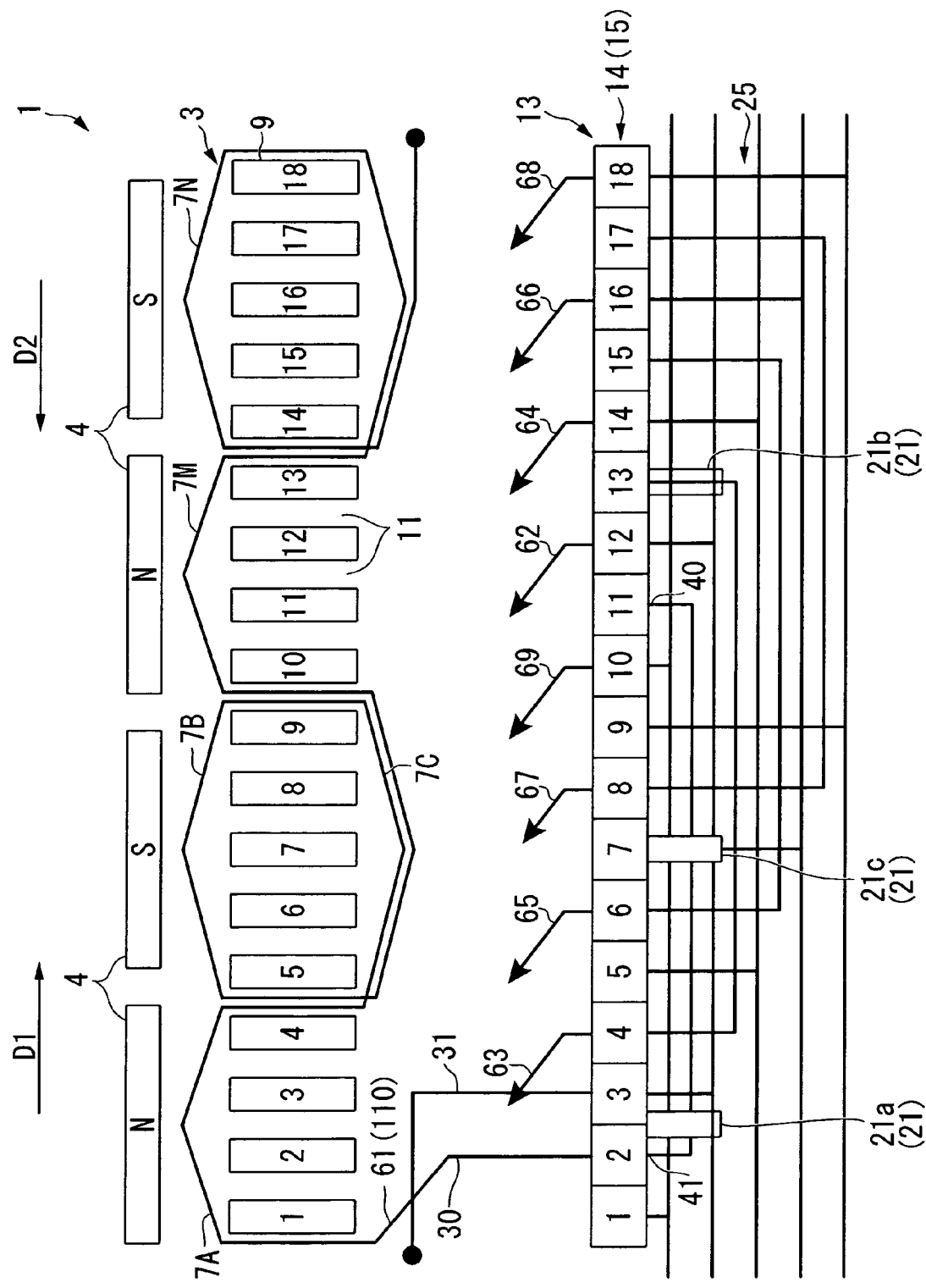
FIG. 31 is a developed view of an armature showing the winding state of an armature coil in a thirteenth embodiment of the invention.
Figure 32:
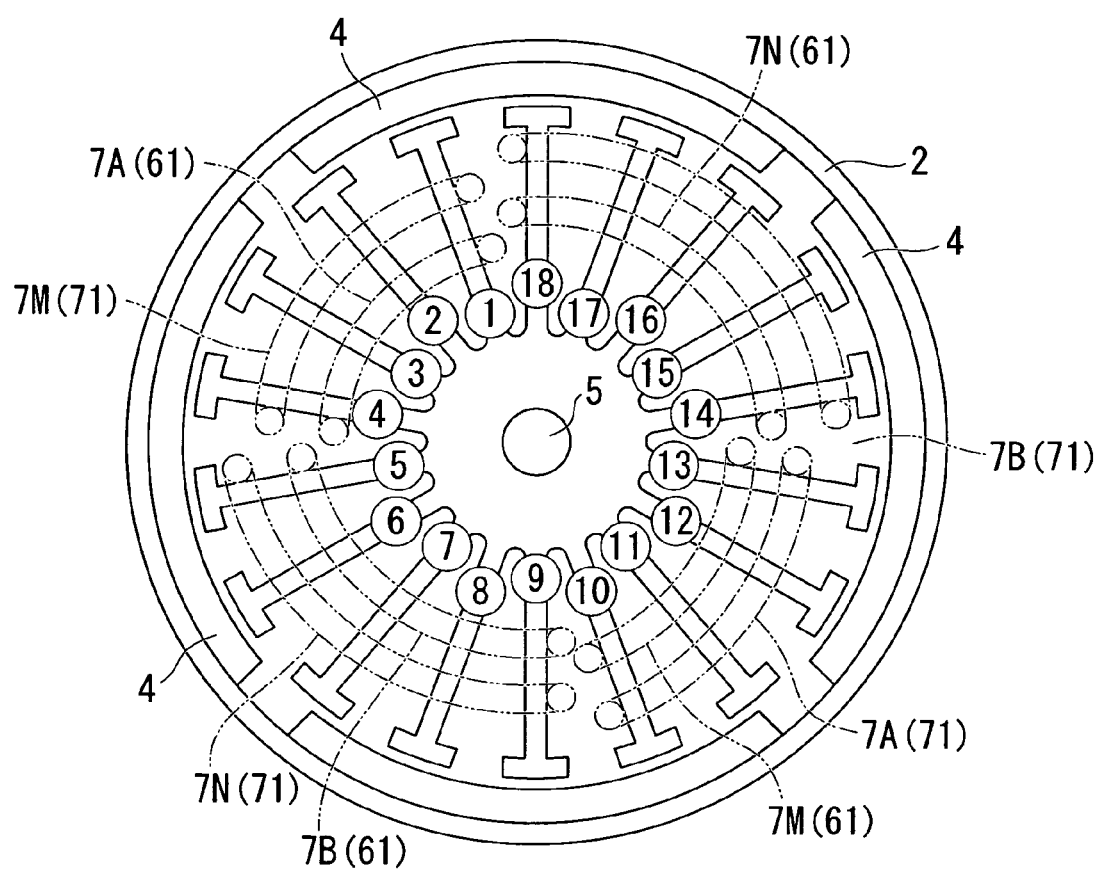
FIG. 32 is a top view of the armature showing the winding state of the armature coil in the thirteenth embodiment of the invention.

Next, the winding structure of the armature coil 7 provided in the electric motor 1 of a thirteenth embodiment of the present invention will be described with reference to FIGS. 31 and 32. FIG. 31 is a developed view of the armature, FIG. 32 is a transverse sectional view of the armature, and a gap between adjacent teeth 9 corresponds to the slot 11. Additionally, in FIGS. 31 and 32, the segments 14 of the commutator 13 and the teeth 9 are each numbered.

Here, in the electric motor 1 of the thirteenth embodiment of the present invention, each of the connecting wires 25 is electrically and mechanically connected to the risers 15 formed by a pair of segments 14 and 14 which is arranged at facing positions which are point symmetric about the rotary shaft 5. Each of the connecting wires 25 may be disposed over the whole circumference, or may be disposed at only half of the circumference.

Additionally, the first to ninth winding wires (61 to 69) have first to fourth coil winding wires (7A, 7B, 7M, and 7N) which are each connected in series to each other. The first to fourth coil winding wires (7A, 7B, 7M, and 7N) are respectively arranged at intervals of about 90° in mechanical angle, and the winding wires 12 are wound substantially over the whole circumference of the armature core 6. That is, the first to fourth coil winding wires (7A, 7B, 7M, and 7N) are respectively arranged at positions which can substantially simultaneously face four magnets 4 provided at the electric motor 1.

The first coil winding wire 7A is wound 6 times clockwise (forward direction) so as to surround four teeth 9 adjacent to each other. The second coil winding wire 7B is adjacent in the right direction D1 to the four teeth 9 around which the first coil winding wire 7A is wound and is wound 6 times counterclockwise (opposite direction) so as to surround five teeth 9 which are adjacent to each other.

The third coil winding wire 7M is adjacent in the right direction D1 to the five teeth 9 around which the second coil winding wire 7B is wound, and is wound 6 times clockwise (forward direction) so as to surround four teeth 9 which are adjacent to each other. The fourth coil winding wire 7N is adjacent in the right direction D1 to the four teeth 9 around which the third coil winding wire 7M is wound, and is wound 6 times counterclockwise (opposite direction) so as to surround five teeth 9 which are adjacent to each other. That is, the first and third coil winding wires (7A, 7M) are wound in the same direction, and the second and fourth coil winding wires (7B, 7N) are wound in a direction opposite to the first and third coil winding wires (7A, 7M).

An end 30 of the first coil winding wire 7A is connected to one segment 14 of the commutator 13, and an end 31 of the fourth coil winding wire 7N is connected to the segment 14 adjacent in the right direction D1 to the segment 14 to which the end 30 of the first coil winding wire 7A is connected.

More specifically, the first winding wire 61 formed by the first conductive wire 110 has first to fourth coil winding wires (7A, 7B, 7M, and 7N) which are each connected in series to each other.

The end 30 of the first coil winding wire 7A is connected to the No. 2 segment 14, and then passes through a slit 11 formed between the No. 18 tooth 9 and the No. 1 tooth 9 and a slit 11 formed between the No. 4 tooth 9 and the No. 5 tooth 9, and is wound 6 times clockwise so as to surround the No. 1 tooth 9 to the No. 4 tooth 9 which are close to each other.

The second coil winding wire 7B passes through a slit 11 formed between a No. 9 tooth 9 and a No. 10 tooth 9 and the slit 11 formed between the No. 4 tooth 9 and the No. 5 tooth 9, and is wound 6 times in a counterclockwise direction opposite to the winding direction of the first coil winding wire 7A so as to surround the No. 5 tooth 9 to the No. 9 tooth 9 which are adjacent to the No. 1 tooth 9 to the No. 4 tooth 9 and are close to each other. The second coil winding wire 7B is wound in a direction different from the first coil winding wire 7A because the second coil winding wire 7B faces a magnetic pole having polarity (S pole in FIG. 31) different from the polarity (N pole in FIG. 31) of a magnetic pole which the first coil winding wire 7A faces.

The third coil winding wire 7M passes through the slit 11 formed between the No. 9 tooth 9 and the No. 10 tooth 9 and the slit 11 formed between the No. 13 tooth 9 and the No. 14 tooth 9, and is wound 6 times in a clockwise direction (forward direction) opposite to the winding direction of the second coil winding wire 7B so as to surround the four No. 10 to No. 13 teeth 9 which are adjacent to the five No. 5 to No. 9 teeth 9 and are close to each other. The third coil winding wire 7M is wound in an opposite direction to the second coil winding wire 7B because the third coil winding wire 7M faces a magnetic pole having polarity (N pole in FIG. 31) different from the polarity (S pole in FIG. 31) of a magnetic pole which the second coil winding wire 7B faces.

The fourth coil winding wire 7N passes through a slit 11 formed between the No. 18 tooth 9 and the No. 1 tooth 9 and the slit 11 formed between the No. 13 tooth 9 and the No. 14 tooth 9, and is wound 6 times in a counterclockwise direction (opposite direction) opposite to the winding direction of the third coil winding wire 7M so as to surround the five No. 14 to No. 18 teeth 9 which are adjacent to the four No. 10 to No. 13 teeth 9 and are close to each other. The fourth coil winding wire 7N is wound in an opposite direction to the third coil winding wire 7M because the fourth coil winding wire 7N faces a magnetic pole having polarity (S pole in FIG. 31) different from the polarity (N pole in FIG. 31) of a magnetic pole which the third coil winding wire 7M faces.

That is, the first coil winding wire 7A and the third coil winding wire 7M are wound in the state of short pitch winding, while the second coil winding wire 7B and the third coil winding wire 7N are wound in the state of long pitch winding.

The end 31 of the fourth coil winding wire 7N is connected to the riser 15 formed at the No. 3 segment 14 adjacent in the right direction D1 to the No. 2 segment 14 to which the end 30 of the first coil winding wire 7A is connected. Also, the first to ninth winding wires (61 to 69) are formed at the armature core 6 by repeating this while deviating in the circumferential direction between the segments 14 and 14 which are adjacent to each other.

According to the thirteenth embodiment, in addition to the same effects as those of the aforementioned seventh embodiment, four coil winding wires 7A to 7N which are connected in series to each other are wound over the whole circumference. Thus, the magnetic balance can be further improved.

Figure 33:
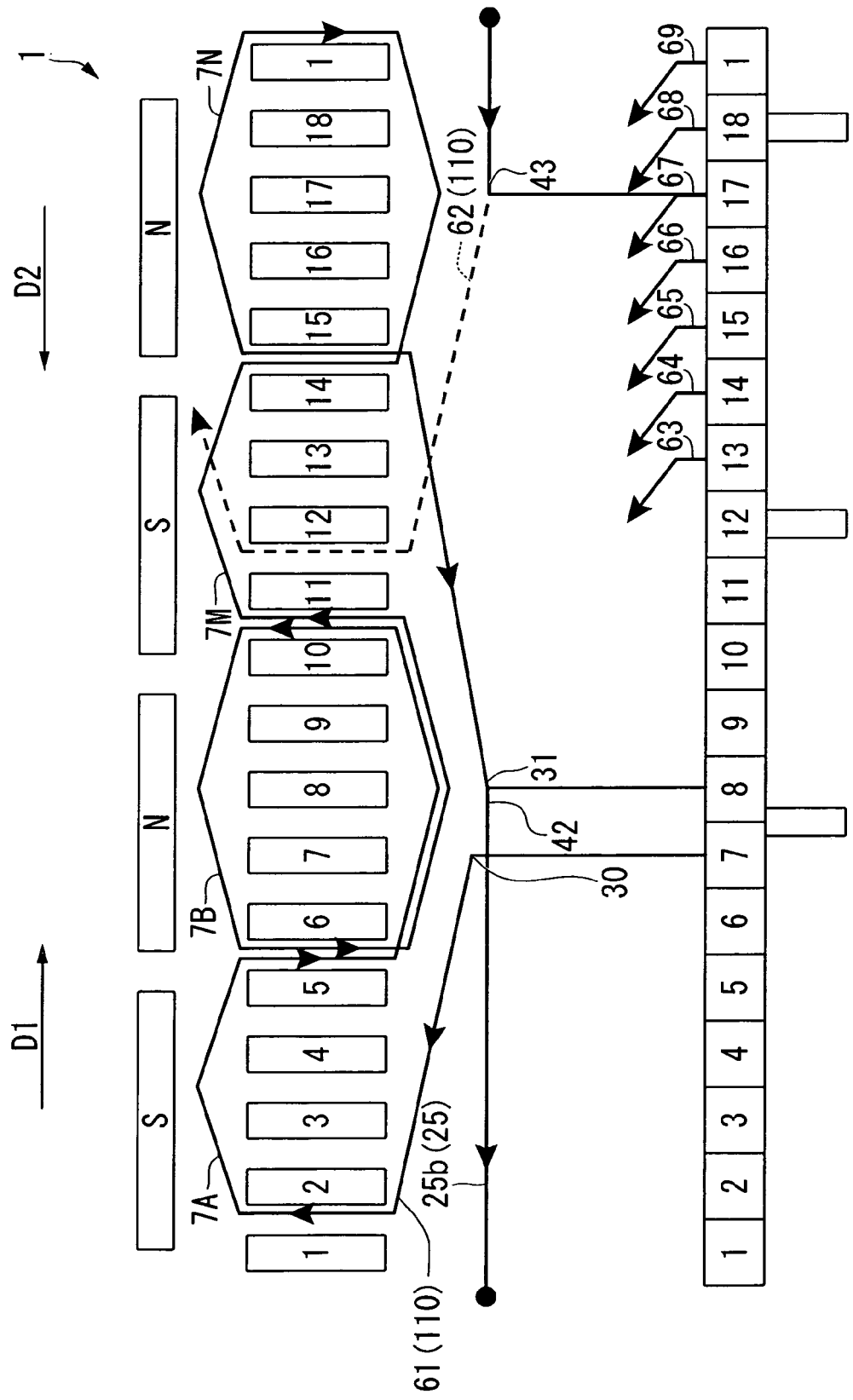
FIG. 33 is a developed view of an armature showing the winding state of an armature coil in a fourteenth embodiment of the invention.
Figure 34:
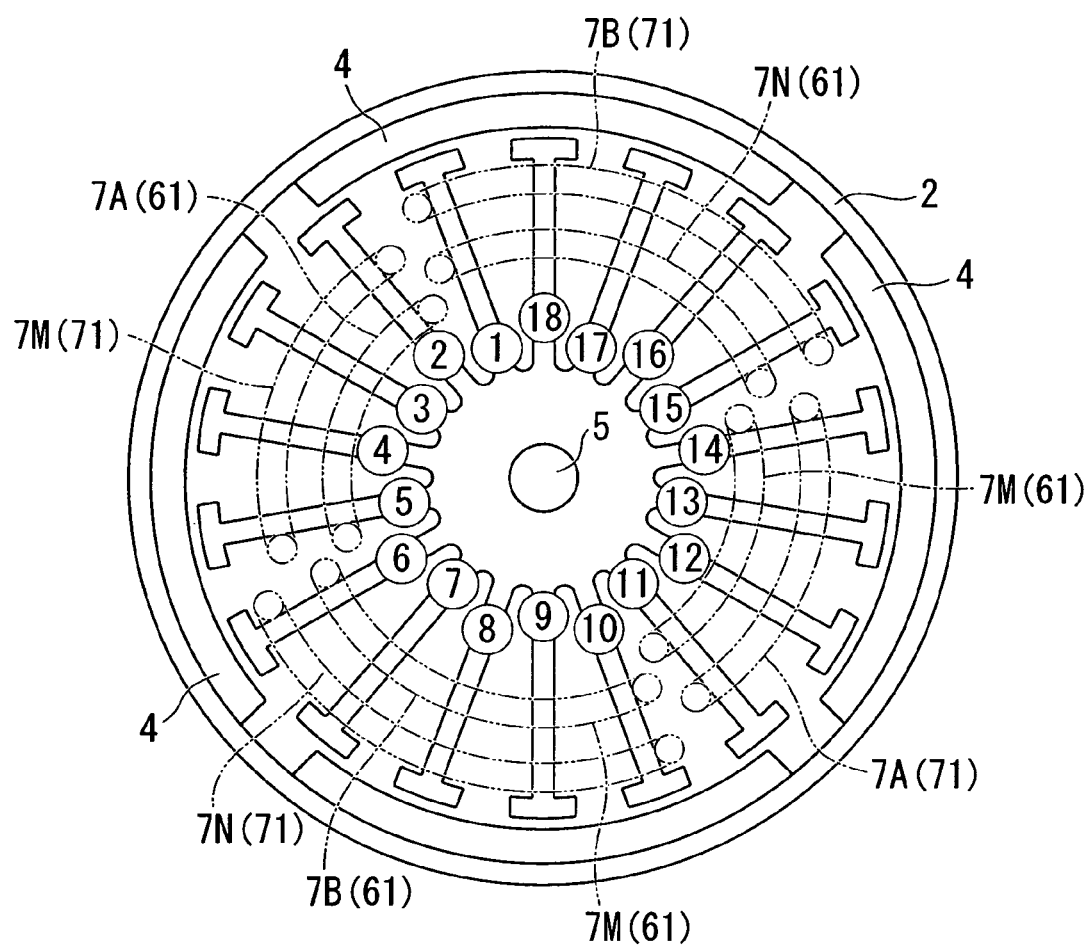
FIG. 34 is a top view of the armature showing the winding state of the armature coil in the fourteenth embodiment of the invention.

Next, the winding structure of the armature coil 7 provided in the electric motor 1 of a fourteenth embodiment of the present invention will be described with reference to FIGS. 33 and 34. FIG. 33 is a developed view of the armature, FIG. 34 is a transverse sectional view of the armature, and a gap between adjacent teeth 9 corresponds to the slot 11. Additionally, in FIGS. 33 and 34, the segments 14 of the commutator 13 and the teeth 9 are each numbered.

Here, in the electric motor 1 of the fourteenth embodiment of the present invention, the first to ninth winding wires (61 to 69) and the connecting wires 25 which join the first to ninth winding wires together in a series are formed by the first conductive wire 110, and the other first to ninth winding wires (71 to 79) and the connecting wires 25 which join the other first to ninth winding wires together in a series are formed by the second conductive wire 120.

The first to ninth winding wires (61 to 69) are joined together in a series via nine connecting wires 25 which are similarly formed from the first conductive wire 110. That is, the first winding wire 61, the connecting wire 25, the second winding wire 62, the connecting wire 25, the third winding wire 63, the connecting wire 25, the fourth winding wire 64, the connecting wire 25, the fifth winding wire 65, the connecting wire 25, the sixth winding wire 66, the connecting wire 25, the seventh winding wire 67, the connecting wire 25, the eighth winding wire 68, the connecting wire 25, the ninth winding wire 69, and the connecting wire 25 are formed in this order in a series by the first conductive wire 110. Additionally, each connecting wire of the connecting wires 25 which connect the first to ninth winding wires (61 to 69) together is electrically and mechanically connected to the risers 15 formed by a pair of segments 14 and 14 which is arranged at positions which are point symmetric with respect to each other about the rotary shaft 5.

The first to ninth winding wires (61 to 69) have first to fourth coil winding wires (7A, 7B, 7M, and 7N) which are each connected in series to each other. The first to fourth coil winding wires (7A, 7B, 7M, and 7N) are respectively arranged at intervals of about 90° in mechanical angle, and the winding wires 12 are wound substantially over the whole circumference of the armature core 6. That is, the first to fourth coil winding wires (7A, 7B, 7M, and 7N) are respectively arranged at positions which can substantially simultaneously face four magnets 4 provided at the electric motor 1.

The first coil winding wire 7A is wound 6 times clockwise (forward direction) so as to surround four teeth 9 adjacent to each other. The second coil winding wire 7B is adjacent in the right direction D1 to the four teeth 9 around which the first coil winding wire 7A is wound, and is wound 6 times counterclockwise (opposite direction) so as to surround five teeth 9 which are adjacent to each other.

The third coil winding wire 7M is adjacent in the right direction D1 to the five teeth 9 around which the second coil winding wire 7B is wound, and is wound 6 times clockwise (forward direction) so as to surround four teeth 9 which are adjacent to each other. The fourth coil winding wire 7N is adjacent in the right direction D1 to the four teeth 9 around which the third coil winding wire 7M is wound, and is wound 6 times counterclockwise (opposite direction) so as to surround five teeth 9 which are adjacent to each other. That is, the first and third coil winding wires (7A, 7M) are wound in the same direction, and the second and fourth coil winding wires (7B, 7N) are wound in a direction opposite to the first and third coil winding wires (7A, 7M).

An end 30 of the first coil winding wire 7A is connected to one segment 14 of the commutator 13, and an end 31 of the fourth coil winding wire 7N is connected to the segment 14 adjacent in the right direction D1 to the segment 14 to which the end 30 of the first coil winding wire 7A is connected.

More specifically, the first winding wire 61 formed by the first conductive wire 110 has first to fourth coil winding wires (7A, 7B, 7M, and 7N) which are each connected in series to each other, and the fourth coil winding wire 7N is joined in a series to the connecting wire 25b similarly formed from the first conductive wire 110.

The first coil winding wire 7A is connected to the No. 7 segment 14, and then passes through a slit 11 formed between the No. 1 tooth 9 and the No. 2 tooth 9 and a slit 11 formed between the No. 5 tooth 9 and the No. 6 tooth 9, and is wound 6 times clockwise (forward direction) so as to surround the No. 2 tooth 9 to the No. 5 tooth 9 which are close to each other.

Next, the arrangement of the second coil winding wire 7B which is connected in series to the first coil winding wire 7A will be described below.

The second coil winding wire 7B passes through a slit 11 formed between a No. 10 tooth 9 and a No. 11 tooth 9 and the slit 11 formed between the No. 5 tooth 9 and the No. 6 tooth 9, and is wound 6 times in a counterclockwise direction (opposite direction) opposite to the winding direction of the first coil winding wire 7A so as to surround the five No. 6 to No. 10 teeth 9 which are adjacent to the No. 2 to No. 5 teeth 9 in the right direction D1 and are close to each other. The second coil winding wire 7B is wound in a direction opposite to the first coil winding wire 7A because the second coil winding wire 7B faces a magnetic pole having polarity (S pole in FIG. 33) different from the polarity (N pole in FIG. 33) of a magnetic pole which the first coil winding wire 7A faces.

Next, the arrangement of the third coil winding wire 7M which is connected in series to the second coil winding wire 7B will be described below.

The third coil winding wire 7M passes through the slit 11 formed between the No. 10 tooth 9 and the No. 11 tooth 9 and the slit 11 formed between the No. 14 tooth 9 and the No. 15 tooth 9, and is wound 6 times in a clockwise direction (forward direction) opposite to the winding direction of the second coil winding wire 7B so as to surround the four No. 11 to No. 14 teeth 9 which are adjacent to the five No. 6 to No. 10 teeth 9 and are close to each other. The third coil winding wire 7M is wound in an opposite direction to the second coil winding wire 7B because the third coil winding wire 7M faces a magnetic pole having polarity (N pole in FIG. 33) different from the polarity (S pole in FIG. 33) of a magnetic pole which the second coil winding wire 7B faces.

Next, the arrangement of the fourth coil winding wire 7N which is connected in series to the third coil winding wire 7M will be described below.

The fourth coil winding wire 7N passes through a slit 11 formed between the No. 18 tooth 9 and the No. 1 tooth 9 and the slit 11 formed between the No. 14 tooth 9 and the No. 15 tooth 9, and is wound 6 times in a counterclockwise direction (opposite direction) opposite to the winding direction of the third coil winding wire 7M so as to surround the five No. 15 to No. 1 teeth 9 which are adjacent to the four No. 11 to No. 14 teeth 9 in the right direction D1 and are close to each other. The fourth coil winding wire 7N is wound in a direction opposite to the third coil winding wire 7M because the fourth coil winding wire 7N faces a magnetic pole having polarity (S pole in FIG. 33) different from the polarity (N pole in FIG. 33) of a magnetic pole which the third coil winding wire 7M faces.

The end 31 of the fourth coil winding wire 7N is connected to the riser 15 formed at the No. 8 segment 14 adjacent in the right direction D1 to the No. 7 segment 14 to which the end 30 of the first coil winding wire 7A is connected.

Here, the end 30 of the first coil winding wire 7A and the end 31 of the fourth coil winding wire 7N are each connected to the segments 14, so as to be each held and rotated around a portion of the rotary shaft 5. For this reason, the respective ends 30 and 31 are brought into a twisted state at the neck of the commutator 13, and winding thickening can be reduced.

The first winding wire 61 and the second winding wire 62 wound around the armature core 6 following the first winding wire 61 are joined together in a series by the connecting wire 25b formed by the first conductive wire 110. An end 42 which is a starting point of the connecting wire 25b and the end 31 of the fourth coil winding wire 7N provided at the first winding wire 61 are joined together in a series, and the end 42 is electrically and mechanically connected to the riser 15 of the No. 8 segment 14. Also, as for the connecting wire 25b, an end 43 which is disposed in the left direction D2 and is an end point of the connecting wire 25b is electrically and mechanically connected to a riser 15 formed at a No. 17 segment 14. Here, the No. 8 segment 14 and the No. 17 segment 14 are arranged at positions which are point symmetric about the rotary shaft 5.

The end 43 of the connecting wire 25b and the end 32, which is the starting point of the first coil winding wire 7A of the second winding wire 62 wound following the first winding wire 61, are joined together in a series. Also, the first coil winding wire 7A of the second winding wire 62 passes through a slit 11 formed between the No. 11 tooth 9 and the No. 12 tooth 9 and the slit 11 formed between the No. 15 tooth 9 and the No. 16 tooth 9, and is wound 6 times clockwise so as to surround the four No. 12 to No. 15 teeth 9. The same process as the aforementioned process is repeated below, and the armature core 6 includes the first to ninth winding wires (61 to 69), and nine connecting wires 25.

Therefore, according to the above-described fourteenth embodiment, the same effects as those of the aforementioned thirteenth embodiment can be exhibited. In addition to this, compared to a case where connecting wires are disposed in advance at the commutator 13, and then, winding wires are disposed, the time of winding work is shortened, and mounting of the connecting wires and winding wires to the armature core and commutator 13 cam be simplified.

Figure 35:
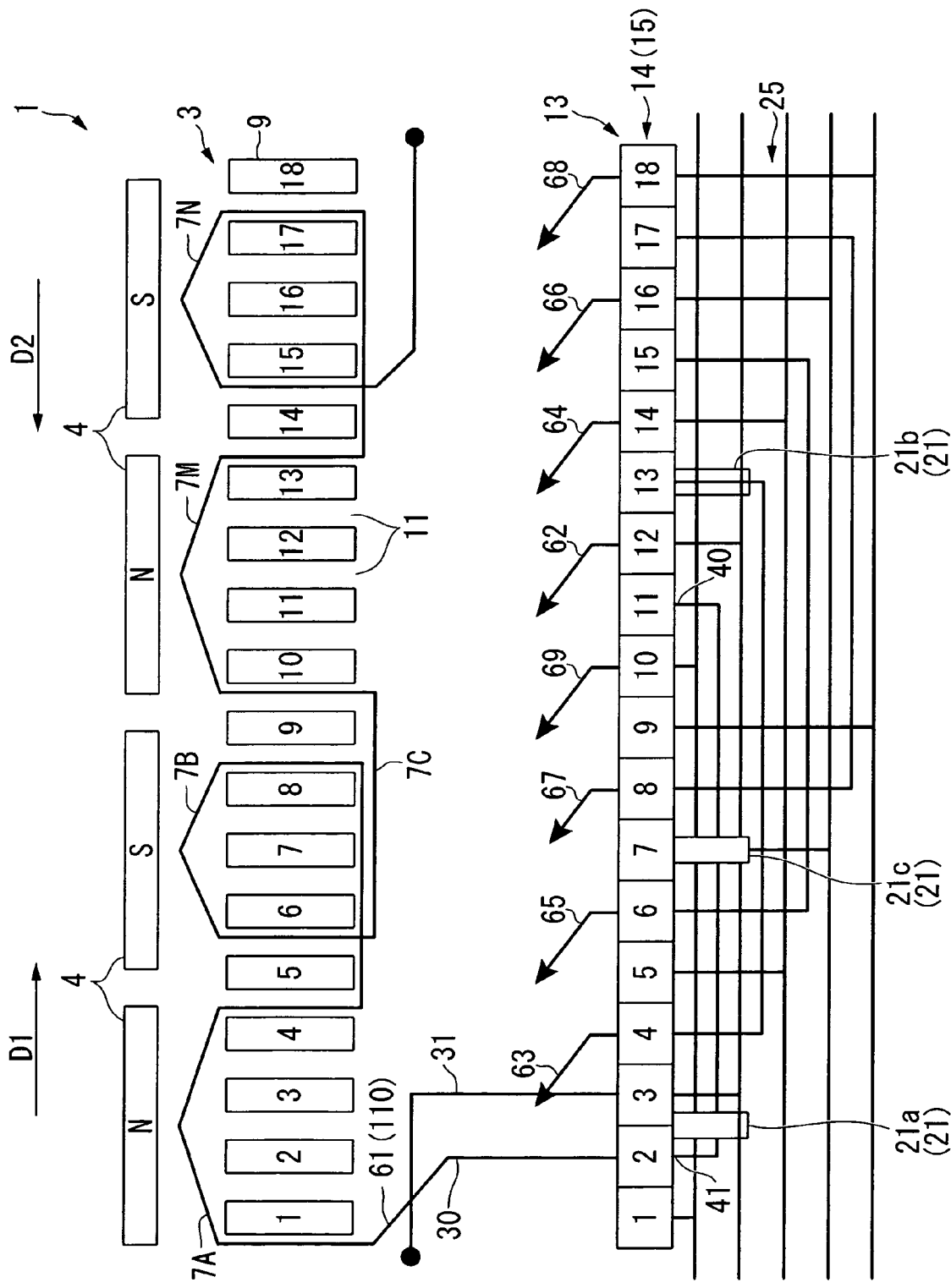
FIG. 35 is a developed view of an armature showing the winding state of an armature coil in a fifteenth embodiment of the invention.
Figure 36:
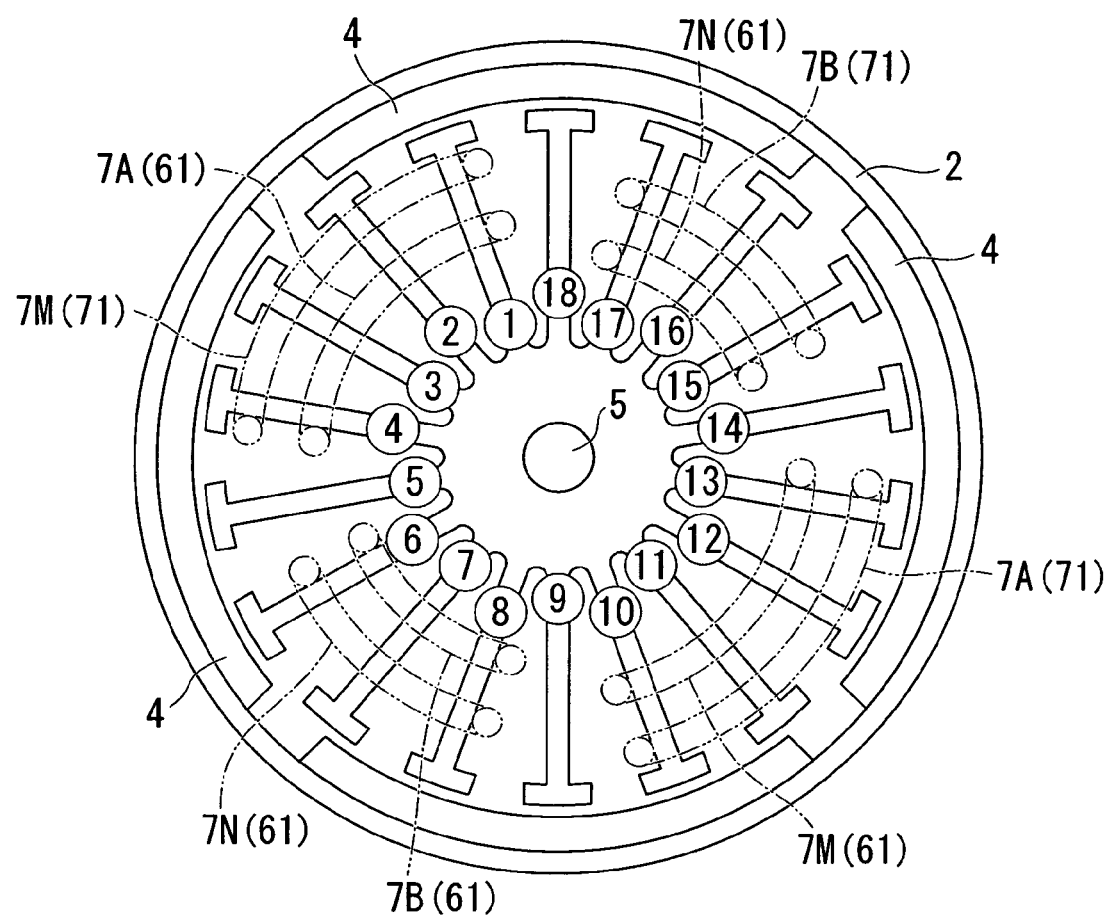
FIG. 36 is a top view of the armature showing the winding state of the armature coil in the fifteenth embodiment of the invention.

Next, the winding structure of the armature coil 7 provided in the electric motor 1 of a fifteenth embodiment of the present invention will be described with reference to FIGS. 35 and 36. FIG. 35 is a developed view of the armature, FIG. 36 is a transverse sectional view of the armature, and a gap between adjacent teeth 9 corresponds to the slot 11. Additionally, in FIGS. 35 and 36, the segments 14 of the commutator 13 and the teeth 9 are each numbered.

Here, in the electric motor 1 of the fifteenth embodiment of the present invention, each of the connecting wires 25 is electrically and mechanically connected to the risers 15 formed by a pair of segments 14 and 14 which is arranged at facing positions which are point symmetric about the rotary shaft 5. Each of the connecting wires 25 may be disposed over the whole circumference, or may be disposed at only half of the circumference.

Additionally, the first to ninth winding wires (61 to 69) have first to fourth coil winding wires (7A, 7B, 7M, and 7N) which are each connected in series to each other. The first to fourth coil winding wires (7A, 7B, 7M, and 7N) are respectively arranged at intervals of about 90° in mechanical angle, and the winding wires 12 are wound substantially over the whole circumference of the armature core 6. That is, the first to fourth coil winding wires (7A, 7B, 7M, and 7N) are respectively arranged at positions which can substantially simultaneously face four magnets 4 provided at the electric motor 1.

The first coil winding wire 7A is wound 6 times clockwise (forward direction) so as to surround four teeth 9 adjacent to each other. The second coil winding wire 7B is adjacent in the right direction D1 to the four teeth 9 around which the first coil winding wire 7A is wound with one tooth 9 therebetween, and is wound 6 times counterclockwise (opposite direction) so as to surround three teeth 9 which are adjacent to each other.

The third coil winding wire 7M is arranged at a position adjacent in the right direction D1 to the three teeth 9 around which the second coil winding wire 7B is wound with one tooth 9 therebetween, and is wound 6 times clockwise (forward direction) so as to surround four teeth 9 which are adjacent to each other. The fourth coil winding wire 7N is adjacent in the right direction D1 to the four teeth 9 around which the third coil winding wire 7M is wound with one tooth 9 therebetween, and is wound 6 times counterclockwise (opposite direction) so as to surround three teeth 9 which are adjacent to each other. That is, the first and third coil winding wires (7A, 7M) are wound in the same direction, and the second and fourth coil winding wires (7B, 7N) are wound in a direction opposite to the first and third coil winding wires (7A, 7M).

An end 30 of the first coil winding wire 7A is connected to one segment 14 of the commutator 13, and an end 31 of the fourth coil winding wire 7N is connected to the segment 14 adjacent in the right direction D1 to the segment 14 to which the end 30 of the first coil winding wire 7A is connected.

More specifically, the first winding wire 61 formed by the first conductive wire 110 has first to fourth coil winding wires (7A, 7B, 7M, and 7N) which are each connected in series to each other.

The end 30 of the first coil winding wire 7A is connected to the No. 2 segment 14, and then passes through a slit 11 formed between the No. 18 tooth 9 and the No. 1 tooth 9 and a slit 11 formed between the No. 4 tooth 9 and the No. 5 tooth 9, and is wound 6 times clockwise so as to surround the No. 1 tooth 9 to the No. 4 tooth 9 which are close to each other.

The second coil winding wire 7B passes through a slit 11 formed between the No. 8 tooth 9 and the No. 9 tooth 9 and the slit 11 formed between the No. 5 tooth 9 and the No. 6 tooth 9, and is wound 6 times in a counterclockwise direction opposite to the winding direction of the first coil winding wire 7A so as to surround the No. 6 tooth 9 to the No. 8 tooth 9 which are adjacent to the No. 1 tooth 9 to the No. 4 tooth 9 with the No. 5 tooth 9 therebetween and are close to each other. The second coil winding wire 7B is wound in a direction different from the first coil winding wire 7A because the second coil winding wire 7B faces a magnetic pole having polarity (S pole in FIG. 35) different from the polarity (N pole in FIG. 35) of a magnetic pole which the first coil winding wire 7A faces.

The third coil winding wire 7M passes through the slit 11 formed between the No. 9 tooth 9 and the No. 10 tooth 9 and the slit 11 formed between the No. 13 tooth 9 and the No. 14 tooth 9, and is wound 6 times in a clockwise direction (forward direction) opposite to the winding direction of the second coil winding wire 7B so as to surround the four No. 10 to No. 13 teeth 9 which are adjacent to the three No. 6 to No. 8 teeth 9 with the No. 9 tooth 9 therebetween and are close to each other. The third coil winding wire 7M is wound in an opposite direction to the second coil winding wire 7B because the third coil winding wire 7M faces a magnetic pole having polarity (N pole in FIG. 35) different from the polarity (S pole in FIG. 35) of a magnetic pole which the second coil winding wire 7B faces.

The fourth coil winding wire 7N passes through the slit 11 formed between the No. 17 tooth 9 and the No. 18 tooth 9 and the slit 11 formed between the No. 14 tooth 9 and the No. 15 tooth 9, and is wound 6 times in a counterclockwise direction (opposite direction) opposite to the winding direction of the third coil winding wire 7M so as to surround the three No. 15 to No. 17 teeth 9 which are adjacent to the four No. 10 to No. 13 teeth 9 with the No. 14 tooth 9 therebetween and are close to each other. The fourth coil winding wire 7N is wound in an opposite direction to the third coil winding wire 7M because the fourth coil winding wire 7N faces a magnetic pole having polarity (S pole in FIG. 35) different from the polarity (N pole in FIG. 35) of a magnetic pole which the third coil winding wire 7M faces.

That is, all the first to fourth coil winding wires (7A, 7B, 7M, and 7N) are wound in the state of short pitch winding.

The end 31 of the fourth coil winding wire 7N is connected to the riser 15 formed at the No. 3 segment 14 adjacent in the right direction D1 to the No. 2 segment 14 to which the end 30 of the first coil winding wire 7A is connected. Also, the first to ninth winding wires (61 to 69) are formed at the armature core 6 by repeating this while deviating in the circumferential direction between the segments 14 and 14 which are adjacent to each other.

According to the fifteenth embodiment, the first to fourth coil winding wires 7A to 7N are in the state of short pitch winding. However, in the aforementioned thirteenth embodiment, the magnets 4 are in the state of being accommodated within a range of long pitch winding. Thus, the same effects as those of the aforementioned thirteenth embodiment can be exhibited.

Figure 37:
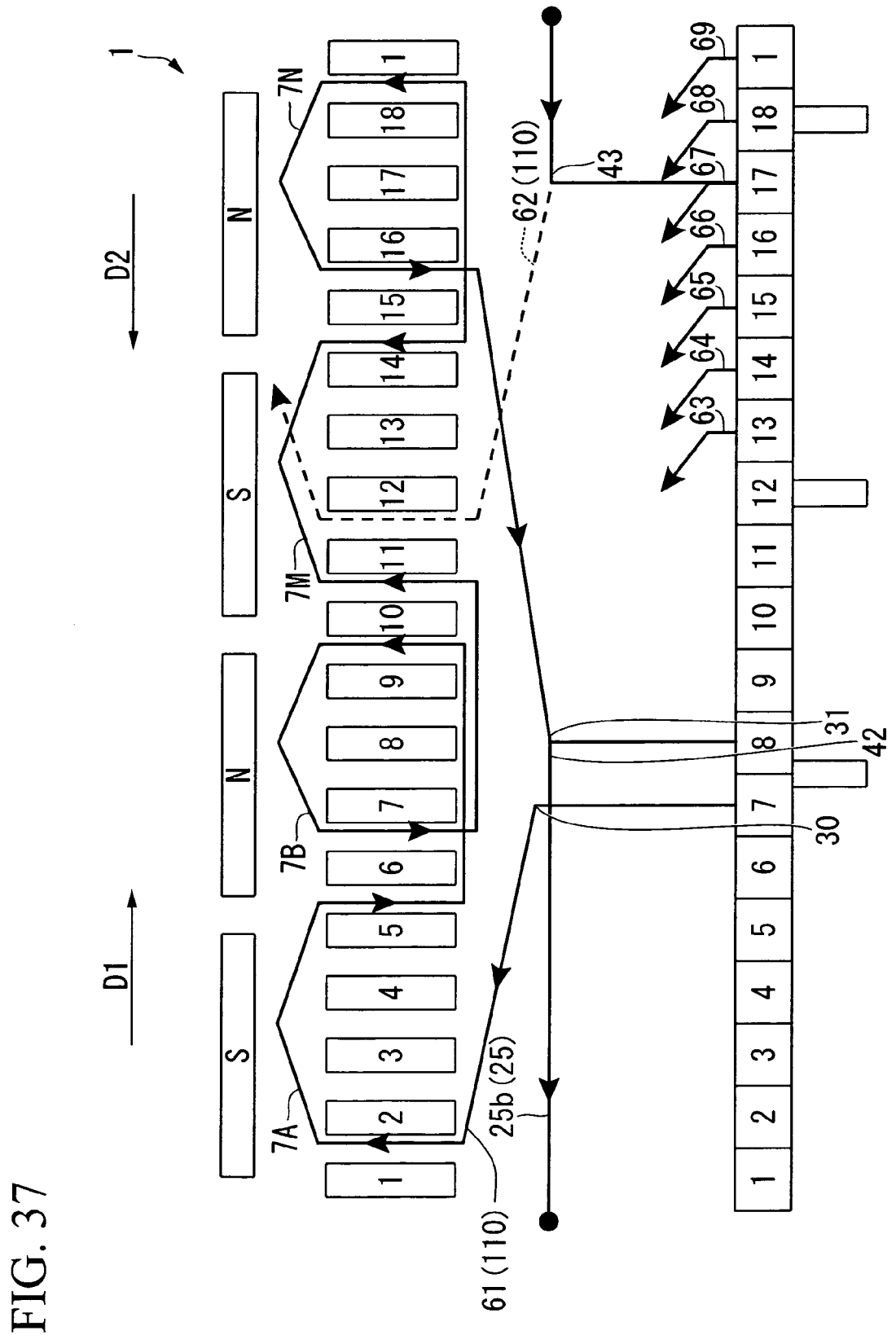
FIG. 37 is a developed view of an armature showing the winding state of an armature coil in a sixteenth embodiment of the invention.
Figure 38:
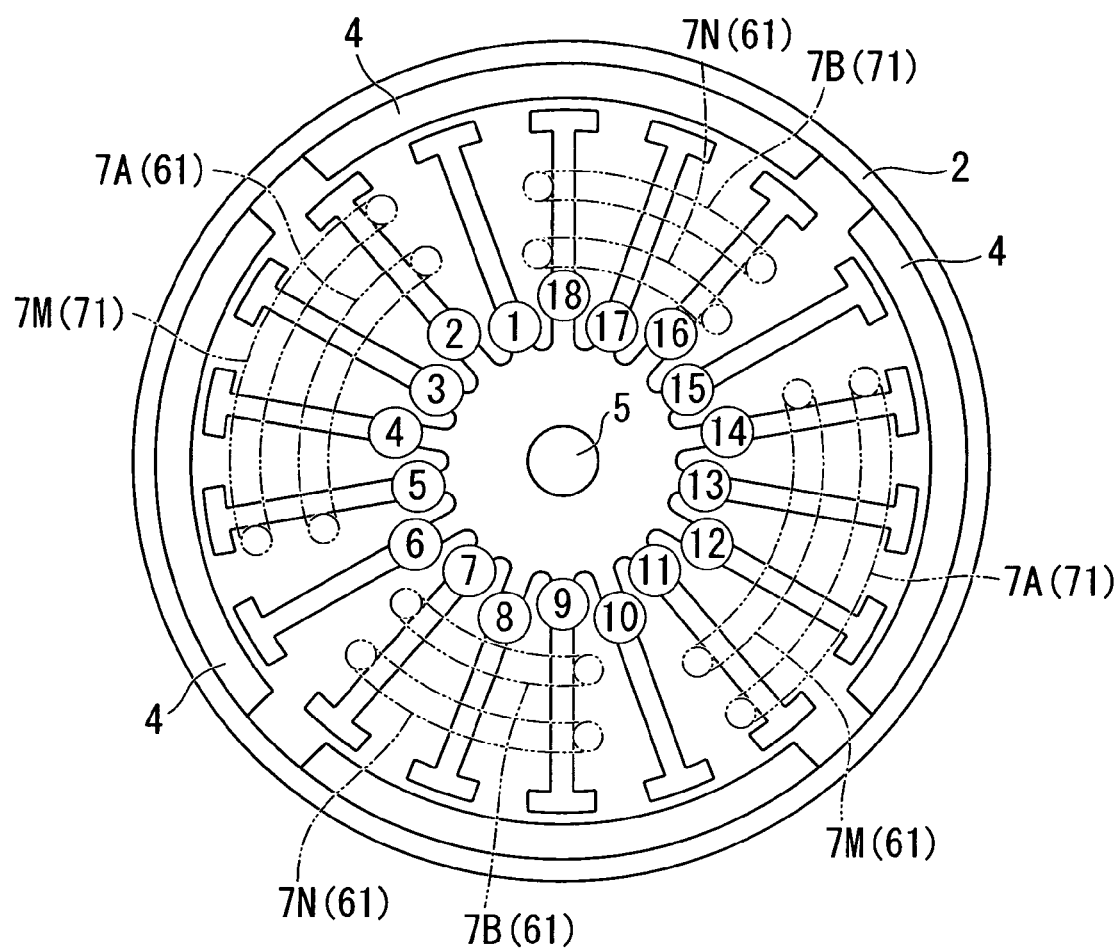
FIG. 38 is a top view of the armature showing the winding state of the armature coil in the sixteenth embodiment of the invention.

Next, the winding structure of the armature coil 7 provided in the electric motor 1 of a sixteenth embodiment of the present invention will be described with reference to FIGS. 37 and 38. FIG. 37 is a developed view of the armature, FIG. 38 is a transverse sectional view of the armature, and a gap between adjacent teeth 9 corresponds to the slot 11. Additionally, in FIGS. 37 and 38, the segments 14 of the commutator 13 and the teeth 9 are each numbered.

Here, in the electric motor 1 of the sixteenth embodiment of the present invention, the first to ninth winding wires (61 to 69) and the connecting wires 25 which join the first to ninth winding wires together in a series are formed by the first conductive wire 110, and the other first to ninth winding wires (71 to 79) and the connecting wires 25 which join the other first to ninth winding wires together in a series are formed by the second conductive wire 120.

The first to ninth winding wires (61 to 69) are joined together in a series via nine connecting wires 25 which are similarly formed from the first conductive wire 110. That is, the first winding wire 61, the connecting wire 25, the second winding wire 62, the connecting wire 25, the third winding wire 63, the connecting wire 25, the fourth winding wire 64, the connecting wire 25, the fifth winding wire 65, the connecting wire 25, the sixth winding wire 66, the connecting wire 25, the seventh winding wire 67, the connecting wire 25, the eighth winding wire 68, the connecting wire 25, the ninth winding wire 69, and the connecting wire 25 are formed in this order in a series by the first conductive wire 110. Additionally, each connecting wire of the connecting wires 25 which connect the first to ninth winding wires (61 to 69) together is electrically and mechanically connected to the risers 15 formed by a pair of segments 14 and 14 which is arranged at positions which are point symmetric with respect to each other about the rotary shaft 5.

The first to ninth winding wires (61 to 69) have first to fourth coil winding wires (7A, 7B, 7M, and 7N) which are each connected in series to each other. The first to fourth coil winding wires (7A, 7B, 7M, and 7N) are respectively arranged at intervals of about 90° in mechanical angle, and the winding wires 12 are wound substantially over the whole circumference of the armature core 6. That is, the first to fourth coil winding wires (7A, 7B, 7M, and 7N) are respectively arranged at positions which can substantially simultaneously face four magnets 4 provided at the electric motor 1.

The first coil winding wire 7A is wound 6 times clockwise (forward direction) so as to surround four teeth 9 adjacent to each other. The second coil winding wire 7B is adjacent in the right direction D1 to the four teeth 9 around which the first coil winding wire 7A is wound with one tooth 9 therebetween, and is wound 6 times counterclockwise (opposite direction) so as to surround three teeth 9 which are adjacent to each other.

The third coil winding wire 7M is arranged at a position adjacent in the right direction D1 to the three teeth 9 around which the second coil winding wire 7B is wound with one tooth 9 therebetween, and is wound 6 times clockwise (forward direction) so as to surround four teeth 9 which are adjacent to each other. The fourth coil winding wire 7N is adjacent in the right direction D1 to the four teeth 9 around which the third coil winding wire 7M is wound with one tooth 9 therebetween, and is wound 6 times counterclockwise (opposite direction) so as to surround three teeth 9 which are adjacent to each other. That is, the first and third coil winding wires (7A, 7M) are wound in the same direction, and the second and fourth coil winding wires (7B, 7N) are wound in a direction opposite to the first and third coil winding wires (7A, 7M).

An end 30 of the first coil winding wire 7A is connected to one segment 14 of the commutator 13, and an end 31 of the fourth coil winding wire 7N is connected to the segment 14 adjacent in the right direction D1 to the segment 14 to which the end 30 of the first coil winding wire 7A is connected.

More specifically, the first winding wire 61 formed by the first conductive wire 110 has first to fourth coil winding wires (7A, 7B, 7M, and 7N) which are each connected in series to each other, and the fourth coil winding wire 7N is joined in a series to the connecting wire 25b similarly formed from the first conductive wire 110.

The first coil winding wire 7A is connected to the No. 7 segment 14, and then passes through a slit 11 formed between the No. 1 tooth 9 and the No. 2 tooth 9 and a slit 11 formed between the No. 5 tooth 9 and the No. 6 tooth 9, and is wound 6 times clockwise (forward direction) so as to surround the No. 2 tooth 9 to the No. 5 tooth 9 which are close to each other.

Next, the arrangement of the second coil winding wire 7B which is connected in series to the first coil winding wire 7A will be described below.

The second coil winding wire 7B passes through the slit 11 formed between the No. 9 tooth 9 and the No. 10 tooth 9 and the slit 11 formed between the No. 6 tooth 9 and the No. 7 tooth 9, and is wound 6 times in a counterclockwise direction (opposite direction) opposite to the winding direction of the first coil winding wire 7A so as to surround the three No. 7 to No. 9 teeth 9 which are adjacent to the No. 2 to No. 5 teeth 9 in the right direction D1 with the No. 6 tooth 9 therebetween and are close to each other. The second coil winding wire 7B is wound in a direction opposite to the first coil winding wire 7A because the second coil winding wire 7B faces a magnetic pole having polarity (S pole in FIG. 37) different from the polarity (N pole in FIG. 37) of a magnetic pole which the first coil winding wire 7A faces.

Next, the arrangement of the third coil winding wire 7M which is connected in series to the second coil winding wire 7B will be described below.

The third coil winding wire 7M passes through the slit 11 formed between the No. 10 tooth 9 and the No. 11 tooth 9 and the slit 11 formed between the No. 14 tooth 9 and the No. 15 tooth 9, and is wound 6 times in a clockwise direction (forward direction) opposite to the winding direction of the second coil winding wire 7B so as to surround the four No. 11 to No. 14 teeth 9 which are adjacent to the three No. 7 to No. 9 teeth 9 with the No. 10 tooth 9 therebetween and are close to each other. The third coil winding wire 7M is wound in an opposite direction to the second coil winding wire 7B because the third coil winding wire 7M faces a magnetic pole having polarity (N pole in FIG. 37) different from the polarity (S pole in FIG. 37) of a magnetic pole which the second coil winding wire 7B faces.

Next, the arrangement of the fourth coil winding wire 7N which is connected in series to the third coil winding wire 7M will be described below.

The fourth coil winding wire 7N passes through the slit 11 formed between the No. 18 tooth 9 and the No. 1 tooth 9 and the slit 11 formed between the No. 15 tooth 9 and the No. 16 tooth 9, and is wound 6 times in a clockwise direction (forward direction) which is the same direction as the winding direction of the third coil winding wire 7M so as to surround the three No. 16 to No. 18 teeth 9 which are adjacent to the four No. 11 to No. 14 teeth 9 in the right direction D1 with the No. 15 tooth 9 therebetween and are close to each other. The fourth coil winding wire 7N is wound in a direction opposite to the third coil winding wire 7M because the fourth coil winding wire 7N faces a magnetic pole having polarity (S pole in FIG. 37) different from the polarity (N pole in FIG. 37) of a magnetic pole which the third coil winding wire 7M faces.

The end 31 of the fourth coil winding wire 7N is connected to the riser 15 formed at the No. 8 segment 14 adjacent in the right direction D1 to the No. 7 segment 14 to which the end 30 of the first coil winding wire 7A is connected.

Here, the end 30 of the first coil winding wire 7A and the end 31 of the fourth coil winding wire 7N are each connected to the segments 14, so as to each be held and rotated around a portion of the rotary shaft 5. For this reason, the respective ends 30 and 31 are brought into a twisted state at the neck of the commutator 13, and winding thickening can be reduced.

The first winding wire 61 and the second winding wire 62 wound around the armature core 6 following the first winding wire 61 are joined together in a series by the connecting wire 25b formed by the first conductive wire 110. An end 42 which is a starting point of the connecting wire 25b and the end 31 of the fourth coil winding wire 7N provided at the first winding wire 61 are joined together in a series, and the end 42 is electrically and mechanically connected to the riser 15 of the No. 8 segment 14. Also, as for the connecting wire 25b, an end 43 which is disposed in the left direction D2 and is an end point of the connecting wire 25b is electrically and mechanically connected to a riser 15 formed at a No. 17 segment 14. Here, the No. 8 segment 14 and the No. 17 segment 14 are arranged at positions which are point symmetric about the rotary shaft 5.

The end 43 of the connecting wire 25b and the end 32, which is the starting point of the first coil winding wire 7A of the second winding wire 62 wound following the first winding wire 61, are joined together in a series. Also, the first coil winding wire 7A of the second winding wire 62 passes through a slit 11 formed between the No. 11 tooth 9 and the No. 12 tooth 9 and the slit 11 formed between the No. 15 tooth 9 and the No. 16 tooth 9, and is wound 6 times clockwise so as to surround the four No. 12 to No. 15 teeth 9. The same process as the aforementioned process is repeated below, and the armature core 6 includes the first to ninth winding wires (61 to 69), and nine connecting wires 25.

Accordingly, according to the above-described sixteenth embodiment, the same effects as those of the aforementioned fourteenth embodiment can be exhibited.

Figure 39:
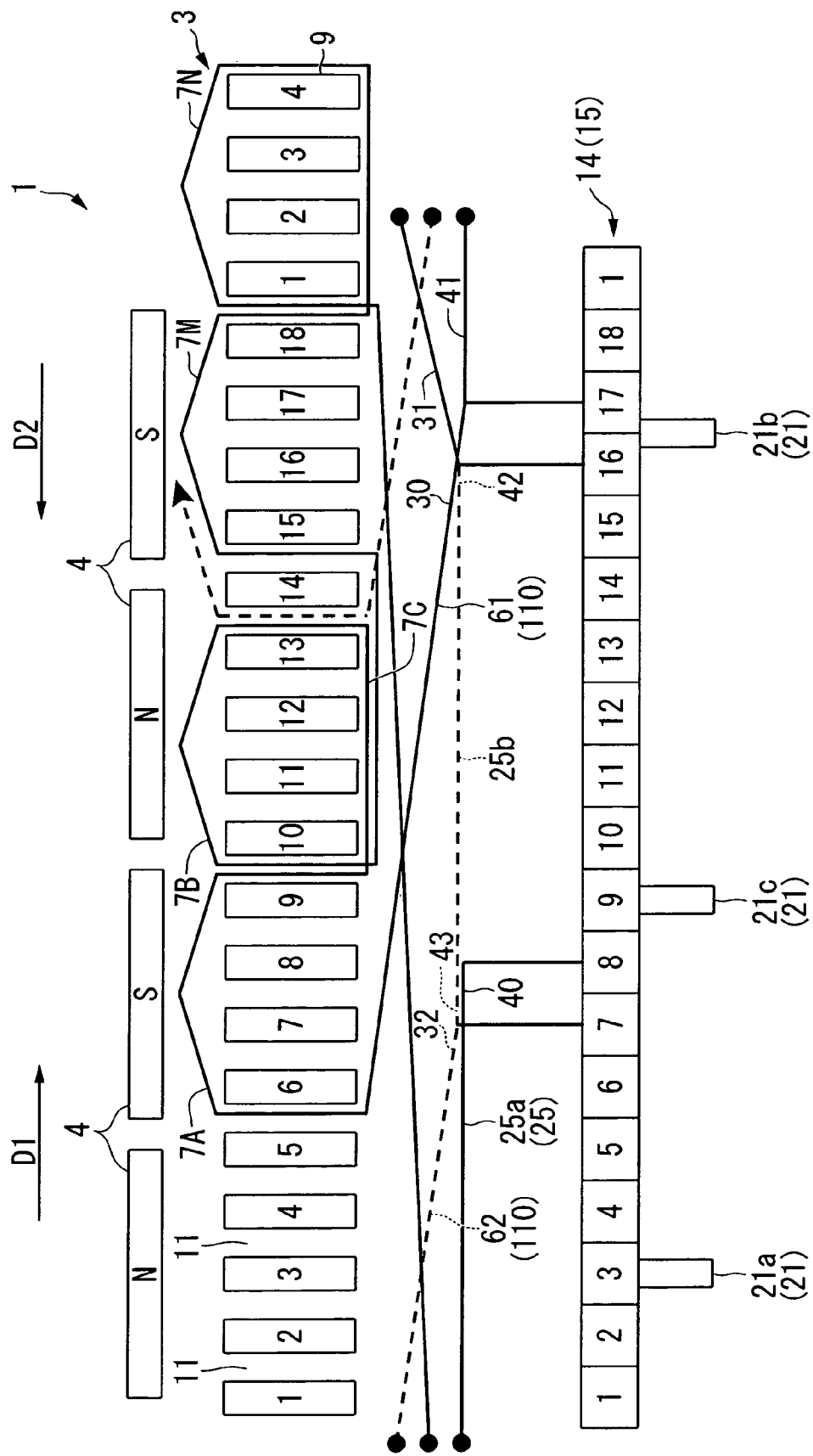
FIG. 39 is a developed view of an armature showing the winding state of an armature coil in a seventeenth embodiment of the invention.
Figure 40:
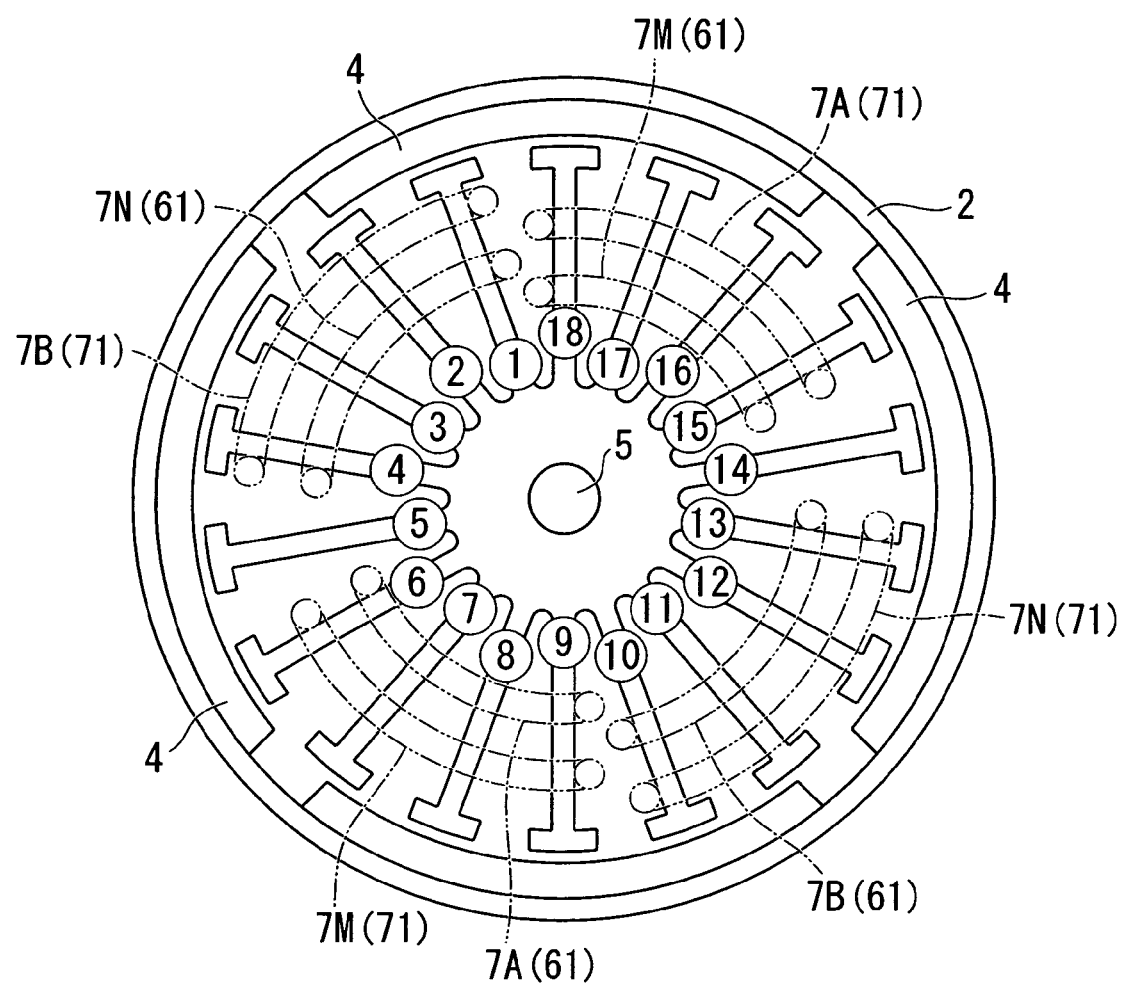
FIG. 40 is a top view of the armature showing the winding state of the armature coil in the seventeenth embodiment of the invention.

Next, the winding structure of the armature coil 7 of a seventeenth embodiment of the present invention will be described with reference to FIGS. 39 and 40. FIG. 39 is a developed view of the armature, FIG. 40 is a transverse sectional view of the armature, and a gap between adjacent teeth 9 corresponds to the slot 11. Additionally, in FIGS. 39 and 40, the segments 14 provided at the commutator 13 and the teeth 9 provided at the armature core 6 are each numbered.

In addition, the electric motor 1 of the seventeenth embodiment of the present invention and the electric motor 1 of the first embodiment described above are different from each other only in the winding structure of the armature coil 7, and are the same in the other portions. Accordingly, only the winding structure of the armature coil 7 will be described below, and description of the other portions is omitted (this is also the same in the following embodiments).

Additionally, the following embodiment is the same as that of the above-mentioned sixth embodiment in that the armature coil 7 includes the first conductive wire 110 and second conductive wire 120, in that the first conductive wire 110 and the second conductive wire 120 are formed at the armature core 6 by the double flyer type winding machine and are substantially simultaneously and similarly wound around the teeth 9 which exist at positions which are point symmetric about the rotary shaft 5, in that the first to ninth winding wires (61 to 69) and the connecting wires 25 which join the first to ninth winding wires together in a series are formed by the first conductive wire 110, and the other first to ninth winding wires (71 to 79) and the connecting wires 25 which join the other first to ninth winding wires together in a series are formed by the second conductive wire 120. Thus, in the developed view (for example, FIG. 39) of the armature, illustration of the second conductive wire 120 is omitted and only the first conductive wire 110 is shown. The winding structure of the first conductive wire 110 will now be described.

Here, the first to ninth winding wires (61 to 69) are joined together in a series via nine connecting wires 25 which are similarly formed from the first conductive wire 110. That is, the first winding wire 61, the connecting wire 25, the second winding wire 62, the connecting wire 25, the third winding wire 63, the connecting wire 25, the fourth winding wire 64, the connecting wire 25, the fifth winding wire 65, the connecting wire 25, the sixth winding wire 66, the connecting wire 25, the seventh winding wire 67, the connecting wire 25, the eighth winding wire 68, the connecting wire 25, the ninth winding wire 69, and the connecting wire 25 are respectively formed in this order in a series by the first conductive wire 110. Moreover, each connecting wire of the connecting wires 25 which connect the first to ninth winding wires (61 to 69) together is electrically and mechanically connected to the risers 15 formed by a pair of segments 14 and 14 which is arranged at facing positions which are point symmetric with respect to each other about the rotary shaft 5 (this is also the same in the following embodiment).

In the electric motor 1 of the seventeenth embodiment of the present invention, the first to ninth winding wires (61 to 69) have first to fourth coil winding wires (7A, 7B, 7M, and 7N) which are each connected in series to each other. Additionally, the first to fourth coil winding wires (7A, 7B, 7M, and 7N) are respectively arranged at intervals of about 90° in mechanical angle, and the winding wires 12 are wound substantially over the whole circumference of the armature core 6. That is, the first to fourth coil winding wires (7A, 7B, 7M, and 7N) are respectively arranged at positions which can substantially simultaneously face four magnets 4 provided at the electric motor 1.

Additionally, the first coil winding wire 7A is wound 6 times clockwise (forward direction) so as to surround four teeth 9 which are adjacent to each other, and the second coil winding wire 7B is arranged at a position adjacent in the right direction D1 to the four teeth 9 around which the first coil winding wire 7A is wound, and is wound 6 times counterclockwise (opposite direction) so as to surround four teeth 9 which are adjacent to each other.

Additionally, the third coil winding wire 7M is arranged at a position adjacent in the right direction D1 to four teeth 9 around which the second coil winding wire 7B is wound with one tooth 9 therebetween, and is wound 6 times clockwise (forward direction) so as to surround four teeth 9 which are adjacent to each other, and the fourth coil winding wire 7N is arranged at a position adjacent in the right direction D1 to four teeth 9 around which the third coil winding wire 7M is wound, and is wound 6 times counterclockwise (opposite direction) so as to surround four teeth 9 which are adjacent to each other. That is, the first and third coil winding wires (7A, 7M) are wound in the same direction, and the second and fourth coil winding wires (7B, 7N) are wound in a direction opposite to the first and third coil winding wires (7A, 7M).

An end 30 of the first coil winding wire 7A is connected to one segment 14 of the commutator 13, and an end 31 of the fourth coil winding wire 7N is connected to the segment 14 adjacent in the left direction D2 to the segment 14 to which the end 30 of the first coil winding wire 7A is connected.

More specifically, the first winding wire 61 formed by the first conductive wire 110 has first to fourth coil winding wires (7A, 7B, 7M, and 7N) which are each connected in series to each other, and the first coil winding wire 7A is joined in a series to a connecting wire 25*a* similarly formed from the first conductive wire 110, while the fourth coil winding wire 7N is joined in a series to a connecting wire 25*b* similarly formed from the first conductive wire 110.

An end 40 which is a starting point of the connecting wire 25*a* formed from the first conductive wire 110 is electrically and mechanically connected to the riser 15 formed at the No. 8 segment 14, and as for the connecting wire 25*a*, an end 41 which is disposed in the left direction D2 and is an end point of the connecting wire 25*a* is electrically and mechanically connected to the riser 15 formed at the No. 17 segment 14. Here, the No. 8 segment 14 and the No. 17 segment 14 are arranged at positions which are point symmetric about the rotary shaft 5. The end 41 of the connecting wire 25*a* and the end 30 which is the starting point of the first coil winding wire 7A are joined together in a series, and the first coil winding wire 7A formed by the first conductive wire 110 is wound around the teeth 9 after being connected to the No. 17 segment 14 at the end 30.

The first coil winding wire 7A passes through a slit 11 formed between the No. 5 tooth 9 and the No. 6 tooth 9 and a slit 11 formed between the No. 9 tooth 9 and the No. 10 tooth 9, and is wound 6 times clockwise (forward direction) so as to surround the four No. 6 to No. 9 teeth 9 which are close to each other.

Next, the arrangement of the second coil winding wire 7B which is connected in series to the first coil winding wire 7A will be described below.

The second coil winding wire 7B passes through a slit 11 formed between a No. 9 tooth 9 and a No. 10 tooth 9 and the slit 11 formed between the No. 13 tooth 9 and the No. 14 tooth 9, and is wound 6 times in a counterclockwise direction (opposite direction) opposite to the winding direction of the first coil winding wire 7A so as to surround the four No. 10 to No. 13 teeth 9 which are adjacent to the No. 1 to No. 4 teeth 9 and are close to each other. The second coil winding wire 7B is wound in a direction opposite to the first coil winding wire 7A because the second coil winding wire 7B faces a magnetic pole having polarity (N pole in FIG. 39) different from the polarity (S pole in FIG. 39) of a magnetic pole which the first coil winding wire 7A faces.

Next, the arrangement of the third coil winding wire 7M which is connected in series to the second coil winding wire 7B will be described below.

The third coil winding wire 7M passes through the slit 11 formed between the No. 14 tooth 9 and the No. 15 tooth 9 and the slit 11 formed between the No. 18 tooth 9 and the No. 1 tooth 9, and is wound 6 times in a clockwise direction (forward direction) opposite to the winding direction of the second coil winding wire 7B so as to surround the four No. 15 to No. 18 teeth 9 which are adjacent to the four No. 10 to No. 13 teeth 9 with the No. 14 tooth 9 therebetween and are close to each other. The third coil winding wire 7M is wound in a direction opposite to the second coil winding wire 7B because the third coil winding wire 7M faces a magnetic pole having polarity (S pole in FIG. 39) different from the polarity (N pole in FIG. 39) of a magnetic pole which the second coil winding wire 7B faces.

Next, the arrangement of the fourth coil winding wire 7N which is connected in series to the third coil winding wire 7M will be described below.

The fourth coil winding wire 7N passes through a slit 11 formed between the No. 18 tooth 9 and the No. 1 tooth 9 and the slit 11 formed between the No. 4 tooth 9 and the No. 5 tooth 9, and is wound 6 times in a counterclockwise direction (opposite direction) opposite to the winding direction of the third coil winding wire 7M so as to surround the four No. 1 to No. 4 teeth 9 which are adjacent to the four No. 15 to No. 18 teeth 9 and are close to each other. The fourth coil winding wire 7N is wound in an opposite direction to the third coil winding wire 7M because the fourth coil winding wire 7N faces a magnetic pole having polarity (N pole in FIG. 39) different from the polarity (S pole in FIG. 39) of a magnetic pole which the third coil winding wire 7M faces.

The end 31 of the fourth coil winding wire 7N is connected to the riser 15 formed at the No. 16 segment 14 adjacent in the left direction D2 to the No. 17 segment 14 to which the end 30 of the first coil winding wire 7A is connected.

Here, the end 30 of the first coil winding wire 7A and the end 31 of the fourth coil winding wire 7N are each connected to the segments 14, so as to each be held and rotated around a portion of the rotary shaft 5. For this reason, the respective ends 30 and 31 are brought into a twisted state at the neck of the commutator 13, and winding thickening can be reduced.

The first winding wire 61 and the second winding wire 62 wound around the armature core 6 following the first winding wire 61 are joined together in a series by the connecting wire 25b formed by the first conductive wire 110. An end 42 which is a starting point of the connecting wire 25b and the end 31 of the fourth coil winding wire 7N provided at the first winding wire 61 are joined together in a series, and the end 42 is electrically and mechanically connected to the riser 15 of the No. 16 segment 14. Also, as for the connecting wire 25b, an end 43 which is disposed in the left direction D2 and is an end point of the connecting wire 25b is electrically and mechanically connected to a riser 15 formed at a No. 7 segment 14. Here, the No. 16 segment 14 and the No. 7 segment 14 are arranged at positions which are point symmetric about the rotary shaft 5.

The end 43 of the connecting wire 25b and the end 32, which is the starting point of the first coil winding wire 7A of the second winding wire 62 wound following the first winding wire 61, are joined together in a series. Also, the first coil winding wire 7A of the second winding wire 62 passes through a slit 11 formed between the No. 13 tooth 9 and the No. 14 tooth 9 and the slit 11 formed between the No. 17 tooth 9 and the No. 18 tooth 9, and is wound 6 times clockwise so as to surround the four No. 14 to No. 17 teeth 9. The same process as the aforementioned process is repeated below, and the armature core 6 includes the first to ninth winding wires (61 to 69), and nine connecting wires 25.

Therefore, according to the above-described seventeenth embodiment, in addition to the same effects as those of the aforementioned sixteenth embodiment, winding thickening at the neck of the commutator 13 can be reduced.

Figure 41:
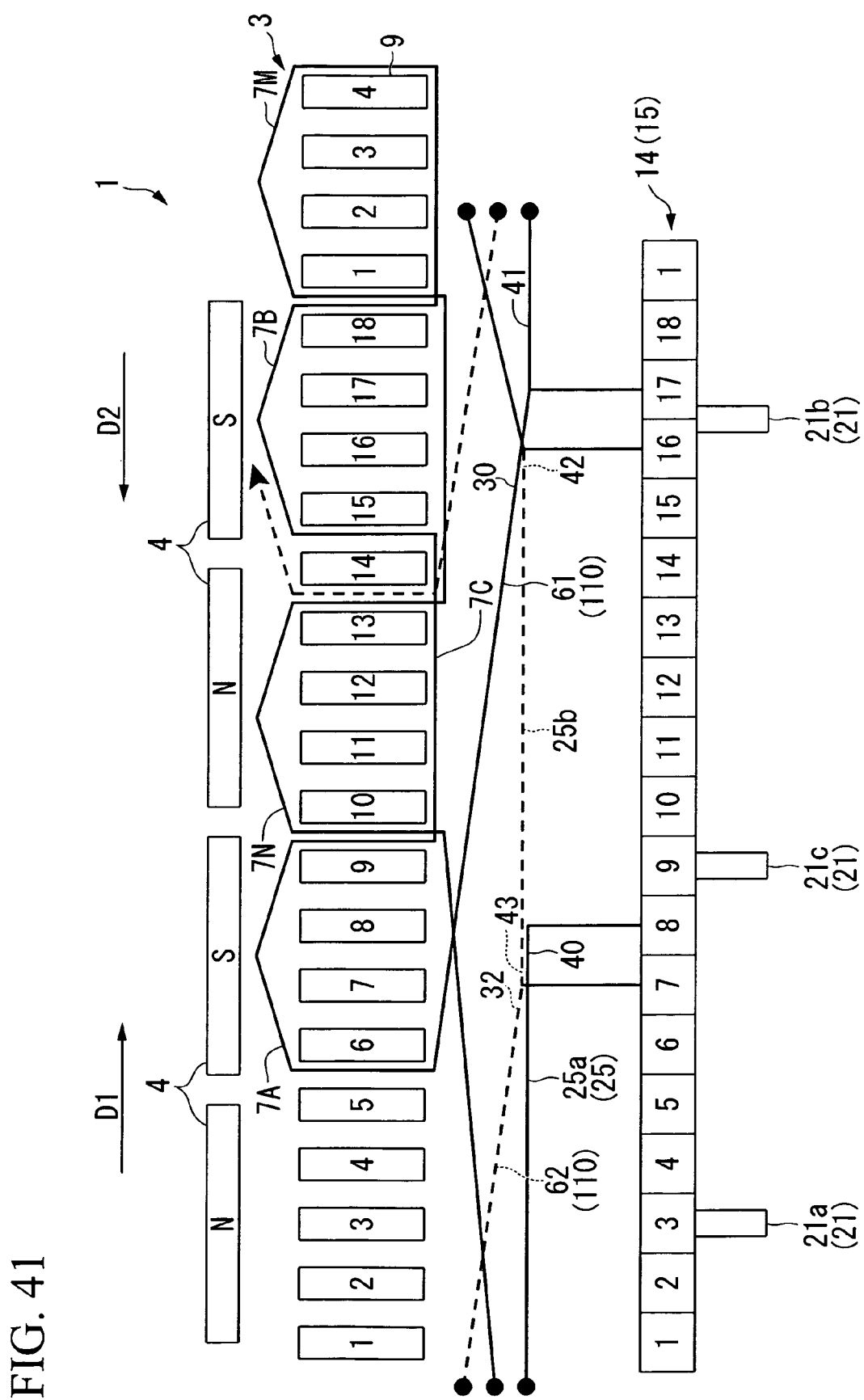
FIG. 41 is a developed view of an armature showing the winding state of an armature coil in an eighteenth embodiment of the invention.
Figure 42:
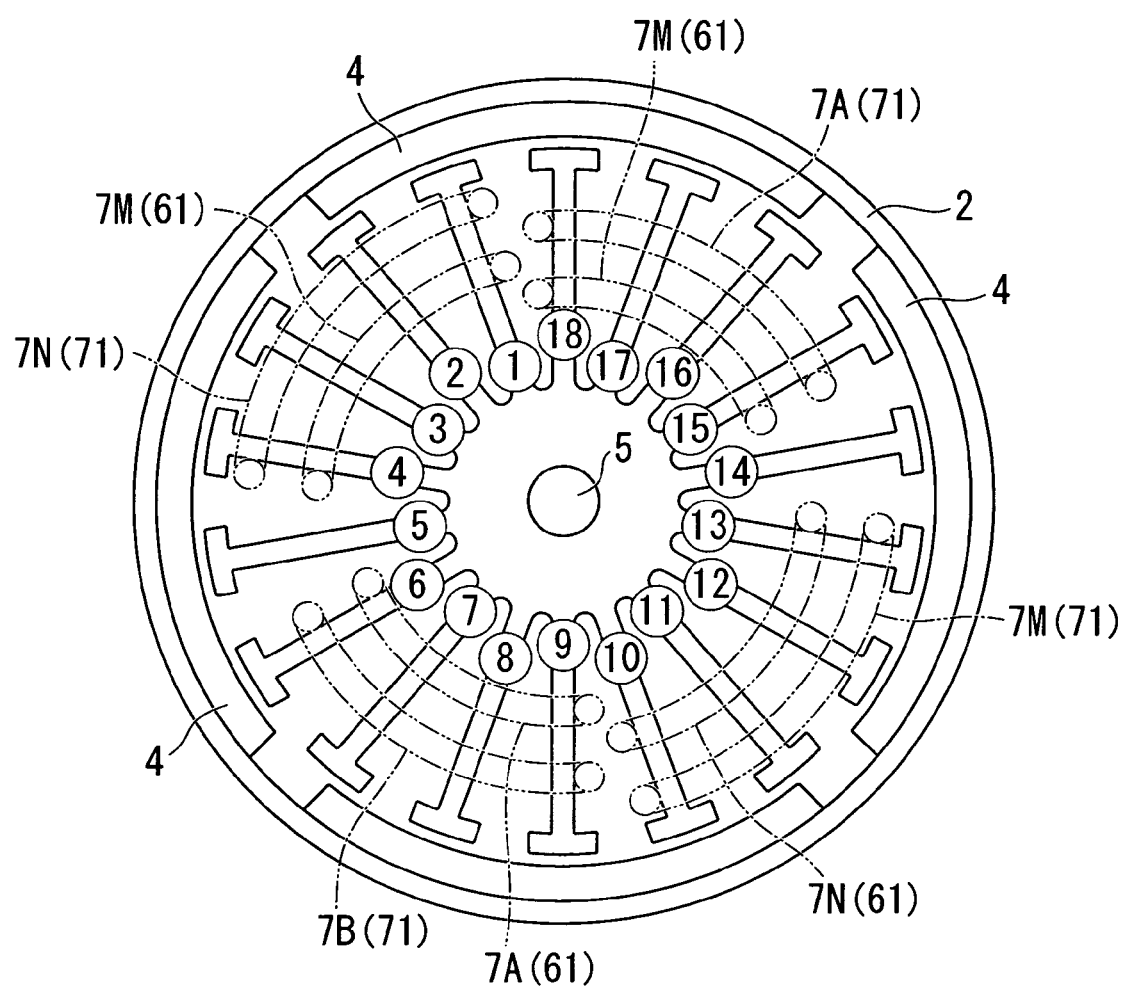
FIG. 42 is a top view of the armature showing the winding state of the armature coil in the eighteenth embodiment of the invention.

Next, the winding structure of the armature coil 7 of an eighteenth embodiment of the present invention will be described with reference to FIGS. 41 and 42. FIG. 41 is a developed view of the armature, FIG. 42 is a transverse sectional view of the armature, and a gap between adjacent teeth 9 corresponds to the slot 11. Additionally, in FIGS. 41 and 42, the segments 14 provided at the commutator 13 and the teeth 9 provided at the armature core 6 are each numbered.

Here, the first to ninth winding wires (61 to 69) have first to fourth coil winding wires (7A, 7B, 7M, and 7N) which are each connected in series to each other. Additionally, the first to fourth coil winding wires (7A, 7B, 7M, and 7N) are respectively arranged at intervals of about 90° in mechanical angle, and the winding wires 12 are wound substantially over the whole circumference of the armature core 6. That is, the first to fourth coil winding wires (7A, 7B, 7M, and 7N) are respectively arranged at positions which can substantially simultaneously face four magnets 4 provided at the electric motor 1.

Additionally, the first coil winding wire 7A is wound 6 times clockwise (forward direction) so as to surround four teeth 9 which are adjacent to each other, and the second coil winding wire 7B exists in the right direction D1 with respect to the four teeth 9 around which the first coil winding wire 7A is wound with five teeth 9 therebetween and is wound 6 times clockwise (forward direction) so as to surround four teeth 9 which are adjacent to each other.

Additionally, the third coil winding wire 7M is arranged to a position adjacent in the right direction D1 to the four teeth 9 around which the second coil winding wire 7B is wound, and is wound 6 times counterclockwise (opposite direction) so as to surround four teeth 9 which are adjacent to each other, and the fourth coil winding wire 7N exists in the left direction D2 with respect to the four teeth 9 around which the third coil winding wire 7M is wound with five teeth 9 therebetween, and is wound 6 times counterclockwise (opposite direction) so as to surround four teeth 9 which are adjacent to each other. That is, the first and second coil winding wires (7A, 7B) are wound in the same direction, and the third and fourth coil winding wires (7M, 7N) are wound in a direction opposite to the first and second coil winding wires (7A, 7B). Additionally, the fourth coil winding wire 7N is arranged at a position which is adjacent to the first coil winding wire 7A between the first coil winding wire 7A and the second coil winding wire 7B.

An end 30 of the first coil winding wire 7A is connected to one segment 14 of the commutator 13, and an end 31 of the fourth coil winding wire 7N is connected to the segment 14 adjacent in the left direction D2 to the segment 14 to which the end 30 of the first coil winding wire 7A is connected.

More specifically, the first winding wire 61 formed by the first conductive wire 110 has first to fourth coil winding wires (7A, 7B, 7M, and 7N) which are each connected in series to each other, and the first coil winding wire 7A is joined in a series to a connecting wire 25a similarly formed from the first conductive wire 110, while the fourth coil winding wire 7N is joined in a series to a connecting wire 25b similarly formed from the first conductive wire 110.

An end 40 which is a starting point of the connecting wire 25a formed from the first conductive wire 110 is electrically and mechanically connected to the riser 15 formed at the No. 8 segment 14, and as for the connecting wire 25a, an end 41 which is disposed in the left direction D2 and is an end point of the connecting wire 25a is electrically and mechanically connected to the riser 15 formed at the No. 17 segment 14. Here, the No. 8 segment 14 and the No. 17 segment 14 are arranged at positions which are point symmetric about the rotary shaft 5. The end 41 of the connecting wire 25a and the end 30 which is the starting point of the first coil winding wire 7A are joined together in a series, and the first coil winding wire 7A formed by the first conductive wire 110 is wound around the teeth 9 after being connected to the No. 17 segment 14 at the end 30.

The first coil winding wire 7A passes through a slit 11 formed between the No. 5 tooth 9 and the No. 6 tooth 9 and a slit 11 formed between the No. 9 tooth 9 and the No. 10 tooth 9, and is wound 6 times clockwise (forward direction) so as to surround the four No. 6 to No. 9 teeth 9 which are close to each other.

Next, the arrangement of the second coil winding wire 7B which is connected in series to the first coil winding wire 7A will be described below.

The second coil winding wire 7B passes through the slit 11 formed between the No. 14 tooth 9 and the No. 15 tooth 9 and the slit 11 formed between the No. 18 tooth 9 and the No. 1 tooth 9, and is wound 6 times in a clockwise direction (forward direction) which is the same direction as the winding direction of the first coil winding wire 7A so as to surround the four No. 15 to No. 18 teeth 9 which are close to each other and which are five teeth 9 away in the right direction D1 with respect to the No. 1 to No. 4 teeth 9. The second coil winding wire 7B is wound in the same direction as the first coil 7 winding wire A because the second coil winding wire 7B faces a magnetic pole having the same polarity (S pole in FIG. 41) as the polarity (S pole in FIG. 41) of a magnetic pole which the first coil winding wire 7A faces.

Next, the arrangement of the third coil winding wire 7M which is connected in series to the second coil winding wire 7B will be described below.

The third coil winding wire 7M passes through a slit 11 formed between the No. 18 tooth 9 and the No. 1 tooth 9 and the slit 11 formed between the No. 4 tooth 9 and the No. 5 tooth 9, and is wound 6 times in a counterclockwise direction (opposite direction) opposite to the winding direction of the second coil winding wire 7M so as to surround the four No. 1 to No. 4 teeth 9 which are adjacent to the four No. 15 to No. 18 teeth 9 and are close to each other. The third coil winding wire 7M is wound in an opposite direction to the second coil winding wire 7B because the third coil winding wire 7M faces a magnetic pole having polarity (N pole in FIG. 41) different from the polarity (S pole in FIG. 41) of a magnetic pole which the second coil winding wire 7B faces.

Next, the arrangement of the fourth coil winding wire 7N which is connected in series to the third coil winding wire 7M will be described below.

The fourth coil winding wire 7N passes through the slit 11 formed between the No. 9 tooth 9 and the No. 10 tooth 9 and the slit 11 formed between the No. 13 tooth 9 and the No. 14 tooth 9, and is wound 6 times in a counterclockwise direction (opposite direction) which is the same direction as the winding direction of the third coil winding wire 7M so as to surround the four No. 10 to No. 13 teeth 9 which are close to each other and which are five teeth 9 away in the left direction D2 with respect to the four No. 1 to No. 4 teeth 9. The fourth coil winding wire 7N is wound in the same direction as the third coil winding wire 7M because the fourth coil winding wire 7N faces a magnetic pole having the same polarity (N pole in FIG. 41) as the polarity (N pole in FIG. 41) of a magnetic pole which the third coil winding wire 7M faces.

The end 31 of the fourth coil winding wire 7N is connected to the riser 15 formed at the No. 16 segment 14 adjacent in the left direction D2 to the No. 17 segment 14 to which the end 30 of the first coil winding wire 7A is connected.

Here, the end 30 of the first coil winding wire 7A and the end 31 of the fourth coil winding wire 7N are each connected to the segments 14, so as to each be held and rotated around a portion of the rotary shaft 5. For this reason, the respective ends 30 and 31 are brought into a twisted state at the neck of the commutator 13, and winding thickening can be reduced.

The first winding wire 61 and the second winding wire 62 wound around the armature core 6 following the first winding wire 61 are joined together in a series by the connecting wire 25*b* formed by the first conductive wire 110. An end 42 which is a starting point of the connecting wire 25*b* and the end 31 of the fourth coil winding wire 7N provided at the first winding wire 61 are joined together in a series, and the end 42 is electrically and mechanically connected to the riser 15 of the No. 16 segment 14. Also, as for the connecting wire 25*b*, an end 43 which is disposed in the left direction D2 and is an end point of the connecting wire 25*b* is electrically and mechanically connected to a riser 15 formed at a No. 7 segment 14. Here, the No. 16 segment 14 and the No. 7 segment 14 are arranged at positions which are point symmetric about the rotary shaft 5.

The end 43 of the connecting wire 25*b* and the end 32, which is the starting point of the first coil winding wire 7A of the second winding wire 62 wound following the first winding wire 61, are joined together in a series. Also, the first coil winding wire 7A of the second winding wire 62 passes through a slit 11 formed between the No. 13 tooth 9 and the No. 14 tooth 9 and the slit 11 formed between the No. 17 tooth 9 and the No. 18 tooth 9, and is wound 6 times clockwise so as to surround the four No. 14 to No. 17 teeth 9. The same process as the aforementioned process is repeated below, and the armature core 6 includes the first to ninth winding wires (61 to 69), and nine connecting wires 25.

Therefore, according to the above-described eighteenth embodiment, the same effects as those of the aforementioned seventeenth embodiment can be exhibited.

Figure 43:
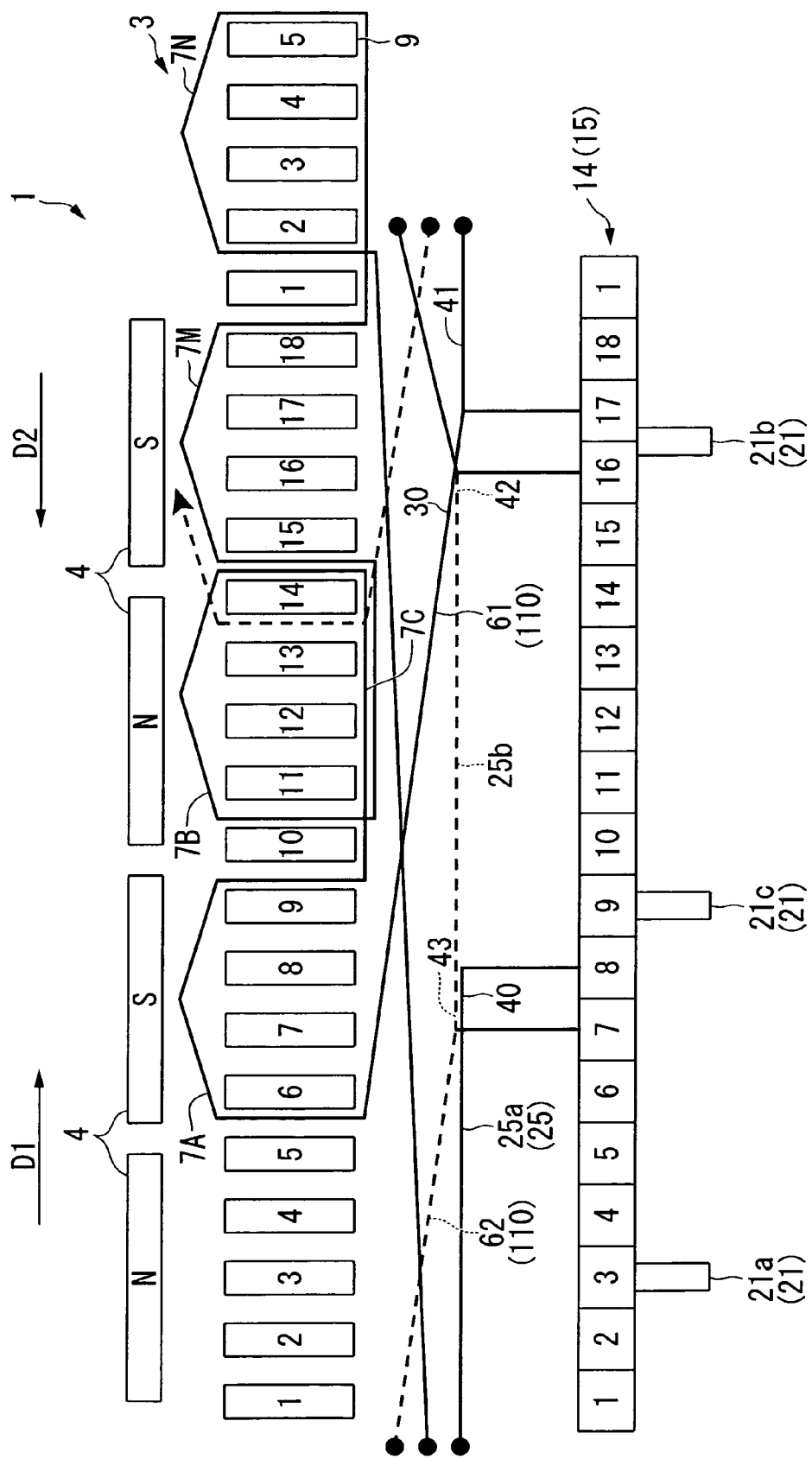
FIG. 43 is a developed view of an armature showing the winding state of an armature coil in a nineteenth embodiment of the invention.
Figure 44:
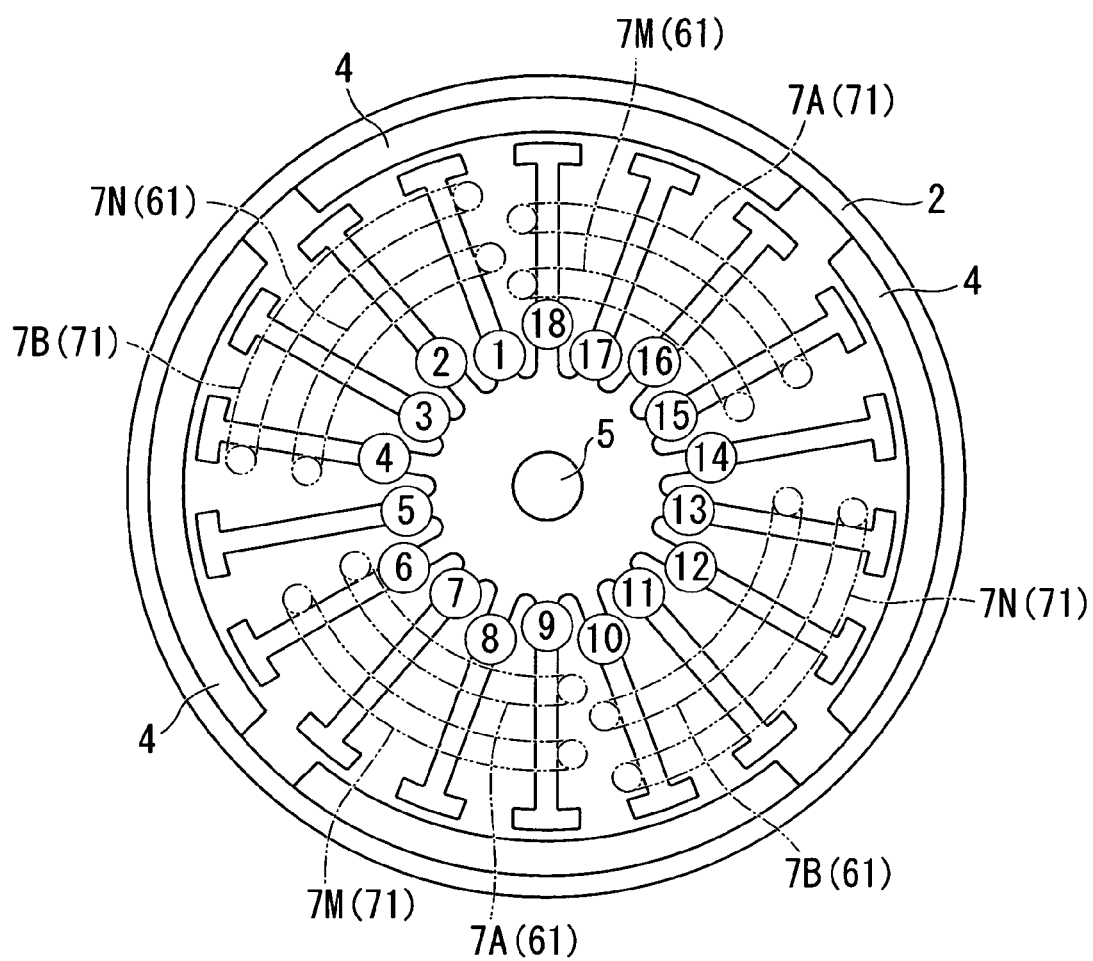
FIG. 44 is a top view of the armature showing the winding state of the armature coil in the nineteenth embodiment of the invention.

Next, the winding structure of the armature coil 7 of a nineteenth embodiment of the present invention will be described with reference to FIGS. 43 and 44. FIG. 43 is a developed view of the armature, FIG. 44 is a transverse sectional view of the armature, and a gap between adjacent teeth 9 corresponds to the slot 11. Additionally, in FIGS. 43 and 44, the segments 14 provided at the commutator 13 and the teeth 9 provided at the stator core 7 are each numbered.

Here, the first to ninth winding wires (61 to 69) have first to fourth coil winding wires (7A, 7B, 7M, and 7N) which are each connected in series to each other. Additionally, the first to fourth coil winding wires (7A, 7B, 7M, and 7N) are respectively arranged at intervals of about 90° in mechanical angle, and the winding wires 12 are wound substantially over the whole circumference of the armature core 6. That is, the first to fourth coil winding wires (7A, 7B, 7M, and 7N) are respectively arranged at positions which can substantially simultaneously face four magnets 4 provided at the electric motor 1.

Additionally, the first coil winding wire 7A is wound 6 times clockwise (forward direction) so as to surround four teeth 9 which are adjacent to each other, and the second coil winding wire 7B is arranged at a position adjacent in the right direction D1 to the four teeth 9 around which the first coil winding wire 7A is wound with one tooth 9 therebetween and is wound 6 times counterclockwise (opposite direction) so as to surround four teeth 9 which are adjacent to each other.

Additionally, the third coil winding wire 7M is arranged to a position adjacent in the right direction D1 to the four teeth 9 around which the second coil winding wire 7B is wound, and is wound 6 times counterclockwise (opposite direction) so as to surround four teeth 9 which are adjacent to each other, and the fourth coil winding wire 7N is arranged at a position adjacent in the right direction D1 to the four teeth 9 around which the third coil winding wire 7M is wound with one tooth 9 therebetween, and is wound 6 times clockwise (forward direction) so as to surround four teeth 9 which are adjacent to each other. That is, the first and third coil winding wires (7A, 7M) are wound in the same direction, and the second and fourth coil winding wires (7B, 7N) are wound in a direction opposite to the first and third coil winding wires (7A, 7M).

An end 30 of the first coil winding wire 7A is connected to one segment 14 of the commutator 13, and an end 31 of the fourth coil winding wire 7N is connected to the segment 14 adjacent in the left direction D2 to the segment 14 to which the end 30 of the first coil winding wire 7A is connected.

More specifically, the first winding wire 61 formed by the first conductive wire 110 has first to fourth coil winding wires (7A, 7B, 7M, and 7N) which are each connected in series to each other, and the first coil winding wire 7A is joined in a series to a connecting wire 25*a* similarly formed from the first conductive wire 110, while the fourth coil winding wire 7N is joined in a series to a connecting wire 25*b* similarly formed from the first conductive wire 110.

An end 40 which is a starting point of the connecting wire 25*a* formed from the first conductive wire 110 is electrically and mechanically connected to the riser 15 formed at the No. 8 segment 14, and as for the connecting wire 25*a*, an end 41 which is disposed in the left direction D2 and is an end point of the connecting wire 25*a* is electrically and mechanically connected to the riser 15 formed at the No. 17 segment 14. Here, the No. 8 segment 14 and the No. 17 segment 14 are arranged at positions which are point symmetric about the rotary shaft 5. The end 41 of the connecting wire 25a and the end 30 which is the starting point of the first coil winding wire 7A are joined together in a series, and the first coil winding wire 7A formed by the first conductive wire 110 is wound around the tooth 9 after being connected to the No. 17 segment 14 at the end 30.

The first coil winding wire 7A passes through a slit 11 formed between the No. 5 tooth 9 and the No. 6 tooth 9 and a slit 11 formed between the No. 9 tooth 9 and the No. 10 tooth 9, and is wound 6 times clockwise (forward direction) so as to surround the four No. 6 to No. 9 teeth 9 which are close to each other.

Next, the arrangement of the second coil winding wire 7B which is connected in series to the first coil winding wire 7A will be described below.

The second coil winding wire 7B passes through the slit 11 formed between the No. 10 tooth 9 and the No. 11 tooth 9 and the slit 11 formed between the No. 14 tooth 9 and the No. 15 tooth 9, and is wound 6 times in a counterclockwise direction (opposite direction) opposite to the winding direction of the first coil winding wire 7A so as to surround the four No. 11 to No. 14 teeth 9 which are adjacent to the No. 6 to No. 9 teeth 9 with one tooth 9 therebetween and are close to each other. The second coil winding wire 7B is wound in a direction opposite to the first coil 7 winding wire A because the second coil winding wire 7B faces a magnetic pole having polarity (N pole in FIG. 43) different from the polarity (S pole in FIG. 43) of a magnetic pole which the first coil winding wire 7A faces.

Next, the arrangement of the third coil winding wire 7M which is connected in series to the second coil winding wire 7B will be described below.

The third coil winding wire 7M passes through the slit 11 formed between the No. 14 tooth 9 and the No. 15 tooth 9 and the slit 11 formed between the No. 18 tooth 9 and the No. 1 tooth 9, and is wound 6 times in a clockwise direction (forward direction) opposite to the winding direction of the second coil winding wire 7B so as to surround the four No. 15 to No. 18 teeth 9 which are adjacent to the four No. 11 to No. 14 teeth 9 and are close to each other. The third coil winding wire 7M is wound in an opposite direction to the second coil winding wire 7B because the third coil winding wire 7M faces a magnetic pole having polarity (S pole in FIG. 43) different from the polarity (N pole in FIG. 43) of a magnetic pole which the second coil winding wire 7B faces.

Next, the arrangement of the fourth coil winding wire 7N which is connected in series to the third coil winding wire 7M will be described below.

The fourth coil winding wire 7N passes through the slit 11 formed between the No. 1 tooth 9 and the No. 2 tooth 9 and the slit 11 formed between the No. 5 tooth 9 and the No. 6 tooth 9, and is wound 6 times in a counterclockwise direction (opposite direction) opposite to the winding direction of the third coil winding wire 7M so as to surround the four No. 2 to No. 5 teeth 9 which are adjacent to the four No. 15 to No. 18 teeth 9 with one tooth 9 therebetween and are close to each other. The fourth coil winding wire 7N is wound in a direction opposite to the third coil winding wire 7M because the fourth coil winding wire 7N faces a magnetic pole having polarity (N pole in FIG. 43) different from the polarity (S pole in FIG. 43) of a magnetic pole which the third coil winding wire 7M faces.

The end 31 of the fourth coil winding wire 7N is connected to the riser 15 formed at the No. 16 segment 14 adjacent in the left direction D2 to the No. 17 segment 14 to which the end 30 of the first coil winding wire 7A is connected.

Here, the end 30 of the first coil winding wire 7A and the end 31 of the fourth coil winding wire 7N are each connected to the segments 14, so as to each be held and rotated around a portion of the rotary shaft 5. For this reason, the respective ends 30 and 31 are brought into a twisted state at the neck of the commutator 13, and winding thickening can be reduced.

The first winding wire 61 and the second winding wire 62 wound around the armature core 6 following the first winding wire 61 are joined together in a series by the connecting wire 25b formed by the first conductive wire 110. An end 42 which is a starting point of the connecting wire 25b and the end 31 of the fourth coil winding wire 7N provided at the first winding wire 61 are joined together in a series, and the end 42 is electrically and mechanically connected to the riser 15 of the No. 16 segment 14. Also, as for the connecting wire 25b, an end 43 which is disposed in the left direction D2 and is an end point of the connecting wire 25b is electrically and mechanically connected to a riser 15 formed at a No. 7 segment 14. Here, the No. 16 segment 14 and the No. 7 segment 14 are arranged at positions which are point symmetric about the rotary shaft 5.

The end 43 of the connecting wire 25b and the end 32, which is the starting point of the first coil winding wire 7A of the second winding wire 62 wound following the first winding wire 61, are joined together in a series. Also, the first coil winding wire 7A of the second winding wire 62 passes through a slit 11 formed between the No. 13 tooth 9 and the No. 14 tooth 9 and the slit 11 formed between the No. 17 tooth 9 and the No. 18 tooth 9, and is wound 6 times clockwise so as to surround the four No. 14 to No. 17 teeth 9. The same process as the aforementioned process is repeated below, and the armature core 6 includes the first to ninth winding wires (61 to 69), and nine connecting wires 25.

Accordingly, according to the above-described nineteenth embodiment, the same effects as those of the aforementioned seventeenth embodiment can be exhibited.

Figure 45:
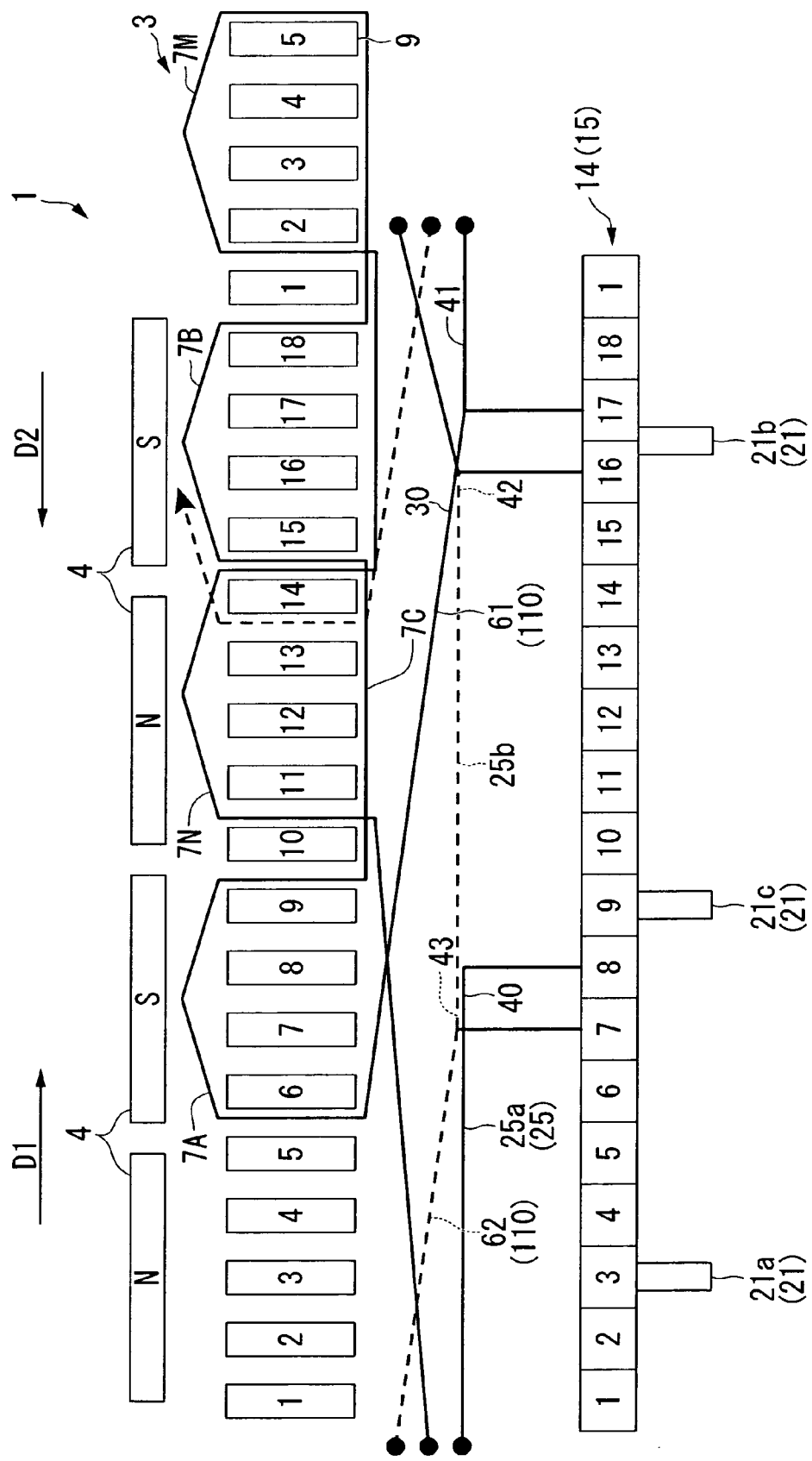
FIG. 45 is a developed view of an armature showing the winding state of an armature coil in a twentieth embodiment of the invention.
Figure 46:
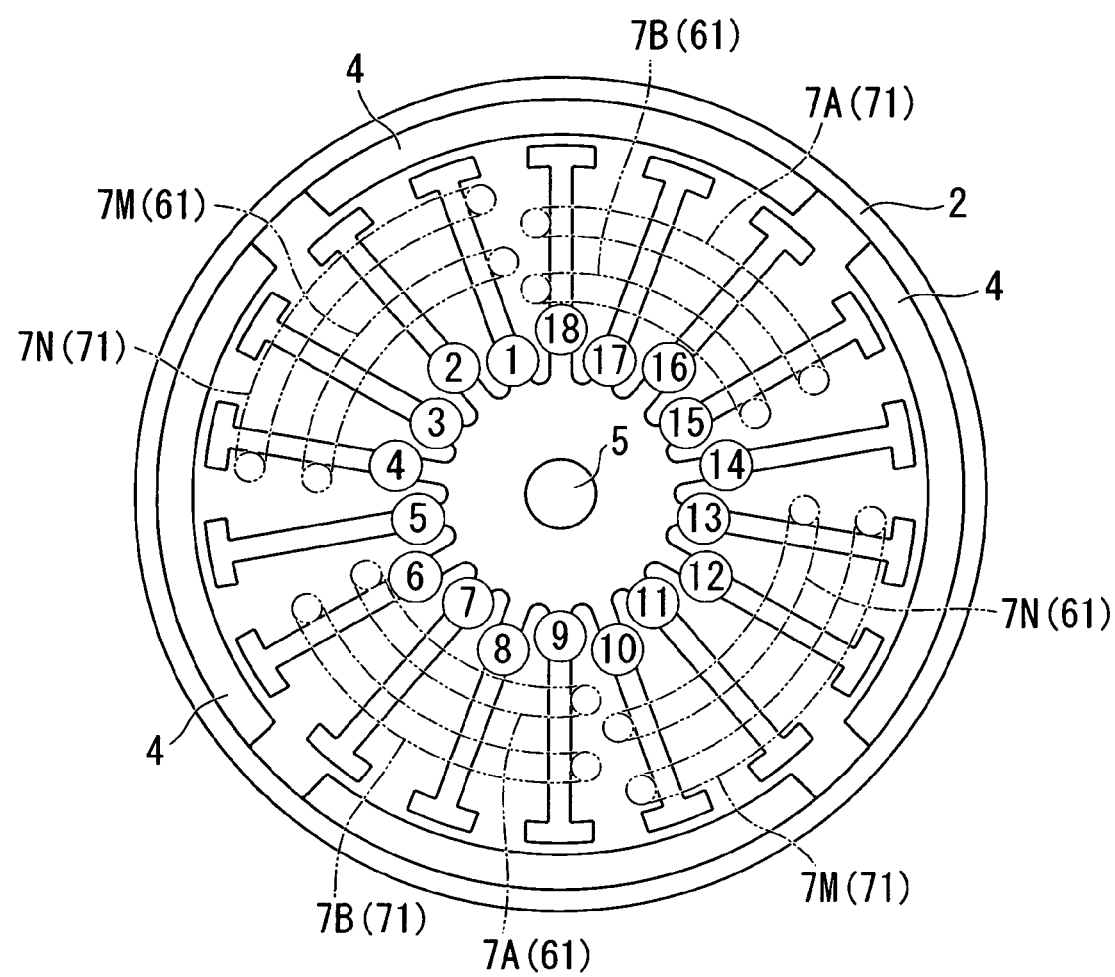
FIG. 46 is a top view of the armature showing the winding state of the armature coil in the twentieth embodiment of the invention.

Next, the winding structure of the armature coil 7 of a twentieth embodiment of the present invention will be described with reference to FIGS. 45 and 46. FIG. 45 is a developed view of the armature, FIG. 46 is a transverse sectional view of the armature, and a gap between adjacent teeth 9 corresponds to the slot 11. Additionally, in FIGS. 45 and 46, the segments 14 provided at the commutator 13 and the teeth 9 provided at the armature core 6 are each numbered.

Here, the first to ninth winding wires (61 to 69) have first to fourth coil winding wires (7A, 7B, 7M, and 7N) which are each connected in series to each other. Additionally, the first to fourth coil winding wires (7A, 7B, 7M, and 7N) are respectively arranged at intervals of about 90° in mechanical angle, and the winding wires 12 are wound substantially over the whole circumference of the armature core 6. That is, the first to fourth coil winding wires (7A, 7B, 7M, and 7N) are respectively arranged at positions which can substantially simultaneously face four magnets 4 provided at the electric motor 1.

Additionally, the first coil winding wire 7A is wound 6 times clockwise (forward direction) so as to surround four teeth 9 which are adjacent to each other, and the second coil winding wire 7B exists in the right direction D1 with respect to the four teeth 9 around which the first coil winding wire 7A is wound with five teeth 9 therebetween and is wound 6 times clockwise (forward direction) so as to surround four teeth 9 which are adjacent to each other.

Additionally, the third coil winding wire 7M is arranged at a position adjacent in the right direction D1 to four teeth 9 around which the second coil winding wire 7B is wound with one tooth 9 therebetween, and is wound 6 times counterclockwise (opposite direction) so as to surround four teeth 9 which are adjacent to each other, and the fourth coil winding wire 7N exists in the left direction D2 with respect to four teeth 9 around which the third coil winding wire 7M is wound with five teeth 9 therebetween, and is wound 6 times counterclockwise (opposite direction) so as to surround four teeth 9 which are adjacent to each other. That is, the first and second coil winding wires (7A, 7B) are wound in the same direction, and the third and fourth coil winding wires (7M, 7N) are wound in a direction opposite to the first and second coil winding wires (7A, 7B). Additionally, the fourth coil winding wire 7N is arranged at a position which is adjacent to the second coil winding wire 7B between the first coil winding wire 7A and the second coil winding wire 7B.

An end 30 of the first coil winding wire 7A is connected to one segment 14 of the commutator 13, and an end 31 of the fourth coil winding wire 7N is connected to the segment 14 adjacent in the left direction D2 to the segment 14 to which the end 30 of the first coil winding wire 7A is connected.

More specifically, the first winding wire 61 formed by the first conductive wire 110 has first to fourth coil winding wires (7A, 7B, 7M, and 7N) which are each connected in series to each other, and the first coil winding wire 7A is joined in a series to a connecting wire 25a similarly formed from the first conductive wire 110, while the fourth coil winding wire 7N is joined in a series to a connecting wire 25b similarly formed from the first conductive wire 110.

An end 40 which is a starting point of the connecting wire 25a formed from the first conductive wire 110 is electrically and mechanically connected to the riser 15 formed at the No. 8 segment 14, and as for the connecting wire 25a, an end 41 which is disposed in the left direction D2 and is an end point of the connecting wire 25a is electrically and mechanically connected to the riser 15 formed at the No. 17 segment 14. Here, the No. 8 segment 14 and the No. 17 segment 14 are arranged at positions which are point symmetric about the rotary shaft 5. The end 41 of the connecting wire 25a and the end 30 which is the starting point of the first coil winding wire 7A are joined together in a series, and the first coil winding wire 7A formed by the first conductive wire 110 is wound around the teeth 9 after being connected to the No. 17 segment 14 at the end 30.

The first coil winding wire 7A passes through a slit 11 formed between the No. 5 tooth 9 and the No. 6 tooth 9 and a slit 11 formed between the No. 9 tooth 9 and the No. 10 tooth 9, and is wound 6 times clockwise (forward direction) so as to surround the four No. 6 to No. 9 teeth 9 which are close to each other.

Next, the arrangement of the second coil winding wire 7B which is connected in series to the first coil winding wire 7A will be described below.

The second coil winding wire 7B passes through the slit 11 formed between the No. 14 tooth 9 and the No. 15 tooth 9 and the slit 11 formed between the No. 18 tooth 9 and the No. 1 tooth 9, and is wound 6 times in a clockwise direction (forward direction) which is the same direction as the winding direction of the first coil winding wire 7A so as to surround the four No. 15 to No. 18 teeth 9 which are close to each other which are five teeth 9 away in the right direction D1 with respect to the No. 6 to No. 9 teeth 9. The second coil winding wire 7B is wound in the same direction as the first coil 7 winding wire A because the second coil winding wire 7B faces a magnetic pole having the same polarity (S pole in FIG. 45) as the polarity (S pole in FIG. 45) of a magnetic pole which the first coil winding wire 7A faces.

Next, the arrangement of the third coil winding wire 7M which is connected in series to the second coil winding wire 7B will be described below.

The third coil winding wire 7M passes through a slit 11 formed between the No. 1 tooth 9 and the No. 2 tooth 9 and the slit 11 formed between the No. 5 tooth 9 and the No. 6 tooth 9, and is wound 6 times in a counterclockwise direction (opposite direction) opposite to the winding direction of the second coil winding wire 7B so as to surround the four No. 2 to No. 5 teeth 9 which are adjacent to the four No. 15 to No. 18 teeth 9 with one tooth 9 therebetween and are close to each other. The third coil winding wire 7M is wound in an opposite direction to the second coil winding wire 7B because the third coil winding wire 7M faces a magnetic pole having polarity (N pole in FIG. 45) different from the polarity (S pole in FIG. 45) of a magnetic pole which the second coil winding wire 7B faces.

Next, the arrangement of the fourth coil winding wire 7N which is connected in series to the third coil winding wire 7M will be described below.

The fourth coil winding wire 7N passes through the slit 11 formed between the No. 9 tooth 9 and the No. 10 tooth 9 and the slit 11 formed between the No. 13 tooth 9 and the No. 14 tooth 9, and is wound 6 times in a counterclockwise direction (opposite direction) which is the same direction as the winding direction of the third coil winding wire 7M so as to surround the four No. 11 to No. 14 teeth 9 which are adjacent to each other which are five teeth 9 away in the left direction D2 with respect to the four No. 1 to No. 4 teeth 9. The fourth coil winding wire 7N is wound in the same direction as the third coil winding wire 7M because the fourth coil winding wire 7N faces a magnetic pole having the same polarity (N pole in FIG. 45) as the polarity (N pole in FIG. 45) of a magnetic pole which the third coil winding wire 7M faces.

The end 31 of the fourth coil winding wire 7N is connected to the riser 15 formed at the No. 16 segment 14 adjacent in the left direction D2 to the No. 17 segment 14 to which the end 30 of the first coil winding wire 7A is connected.

Here, the end 30 of the first coil winding wire 7A and the end 31 of the fourth coil winding wire 7N are each connected to the segments 14, so as to each be held and rotated around a portion of the rotary shaft 5. For this reason, the respective ends 30 and 31 are brought into a twisted state at the neck of the commutator 13, and winding thickening can be reduced.

The first winding wire 61 and the second winding wire 62 wound around the armature core 6 following the first winding wire 61 are joined together in a series by the connecting wire 25b formed by the first conductive wire 110. An end 42 which is a starting point of the connecting wire 25b and the end 31 of the fourth coil winding wire 7N provided at the first winding wire 61 are joined together in a series, and the end 42 is electrically and mechanically connected to the riser 15 of the No. 16 segment 14. Also, as for the connecting wire 25b, an end 43 which is disposed in the left direction D2 and is an end point of the connecting wire 25b is electrically and mechanically connected to a riser 15 formed at a No. 7 segment 14. Here, the No. 16 segment 14 and the No. 7 segment 14 are arranged at positions which are point symmetric about the rotary shaft 5.

The end 43 of the connecting wire 25b and the end 32, which is the starting point of the first coil winding wire 7A of the second winding wire 62 wound following the first winding wire 61, are joined together in a series. Also, the first coil winding wire 7A of the second winding wire 62 passes through a slit 11 formed between the No. 13 tooth 9 and the No. 14 tooth 9 and the slit 11 formed between the No. 17 tooth 9 and the No. 18 tooth 9, and is wound 6 times clockwise so as to surround the four No. 14 to No. 17 teeth 9. The same process as the aforementioned process is repeated below, and the armature core 6 includes the first to ninth winding wires (61 to 69), and nine connecting wires 25.

Accordingly, according to the above-described twentieth embodiment, the same effects as those of the aforementioned seventeenth embodiment can be exhibited.

Figure 47:
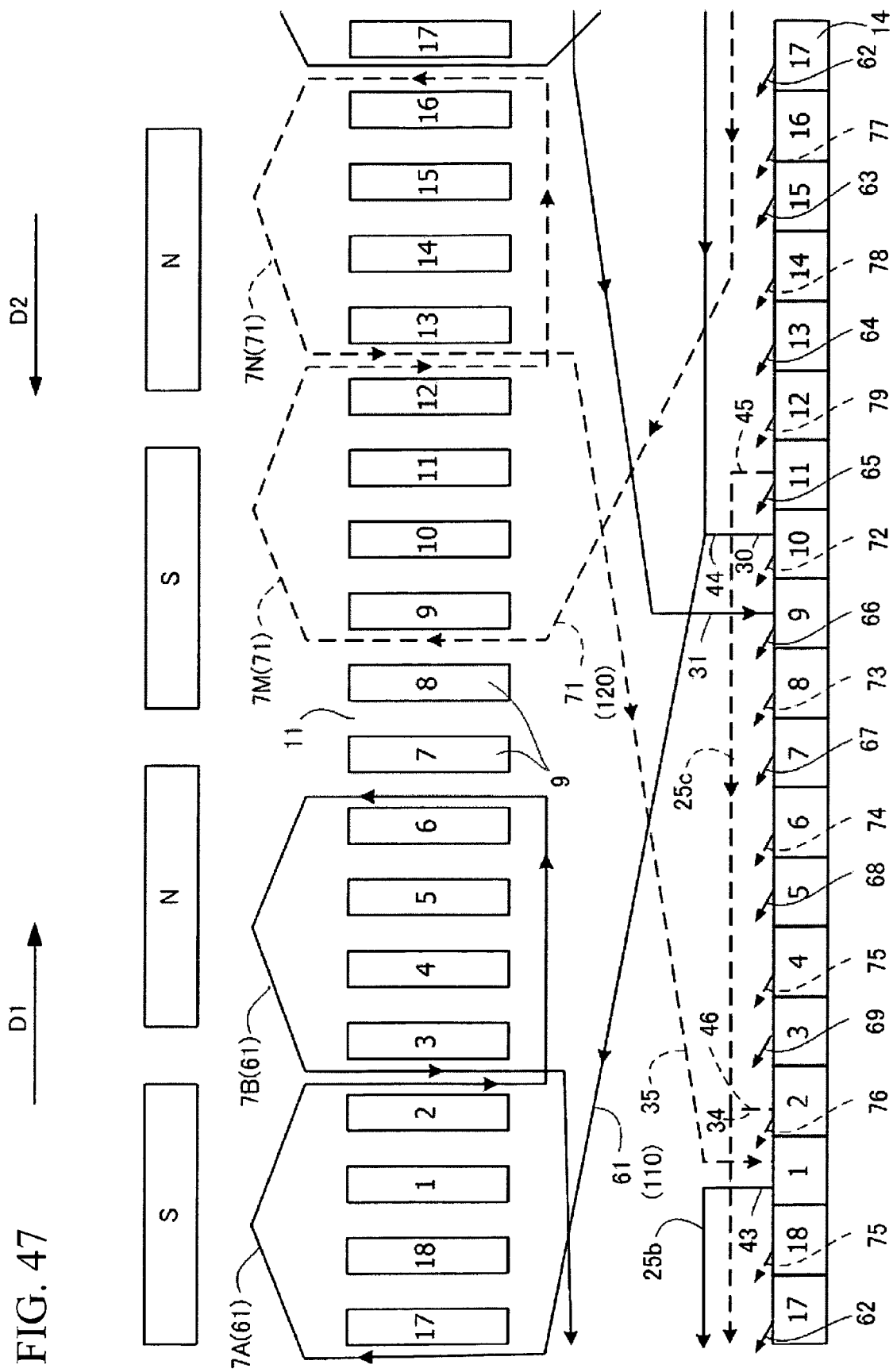
FIG. 47 is a developed view of an armature showing the winding state of an armature coil in a twenty first embodiment of the invention.
Figure 48:
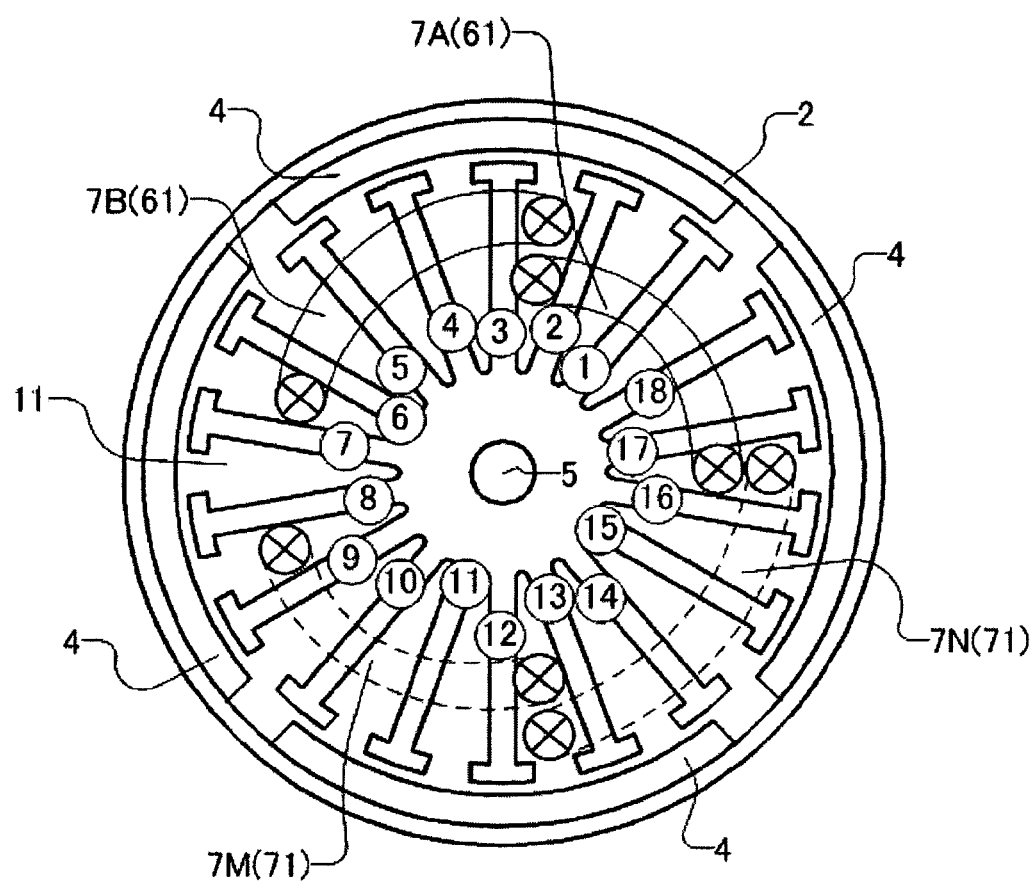
FIG. 48 is a top view of the armature showing the winding state of the armature coil in the twenty first embodiment of the invention.

Next, the winding structure of the armature coil 7 of a twenty first embodiment of the present invention will be described with reference to FIGS. 47 and 48. FIG. 47 is a developed view of the armature, FIG. 48 is a transverse sectional view of the armature, and a gap between adjacent teeth 9 corresponds to the slot 11. Additionally, in FIGS. 47 and 48, the segments 14 provided at the commutator 13 and the teeth 9 provided at the armature core 6 are each numbered.

The electric motor 1 of the twenty first embodiment of the present invention and the electric motor 1 of the first embodiment described above are different from each other only in the winding structure of the armature coil 7, and are the same in the other portions. Accordingly, only the winding structure of the armature coil 7 will be described below, and description of the other portions is omitted.

The armature coil 7 of the twenty first embodiment of the invention includes a first conductive wire 110 and a second conductive wire 120. In addition, in FIG. 47, the first conductive wire 110 is shown by solid lines, and the second conductive wire 120 is indicated by broken lines.

The first to ninth winding wires (61 to 69) are joined together in a series via nine connecting wires 25 which are similarly formed from the first conductive wire 110. That is, the first winding wire 61, the connecting wire 25, the second winding wire 62, the connecting wire 25, the third winding wire 63, the connecting wire 25, the fourth winding wire 64, the connecting wire 25, the fifth winding wire 65, the connecting wire 25, the sixth winding wire 66, the connecting wire 25, the seventh winding wire 67, the connecting wire 25, the eighth winding wire 68, the connecting wire 25, the ninth winding wire 69, and the connecting wire 25 are respectively formed in this order in a series by the first conductive wire 110. Additionally, each connecting wire of the connecting wires 25 which connect the first to ninth winding wires (61 to 69) together is electrically and mechanically connected to the risers 15 formed by a pair of segments 14 and 14 which is arranged at facing positions which are point symmetric with respect to each other about the rotary shaft 5.

On the other hand, the other first to ninth winding wires (71 to 79) are joined together in a series via nine connecting wires 25 which are similarly formed from the second conductive wire 120. That is, the first winding wire 71, the connecting wire 25, the second winding wire 72, the connecting wire 25, the third winding wire 73, the connecting wire 25, the fourth winding wire 74, the connecting wire 25, the fifth winding wire 75, the connecting wire 25, the sixth winding wire 76, the connecting wire 25, the seventh winding wire 77, the connecting wire 25, the eighth winding wire 78, the connecting wire 25, the ninth winding wire 79, and the connecting wire 25 are formed in this order in a series by the second conductive wire 120. Additionally, each connecting wire of the connecting wires 25 which connect the other first to ninth winding wires (71 to 79) together is electrically and mechanically connected to the risers 15 formed by a pair of segments 14 and 14 which is arranged at facing positions which are point symmetric with respect to each other about the rotary shaft 5.

In FIGS. 47 and 48, only winding wire developed views of the first winding wires 61 of the first conductive wire 110 and the first winding wire 71 of the second conductive wire 120 are shown. The first winding wire 61 has a first coil winding wire 7A and a second coil winding wire 7B which are each connected in series to each other. Also, the first winding wire 71 has a third coil winding wire 7M and a fourth coil winding wire 7N which are connected in series to each other. Additionally, the first coil winding wire 7A is wound 12 times so as to surround four teeth 9 which are adjacent to each other, and the second coil winding wire 7B is wound using a slot 11 located in the right direction D1 with respect to the four teeth 9 around which the first coil winding wire 7A is wound as a common slot. Also, the second coil winding wire 7B is wound 13 times so as to surround four other teeth 9 which are adjacent to each other in the right direction D1. Here, the winding direction of the second coil winding wire 7B is opposite to the winding direction of the first coil winding wire 7A.

An end 43 which is a starting point of the connecting wire 25b formed from the first conductive wire 110 is electrically and mechanically connected to the riser 15 formed at the No. 1 segment 14, and as for the connecting wire 25b, an end 44 which is disposed in the left direction D2 and is an end point of the connecting wire 25b is electrically and mechanically connected to the riser 15 of the No. 10 segment 14. Here, the No. 1 segment 14 and the No. 10 segment 14 are arranged at positions which face each other point-symmetrically about the rotary shaft 5.

An end 30 of the first coil winding wire 7A is connected to one segment 14 (No. 10 segment) of the commutator 13, and an end 31 of the second coil winding wire 7B is connected to the segment 14 (No. 9 segment) adjacent in the left direction D2 to the segment 14 to which the end 30 of the first coil winding wire 7A is connected.

In the present embodiment, the first conductive wire 110 and second conductive wire 120 are substantially simultaneously wound around the teeth 9 by a double flyer type winding machine. The first to ninth winding wires (61 to 69) and the connecting wires 25 which join the first to ninth winding wires together in a series are formed by the first conductive wire 110, and the other first to ninth winding wires (71 to 79) and the connecting wires 25 which join the other first to ninth winding wires together in a series are formed by the second conductive wire 120. The end 44 of the connecting wire 25b and the end 30 which is the starting point of the first coil winding wire 7A are joined together in a series, and the first coil winding wire 7A formed by the first conductive wire 110 is wound around the teeth 9 from the end 30.

The arrangement of the first coil winding wire 7A will be described. The first coil winding wire 7A passes through a slit 11 formed between the No. 16 tooth 9 and the No. 17 tooth 9 and a slit 11 formed between the No. 2 tooth 9 and the No. 3 tooth 9, and is wound 12 times clockwise so as to surround the four No. 17 to No. 2 teeth 9 which are close to each other.

The arrangement of the second coil winding wire 7B, which is formed from the first conductive wire 110 similarly to the first coil winding wire 7A and is connected in series to the first coil winding wire 7A, will be described below. The second coil winding wire 7B passes through a slit 11 formed between a No. 2 tooth 9 and a No. 3 tooth 9 and the slit 11 formed between the No. 6 tooth 9 and the No. 7 tooth 9, and is wound 13 times in a counterclockwise direction (opposite direction) opposite to the winding direction of the first coil winding wire 7A so as to surround the four No. 3 to No. 6 teeth 9 which are close to each other. The second coil winding wire 7B is wound in a direction opposite to the first coil 7 winding wire A because the second coil winding wire 7B faces a magnetic pole having polarity (S pole in FIG. 47) different from the polarity (N pole in FIG. 47) of a magnetic pole which the first coil winding wire 7A faces.

The end 31 of the second coil winding wire 7B is connected to the riser 15 formed at the No. 9 segment 14 adjacent in the left direction D2 to the No. 10 segment 14 to which the end 30 of the first coil winding wire 7A is connected.

In this way, the respective winding wires 12 of the first to ninth winding wires (61 to 69) are split into the first coil winding wire 7A and the second coil winding wire 7B, and are wound around the armature core 6. Additionally, the first to ninth winding wires (61 to 69) and the connecting wires 25 which join the first to ninth winding wires together in a series are formed by disposing a single first conductive wire 110 at the armature core 6 and the commutator 13. Therefore, compared to a case where connecting wires are disposed in advance at the commutator 13, and then, winding wires are disposed, the time of winding work is shortened, and mounting of the connecting wires and winding wires to the armature core and commutator 13 is simple.

As described above, each of the first to ninth winding wires (61 to 69) formed by the first conductive wire 110 and each of the other first to ninth winding wires (71 to 79) formed by the second conductive wire 120 corresponding to the first to ninth winding wires are substantially simultaneously wound around the teeth 9 of the armature core 6 by a double flyer type winding machine.

Hereinafter, the other first to ninth winding wires (71 to 79) and the connecting wires 25 which join the other first to ninth winding wires together in a series, which are formed by the second conductive wire 120, will be described from the first winding wire 71.

The first winding wire 71 formed by the second conductive wire 120 has a third coil winding wire 7M and a fourth coil winding wire 7N connected in series to the third coil winding wire 7M, and the third coil winding wire 7M is joined in a series to a connecting wire 25c similarly formed from the second conductive wire 120.

An end 45 which is a starting point of the connecting wire 25c formed from the second conductive wire 120 is electrically and mechanically connected to the riser 15 formed at the No. 11 segment 14, and as for the connecting wire 25c, an end 46 which is disposed in the left direction D2 and is an end point of the connecting wire 25c is electrically and mechanically connected to the riser 15 of the No. 2 segment 14. Here, the No. 11 segment 14 and the No. 2 segment 14 are arranged at positions which face each other point-symmetrically about the rotary shaft 5. The end 46 of the connecting wire 25c and the end 34 which is the starting point of the third coil winding wire 7M are joined together in a series, and the third coil winding wire 7M formed by the second conductive wire 120 is wound around the teeth 9 from the end 34.

An end 34 of the third coil winding wire 7M is connected to one segment 14 (No. 2 segment) of the commutator 13, and an end 35 of the fourth coil winding wire 7N is connected in the left direction D2 to the segment 14 (No. 1 segment) adjacent to the segment 14 to which the end 34 of the third coil winding wire 7M is connected.

The third coil winding wire 7M passes through a slit 11 formed between the No. 8 tooth 9 and the No. 9 tooth 9 and a slit 11 formed between the No. 12 tooth 9 and the No. 13 tooth 9, and is wound 12 times clockwise so as to surround the four No. 9 to No. 12 teeth 9 which are close to each other.

The arrangement of the fourth coil winding wire 7N, which is formed by the second conductive wire 120 similarly to the third coil winding wire 7M and is connected in series to the third coil winding wire 7M, will be described below. The fourth coil winding wire 7N passes through a slit 11 formed between a No. 12 tooth 9 and a No. 13 tooth 9 and the slit 11 formed between the No. 16 tooth 9 and the No. 17 tooth 9, and is wound 13 times in a counterclockwise direction opposite to the winding direction of the third coil winding wire 7M so as to surround the four No. 13 to No. 16 teeth 9 which are close to each other. The fourth coil winding wire 7N is wound in an opposite direction to the third coil winding wire 7M because the fourth coil winding wire 7N faces a magnetic pole having polarity (S pole in FIG. 47) different from the polarity (N pole in FIG. 47) of a magnetic pole which the third coil winding wire 7M faces.

Here, the slot 11 of the second coil winding wire 7B wound by the first conductive wire 110 on the right direction D1 side and the slot 11 of the third coil winding wire 7M wound by the second conductive wire 120 on the left direction D2 side are spaced apart from each other by one slot 11 (two teeth).

Accordingly, according to the above-described twenty first embodiment, the same effects as those of the aforementioned seventeenth embodiment can be exhibited.

INDUSTRIAL APPLICABILITY

According to the invention, in the electric motor capable of changing the rotational speed of the armature by switching application of an electric current among three brushes, vibration and operating noise can be reduced, and mounting of the connecting wires and the winding wires can be facilitated.

REFERENCE SIGNS LIST

1: ELECTRIC MOTOR
2: YOKE
3: ARMATURE
4: MAGNET
5: ROTARY SHAFT
6: ARMATURE CORE
7: ARMATURE COIL
7A: FIRST COIL WINDING WIRE
7B: SECOND COIL WINDING WIRE
7M: THIRD COIL WINDING WIRE
7N: FOURTH COIL WINDING WIRE
7C: CROSSOVER
9: TOOTH
11: SLOT
12: WINDING WIRE
13: COMMUTATOR
14: SEGMENT
15: RISER
16: BEARING
21: BRUSH
21a: BRUSH FOR LOW SPEED
21b: BRUSH FOR HIGH SPEED
21c: COMMON BRUSH
25: CONNECTING WIRE
30: END (END OF FIRST COIL WINDING WIRE)
31: END (END OF SECOND COIL WINDING WIRE)
61 TO 69: FIRST TO NINTH WINDING WIRES
71 TO 79: OTHER FIRST TO NINTH WINDING WIRES
110: FIRST CONDUCTIVE WIRE
120: SECOND CONDUCTIVE WIRE

The invention claimed is:
1. An electric motor comprising:
a housing which is a magnetic yoke;
a plurality of pairs of magnets fixed onto the inner wall of the housing;
an armature including a rotary shaft, an armature core which is fixed onto the rotary shaft and has a plurality of radially formed teeth, a commutator which is fixed onto the rotary shaft and has a plurality of segments, an armature coil wound so as to surround the teeth of the armature core and having a plurality of winding wires con- nected to the segments of the commutator, and a plurality of connecting wires connecting one pair of segments of the commutator, wherein the armature is arranged so as to be surrounded by the plurality of pairs of magnets and is rotatably supported by the housing; and a plurality of brushes capable of making sliding contact with the segments of the commutator of the armature, wherein the number of pole pairs of the magnets is two, the number of the teeth is 18, and the number of the segments of the commutator is 18, wherein the armature has a first conductive wire and a second conductive wire, wherein the plurality of winding wires has first to ninth winding wires formed from the first conductive wire, and other first to ninth winding wires formed from the second conductive wire and arranged so as to each face respective winding wires of the first to ninth winding wires, wherein the first to the ninth winding wires are joined together in a series via respective connecting wires of the nine connecting wires formed from the first conductive wire, wherein the other first to ninth winding wires are joined together in a series via respective connecting wires of the other nine connecting wires formed from the second conductive wire, wherein respective winding wires of the first to ninth winding wires and the other first to ninth winding wires have a first coil winding wire and a second coil winding wire which are connected in series to each other, an end of the first coil winding wire is connected to one segment of the commutator, and an end of the second coil winding wire is connected to a segment adjacent to a segment arranged at a position which is point symmetric about the rotary shaft with respect to the segment to which the end of the first coil winding wire is connected, wherein the first coil winding wire is wound so as to surround four teeth adjacent to each other, and the second coil winding wire is arranged at a position adjacent to the four teeth around which the first coil winding wire is wound, and is wound so as to surround four other teeth adjacent to each other, wherein the winding direction of the second coil winding wire is opposite to the winding direction of the first coil winding wire, wherein respective connecting wires of the nine connecting wires and respective connecting wires of the other nine connecting wires are connected to one pair of segments which is arranged to face each other, and wherein the brushes have first and second brushes selectively connected to a first power supply terminal, and a third brush connected to a second power supply terminal, the first brush is arranged at a position separated from the third brush by an electrical angle of about 180°, and the second brush is arranged at a position separated by a predetermined angle from a position separated from the third brush by an electric angle of about 180°.

2. The electric motor according to claim 1, wherein the second coil winding wire is arranged in the right direction with respect to the first coil winding wire, and the segment to which the end of the second coil winding wire is connected is arranged in the right direction with respect to the segment which is arranged at a position which is point symmetric with respect to the segment to which the end of the first coil winding wire is connected.

3. An electric motor comprising:

a housing which is a magnetic yoke;

a plurality of pairs of magnets fixed onto the inner wall of the housing;

an armature including a rotary shaft, an armature core which is fixed onto the rotary shaft and has a plurality of radially formed teeth, a commutator which is fixed onto the rotary shaft and has a plurality of segments, an armature coil wound so as to surround the teeth of the armature core and having a plurality of winding wires connected to the segments of the commutator, and a plurality of connecting wires connecting one pair of segments of the commutator, wherein the armature is arranged so as to be surrounded by the plurality of pairs of magnets and is rotatably supported by the housing; and a plurality of brushes capable of making sliding contact with the segments of the commutator of the armature, wherein the number of pole pairs of the magnets is two, the number of the teeth is 18, and the number of the segments of the commutator is 18, wherein the armature has a first conductive wire and a second conductive wire, wherein the plurality of winding wires has first to ninth winding wires formed from the first conductive wire, and other first to ninth winding wires formed from the second conductive wire and arranged so as to each face respective winding wires of the first to ninth winding wires, wherein the first to the ninth winding wires are joined together in a series via respective connecting wires of the nine connecting wires formed from the first conductive wire, wherein the other first to ninth winding wires are joined together in a series via respective connecting wires of the other nine connecting wires formed from the second conductive wire, wherein respective winding wires of the first to ninth winding wires and the other first to ninth winding wires have a first coil winding wire and a second coil winding wire which are connected in series to each other, an end of the first coil winding wire is connected to one segment of the commutator, and an end of the second coil winding wire is connected to a segment adjacent to a segment arranged at a position which is point symmetric about the rotary shaft with respect to the segment to which the end of the first coil winding wire is connected, wherein the first coil winding wire is wound so as to surround four teeth adjacent to each other, and the second coil winding wire is arranged at a position adjacent to the four teeth around which the first coil winding wire is wound with one tooth therebetween, and is wound so as to surround four other teeth adjacent to each other, wherein the winding direction of the second coil winding wire is opposite to the winding direction of the first coil winding wire, wherein respective connecting wires of the nine connecting wires and respective connecting wires of the other nine connecting wires are connected to one pair of segments which is arranged to face each other, and wherein the brushes have first and second brushes selectively connected to a first power supply terminal, and a third brush connected to a second power supply terminal, the first brush is arranged at a position separated from the third brush by an electrical angle of about 180°, and the second brush is arranged at a position separated by a predetermined angle from a position separated from the third brush by an electric angle of about 180°.

4. The electric motor according to claim 3,
wherein the second coil winding wire is arranged in the right direction with respect to the first coil winding wire, and the segment to which the end of the second coil winding wire is connected is arranged in the right direction with respect to the segment which is arranged at a position which is point symmetric with respect to the segment to which the end of the first coil winding wire is connected.

5. An electric motor comprising:
a housing which is a magnetic yoke;
a plurality of pairs of magnets fixed onto the inner wall of the housing;
an armature including a rotary shaft, an armature core which is fixed onto the rotary shaft and has a plurality of radially formed teeth, a commutator which is fixed onto the rotary shaft and has a plurality of segments, an armature coil wound so as to surround the teeth of the armature core and having a plurality of winding wires connected to the segments of the commutator, and a plurality of connecting wires connecting one pair of segments of the commutator, wherein the armature is arranged so as to be surrounded by the plurality of pairs of magnets and is rotatably supported by the housing; and
a plurality of brushes capable of making sliding contact with the segments of the commutator of the armature,
wherein segments which exist at positions which are point symmetric about the rotary shaft among the segments are electrically connected to each other via the connecting wires,
wherein the number of pole pairs of the magnets is two, the number of the teeth is 18, and the number of the segments of the commutator is 18,
wherein the armature has a first conductive wire and a second conductive wire,
wherein the plurality of winding wires has first to ninth winding wires formed from the first conductive wire, and other first to ninth winding wires formed from the second conductive wire and arranged so as to each face respective winding wires of the first to ninth winding wires,
wherein respective winding wires of the first to ninth winding wires and the other first to ninth winding wires have a first coil winding wire and a second coil winding wire which are connected in series to each other, an end of the first coil winding wire is connected to one segment of the commutator, and an end of the second coil winding wire is connected to a segment adjacent to the segment to which the end of the first coil winding wire is connected,
wherein the first coil winding wire is wound so as to surround four teeth adjacent to each other, and the second coil winding wire is arranged at a position adjacent to the four teeth around which the first coil winding wire is wound, and is wound so as to surround five teeth adjacent to each other,
wherein the winding direction of the second coil winding wire is opposite to the winding direction of the first coil winding wire,
wherein respective connecting wires of the nine connecting wires and respective connecting wires of the other nine connecting wires are connected to one pair of segments which is arranged to face each other, and
wherein the brushes have first and second brushes selectively connected to a first power supply terminal, and a third brush connected to a second power supply terminal, the first brush is arranged at a position separated from the third brush by an electrical angle of about 180°, and the second brush is arranged at a position separated by a predetermined angle from a position separated from the third brush by an electric angle of about 180°.

6. An electric motor comprising:
a housing which is a magnetic yoke;
a plurality of pairs of magnets fixed onto the inner wall of the housing;
an armature including a rotary shaft, an armature core which is fixed onto the rotary shaft and has a plurality of radially formed teeth, a commutator which is fixed onto the rotary shaft and has a plurality of segments, an armature coil wound so as to surround the teeth of the armature core and having a plurality of winding wires connected to the segments of the commutator, and a plurality of connecting wires connecting one pair of segments of the commutator, wherein the armature is arranged so as to be surrounded by the plurality of pairs of magnets and is rotatably supported by the housing; and
a plurality of brushes capable of making sliding contact with the segments of the commutator of the armature,
wherein segments which exist at positions which are point symmetric about the rotary shaft among the segments are electrically connected to each other via the connecting wires,
wherein the number of pole pairs of the magnets is two, the number of the teeth is 18, and the number of the segments of the commutator is 18,
wherein the armature has a first conductive wire and a second conductive wire,
wherein the plurality of winding wires has first to ninth winding wires formed from the first conductive wire, and other first to ninth winding wires formed from the second conductive wire and arranged so as to each face respective winding wires of the first to ninth winding wires,
wherein respective winding wires of the first to ninth winding wires and the other first to ninth winding wires have a first coil winding wire and a second coil winding wire which are connected in series to each other, an end of the first coil winding wire is connected to one segment of the commutator, and an end of the second coil winding wire is connected to a segment adjacent to a segment arranged at a position which is point symmetric about the rotary shaft with respect to the segment to which the end of the first coil winding wire is connected,
wherein the first coil winding wire is wound so as to surround four teeth adjacent to each other, and the second coil winding wire is arranged at a position adjacent to the four teeth around which the first coil winding wire is wound, and is wound so as to surround five teeth adjacent to each other,
wherein the winding direction of the second coil winding wire is opposite to the winding direction of the first coil winding wire, and
wherein the brushes have first and second brushes selectively connected to a first power supply terminal, and a third brush connected to a second power supply terminal, the first brush is arranged at a position separated from the third brush by an electrical angle of about 180°, and the second brush is arranged at a position separated by a predetermined angle from a position separated from the third brush by an electric angle of about 180°.

7. An electric motor comprising:

a housing which is a magnetic yoke;

a plurality of pairs of magnets fixed onto the inner wall of the housing;

an armature including a rotary shaft, an armature core which is fixed onto the rotary shaft and has a plurality of radially formed teeth, a commutator which is fixed onto the rotary shaft and has a plurality of segments, an armature coil wound so as to surround the teeth of the armature core and having a plurality of winding wires connected to the segments of the commutator, and a plurality of connecting wires connecting one pair of segments of the commutator, wherein the armature is arranged so as to be surrounded by the plurality of pairs of magnets and is rotatably supported by the housing; and a plurality of brushes capable of making sliding contact with the segments of the commutator of the armature, wherein segments which exist at positions which are point symmetric about the rotary shaft among the segments are electrically connected to each other via the connecting wires, wherein the number of pole pairs of the magnets is two, the number of the teeth is 18, and the number of the segments of the commutator is 18, wherein the armature has a first conductive wire and a second conductive wire, wherein the plurality of winding wires has first to ninth winding wires formed from the first conductive wire, and other first to ninth winding wires formed from the second conductive wire and arranged so as to each face respective winding wires of the first to ninth winding wires, wherein respective winding wires of the first to ninth winding wires and the other first to ninth winding wires have a first coil winding wire and a second coil winding wire which are connected in series to each other, an end of the first coil winding wire is connected to one segment of the commutator, and an end of the second coil winding wire is connected to a segment adjacent to the segment to which the end of the first coil winding wire is connected, wherein the first coil winding wire is wound so as to surround four teeth adjacent to each other, and the second coil winding wire is arranged at a position adjacent to the four teeth around which the first coil winding wire is wound with one tooth therebetween, and is wound so as to surround three teeth adjacent to each other, wherein the winding direction of the second coil winding wire is opposite to the winding direction of the first coil winding wire, wherein respective connecting wires of the nine connecting wires and respective connecting wires of the other nine connecting wires are connected to one pair of segments which is arranged to face each other, and wherein the brushes have first and second brushes selectively connected to a first power supply terminal, and a third brush connected to a second power supply terminal, the first brush is arranged at a position separated from the third brush by an electrical angle of about 180°, and the second brush is arranged at a position separated by a predetermined angle from a position separated from the third brush by an electric angle of about 180°.

8. An electric motor comprising:

a housing which is a magnetic yoke;

a plurality of pairs of magnets fixed onto the inner wall of the housing;

an armature including a rotary shaft, an armature core which is fixed onto the rotary shaft and has a plurality of radially formed teeth, a commutator which is fixed onto the rotary shaft and has a plurality of segments, an armature coil wound so as to surround the teeth of the armature core and having a plurality of winding wires connected to the segments of the commutator, and a plurality of connecting wires connecting one pair of segments of the commutator, wherein the armature is arranged so as to be surrounded by the plurality of pairs of magnets and is rotatably supported by the housing; and a plurality of brushes capable of making sliding contact with the segments of the commutator of the armature, wherein segments which exist at positions which are point symmetric about the rotary shaft among the segments are electrically connected to each other via the connecting wires, wherein the number of pole pairs of the magnets is two, the number of the teeth is 18, and the number of the segments of the commutator is 18, wherein the armature has a first conductive wire and a second conductive wire, wherein the plurality of winding wires has first to ninth winding wires formed from the first conductive wire, and other first to ninth winding wires formed from the second conductive wire and arranged so as to each face respective winding wires of the first to ninth winding wires, wherein respective winding wires of the first to ninth winding wires and the other first to ninth winding wires have a first coil winding wire and a second coil winding wire which are connected in series to each other, an end of the first coil winding wire is connected to one segment of the commutator, and an end of the second coil winding wire is connected to a segment adjacent to a segment arranged at a position which is point symmetric about the rotary shaft with respect to the segment to which the end of the first coil winding wire is connected, wherein the first coil winding wire is wound so as to surround four teeth adjacent to each other, and the second coil winding wire is arranged at a position adjacent to the four teeth around which the first coil winding wire is wound with one tooth therebetween, and is wound so as to surround three teeth adjacent to each other, wherein the winding direction of the second coil winding wire is opposite to the winding direction of the first coil winding wire, wherein respective connecting wires of the nine connecting wires and respective connecting wires of the other nine connecting wires are connected to one pair of segments which is arranged to face each other, and wherein the brushes have first and second brushes selectively connected to a first power supply terminal, and a third brush connected to a second power supply terminal, the first brush is arranged at a position separated from the third brush by an electrical angle of about 180°, and the second brush is arranged at a position separated by a predetermined angle from a position separated from the third brush by an electric angle of about 180°.

9. The electric motor according to claim 5, wherein the second coil winding wire is arranged in the right direction with respect to the first coil winding wire.

10. An electric motor comprising:

a housing which is a magnetic yoke;

a plurality of pairs of magnets fixed onto the inner wall of the housing;

an armature including a rotary shaft, an armature core which is fixed onto the rotary shaft and has a plurality of radially formed teeth, a commutator which is fixed onto the rotary shaft and has a plurality of segments, an armature coil wound so as to surround the teeth of the armature core and having a plurality of winding wires connected to the segments of the commutator, and a plurality of connecting wires connecting one pair of segments of the commutator, wherein the armature is arranged so as to be surrounded by the plurality of pairs of magnets and is rotatably supported by the housing; and a plurality of brushes capable of making sliding contact with the segments of the commutator of the armature, wherein segments which exist at positions which are point symmetric about the rotary shaft among the segments are electrically connected to each other via the connecting wires, wherein the number of pole pairs of the magnets is two, the number of the teeth is 18, and the number of the segments of the commutator is 18, wherein the armature has a first conductive wire and a second conductive wire, wherein the plurality of winding wires has first to ninth winding wires formed from the first conductive wire, and other first to ninth winding wires formed from the second conductive wire and arranged so as to each face respective winding wires of the first to ninth winding wires, wherein respective winding wires of the first to ninth winding wires and the other first to ninth winding wires form first to fourth coil winding wires which are connected in series to each other, wherein an end of the first coil winding wire is connected to one segment of the commutator, and an end of the fourth coil winding wire is connected to a segment adjacent to the segment to which the end of the first coil winding wire is connected, wherein the first coil winding wire is wound so as to surround four teeth adjacent to each other, wherein the second coil winding wire is arranged at a position adjacent to the four teeth around which the first coil winding wire is wound, and is wound so as to surround five teeth adjacent to each other, wherein the third coil winding wire is arranged at a position adjacent, on the side opposite to the side where the first coil winding wire exists, to the five teeth around which the second coil winding wire is wound, and is wound so as to surround four other teeth adjacent to each other, wherein the fourth coil winding wire is arranged at a position adjacent, on the side opposite to the side where the second coil winding wire exists, to the four teeth around which the third coil winding wire is wound, and is wound so as to surround five other teeth adjacent to each other, wherein the first coil winding wire and the third coil winding wire are wound in the same direction as each other, the second coil winding wire and the fourth coil winding wire are wound in the same direction as each other, and the winding direction of the first coil winding wire and the winding direction of the second coil winding wire are directions opposite to each other, wherein respective connecting wires of the nine connecting wires and respective connecting wires of the other nine connecting wires are connected to one pair of segments which is arranged to face each other, and wherein the brushes have first and second brushes selectively connected to a first power supply terminal, and a third brush connected to a second power supply terminal, the first brush is arranged at a position separated from the third brush by an electrical angle of about 180°, and the second brush is arranged at a position separated by a predetermined angle from a position separated from the third brush by an electric angle of about 180°.

11. An electric motor comprising:

a housing which is a magnetic yoke;

a plurality of pairs of magnets fixed onto the inner wall of the housing;

an armature including a rotary shaft, an armature core which is fixed onto the rotary shaft and has a plurality of radially formed teeth, a commutator which is fixed onto the rotary shaft and has a plurality of segments, an armature coil wound so as to surround the teeth of the armature core and having a plurality of winding wires connected to the segments of the commutator, and a plurality of connecting wires connecting one pair of segments of the commutator, wherein the armature is arranged so as to be surrounded by the plurality of pairs of magnets and is rotatably supported by the housing; and a plurality of brushes capable of making sliding contact with the segments of the commutator of the armature, wherein segments which exist at positions which are point symmetric about the rotary shaft among the segments are electrically connected to each other via the connecting wires, wherein the number of pole pairs of the magnets is two, the number of the teeth is 18, and the number of the segments of the commutator is 18, wherein the armature has a first conductive wire and a second conductive wire, wherein the plurality of winding wires has first to ninth winding wires formed from the first conductive wire, and other first to ninth winding wires formed from the second conductive wire and arranged so as to each face respective winding wires of the first to ninth winding wires, wherein respective winding wires of the first to ninth winding wires and the other first to ninth winding wires form first to fourth coil winding wires which are connected in series to each other, wherein an end of the first coil winding wire is connected to one segment of the commutator, and an end of the fourth coil winding wire is connected to a segment adjacent to the segment to which the end of the first coil winding wire is connected, wherein the first coil winding wire is wound so as to surround four teeth adjacent to each other, wherein the second coil winding wire is arranged at a position adjacent to the four teeth around which the first coil winding wire is wound with one tooth therebetween, and is wound so as to surround three teeth adjacent to each other, wherein the third coil winding wire is arranged at a position adjacent, on the side opposite to the side where the first coil winding wire exists, to the three teeth around which the second coil winding wire is wound with one tooth therebetween, and is wound so as to surround four other teeth adjacent to each other, wherein the fourth coil winding wire is arranged at a position adjacent, on the side opposite to the side where the second coil winding wire exists, to the four teeth around which the third coil winding wire is wound with one tooth therebetween, and is wound so as to surround three other teeth adjacent to each other, wherein the first coil winding wire and the third coil winding wire are wound in the same direction as each other, the second coil winding wire and the fourth coil winding wire are wound in the same direction as each other, and the winding direction of the first coil winding wire and the winding direction of the second coil winding wire are directions opposite to each other, wherein respective connecting wires of the nine connecting wires and respective connecting wires of the other nine connecting wires are connected to one pair of segments which is arranged to face each other, and wherein the brushes have first and second brushes selectively connected to a first power supply terminal, and a third brush connected to a second power supply terminal, the first brush is arranged at a position separated from the third brush by an electrical angle of about 180°, and the second brush is arranged at a position separated by a predetermined angle from a position separated from the third brush by an electric angle of about 180°.

12. The electric motor according to claim 5,
wherein the connecting wires includes nine connecting wires formed from the first conductive wire, and other nine connecting wires formed from the second conductive wire, wherein the first to ninth winding wires are joined together in a series via respective connecting wires of the nine connecting wires, and wherein the other first to ninth winding wires are joined together in a series via respective connecting wires of the other nine connecting wires.

13. An electric motor comprising:
a housing which is a magnetic yoke;
a plurality of pairs of magnets fixed onto the inner wall of the housing;
an armature including a rotary shaft, an armature core which is fixed onto the rotary shaft and has a plurality of radially formed teeth, a commutator which is fixed onto the rotary shaft and has a plurality of segments, an armature coil wound so as to surround the teeth of the armature core and having a plurality of winding wires connected to the segments of the commutator, and a plurality of connecting wires connecting one pair of (two) segments of the commutator, wherein the armature is arranged so as to be surrounded by the plurality of pairs of magnets and is rotatably supported by the housing; and
a plurality of brushes capable of making sliding contact with the segments of the commutator of the armature, wherein the number of pole pairs of the magnets is two, the number of the teeth is 18, and the number of the segments of the commutator is 18, wherein the armature has a first conductive wire and a second conductive wire, wherein the plurality of winding wires has first to ninth winding wires formed from the first conductive wire, and other first to ninth winding wires formed from the second conductive wire and arranged so as to each face respective winding wires of the first to ninth winding wires, wherein the first to the ninth winding wires are joined together in a series via respective connecting wires of the nine connecting wires formed from the first conductive wire, wherein the other first to ninth winding wires are joined together in a series via respective connecting wires of the other nine connecting wires formed from the second conductive wire, wherein respective winding wires of the first to ninth winding wires and the other first to ninth winding wires form first to fourth coil winding wires which are connected in series to each other, an end of the first coil winding wire is connected to one segment of the commutator, and an end of the fourth coil winding wire is connected to a segment adjacent to a segment existing at a position which is point symmetric about the rotary shaft with respect to the segment to which the end of the first coil winding wire is connected, wherein the first coil winding wire is wound so as to surround four teeth adjacent to each other, wherein the second coil winding wire is arranged at a position adjacent to the four teeth around which the first coil winding wire is wound, and is wound so as to surround four other teeth adjacent to each other, wherein the third coil winding wire is arranged at a position adjacent, on the side opposite to the side where the first coil winding wire exists, to the four teeth around which the second coil winding wire is wound with one tooth therebetween, and is wound so as to surround four other teeth adjacent to each other, wherein the fourth coil winding wire is arranged at a position adjacent, on the side opposite to the side where the second coil winding wire exists, to the four teeth around which the third coil winding wire is wound, and is wound so as to surround four other teeth adjacent to each other, wherein the winding direction of the second coil winding wire is opposite to the winding direction of the first coil winding wire, wherein respective connecting wires of the nine connecting wires and respective connecting wires of the other nine connecting wires are connected to one pair of segments which is arranged to face each other, and wherein the plurality of brushes have first and second brushes selectively connected to a first power supply terminal, and a third brush connected to a second power supply terminal, the first brush is arranged at a position separated from the third brush by an electrical angle of about 180°, and the second brush is arranged at a position separated by a predetermined angle from a position separated from the third brush by an electric angle of about 180°.

14. An electric motor comprising:
a housing which is a magnetic yoke;
a plurality of pairs of magnets fixed onto the inner wall of the housing;
an armature including a rotary shaft, an armature core which is fixed onto the rotary shaft and has a plurality of radially formed teeth, a commutator which is fixed onto the rotary shaft and has a plurality of segments, an armature coil wound so as to surround the teeth of the armature core and having a plurality of winding wires connected to the segments of the commutator, and a plurality of connecting wires connecting one pair of (two) segments of the commutator, wherein the armature is arranged so as to be surrounded by the plurality of pairs of magnets and is rotatably supported by the housing; and
a plurality of brushes capable of making sliding contact with the segments of the commutator of the armature, wherein the number of pole pairs of the magnets is two, the number of the teeth is 18, and the number of the segments of the commutator is 18, wherein the armature has a first conductive wire and a second conductive wire, wherein the plurality of winding wires has first to ninth winding wires formed from the first conductive wire, and other first to ninth winding wires formed from the second conductive wire and arranged so as to each face respective winding wires of the first to ninth winding wires, wherein the first to the ninth winding wires are joined together in a series via respective connecting wires of the nine connecting wires formed from the first conductive wire, wherein the other first to ninth winding wires are joined together in a series via respective connecting wires of the other nine connecting wires formed from the second conductive wire, wherein respective winding wires of the first to ninth winding wires and the other first to ninth winding wires form first to fourth coil winding wires which are connected in series to each other, an end of the first coil winding wire is connected to one segment of the commutator, and an end of the fourth coil winding wire is connected to a segment adjacent to a segment arranged at a position which is point symmetric about the rotary shaft with respect to the segment to which the end of the first coil winding wire is connected, wherein the first coil winding wire is wound so as to surround four teeth adjacent to each other, wherein the second coil winding wire is arranged at a position adjacent to the four teeth around which the first coil winding wire is wound with one tooth therebetween, and is wound so as to surround four other teeth adjacent to each other, wherein the third coil winding wire is arranged at a position adjacent, on the side opposite to the side where the first coil winding wire exists, to the four teeth around which the second coil winding wire is wound, and is wound so as to surround four other teeth adjacent to each other, wherein the fourth coil winding wire is arranged at a position adjacent, on the side opposite to the side where the first coil winding wire exists, to the four teeth around which the third coil winding wire is wound with one tooth therebetween, and is wound so as to surround four other teeth adjacent to each other, wherein the winding direction of the second coil winding wire is opposite to the winding direction of the first coil winding wire, wherein respective connecting wires of the nine connecting wires and respective connecting wires of the other nine connecting wires are connected to one pair of segments which is arranged to face each other, and wherein the plurality of brushes have first and second brushes selectively connected to a first power supply terminal, and a third brush connected to a second power supply terminal, the first brush is arranged at a position separated from the third brush by an electrical angle of about 180°, and the second brush is arranged at a position separated by a predetermined angle from a position separated from the third brush by an electric angle of about 180°.

15. An electric motor comprising:

a housing which is a magnetic yoke;

a plurality of pairs of magnets fixed onto the inner wall of the housing;

an armature including a rotary shaft, an armature core which is fixed onto the rotary shaft and has a plurality of radially formed teeth, a commutator which is fixed onto the rotary shaft and has a plurality of segments, an armature coil wound so as to surround the teeth of the armature core and having a plurality of winding wires connected to the segments of the commutator, and a plurality of connecting wires connecting one pair of segments of the commutator, wherein the armature is arranged so as to be surrounded by the plurality of pairs of magnets and is rotatably supported by the housing; and a plurality of brushes capable of making sliding contact with the segments of the commutator of the armature, wherein the number of pole pairs of the magnets is two, the number of the teeth is 18, and the number of the segments of the commutator is 18, wherein the armature has a first conductive wire and a second conductive wire, wherein the plurality of winding wires has first to ninth winding wires formed from the first conductive wire, and other first to ninth winding wires formed from the second conductive wire and arranged so as to each face respective winding wires of the first to ninth winding wires, wherein the first to the ninth winding wires are joined together in a series via respective connecting wires of the nine connecting wires formed from the first conductive wire, wherein the other first to ninth winding wires are joined together in a series via respective connecting wires of the other nine connecting wires formed from the second conductive wire, wherein respective winding wires of the first to ninth winding wires and the other first to ninth winding wires form first to fourth coil winding wires which are connected in series to each other, an end of the first coil winding wire is connected to one segment of the commutator in the state of being wound around the rotary shaft, and an end of the fourth coil winding wire is connected to a segment adjacent to the segment to which the end of the first coil winding wire is connected in the state of being wound around the rotary shaft, wherein the first coil winding wire is wound so as to surround four teeth adjacent to each other, wherein the second coil winding wire is arranged at a position adjacent to the four teeth around which the first coil winding wire is wound, and is wound so as to surround four other teeth adjacent to each other, wherein the third coil winding wire is arranged at a position adjacent, on the side opposite to the side where the first coil winding wire exists, to the four teeth around which the second coil winding wire is wound with one tooth therebetween, and is wound so as to surround four other teeth adjacent to each other, wherein the fourth coil winding wire is arranged at a position adjacent, on the side opposite to the side where the second coil winding wire exists, to the four teeth around which the third coil winding wire is wound, and is wound so as to surround four other teeth adjacent to each other, wherein the winding direction of the second coil winding wire is opposite to the winding direction of the first coil winding wire, wherein the nine connecting wires and the other nine connecting wires are each connected to one pair of segments which is arranged to face each other in a radial direction and wherein the plurality of brushes have first and second brushes selectively connected to a first power supply terminal, and a third brush connected to a second power supply terminal, the first brush is arranged at a position separated from the third brush by an electrical angle of about 180°, and the second brush is arranged at a position separated by a predetermined angle from a position separated from the third brush by an electric angle of about 180°.

16. An electric motor comprising:

a housing which is a magnetic yoke;

a plurality of pairs of magnets fixed onto the inner wall of the housing;

an armature including a rotary shaft, an armature core which is fixed onto the rotary shaft and has a plurality of radially formed teeth, a commutator which is fixed onto the rotary shaft and has a plurality of segments, an armature coil wound so as to surround the teeth of the armature core and having a plurality of winding wires connected to the segments of the commutator, and a plurality of connecting wires connecting one pair of segments of the commutator, wherein the armature is arranged so as to be surrounded by the plurality of pairs of magnets and is rotatably supported by the housing; and a plurality of brushes capable of making sliding contact with the segments of the commutator of the armature, wherein the number of pole pairs of the magnets is two, the number of the teeth is 18, and the number of the segments of the commutator is 18, wherein the armature has a first conductive wire and a second conductive wire, wherein the plurality of winding wires has first to ninth winding wires formed from the first conductive wire, and other first to ninth winding wires formed from the second conductive wire and arranged so as to each face respective winding wires of the first to ninth winding wires, wherein the first to the ninth winding wires are joined together in a series via respective connecting wires of the nine connecting wires formed from the first conductive wire, wherein the other first to ninth winding wires are joined together in a series via respective connecting wires of the other nine connecting wires formed from the second conductive wire, wherein respective winding wires of the first to ninth winding wires and the other first to ninth winding wires form first to fourth coil winding wires which are connected in series to each other, an end of the first coil winding wire is connected to one segment of the commutator in the state of being wound around the rotary shaft, and an end of the fourth coil winding wire is connected to a segment adjacent to the segment to which the end of the first coil winding wire is connected in the state of being wound around the rotary shaft, wherein the first coil winding wire is wound so as to surround four teeth adjacent to each other, wherein the second coil winding wire is wound so as to surround four other teeth which are adjacent to each other and which are five teeth away with respect to the four teeth around which the first coil winding wire is wound, wherein the third coil winding wire is arranged at a position adjacent, on the side opposite to the side where the first coil winding wire exists, to the four teeth around which the second coil winding wire is wound, and is wound so as to surround four other teeth adjacent to each other, wherein the fourth coil winding wire is arranged at a position adjacent to the four teeth around which the first coil winding wire is wound between the first coil winding wire and the second coil winding wire, and is wound so as to surround four other teeth adjacent to each other, wherein the winding directions of the first coil winding wire and the second coil winding wire are the same as each other, the winding directions of the third coil winding wire and the fourth coil winding wire are the same as each other, and the winding direction of the first coil winding wire and the winding direction of the third coil winding wire are opposite to each other, wherein the nine connecting wires and the other nine connecting wires are each connected to one pair of segments which is arranged to face each other in a radial direction and wherein the plurality of brushes have first and second brushes selectively connected to a first power supply terminal, and a third brush connected to a second power supply terminal, the first brush is arranged at a position separated from the third brush by an electrical angle of about 180°, and the second brush is arranged at a position separated by a predetermined angle from a position separated from the third brush by an electric angle of about 180°.

17. An electric motor comprising:

a housing which is a magnetic yoke;

a plurality of pairs of magnets fixed onto the inner wall of the housing;

an armature including a rotary shaft, an armature core which is fixed onto the rotary shaft and has a plurality of radially formed teeth, a commutator which is fixed onto the rotary shaft and has a plurality of segments, an armature coil wound so as to surround the teeth of the armature core and having a plurality of winding wires connected to the segments of the commutator, and a plurality of connecting wires connecting one pair of segments of the commutator, wherein the armature is arranged so as to be surrounded by the plurality of pairs of magnets and is rotatably supported by the housing; and a plurality of brushes capable of making sliding contact with the segments of the commutator of the armature, wherein the number of pole pairs of the magnets is two, the number of the teeth is 18, and the number of the segments of the commutator is 18, wherein the armature has a first conductive wire and a second conductive wire, wherein the plurality of winding wires has first to ninth winding wires formed from the first conductive wire, and other first to ninth winding wires formed from the second conductive wire and arranged so as to each face respective winding wires of the first to ninth winding wires, wherein the first to the ninth winding wires are joined together in a series via respective connecting wires of the nine connecting wires formed from the first conductive wire, wherein the other first to ninth winding wires are joined together in a series via respective connecting wires of the other nine connecting wires formed from the second conductive wire, wherein respective winding wires of the first to ninth winding wires and the other first to ninth winding wires form first to fourth coil winding wires which are connected in series to each other, an end of the first coil winding wire is connected to one segment of the commutator in the state of being wounded around the rotary shaft, and an end of the fourth coil winding wire is connected to a segment adjacent to the segment to which the end of the first coil winding wire is connected in the state of being wound around the rotary shaft, wherein the first coil winding wire is wound so as to surround four teeth adjacent to each other, wherein the second coil winding wire is arranged at a position adjacent to the four teeth around which the first coil winding wire is wound with one tooth therebetween, and is wound so as to surround four other teeth adjacent to each other, wherein the third coil winding wire is arranged at a position adjacent, on the side opposite to the side where the first coil winding wire exists, to the four teeth around which the second coil winding wire is wound, and is wound so as to surround four other teeth adjacent to each other, wherein the fourth coil winding wire is arranged at a position adjacent, on the side opposite to the side where the second coil winding wire exists, to the four teeth around which the third coil winding wire is wound with one tooth therebetween, and is wound so as to surround four other teeth adjacent to each other, wherein the winding direction of the second coil winding wire is opposite to the winding direction of the first coil winding wire, wherein the nine connecting wires and the other nine connecting wires are each connected to one pair of segments which is arranged to face each other in a radial direction and wherein the plurality of brushes have first and second brushes selectively connected to a first power supply terminal, and a third brush connected to a second power supply terminal, the first brush is arranged at a position separated from the third brush by an electrical angle of about 180°, and the second brush is arranged at a position separated by a predetermined angle from a position separated from the third brush by an electric angle of about 180°.

18. An electric motor comprising:

a housing which is a magnetic yoke;

a plurality of pairs of magnets fixed onto the inner wall of the housing;

an armature including a rotary shaft, an armature core which is fixed onto the rotary shaft and has a plurality of radially formed teeth, a commutator which is fixed onto the rotary shaft and has a plurality of segments, an armature coil wound so as to surround the teeth of the armature core and having a plurality of winding wires connected to the segments of the commutator, and a plurality of connecting wires connecting one pair of segments of the commutator, wherein the armature is arranged so as to be surrounded by the plurality of pairs of magnets and is rotatably supported by the housing; and a plurality of brushes capable of making sliding contact with the segments of the commutator of the armature, wherein the number of pole pairs of the magnets is two, the number of the teeth is 18, and the number of the segments of the commutator is 18, wherein the armature has a first conductive wire and a second conductive wire, wherein the plurality of winding wires has first to ninth winding wires formed from the first conductive wire, and other first to ninth winding wires formed from the second conductive wire and arranged so as to each face respective winding wires of the first to ninth winding wires, wherein the first to the ninth winding wires are joined together in a series via respective connecting wires of the nine connecting wires formed from the first conductive wire, wherein the other first to ninth winding wires are joined together in a series via respective connecting wires of the other nine connecting wires formed from the second conductive wire, wherein respective winding wires of the first to ninth winding wires and the other first to ninth winding wires form first to fourth coil winding wires which are connected in series to each other, an end of the first coil winding wire is connected to one segment of the commutator in the state of being wound around the rotary shaft, and an end of the fourth coil winding wire is connected to a segment adjacent to the segment to which the end of the first coil winding wire is connected in the state of being wound around the rotary shaft, wherein the first coil winding wire is wound so as to surround four teeth adjacent to each other, wherein the second coil winding wire is wound so as to surround four other teeth which are adjacent to each other which are five teeth away with respect to the four teeth around which the first coil winding wire is wound, wherein the third coil winding wire is arranged at a position adjacent, on the side opposite to the side where the first coil winding wire exists, to the four teeth around which the second coil winding wire is wound with one tooth therebetween, and is wound so as to surround four other teeth adjacent to each other, wherein the fourth coil winding wire is arranged at a position adjacent to the four teeth around which the second coil winding wire is wound between the first coil winding wire and the second coil winding wire, and is wound so as to surround four other teeth adjacent to each other, wherein the winding directions of the first coil winding wire and the second coil winding wire are the same as each other, the winding directions of the third coil winding wire and the fourth coil winding wire are the same as each other, and the winding direction of the first coil winding wire and the winding direction of the third coil winding wire are opposite to each other, wherein the nine connecting wires and the other nine connecting wires are each connected to one pair of segments which is arranged to face each other in a radial direction and wherein the plurality of brushes have first and second brushes selectively connected to a first power supply terminal, and a third brush connected to a second power supply terminal, the first brush is arranged at a position separated from the third brush by an electrical angle of about 180°, and the second brush is arranged at a position separated by a predetermined angle from a position separated from the third brush by an electric angle of about 180°.

19. An electric motor comprising:

a housing which is a magnetic yoke;

a plurality of pairs of magnets fixed onto the inner wall of the housing;

an armature including a rotary shaft, an armature core which is fixed onto the rotary shaft and has a plurality of radially formed teeth, a commutator which is fixed onto the rotary shaft and has a plurality of segments, an armature coil wound so as to surround the teeth of the armature core and having a plurality of winding wires connected to the segments of the commutator, and a plurality of connecting wires connecting one pair of segments of the commutator, wherein the armature is arranged so as to be surrounded by the plurality of pairs of magnets and is rotatably supported by the housing; and a plurality of brushes capable of making sliding contact with the segments of the commutator of the armature, wherein the number of pole pairs of the magnets is two, the number of the teeth is 18, and the number of the segments of the commutator is 18, wherein the armature has a first conductive wire and a second conductive wire, wherein the plurality of winding wires has first to ninth winding wires formed from the first conductive wire, and other first to ninth winding wires formed from the second conductive wire and arranged so as to each face respective winding wires of the first to ninth winding wires, wherein the first to the ninth winding wires are joined together in a series via respective connecting wires of the nine connecting wires formed from the first conductive wire, wherein the other first to ninth winding wires are joined together in a series via respective connecting wires of the other nine connecting wires formed from the second winding wire, wherein respective winding wires of the first to ninth winding wires and the other first to ninth winding wires have a first coil winding wire and a second coil winding wire which are connected in series to each other, an end of the first coil winding wire is connected to one segment of the commutator, and an end of the second coil winding wire is connected to a segment adjacent to a segment to which the end of the first coil winding wire is connected, wherein the first coil winding wire is wound so as to surround four teeth adjacent to each other, and the second coil winding wire is arranged at a position adjacent to the four teeth around which the first coil winding wire is wound, and is wound so as to surround four other teeth adjacent to each other, wherein the winding direction of the second coil winding wire is opposite to the winding direction of the first coil winding wire, wherein respective connecting wires of the nine connecting wires and respective connecting wires of the other nine connecting wires are connected to one pair of segments which is arranged to face each other, and wherein the brushes have first and second brushes selectively connected to a first power supply terminal, and a third brush connected to a second power supply terminal, the first brush is arranged at a position separated from the third brush by an electrical angle of about 180°, and the second brush is arranged at a position separated by a predetermined angle from a position separated from the third brush by an electric angle of about 180°.

20. The electric motor according to claim 19, wherein the second coil winding wire is arranged in the right direction with respect to the first coil winding wire, and the segment to which the end of the second coil winding wire is connected is arranged in the left direction with respect to the segment to which the end of the first coil winding wire is connected.

21. An electric motor comprising:
a housing which is a magnetic yoke;
a plurality of pairs of magnets fixed onto the inner wall of the housing;
an armature including a rotary shaft, an armature core which is fixed onto the rotary shaft and has a plurality of radially formed teeth, a commutator which is fixed onto the rotary shaft and has a plurality of segments, an armature coil wound so as to surround the teeth of the armature core and having a plurality of winding wires connected to the segments of the commutator, and a plurality of connecting wires connecting one pair of segments of the commutator, wherein the armature is arranged so as to be surrounded by the plurality of pairs of magnets and is rotatably supported by the housing; and a plurality of brushes capable of making sliding contact with the segments of the commutator of the armature, wherein the number of pole pairs of the magnets is two, the number of the teeth is 18, and the number of the segments of the commutator is 18, wherein the armature has a first conductive wire and a second conductive wire, wherein the plurality of winding wires has first to ninth winding wires formed from the first conductive wire, and other first to ninth winding wires formed from the second conductive wire and arranged so as to each face respective winding wires of the first to ninth winding wires, wherein the first to the ninth winding wires are joined together in a series via respective connecting wires of the nine connecting wires formed from the first conductive wire, wherein the other first to ninth winding wires are joined together in a series via respective connecting wires of the other nine connecting wires formed from the second winding wire, wherein respective winding wires of the first to ninth winding wires and the other first to ninth winding wires have a first coil winding wire and a second coil winding wire which are connected in series to each other, an end of the first coil winding wire is connected to one segment of the commutator, and an end of the second coil winding wire is connected to a segment adjacent to a segment to which the end of the first coil winding wire is connected, wherein the first coil winding wire is wound so as to surround four teeth adjacent to each other, and the second coil winding wire is arranged at a position adjacent to the four teeth around which the first coil winding wire is wound with one tooth therebetween, and is wound so as to surround four other teeth adjacent to each other, wherein the winding direction of the second coil winding wire is opposite to the winding direction of the first coil winding wire, wherein respective connecting wires of the nine connecting wires and respective connecting wires of the other nine connecting wires are connected to one pair of segments which is arranged to face each other, and wherein the brushes have first and second brushes selectively connected to a first power supply terminal, and a third brush connected to a second power supply terminal, the first brush is arranged at a position separated from the third brush by an electrical angle of about 180°, and the second brush is arranged at a position separated by a predetermined angle from a position separated from the third brush by an electric angle of about 180°.

22. The electric motor according to claim 21, wherein the second coil winding wire is arranged in the right direction with respect to the first coil winding wire, and the segment to which the end of the second coil winding wire is connected is arranged in the left direction with respect to the segment to which the end of the first coil winding wire is connected.

23. An electric motor comprising:
a housing which is a magnetic yoke;
a plurality of pairs of magnets fixed onto the inner wall of the housing;
an armature including a rotary shaft, an armature core which is fixed onto the rotary shaft and has a plurality of radially formed teeth, a commutator which is fixed onto the rotary shaft and has a plurality of segments, an armature coil wound so as to surround the teeth of the armature core and having a plurality of winding wires connected to the segments of the commutator, and a plurality of connecting wires connecting one pair of segments of the commutator, wherein the armature is arranged so as to be surrounded by the plurality of pairs of magnets and is rotatably supported by the housing; and
a plurality of brushes capable of making sliding contact with the segments of the commutator of the armature,
wherein segments which exist at positions which are point symmetric about the rotary shaft among the segments are electrically connected to each other via the connecting wires,
wherein the number of pole pairs of the magnets is two, the number of the teeth is 18, and the number of the segments of the commutator is 18,
wherein the armature has a first conductive wire and a second conductive wire,
wherein the plurality of winding wires has first to ninth winding wires formed from the first conductive wire, and other first to ninth winding wires formed from the second conductive wire and arranged so as to be spaced apart from respective winding wires of the first to ninth winding wires, respectively, by predetermined gaps,
wherein the first to ninth winding wires form first and second coil winding wires which are connected in series to each other, an end of the first coil winding wire is connected to one segment of the commutator, and an end of the second coil winding wire is connected to a segment spaced apart by a predetermined gap from the segment to which the end of the first coil winding wire is connected,
wherein the other first to ninth winding wires form third and fourth coil winding wires which are connected in series to each other, an end of the third coil winding wire is connected to one segment of the commutator, and an end of the fourth coil winding wire is connected to a segment spaced apart by a predetermined gap from the segment to which the end of the first coil winding wire is connected,
wherein the first coil winding wire is wound so as to surround four teeth adjacent to each other,
wherein the second coil winding wire is wound so as to surround four teeth adjacent to each other, including any one slot of slots around which the winding wires are wound, with respect to the four teeth around which the first coil winding wire is wound,
wherein the third coil winding wire is wound so as to surround four other teeth adjacent to each other from a position spaced apart by two teeth from the four teeth around which the second coil winding wire is wound,
wherein the fourth coil winding wire is wound so as to surround four teeth adjacent to each other, including a slot adjacent to the second coil winding wire on the opposite side among slots around which the winding wires are wound, with respect to the four teeth around which the third coil winding wire is wound,
wherein the first coil winding wire and the third coil winding wire are wound in the same direction as each other, the second coil winding wire and the fourth coil winding wire are wound in the same direction as each other, and the winding direction of the first coil winding wire and the winding direction of the second coil winding wire are directions opposite to each other,
wherein respective connecting wires of the nine connecting wires and respective connecting wires of the other nine connecting wires are connected to one pair of segments which is arranged to face each other, and
wherein the brushes have first and second brushes selectively connected to a first power supply terminal, and a third brush connected to a second power supply terminal, the first brush is arranged at a position separated from the third brush by an electrical angle of about 180°, and the second brush is arranged at a position separated by a predetermined angle from a position separated from the third brush by an electric angle of about 180°.

\* \* \* \* \*

UNITED STATES PATENT AND TRADEMARK OFFICE
CERTIFICATE OF CORRECTION

PATENT NO.        : 8,378,547 B2                                                Page 1 of 1
APPLICATION NO.   : 12/737308
DATED             : February 19, 2013
INVENTOR(S)       : Sakata et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 216 days.

Signed and Sealed this
First Day of September, 2015

Michelle K. Lee
*Director of the United States Patent and Trademark Office*